United States Patent
Leo

(12) 
(10) Patent No.: US 6,267,875 B1
(45) Date of Patent: *Jul. 31, 2001

(54) REUSABLE SPIN-ON MULTI SYSTEM OIL FILTER AND METHOD OF RECLAIMING USED FILTER CANISTERS

(76) Inventor: Ano Leo, 229 Sandstone Dr. N.W., Calgary, Alberta (CA), T3K B9

( * ) Notice: Subject to any disclaimer, the term of this patent is extended or adjusted under 35 U.S.C. 154(b) by 0 days.

This patent is subject to a terminal disclaimer.

(21) Appl. No.: 09/194,158

(22) PCT Filed: May 23, 1997

(86) PCT No.: PCT/CA97/00343

§ 371 Date: Nov. 23, 1998

§ 102(e) Date: Nov. 23, 1998

(87) PCT Pub. No.: WO97/44114

PCT Pub. Date: Nov. 27, 1997

Related U.S. Application Data

(63) Continuation-in-part of application No. 08/652,355, filed on May 23, 1996, now Pat. No. 5,814,211.

(30) Foreign Application Priority Data

May 23, 1996 (CA) .................................................. 2177182

(51) Int. Cl.[7] .......................... B01D 35/06; B01D 35/147
(52) U.S. Cl. ............................ 210/90; 210/132; 210/136; 210/223; 210/232; 210/315; 210/316; 210/338; 210/424; 210/443; 210/456; 210/DIG. 17; 184/6.24; 184/6.25; 123/196 A
(58) Field of Search .......................... 210/90, 132, 136, 210/223, 232, 249, 315, 316, 338, 416 S, 424, 443, 444, 456, 499, DIG. 17; 123/196 A; 184/6.24, 6.25

(56) References Cited

U.S. PATENT DOCUMENTS

| | | | |
|---|---|---|---|
| 3,397,786 | * | 8/1968 | Hultgren ............................... 210/132 |
| 5,078,877 | * | 1/1992 | Cudaback et al. ................... 210/315 |
| 5,160,037 | * | 11/1992 | LeCour ................................. 210/90 |

(List continued on next page.)

FOREIGN PATENT DOCUMENTS

| | | |
|---|---|---|
| 14 36 276 A | 5/1969 | (DE) . |
| 14 61 434 B | 3/1970 | (DE) . |
| 19 51 608 A | 4/1971 | (DE) . |
| 28 00 486 A | 8/1978 | (DE) . |
| 24 34 075 B | 7/1997 | (DE) . |
| 0 287 527A | 10/1988 | (EP) . |
| 1 333 859 A | 11/1968 | (GB) . |
| 2 295 331 | 5/1996 | (GB) . |

*Primary Examiner*—David A. Reifsnyder
(74) *Attorney, Agent, or Firm*—McFadden, Fincham

(57) ABSTRACT

The invention is a spin-on type filter with a reclaimed permanent filter casing and permanent filtering media that are washable and reusable. There are three distinct progressive filtering systems that function simultaneously, but separately within one filter housing, one is the full flow filtering at 10 micron capability while the other is in its bypass fine filtering mode at 1 to 3 micron filtering capability. In addition, a safety full flow filter can be activated to filter the return oil while the main full flow medium is fouled. Each system can be implemented with multiple media. The main body of the filter, which comprises the filter head and the media, can be separated easily for servicing from its casing which is designed to attach to the engine. Fine stainless steel cloths are utilized as filtering media which can last the life of an engine Furthermore, magnets arc utilized to trap suspending metal filings in oil flow. The design of the main filter body as such is that any used conventional filter canister can be simply adapted to it or a new filter canister casing can be utilized whichever is the advantage at the time of installation and of in production.

20 Claims, 97 Drawing Sheets

U.S. PATENT DOCUMENTS

| | | | |
|---|---|---|---|
| 5,207,898 | * | 5/1993 | Hodgkins .............................. 210/136 |
| 5,228,990 | * | 7/1993 | Chiang ................................. 210/223 |
| 5,366,400 | * | 11/1994 | Kuick ........................... 210/DIG. 17 |
| 5,447,627 | * | 9/1995 | Loafman et al. ..................... 210/316 |
| 5,569,373 | * | 10/1996 | Smith et al. ........................... 210/90 |

* cited by examiner

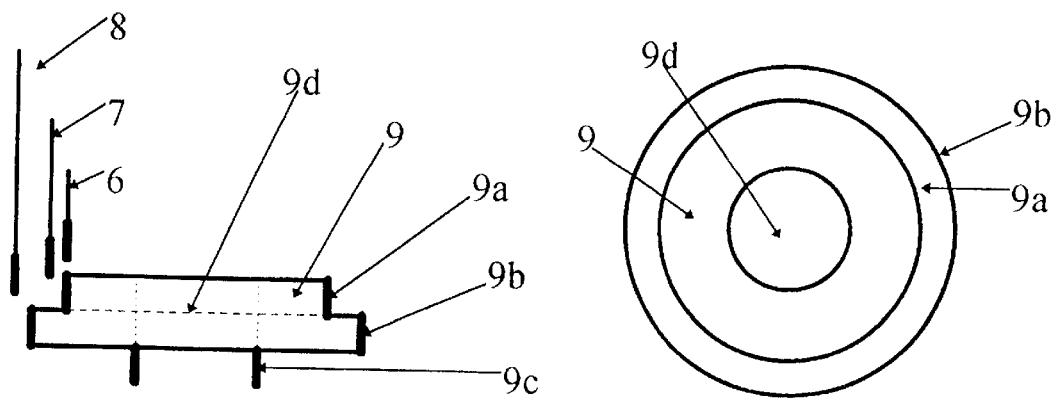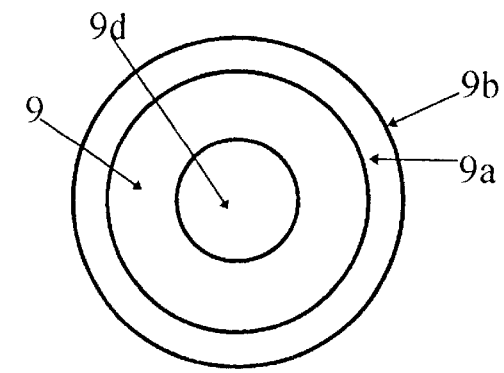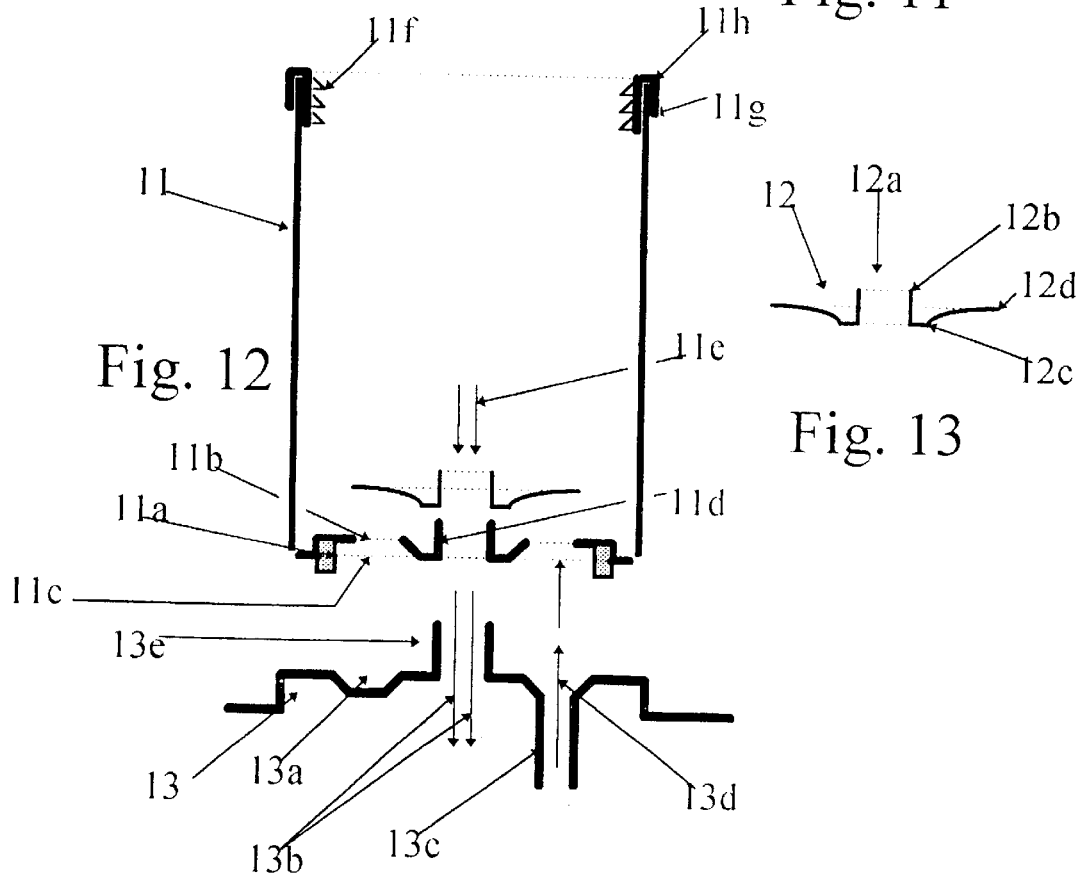

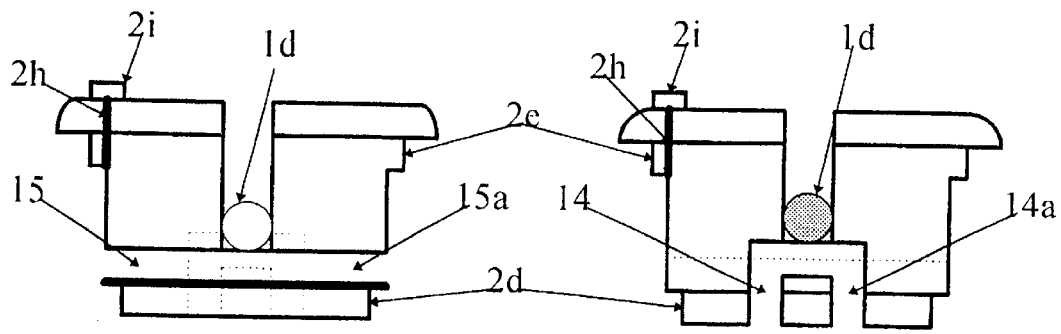
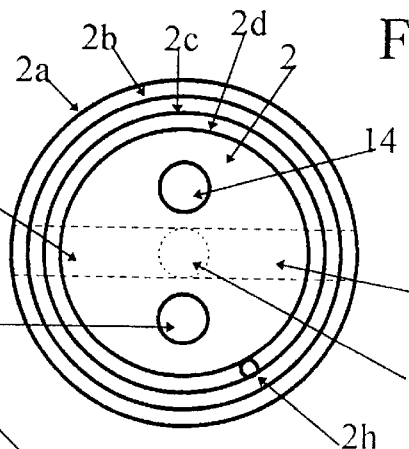
Fig. 15  Fig. 16
Fig. 17
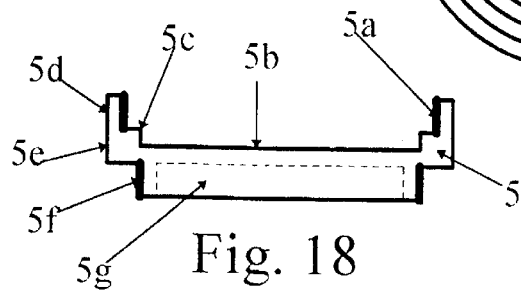
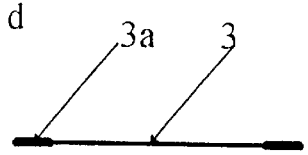
Fig. 18  Fig. 20
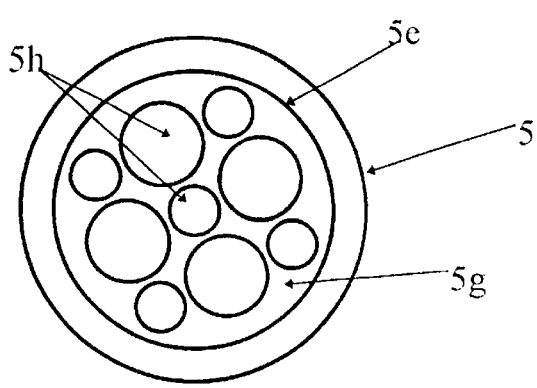
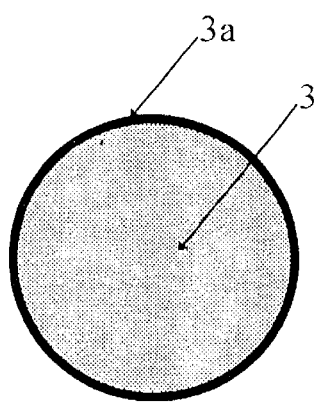
Fig. 19  Fig. 21

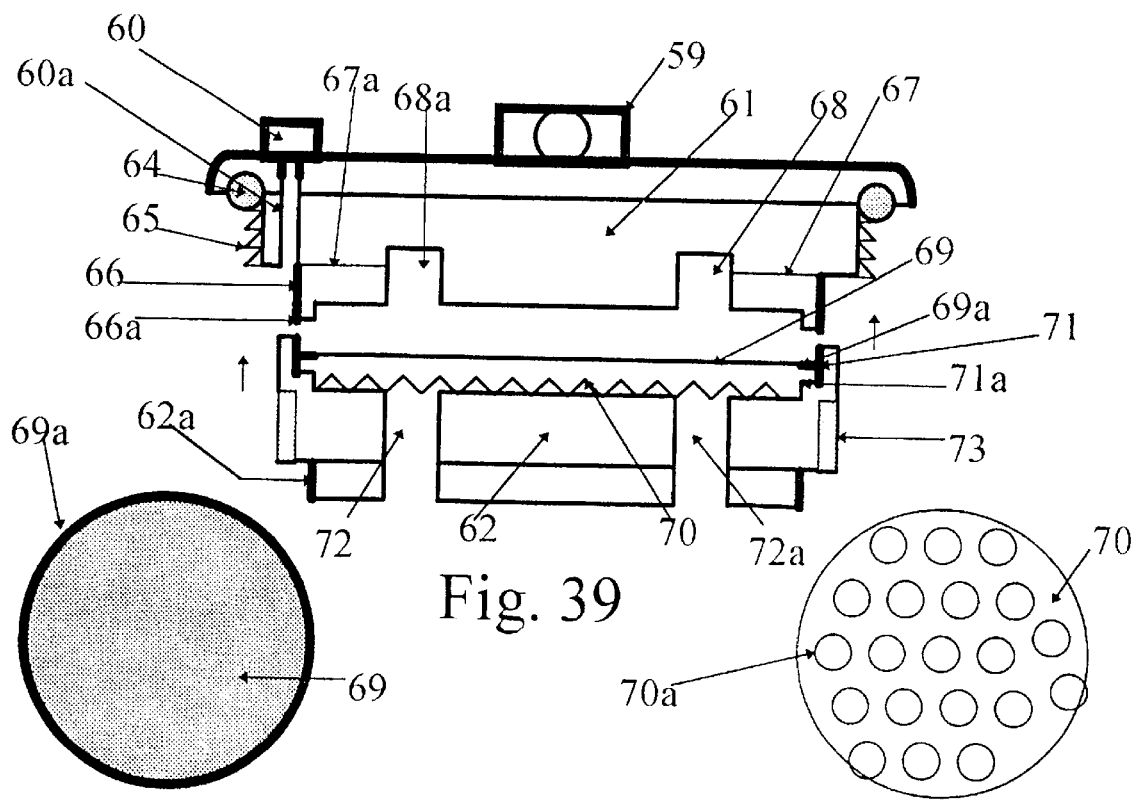
Fig. 39
Fig. 40
Fig. 41
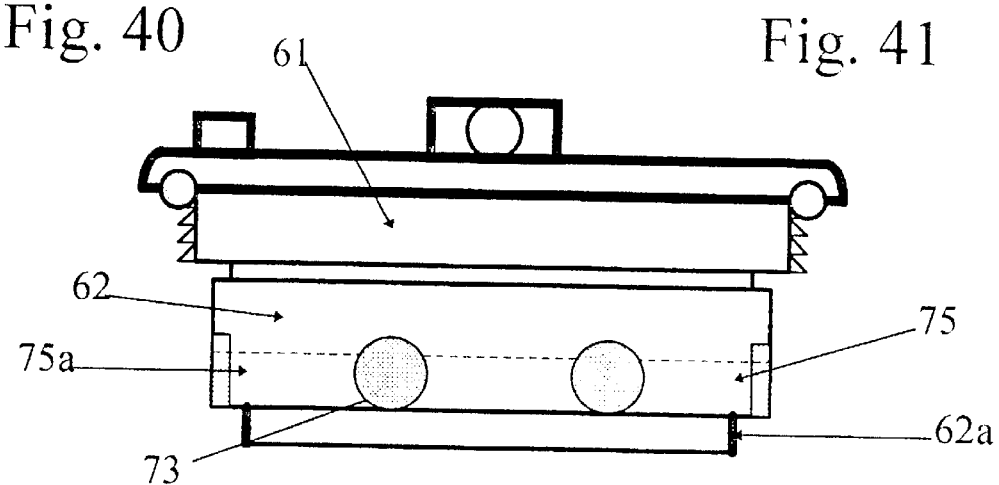
Fig. 42

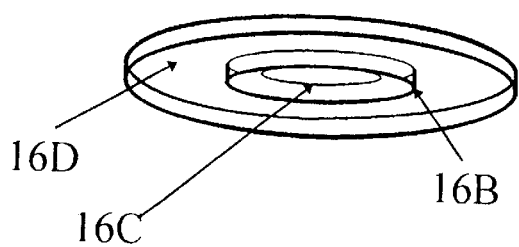
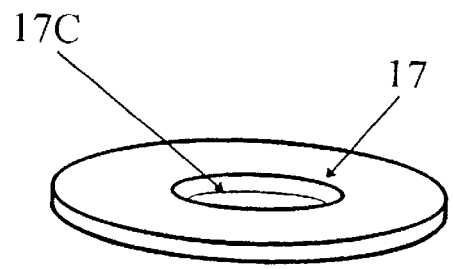
FIG. 80  FIG. 81
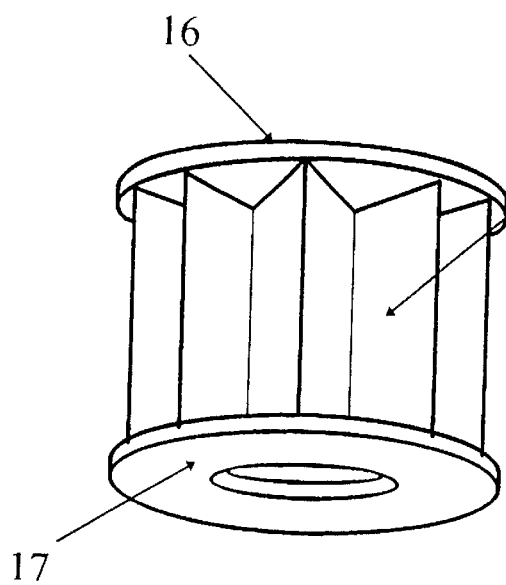
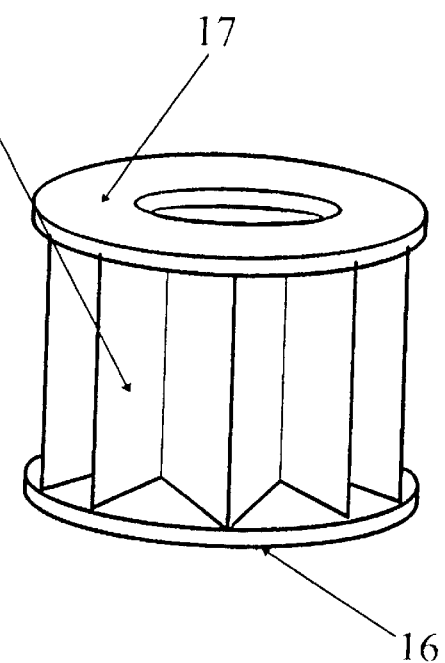
FIG. 82  FIG. 83

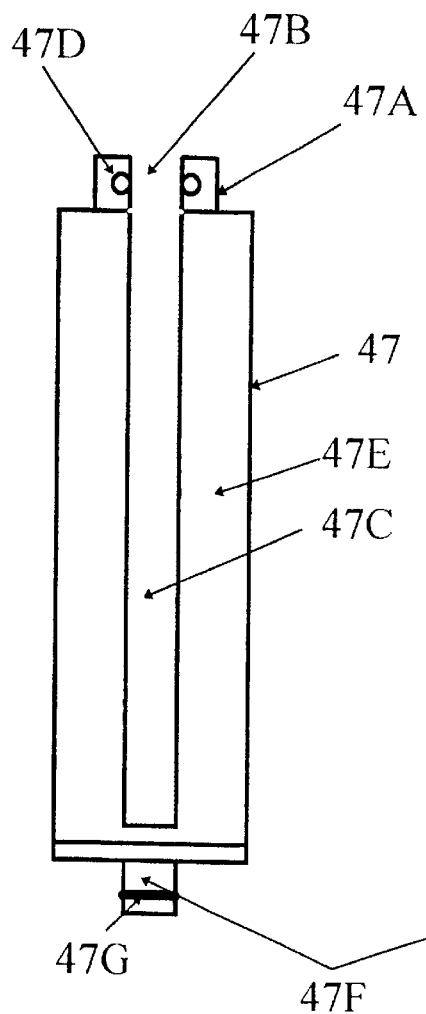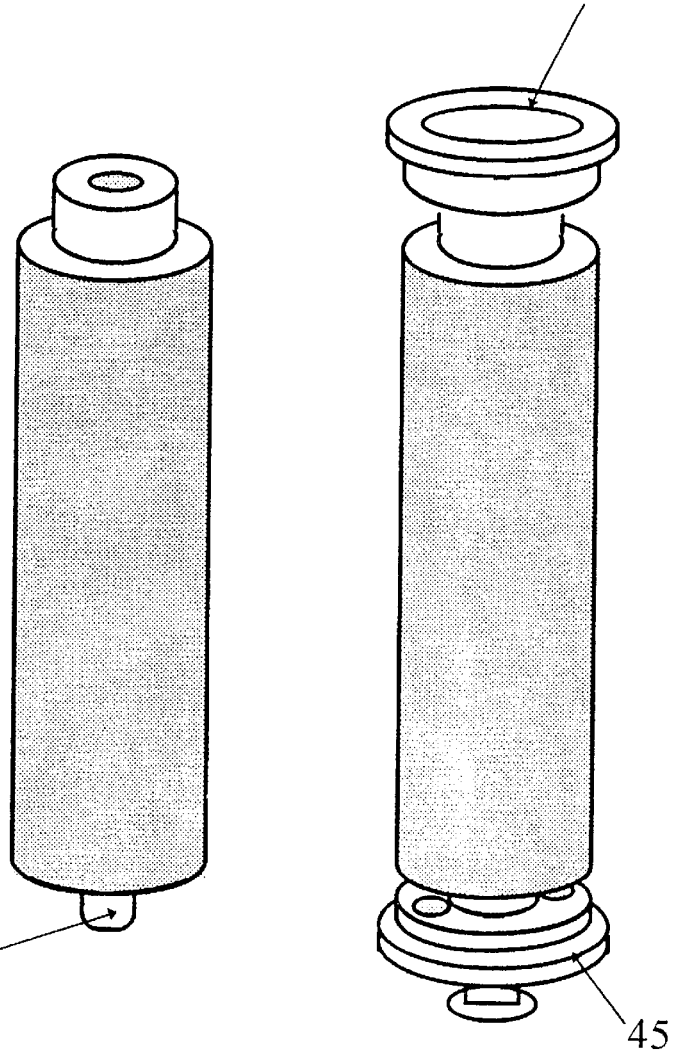
FIG. 151　　　FIG. 152　　　FIG. 153

REUSABLE SPIN-ON MULTI SYSTEM OIL FILTER AND METHOD OF RECLAIMING USED FILTER CANISTERS

This application is a continuation-in-part of U.S. patent application No. 08/652,355, filed May 23, 1996, now U.S. Pat. No. 5,814,211.

TECHNICAL FIELD

The present invention relates to liquid filters and more particularly the present invention relates to disposable filters suitable for use in connection with internal combustion engines.

BACKGROUND ART

Environmental concerns regarding soil and atmospheric contamination, caused by automotive related pollutants are becoming increasingly important issues for all governments. New passenger vehicles that come off the production line typically requires an average of 6 to 8 oil and oil filter changes every year for a 12 to 14 year period, typically average driving life for North American passenger vehicles. Commercial vehicles require 12 or more oil and oil filter changes every year. Older vehicles require even more frequent changes.

The disposal of used oil filters and waste oils is costly. The waste generated from filters and discarded oil amounts to billions of units daily world wide.

Conventional oil filters presently on the market are made for disposal after each usage. The filtering pore size of these filters varies from 20 to 120 microns. Conventional oil filters on the market are equipped with a safety valve but some are not. Of those filters, oil starvation to the engine may occur as they are prone to pressure breaks, which opens the paper fibre element and forces the oil to channel through the filter thus eliminating its filtering efficiency. Under proper operation a conventional filter restricts main oil flow from the filter medium clogging. Oil pressure then forces the built-in safety valve to open to allow unfiltered oil to flow back freely to the engine, preventing oil starvation which will lead to serious engine damage. Clearly, unfiltered oil may then flow through the engine and due to the high pressure of the oil particles on the surface of the fully clogged paper medium are transported through the engine and contact delicate engine parts.

In terms of materials of which typical filters are made, generally metals are employed for the canister and paper fiber for the filter medium. These materials and the energy used to produce them can be conserved by practicing the present invention.

Other than the full flow oil filters, auxiliary bypass filtering systems for finer micron filtrations are also commonly found on the market. An auxiliary bypass system works like a dialysis machine, a small amount of fluid is taken, cleaned, and returned into the source for merger with the main source. As an example, approximately 30 minutes to about one hour is one cycle for a full sump tank of 4 litres of motor oil to be cleaned by a bypass system. Some of the full flow filters allow for 16 gallons per minute of oil to be filtered through the engine. The bypass system does not emphasize oil flow but the efficiency in filtering particles in the smallest micron sizes, usually in 1 to 3 microns. Generally speaking the conventional bypass oil filters on the market are bulky units, installed separately from the existing full flow system. They are extremely labour intensive to install and are much more expensive than the full flow filters. These bypass filters are designed to be disposed of at the time the engine oil is changed.

INDUSTRIAL APPLICABILITY

The invention has applicability in the filter art and more particularly the invention has distinct applicability in the internal combustion engine lubricant filtration art.

DISCLOSURE OF THE INVENTION

One object of the present invention is to provide an improved oil filter.

A further object of one embodiment of the present invention is to provide a reusable oil filter, comprising:
  a hollow container having opposed ends;
  a plurality of spaced apart concentric filtration members removably mounted in concentric relation within the container, each member having a different porosity for filtering;
  removable filter head means releasably mounted to the hollow container; and
  filter base means removably mounted to the container, the filter base means having an inlet to receive oil to be filtered and an outlet to discharge filter oil.

The filter includes upper and lower filter body members and an annular oil flow space between the filter body members and the housing.

In a further aspect, flow guide means are provided to direct the flow of oil within the filter towards the filtration media. The various aspects of the invention are directed towards enhancing the effectiveness of the filter in a manner not hereto achieved by the prior art. In particular reference may be had to German Patent Publication 1,416,434 (Gray) disclosing a multistage filter having a bypass valve means, but not featuring a filter head as identified above.

The filter head may be circular in shape, preferably a solid piece, it can be made out of materials such as; plastic, cast iron, steel or aluminum depending on its intended applications. For example; for highly corrosive liquids, high quality stainless steel is used. For motor oil filtration, aluminum alloy is adequate for the invention. The versatile design of the filter head allows for its transformation to multifarious functions from simple filtration to multiple stage filtration within multiple filtering systems.

The filter head of the invention has added to its basic form a threaded cap as well as having an outer thread at the bottom of the filter head. Within the lower part of the filter head is a set of openings generally subscribing to a tunnel shape. The single tunnel is made by drilling a hole horizontally at right angles from one side of the filter head through to the other side. At this stage of the invention the filter head configuration forms a single functional filter head after having adapted to it a cylindrical shaped full flow filter medium. This basic form can be transformed into a much more complex filter head. The transformation is facilitated by the addition of various sized tunnels at designated points making oil passages associated with multiple filtering chambers. These chambers and tunnels may be located on different levels within the filter head. The number of tunnels or chambers required depend on the complexity of various filtering requirements. As an example, the one solid piece, single open tunnel filter head is appropriate for one filtering stage of a full flow filtering system which is a simple application of the invention. A two piece, multiple level, filter may have eight tunnels in the filter head. Some tunnels could be inter-connected and lead to two or more filtering chambers for specific filtering requirements. Oil filtering chambers within the filter head are formed to accommodate circular sheet filtering media by providing recess spaces. Circular disks containing the medium supporting members and filtering media join the parts of the filter together and are sealed by O rings. This system allows for a single filtering system or if the addition of filter medium connecting members or brushings are added a multiple stage filtering is achieved. This system not only allows for the above multiple stage filtering implementations, but also allows for the accommodation of additional component parts as required. Various porosity of filtering media which are flat circular sheets of tailor cut stainless steel cloth made from course to fine meshes are sandwiched between the recessed bushings. This multiple chamber filter head is a multiple stage filtering device, a bypass filtering system and it is one of the three distinct progressive filtering systems of the invention.

The versatility of the invention allows for implementation of either single stage or multiple stage filtering which is dependent on the number of filtering media and medium bushing disks implemented within the filter head. To extend the function of the filter head, and maximize the filtering effects by utilizing various flow tunnels built-in the filter head, a consolidated three piece full flow filtering device all in cylindrical configuration with both circular ends open, can be incorporated at the bottom part of the filter head. At this stage, the filter head itself can be in the single filtering stage or in the multiple filtering stage depending on how many circular medium bearing bushing disks and how many sheet media have been installed.

The three piece filtering device in cylindrical configuration comprises the main full flow system of the invention. This includes a perforated flow guide on the outside, steel cloth medium and the core member which is threaded at both ends, corrugated and is a perforated element supporting member which is a rigid member, has one end secured to the bottom threaded retaining rim of the filter head and the other end is secured and enclosed by an outwardly threaded retaining base member. The retaining base has a centre hole for return oil flow and when the components are assembled a complete filtering core is formed. The oil flow guide has outward deflecting lips at one side of each perforated hole and the lips are all facing the same direction which is in the direction of the main oil flow. The flow guide is spaced a minimum of 2 mm away from the outside circumferential surface of the cylindrical main flow filtering element. The purpose and function of the flow guide during the oil flow restricted mode, is to prevent particles that were loaded on the surface of the fully clogged medium, from being washed off by the vibrantly moving main oil flow via the open safety valve tunnel which flows back to the engine. Within the empty core space of the rigid full flow medium supporting member, a smaller cylindrical device resembling this member, but comprised of a finer medium and its support member can be installed in addition to the full flow medium. These additional members form a progressive multiple stage full flow filtering system when incorporated in the staged filtering system. This additional stage can increase the holding capacity of the filter and enhance its efficiency due to the entrapping of smaller contaminants due to the increased range of filtering media sizes utilized.

As a further embodiment the circular medium bearing disks may be installed by the same threaded means as the bottom retaining rim of the filter head. This is the safety full flow filtering system located at the exit of the safety valve tunnel installed after the safety valve. This version of the invention is equipped with a three-in-one pressure activated device; safety valve, sensor and dash board light indicator. If the cylindrical main full flow filtering medium becomes clogged causing the oil flow restriction sensor light to illuminate the safety valve is open and the main oil flow enters the safety tunnel and is filtered by the safety full flow filter. This safety full flow filtering measure, after the safety valve of the invention is a safety feature that the conventional oil filters presently do not have provided. The invention may employ any existing sensors or safety valves depending on different applications desired.

According to a further feature of the present invention, magnets may be included. The magnets are useful to attract metal debris within the oil flow to remove them from possible contact with engine parts. Advantageously, the filtering body can be easily dismantled by unthreading the component parts cleaning of the magnetic implants makes them highly effective.

Conveniently, the two distinct filtering mechanisms may be housed in a generic filter canister. The basic filter head incorporates a single cylindrical full flow element and safety valve. The complex filter head incorporates a multiple tunnel, multiple chamber for multiple stage filtering and in addition to that having a safety full flow filter, a cylindrical full flow filtering device and magnets forming four distinct and separate filtering systems housed within one filter canister.

The invention comprises a single stage to multiple stage bypass filtering system as well as a safety filtering system within the filter head. The invention utilizes a range of 1 to 35 micron, circular sheet steel cloth elements. The cylindrical full flow element also has various ranges of micron sizes, typically 1 $\mu$m to about 300 $\mu$m that can be used depending upon specific requirements.

Advantageously, the invention enables alternate filtering configurations to be employed. When installing space for the filter on a given engine is important, the invention filter body configuration can be changed by the safety valve being incorporated at the bottom centre of the filter head thus yielding space and enabling a shorter filter bead to be made. This filter bead of the invention comprises nearly all functions as the aforementioned but without the sensor and the indicating light and the safety full flow filter system.

A further object of one embodiment of the present invention is to provide an internal combustion engine oil filter insert kit, comprising:

a plurality of reusable individual filter elements;
  a plurality of connecting elements for releasably connecting the filter elements together to form an insert; and
  filter head means for releasably connecting the insert, the filter head means further including means for connection with an oil filter container.

Within the multiple chamber filter head, a plurality of holes, about 300 microns in diameter, depending on the size of the filter and flow requirement, may be included from the outer circumference of the filter head into the upper part of the bypass filtering chamber. These tiny holes are the inlet-port orifices for controlled amount of small oil streams that enter the upper filtering chamber to be filtered. A further versatile transformation of the filter head, is made by enlarging the diameter of the small stream in-port orifices which lead to the upper filter chamber. These can be covered to become main oil flow tunnels for oil passage and replacing the very fine filtering media to an appropriate porosity. Oil flow is thereby increased and the bypass system is easily transformed into a full flow filtering system from its original configuration.

Within the circular filter head, beneath the multiple chamber or the single chamber, three sets of oil flow tunnels are located on different levels. The first set of two vertical tunnels is part of the bypass system and is for the oil to permeate through and the filtered oil to merge with the main filtered return oil stream which comes through the cylindrical full flow medium. The second set of two tunnels is usually closed by the safety valve, except when the unfiltered main oil stream is restricted then the oil pressure forces the safety valve to open up allowing the main oil stream to flow back to the engine preventing starvation of oil to the engine. The third set of tunnels extends across from side to side in the lowest level of the filter head allowing oil flowing freely to reach the safety valve at any time in case the main full flow filtering medium is totally or partially fouled and oil flow is restricted. The forth is a small single tunnel running vertically down from a point near the rim at the top of the filter head. This small tunnel becomes the drain conduit for draining oil from the invention before an oil and filter servicing. The drain conduit is also for the convenience of collecting oil samples for analytical purposes. At the bottom part of the filter head one end of the cylindrical medium supporting member and the cylindrical full flow medium are mounted. All return oil will flow within the supporting member. At the other end of the cylindrical medium supporting member, a retaining base member with a centre hole is mounted to secure the cylindrical medium supporting member and separate the oil path. The above, when fastened as a whole can be inserted into a cylindrical shape, open ended filter canister. The filter head can be secured to the canister by threaded means, the thread is located in the interior of the rim of the open ended canister and is sealed by an O-ring when screwed down preventing oil leakage.

The filter head and the discussed embodiment of the invention may be utilized with the conventional throw-away filter canister. The invention is able to adapt the convenience of the existing conventional method for installing an oil filter on an engine by spinning the same as is conventional. Part of the invention utilizes the conventional filter by machining off the filter top of the used canister and removing the used paper filter medium. Then the core of the invention is installed in the used filter canister by installing a U-shaped inner threaded metal ring right on and around the cut-off rim which re-in forces the used filter canister and makes it rigid.

The next operation covers the insertion of the entire filter body into the used filter canister. This insertion is threaded into the used filter canister by the outer threaded filter head being turned into the inner threaded metal ring. The embodiment of the invention is the utilization of the used filter canister adapted as described and or the production of a new filter canister which can be manufactured, either of which when utilized with the internal workings (core) previously described forms the entire invention. The servicing of the invention becomes one version of the invention the indicator light is illuminated when servicing the invention becomes necessary.

There are several configurations of the invention that have indicator light assemblies incorporated in their design. With respect to the embodiments of the invention that have indicator lights, the filter is serviced by unscrewing the top cap of the filter head and the whole filter body can be removed from the cylindrical filter canister. The main full flow medium is then fully exposed for easy cleaning. The bypass medium within can also be serviced at the same time and can be removed for servicing by removing the top portion of the filter head. For versions equipped without a sensor and indicator light, the filter may be services according to the manufacturer's recommended schedule; usually at three to six thousand kilometre intervals, or by the result of an oil sample analysis.

In the normal filtering mode, the oil flows into the invention via the one way valves from the engine, filling up the space inside the housing around the filter head and the body. The main stream of oil flows rapidly through the main full flow filtering element. It returns to the engine while the small orifices are receiving small streams of oil. The small stream of oil by pressure forces its way into the bypass chamber. The filtered oil then passes through the one to three micron steel cloth media. The fine oil which is in small quantities then runs down the two tunnels and merges with the filtered main oil stream within the cylindrical element supporting member and the oil then continues its flow path back to the engine.

In the restricted filtering mode, the main oil flow is restricted from the particle loaded filter medium; subsequently, via the open tunnel, oil pressure forces the safety valve to open allowing the main oil stream to flow through the two tunnels at different levels. At this stage the main oil stream returns to the engine without being filtered unless the safety full flow element is installed. There may be a small amount of oil permeating through the bypass system depending upon the condition of the bypass medium at this stage. Even though the bypass chamber, or chambers may be prematurely clogged with particles, this does not affect the unfiltered main oil stream flow through the full flow element when it is in normal mode.

A further object of one embodiment of the present invention is designed to reduce environmental waste by reclaiming the innumerable discarded conventional oil filter canisters and by reducing the frequency of oil changes. Reducing the contamination of dump sites by eliminating the disposal of those large numbers of paper filtering media and greatly reducing the amount of used oil through more efficient filtration. The invention also offers a filtering device with adaptability, versatility, efficiency and is economical thereby providing a better alternative to conventional oil filters. The invention is a highly efficient filtration system suited for both heavy industrial usages and retail automotive trade.

A still further object of one embodiment of the present invention is to provide a method of filtering internal combustion engine oil, comprising the steps of:

providing a plurality of reusable discrete filtering elements, each having a different pore size for filtering particulates entrained in an oil feed, each of the filtered elements being releasably connectable with an adjacent element;

disposing the filter elements coaxially within a container, the container adapted for connection with an oil outlet of the internal combustion engine;

introducing oil into the container for passage through each of the filter elements; and progressively filtering a variety of particle sizes from the oil.

Having thus generally described the nature of the invention, reference will now be to the accompanying drawings, illustrating preferred embodiments.

BRIEF DESCRIPTION OF THE DRAWINGS

FIG. 10 is a cross-sectional view of the circular retaining base-member and the coordinated positions of the cylindrical medium supporting member, the cylindrical full flow medium and the cylindrical flow guide;

FIG. 11 is a top view of the retaining base-member;

FIG. 12 is a cross-sectional view of the open ended conventional filter canister;

FIG. 13 is a cross-sectional view of the dual function circular seal gasket and the back flow flap cover;

FIG. 14 is a cross-sectional view of simulated oil filter mounting base on an engine;

FIG. 15 is another cross-sectional view of the one piece filter head illustrates the safety valve in its open position and the two safety flow tunnels;

FIG. 16 is another cross-sectional view of the one piece filter head illustrates the open flow tunnel at the lower part of the filter head and the closed position of the safety valve;

FIG. 17 is a bottom view of the filter head illustrates the coordinated positions of the two safety valve flow-tunnels-exits in FIG. 15, the open flow tunnel in FIG. 16 and the safety valve chamber in FIG. 15 and 16;

FIG. 18 is another cross-sectional view of the circular adaptable bushing disk in FIG. 6;

FIG. 19 is a top view of the circular adaptable bushing disk;

FIG. 20 is a cross-sectional view of the circular steel cloth sheet medium with no centre opening comprising a U-ring sealing gasket mounted on its outer edge;

FIG. 21 is a top view of the circular steel cloth sheet medium referred to in FIG. 20;

FIG. 39 is a cross-sectional view of the transformed two piece filter head comprises with a single stage bypass system;

FIG. 40 is a top view of the first circular bypass sheet medium without the centre opening referred to in FIG. 21;

FIG. 41 is a top view of the first circular perforated and corrugated underlay member referred to FIG. 5;

FIG. 42 is a cross-sectional view of the two piece filter head enclosed with a single stage bypass system;

FIG. 80 is a perspective view of the underside of the top mounting plate of the safety filter medium;

FIG. 81 is a perspective view of the top of FIG. 80;

FIG. 82 is a perspective view of the safety filter medium cartridge;

FIG. 83 is a similar view to FIG. 82 in a different attitude;

FIG. 120 is a similar view of FIG. 119 schematically illustrating the oil movement;

FIG. 121 is a similar view of FIG. 120 illustrating the oil movement in a different mode;

FIG. 122 is an exploded view of the warning device according to a further embodiment;

FIG. 123 is a perspective view of a central valve for use in the present invention;

FIG. 124 is a cross-sectional view of FIG. 123;

FIG. 125 is a perspective view of FIG. 123 illustrating the underside of the valve;

FIG. 126 is an exploded view of the warning device, filter cap, valve spring and center valve casing;

FIG. 127 is a cross-sectional view of the fully assembled safety valve warning device and filter cap affixed thereto;

FIG. 128 is a similar view to FIG. 127 with the safety valve spring removed;

FIG. 129 is a similar view to FIG. 128 illustrating the valve in a closed position;

FIG. 130 is a perspective view of the filter cap and safety valve assembly in position;

FIG. 131 is a perspective view of the free flow tunnel;

Figure 89:
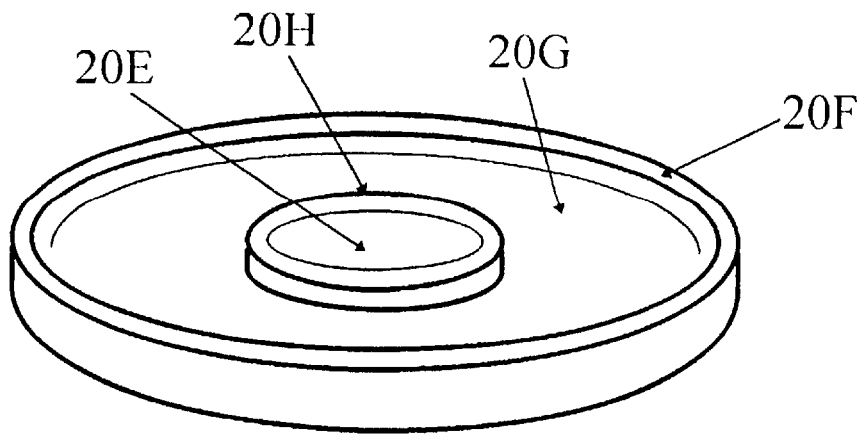
FIG. 89 is a perspective view of the top of the bottom of the main filter plate.
Figure 130:
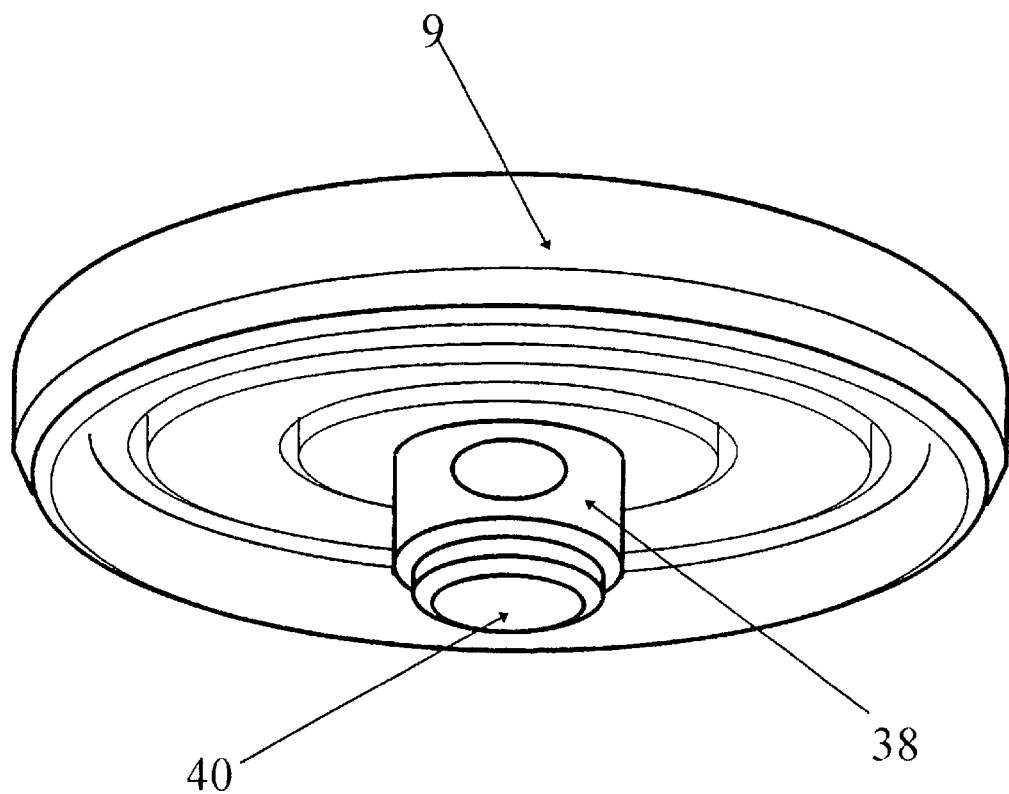
Figure 131:
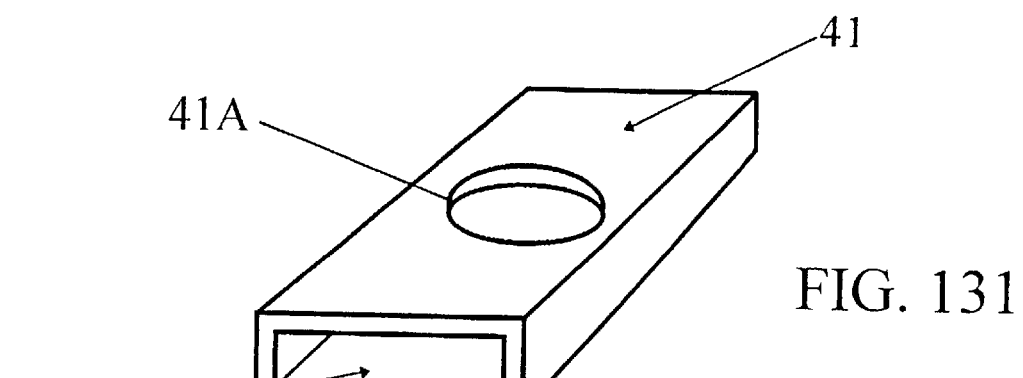
Figure 132:
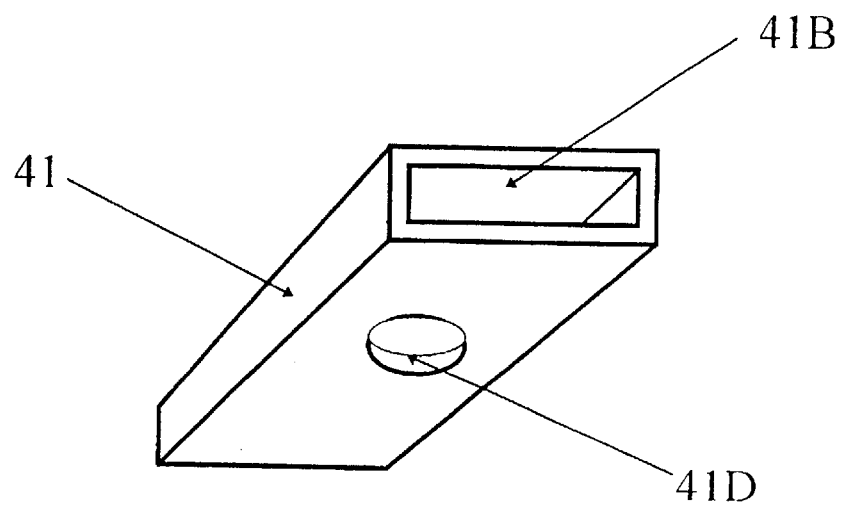
Figure 133:
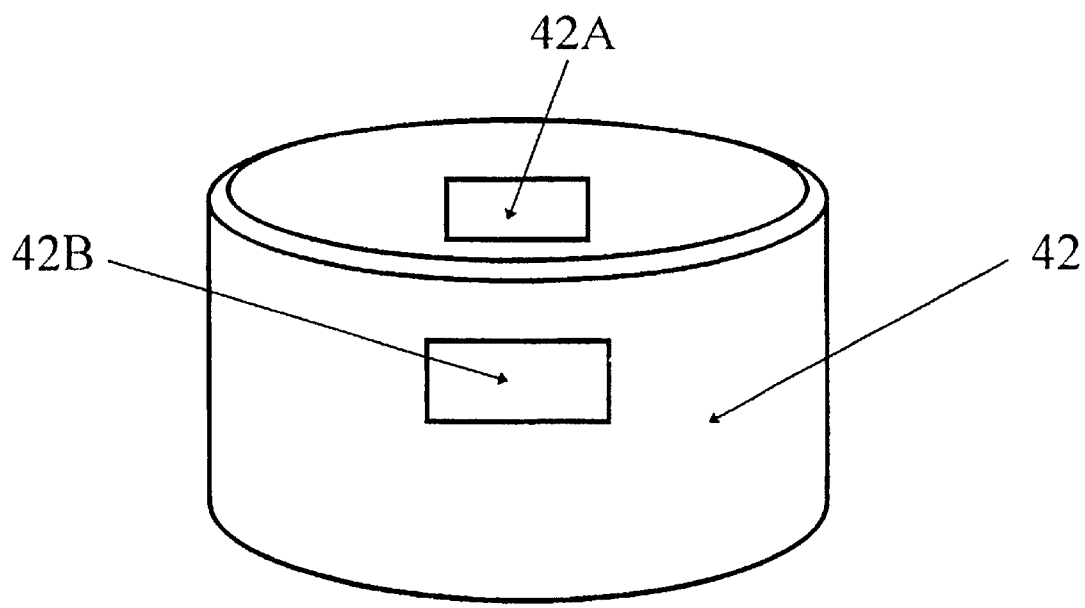
Figure 134:
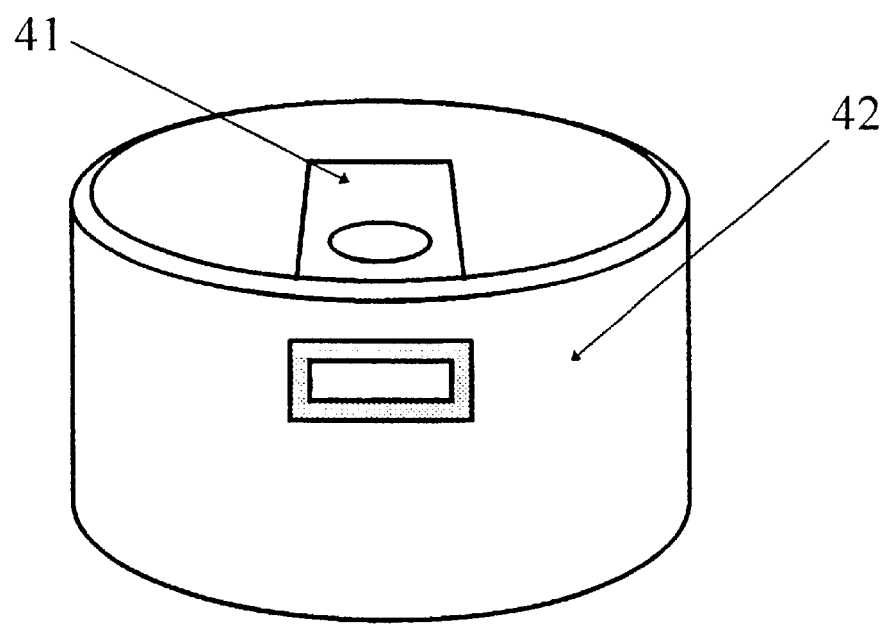
Figure 135:
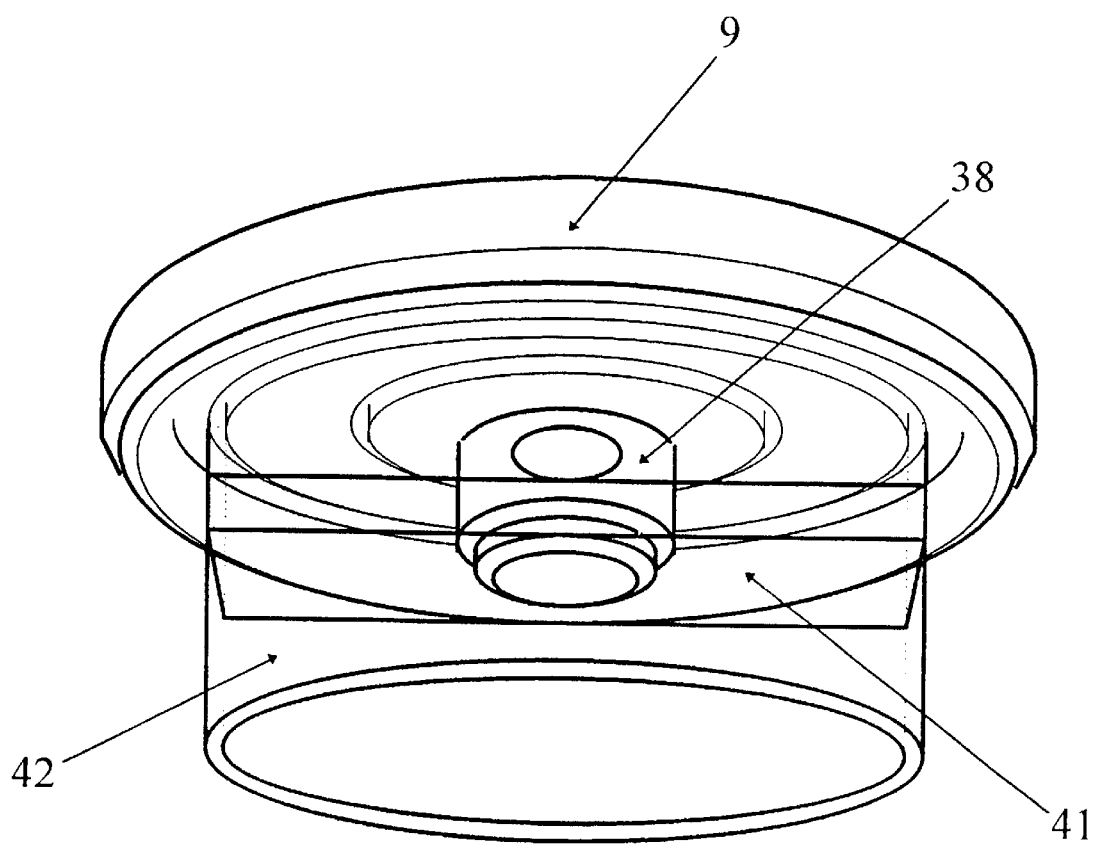
Figure 136:
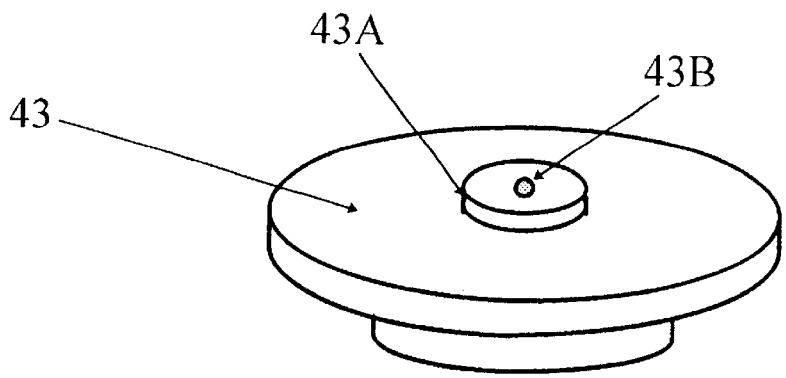
Figure 137:
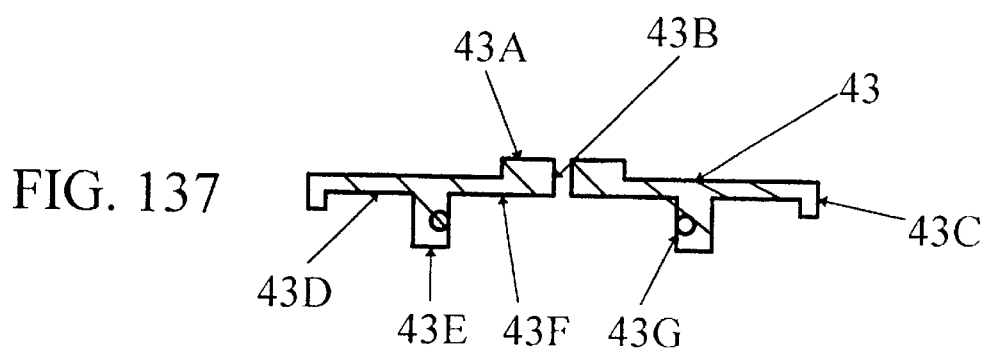
Figure 138:
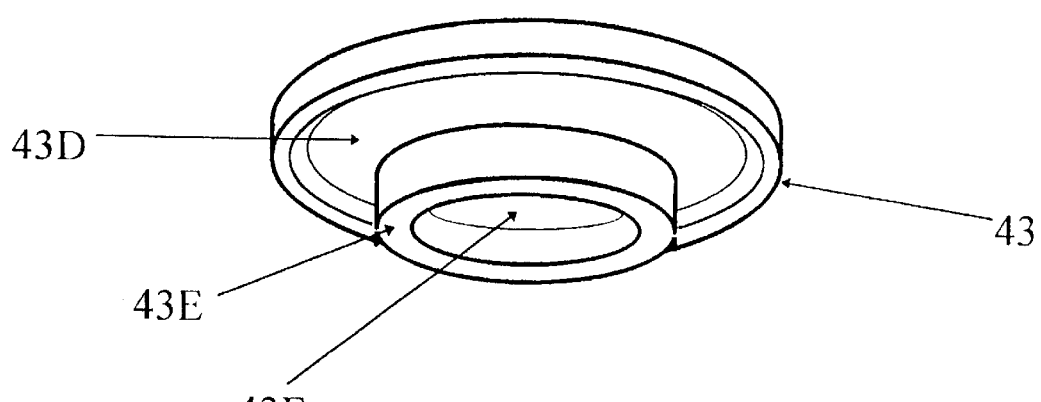
Figure 139:
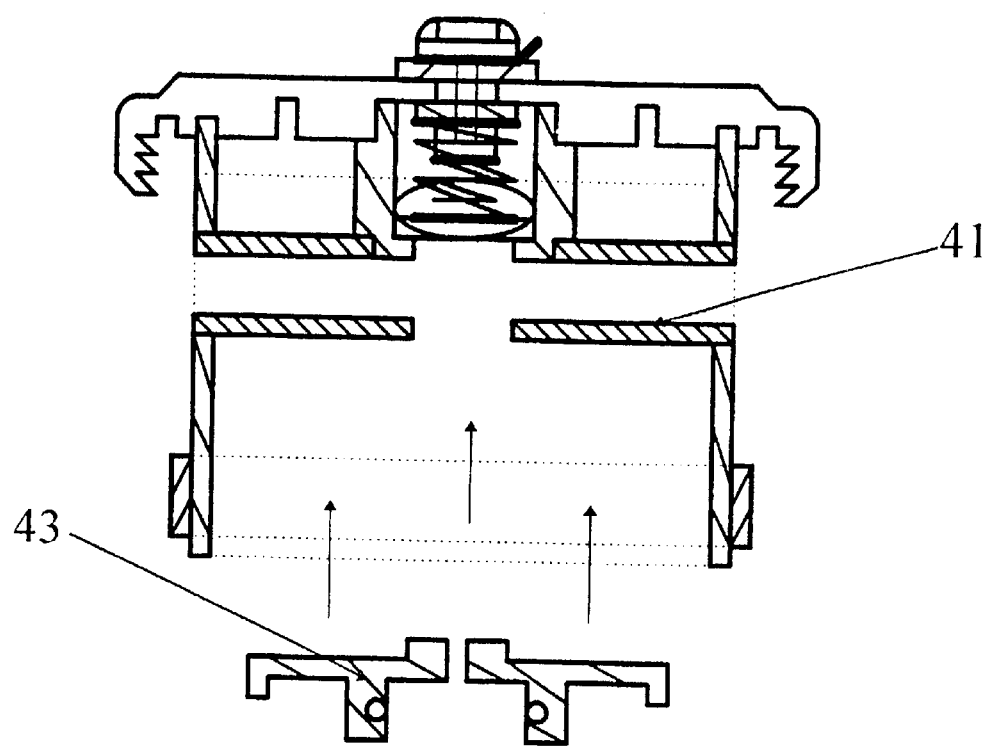
Figure 140:
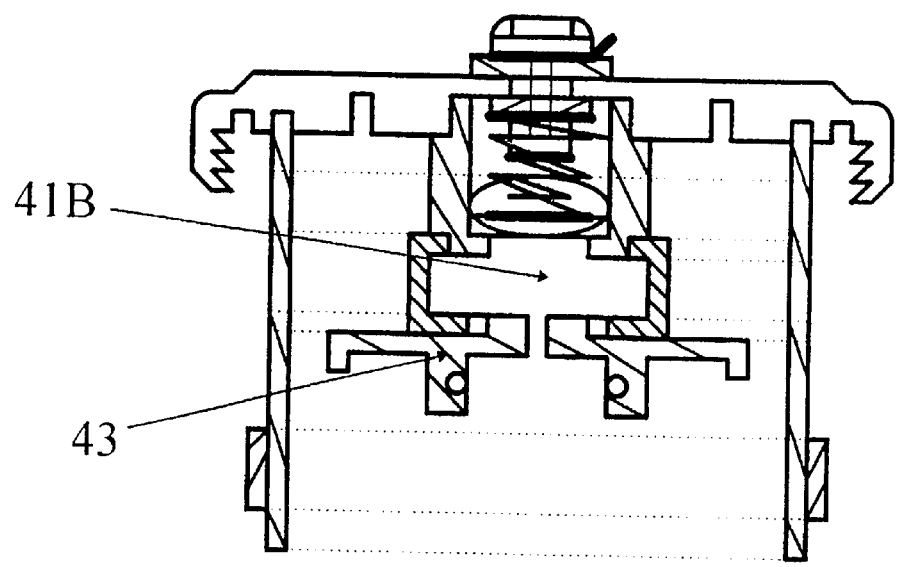
Figure 141:
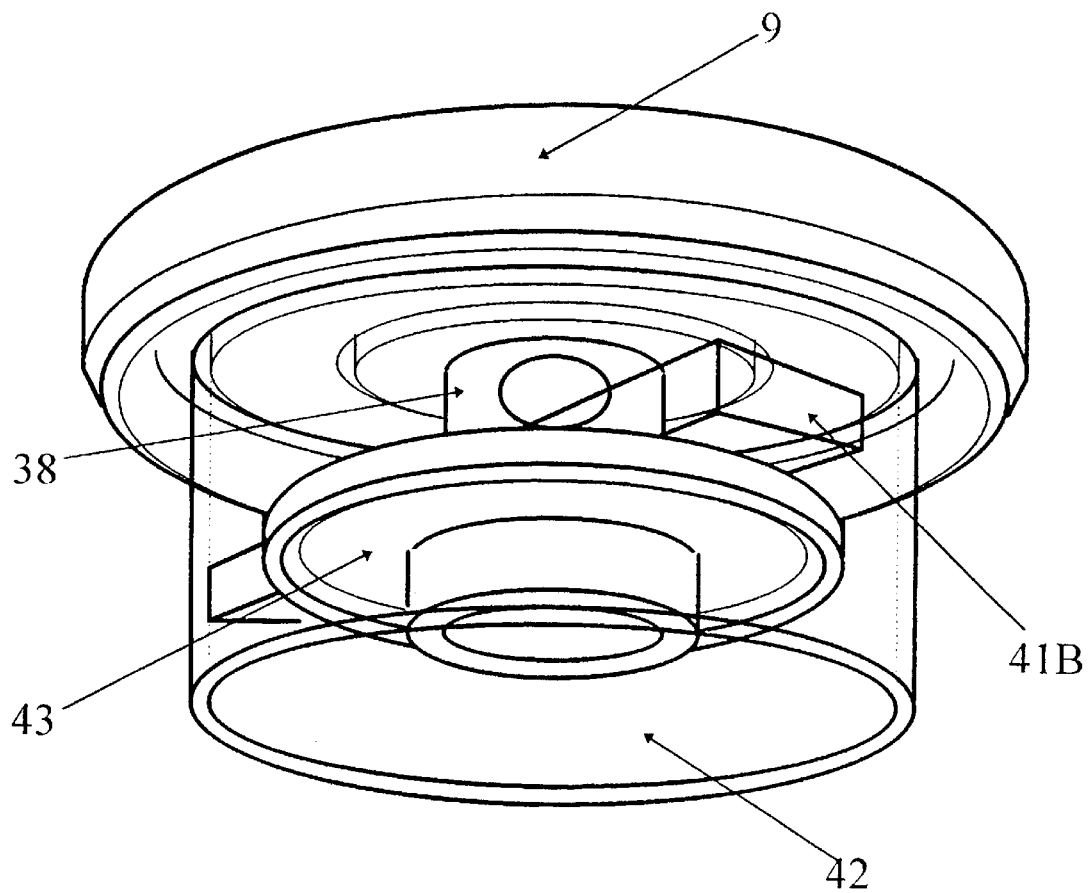
Figure 142:
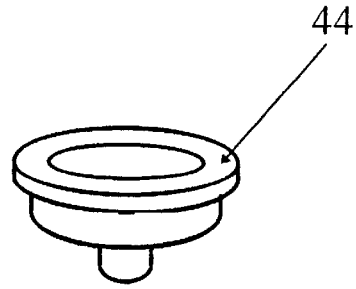
Figure 145:
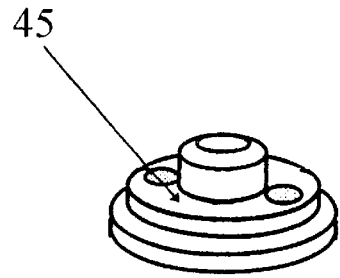
Figure 143:
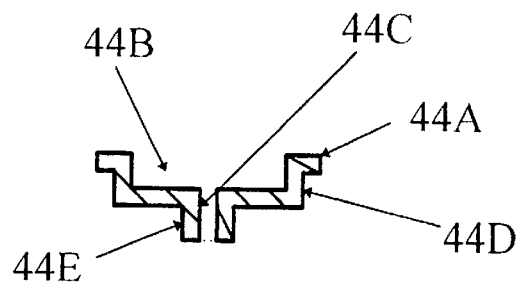
Figure 146:
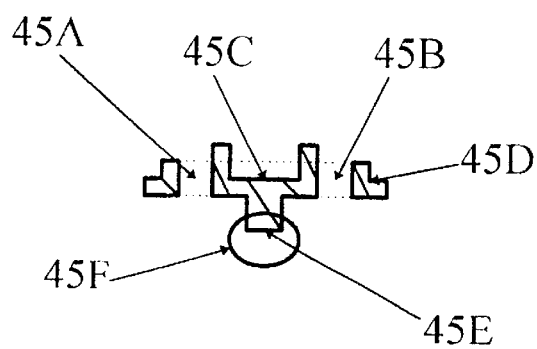
Figure 144:
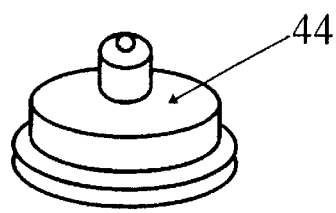
Figure 147:
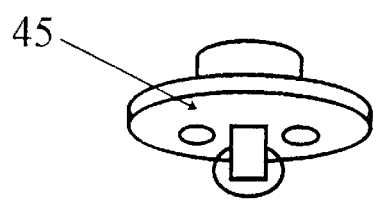
Figure 148:
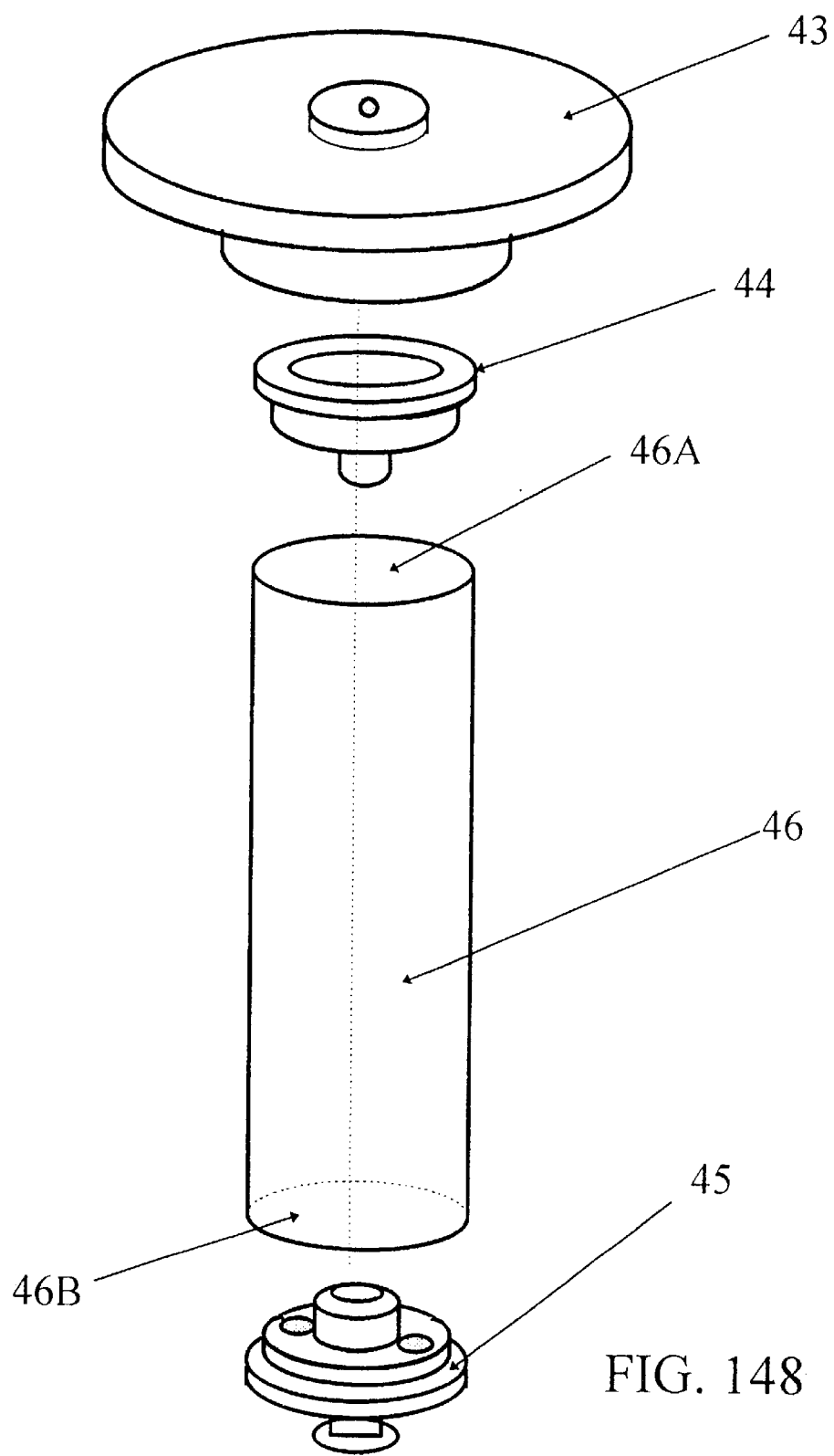
Figures 149, 150:
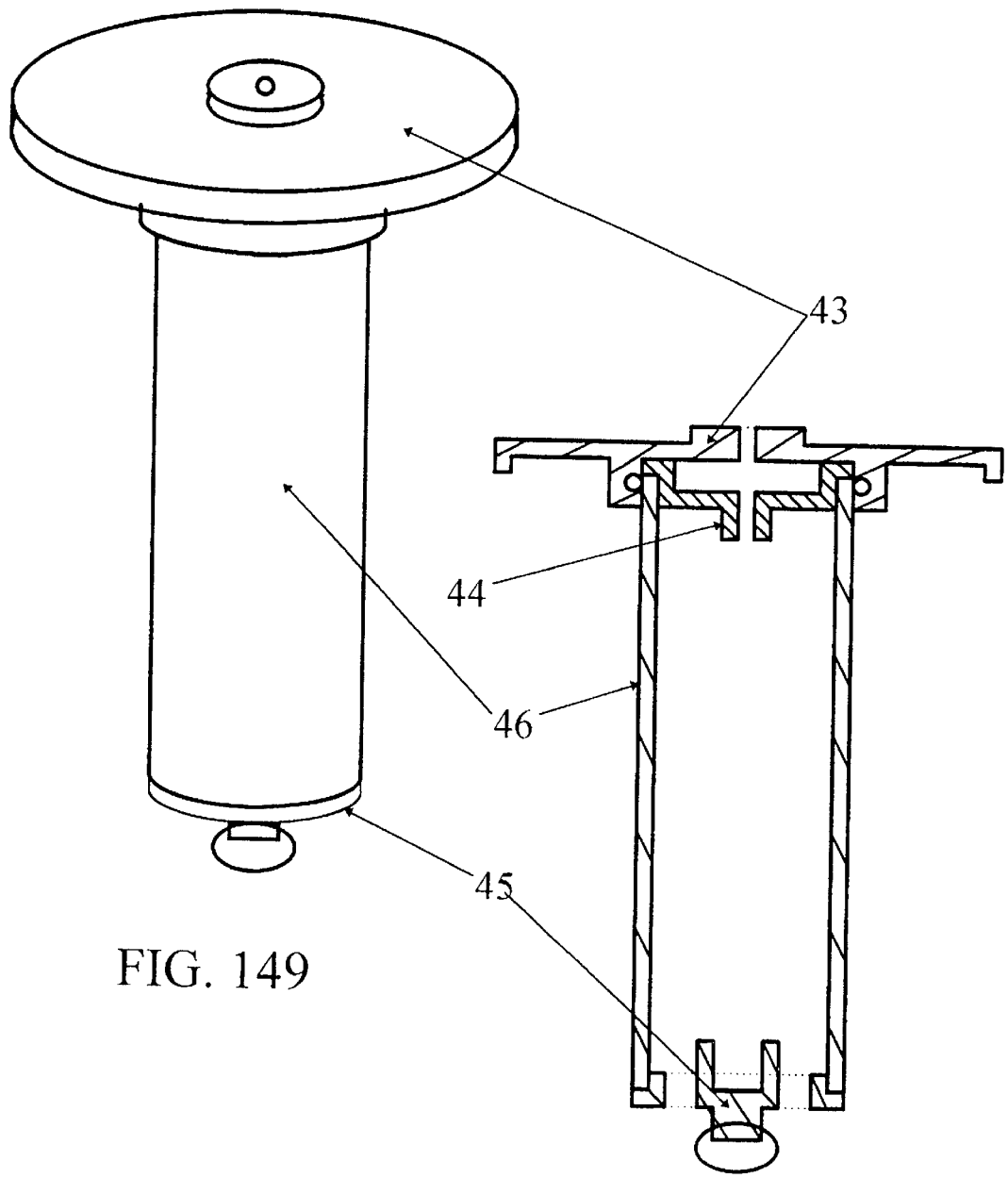
Figure 154:
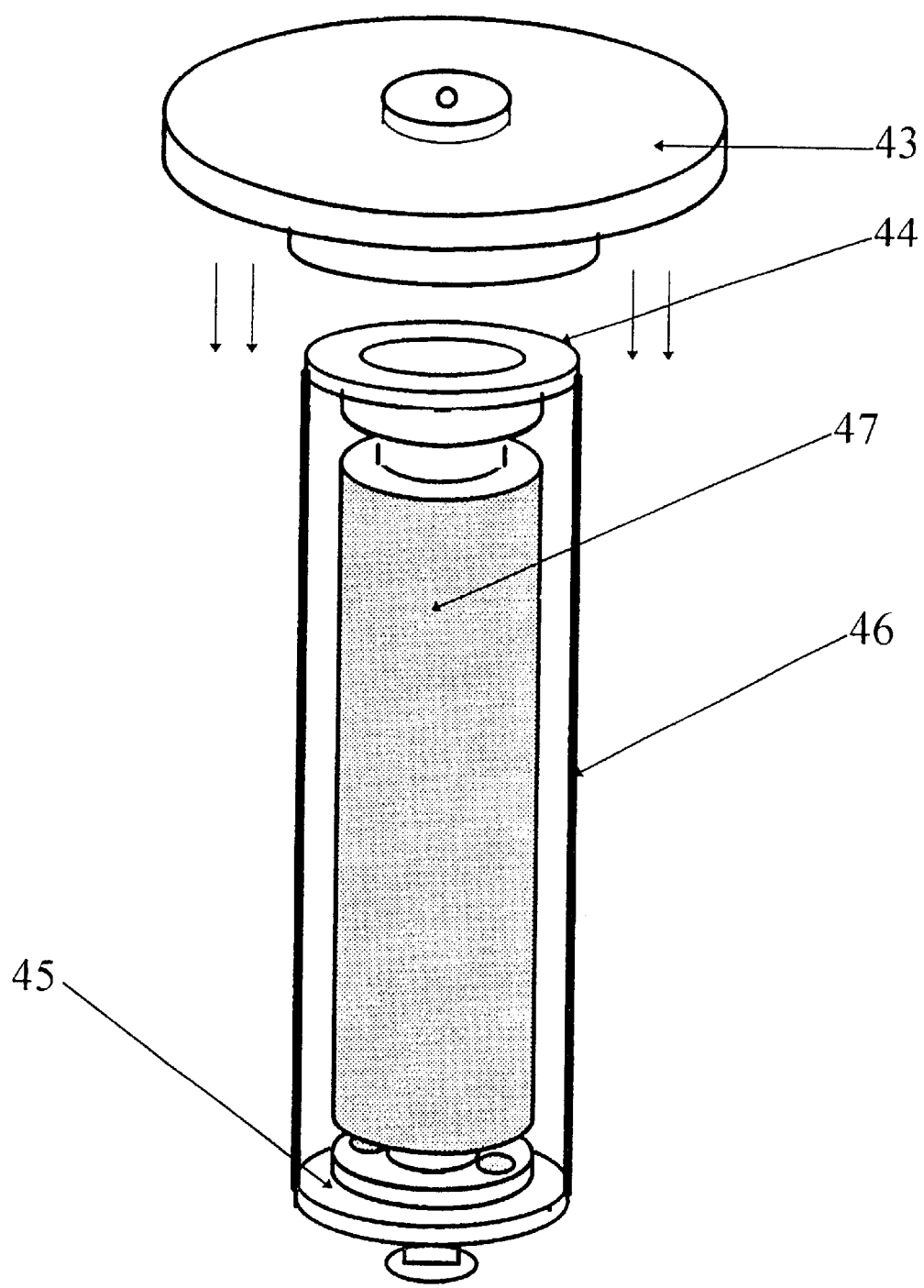
Figure 155:
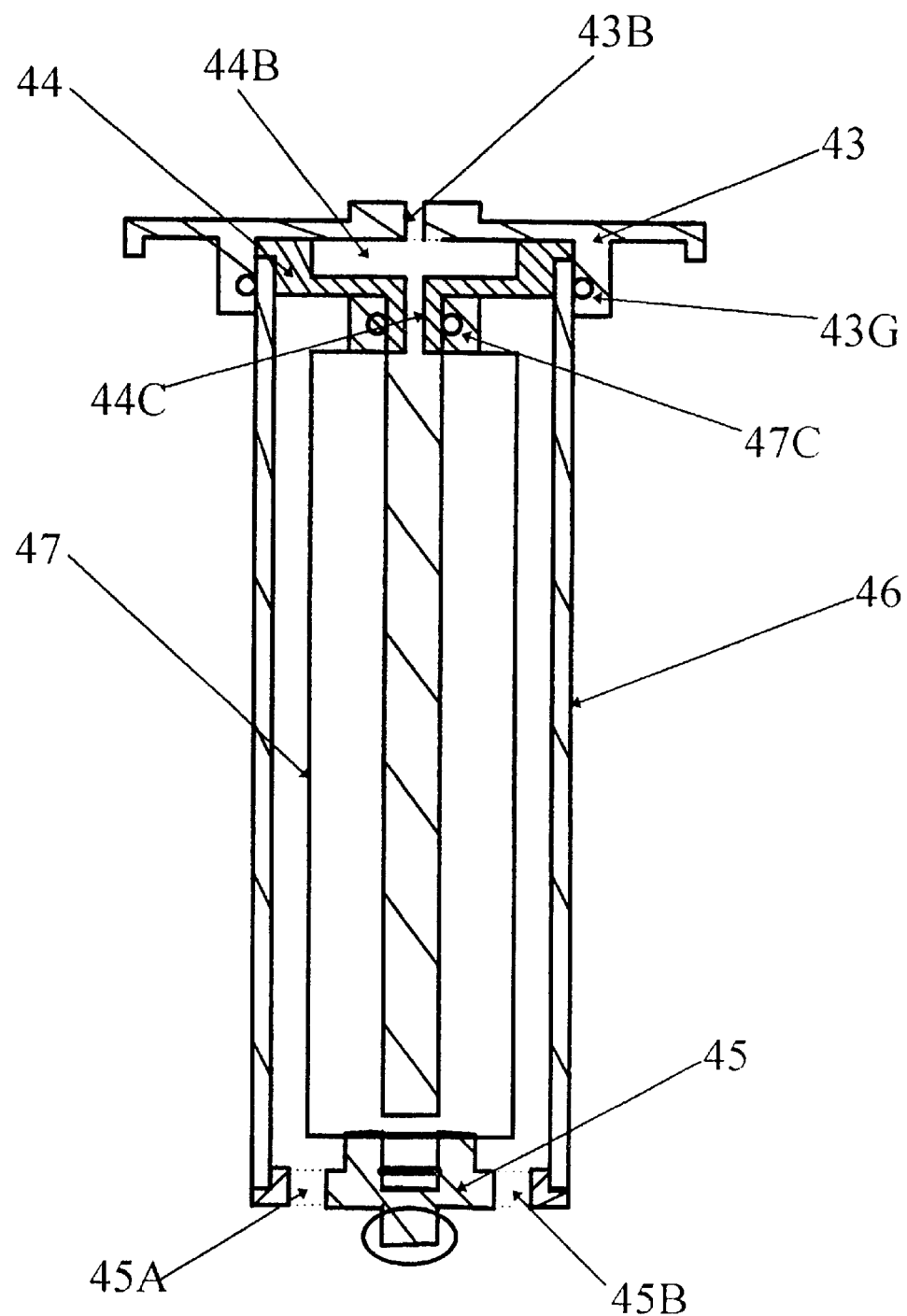
Figure 156:
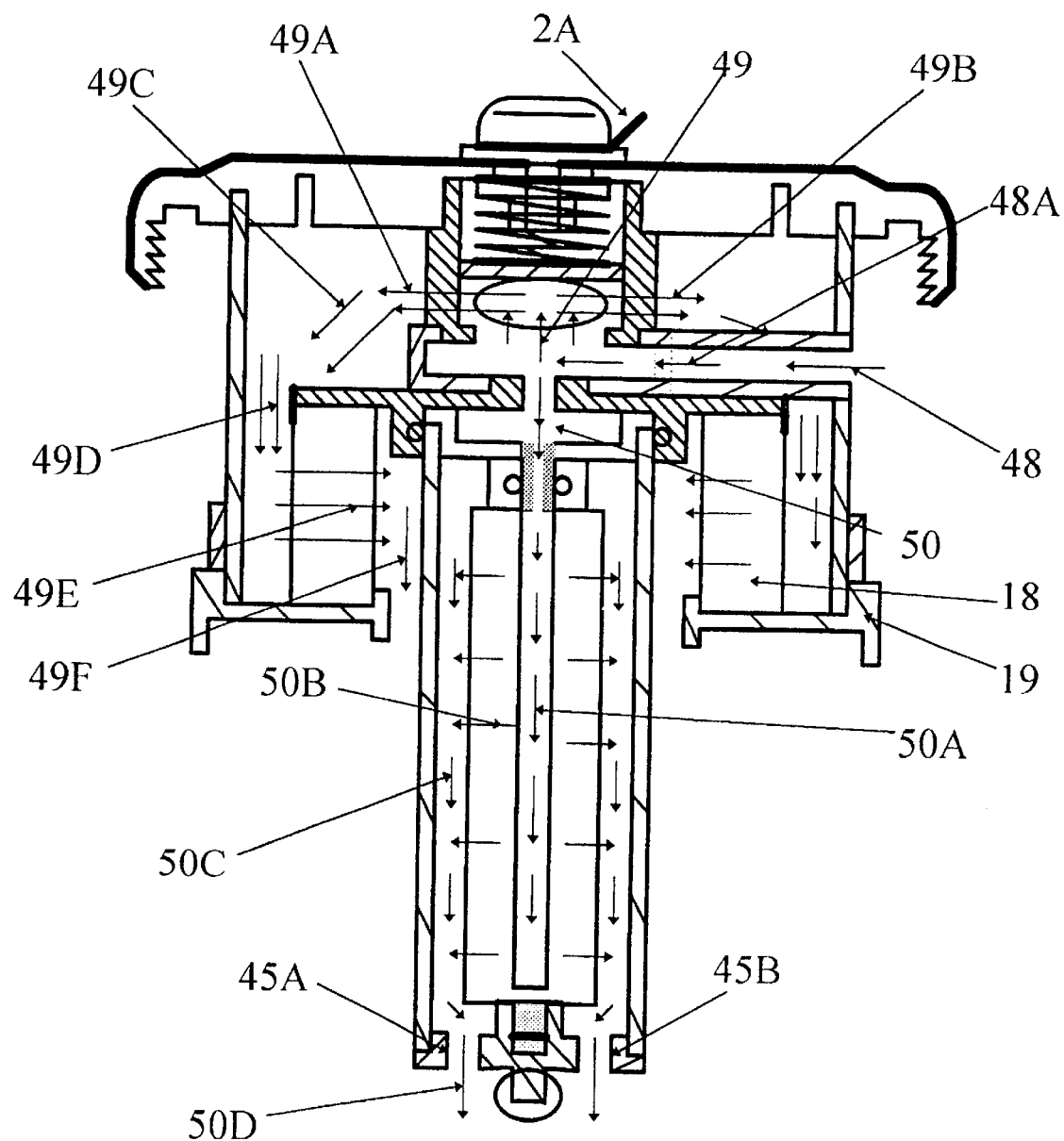
Figure 157:
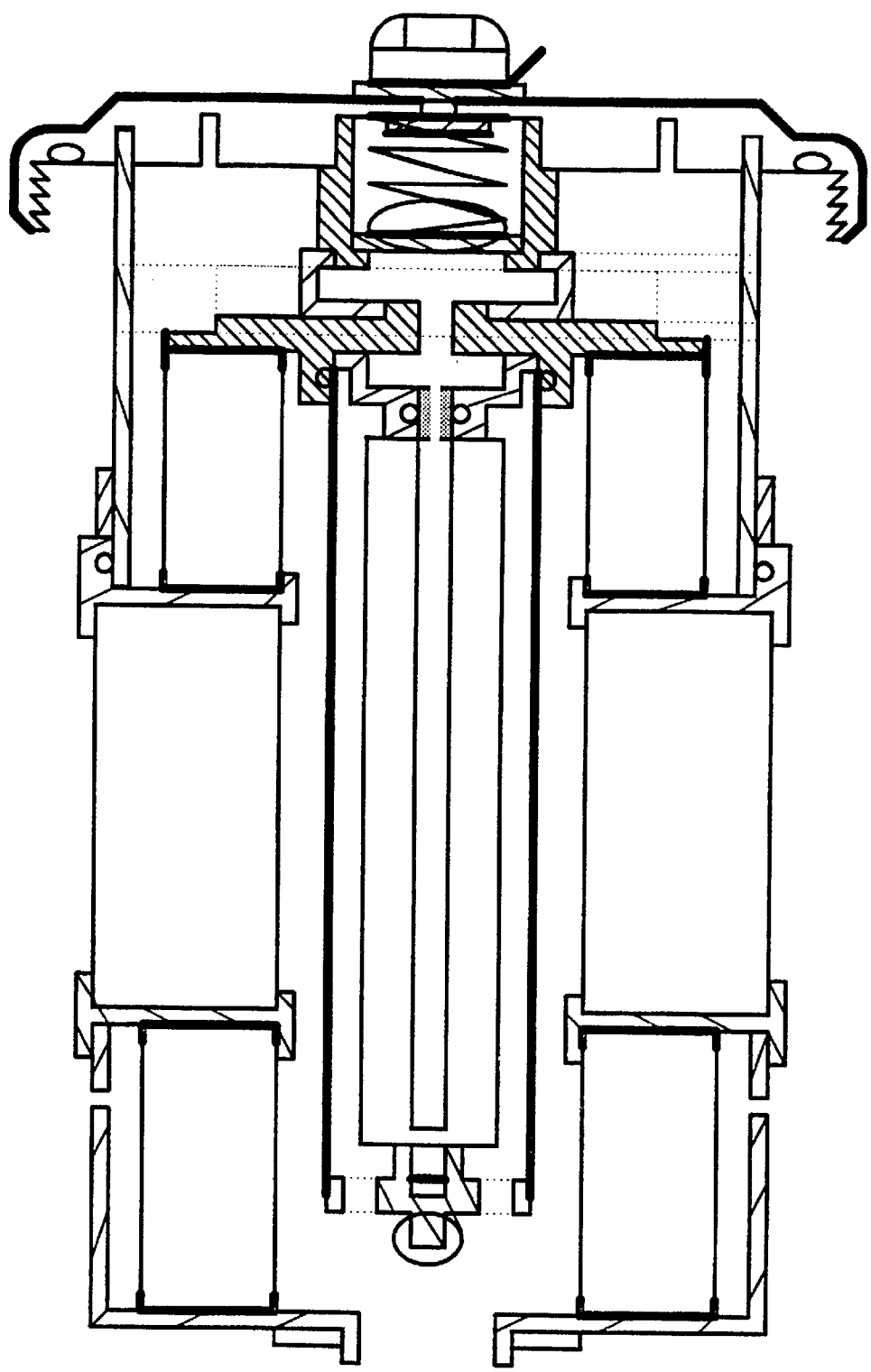
Figure 158:
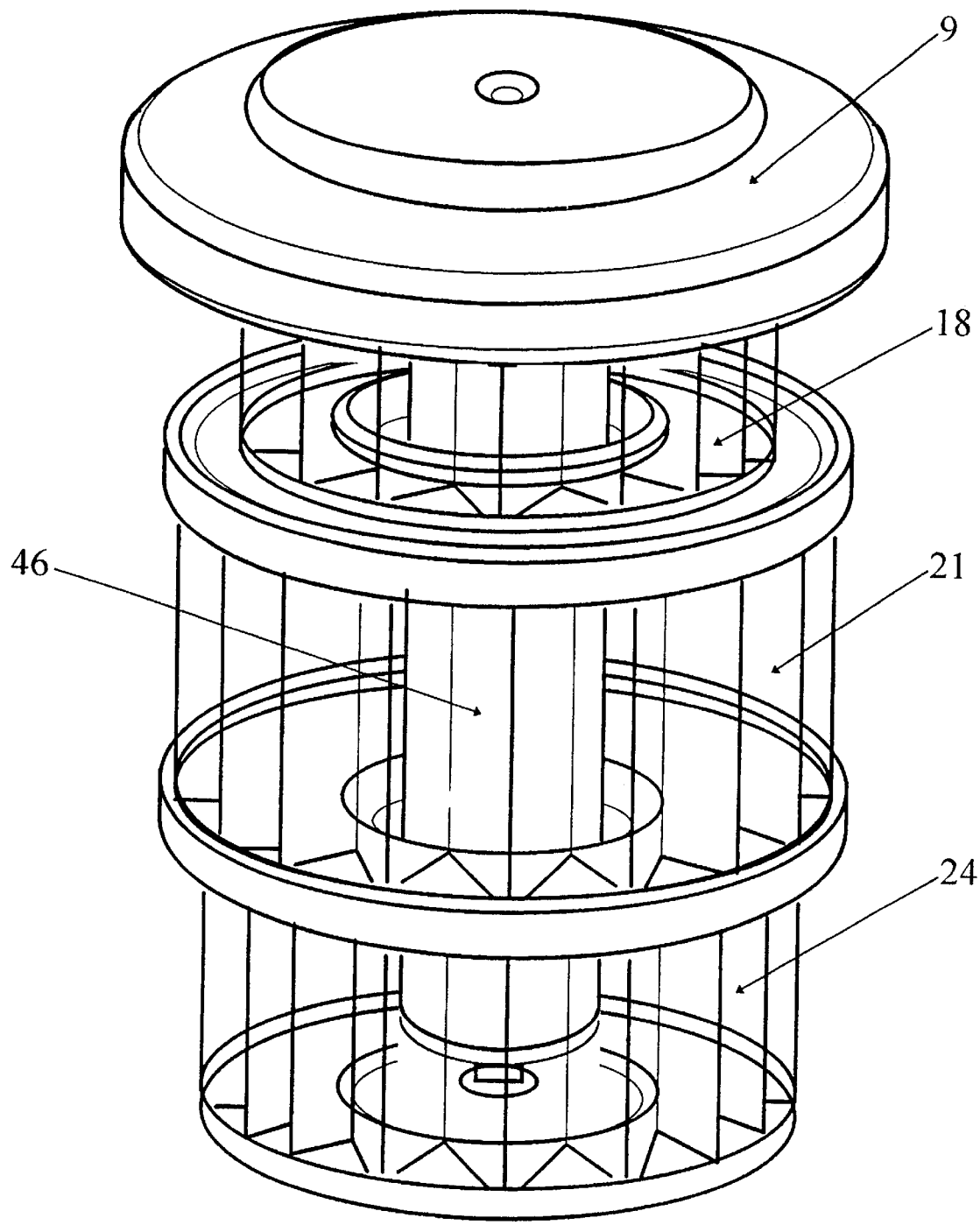
Figure 159:
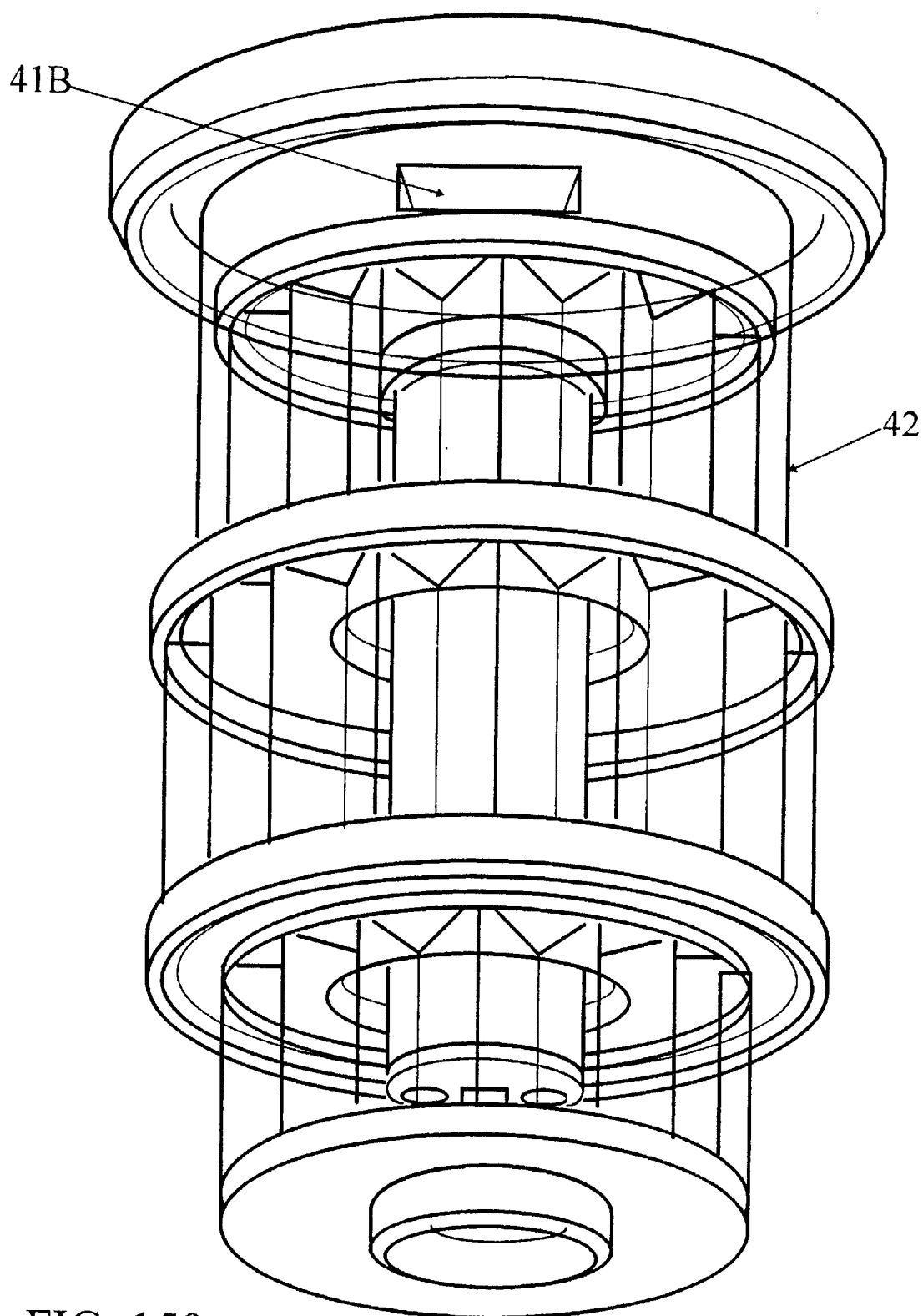
Figure 160:
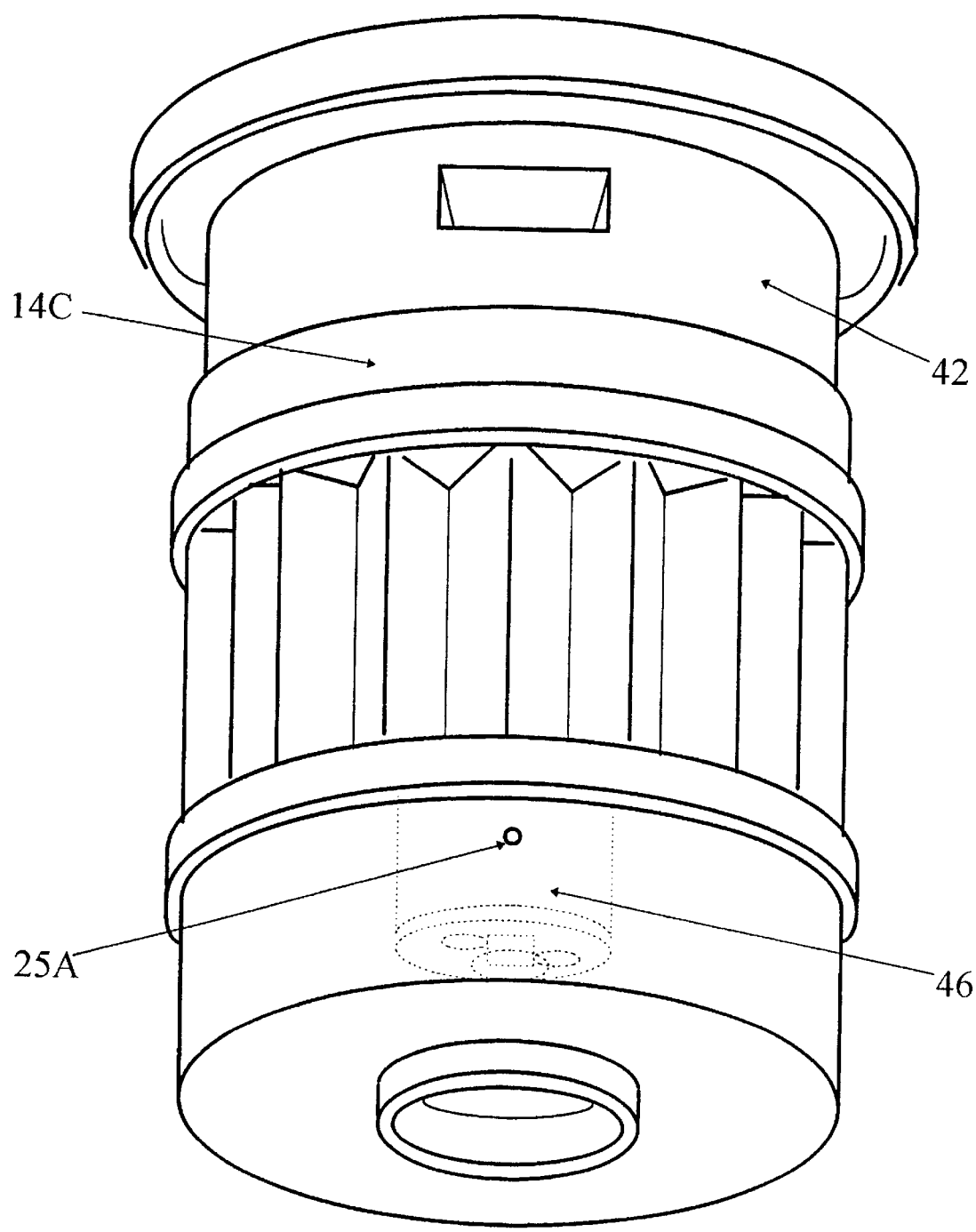
Figure 161:
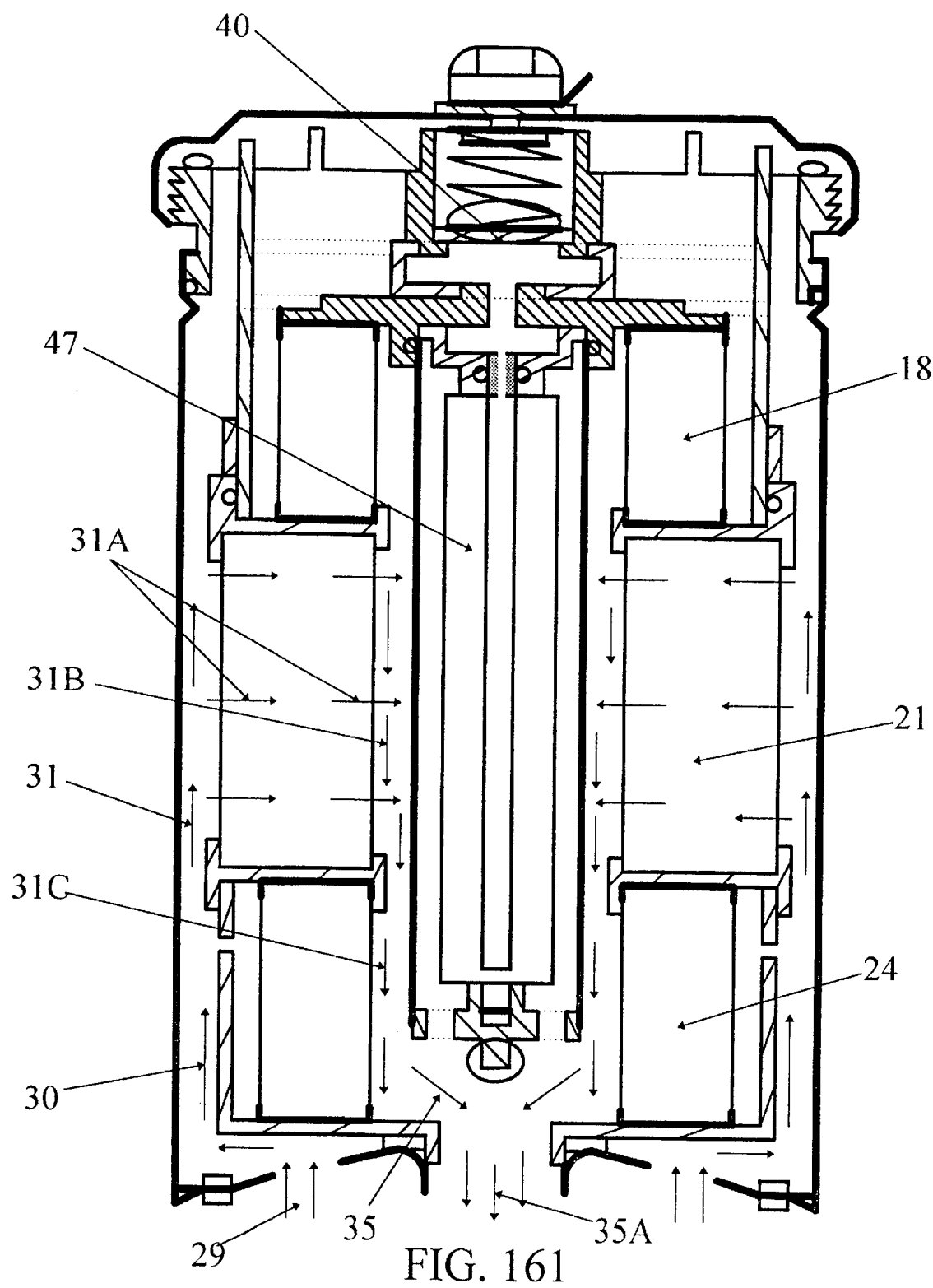
Figure 162:
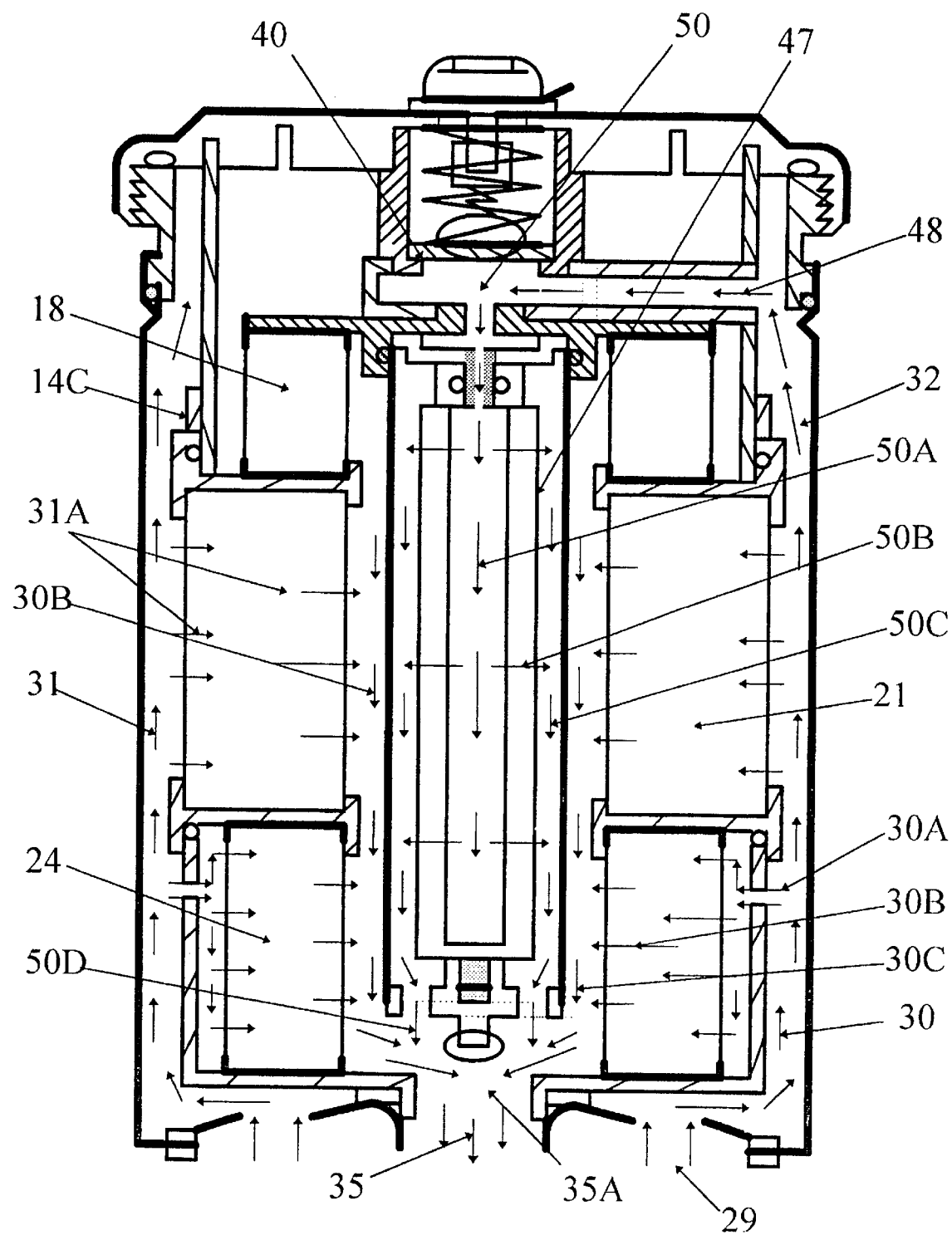
Figure 163:
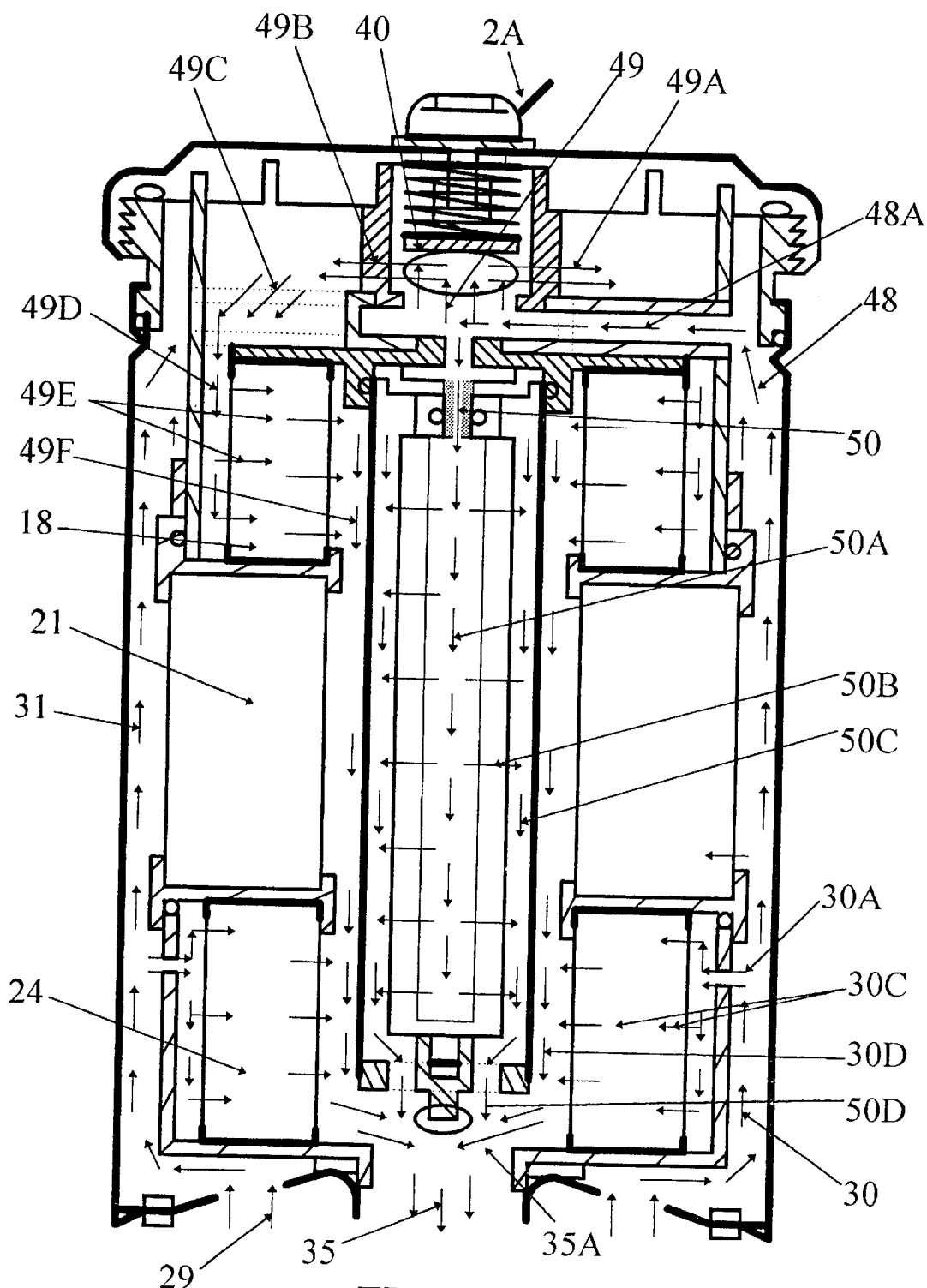
Figure 164:
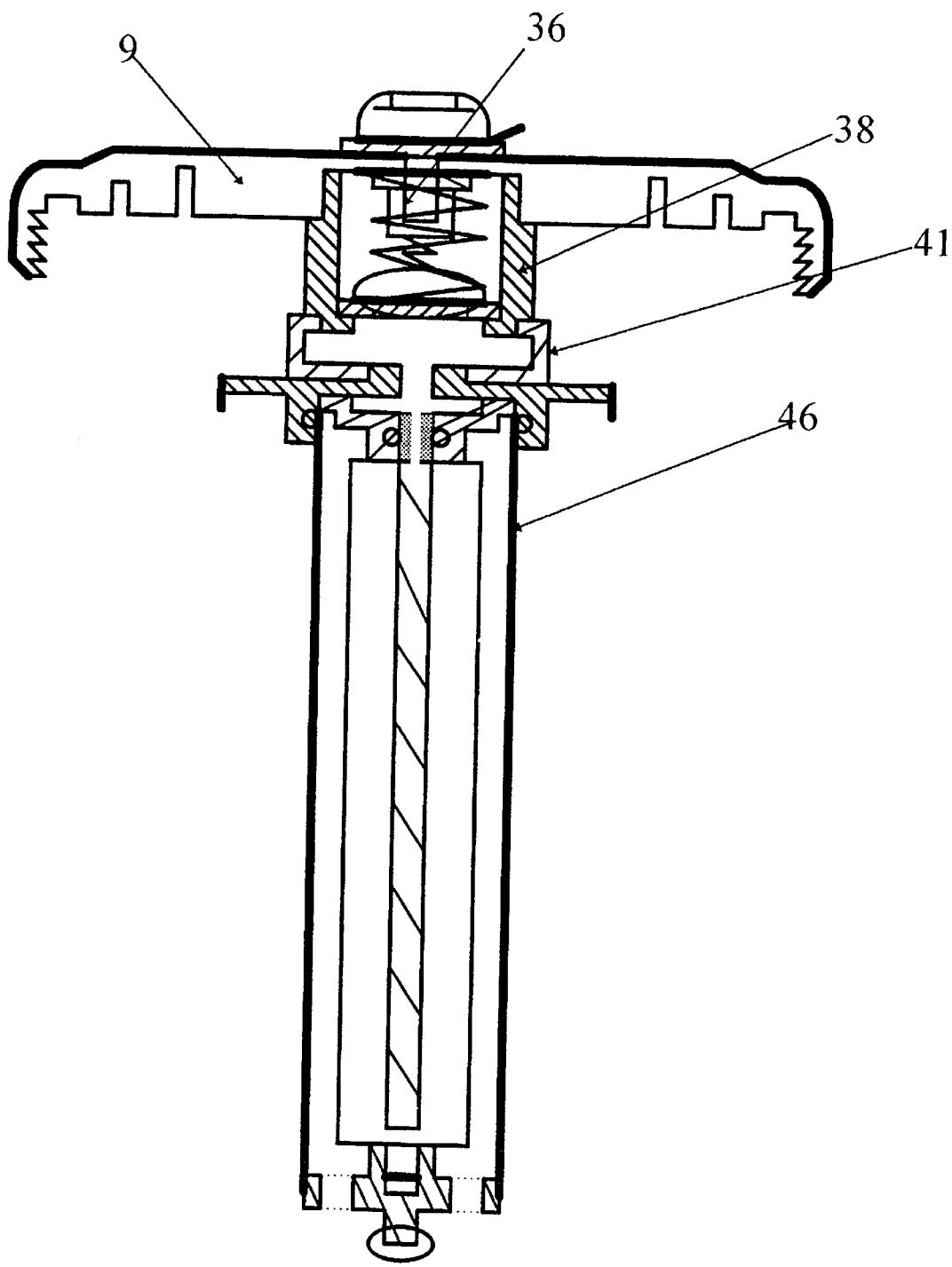

FIG. 132 is a similar view to FIG. 131 in a different attitude;

FIG. 133 is a perspective view of the tubular section for containing the free flow tunnel;

FIG. 134 is a similar view to FIG. 133 with the tunnel in situ;

FIG. 135 is a perspective view of the arrangement shown in FIG. 130 together with the flow tunnel;

FIG. 136 is a perspective view of the top of the circular member for securing the safety filter cartridge;

FIG. 137 is a cross-sectional view of FIG. 136;

FIG. 138 is a perspective view of FIG. 136 illustrating the underside thereof;

FIG. 139 is an exploded view of the position of the circular member and the relationship with the elements of FIG. 135;

FIG. 140 is a cross-sectional view similar to FIG. 139 with the elements in the assembled condition;

FIG. 141 is a perspective view of the elements of FIG. 139;

FIG. 142 is a perspective view of the circular cap;

FIG. 143 is a cross-sectional view of FIG. 142;

FIG. 144 is a perspective view of the top cover of FIG. 89;

FIG. 145 is a perspective view of the circular cap illustrating the underside;

FIG. 146 is a cross-sectional view of FIG. 145;

FIG. 147 is a perspective view of the bottom of the cover;

FIG. 148 is an exploded view of illustrating the elongated auxiliary body and additional elements;

FIG. 149 is a perspective view of the elements of FIG. 148 is an assembled form;

FIG. 150 is a cross-sectional view of FIG. 149;

FIG. 151 is a cross-sectional view of the elongated filter cartridge;

FIG. 152 is a perspective view of FIG. 151;

FIG. 153 is a perspective view with the caps shown in FIG. 145;

FIG. 154 is a partly exploded view of the elongated auxiliary body;

FIG. 155 is a cross-sectional view of FIG. 154;

FIG. 156 is a cross-sectional view of the assembly of FIG. 155 illustrating the oil flow path;

FIG. 157 is a cross-sectional view of the partially assembled filter core;

FIG. 158 is a perspective view of the elements of FIG. 157;

FIG. 159 is a similar view of of FIG. 158 from a different attitude;

FIG. 160 is a perspective view of the completely assembled filter core;

FIG. 161 is a cross-sectional view illustrating the flow pattern for the oil:

FIG. 162 is a similar view to FIG. 161 illustrating the oil flow patterns when in a normal filtering mode;

FIG. 163 is a similar view to FIG. 162 illustrating the oil flow patterns in a restricted mode;

FIG. 164 is a cross-sectional view of the components of the safety device, filter cap, valve casing and auxiliary filter assembly.

Figure 165:
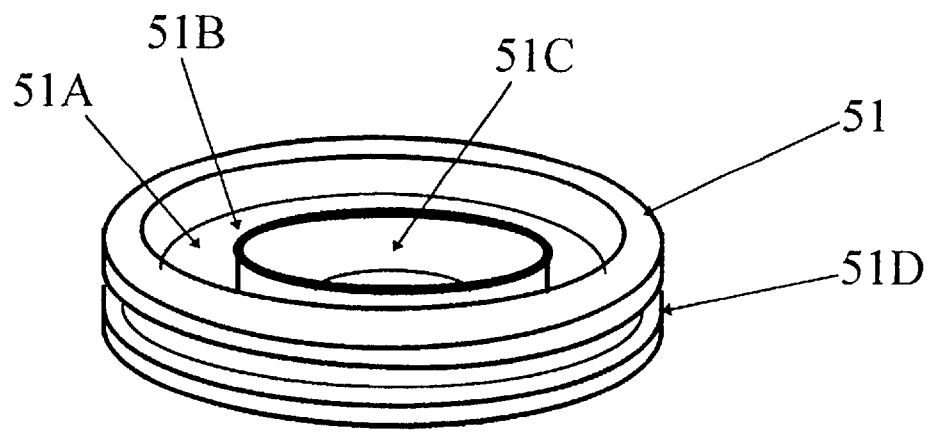
Figure 166:
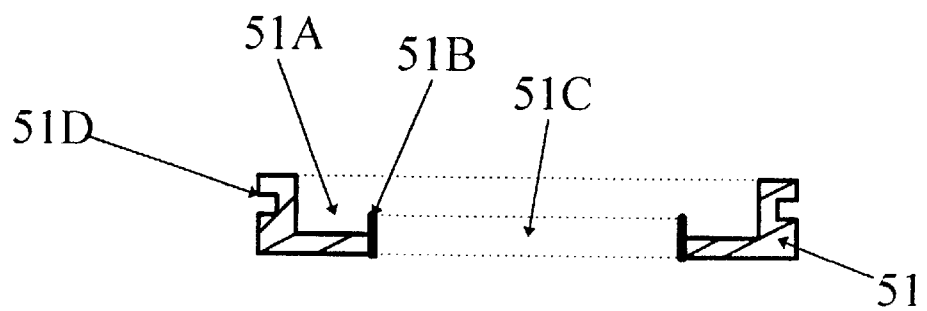
Figure 167:
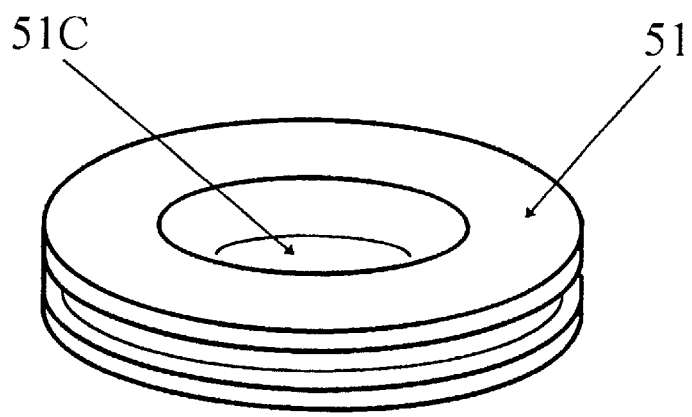
Figures 168, 169:
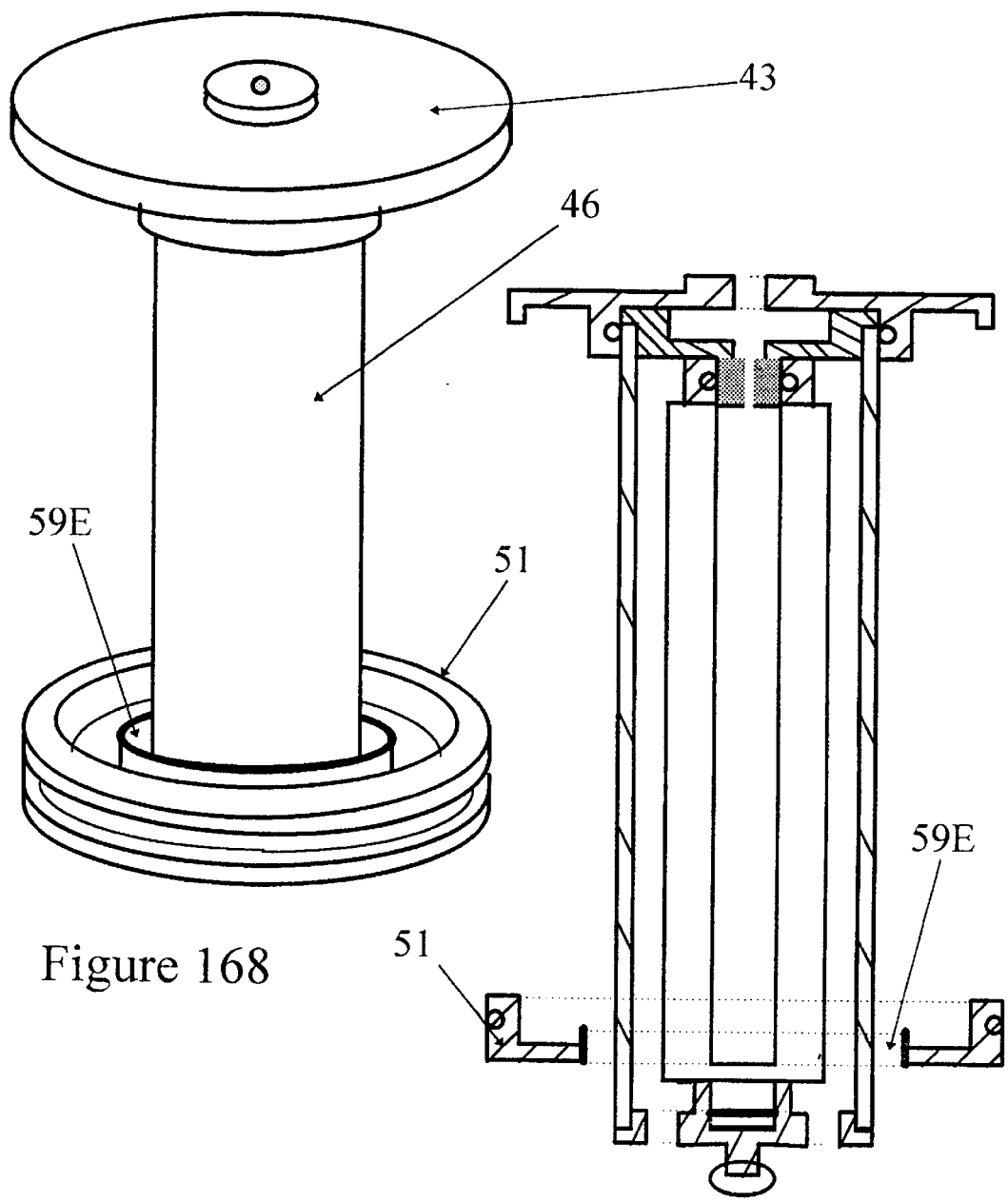
Figures 170, 171:
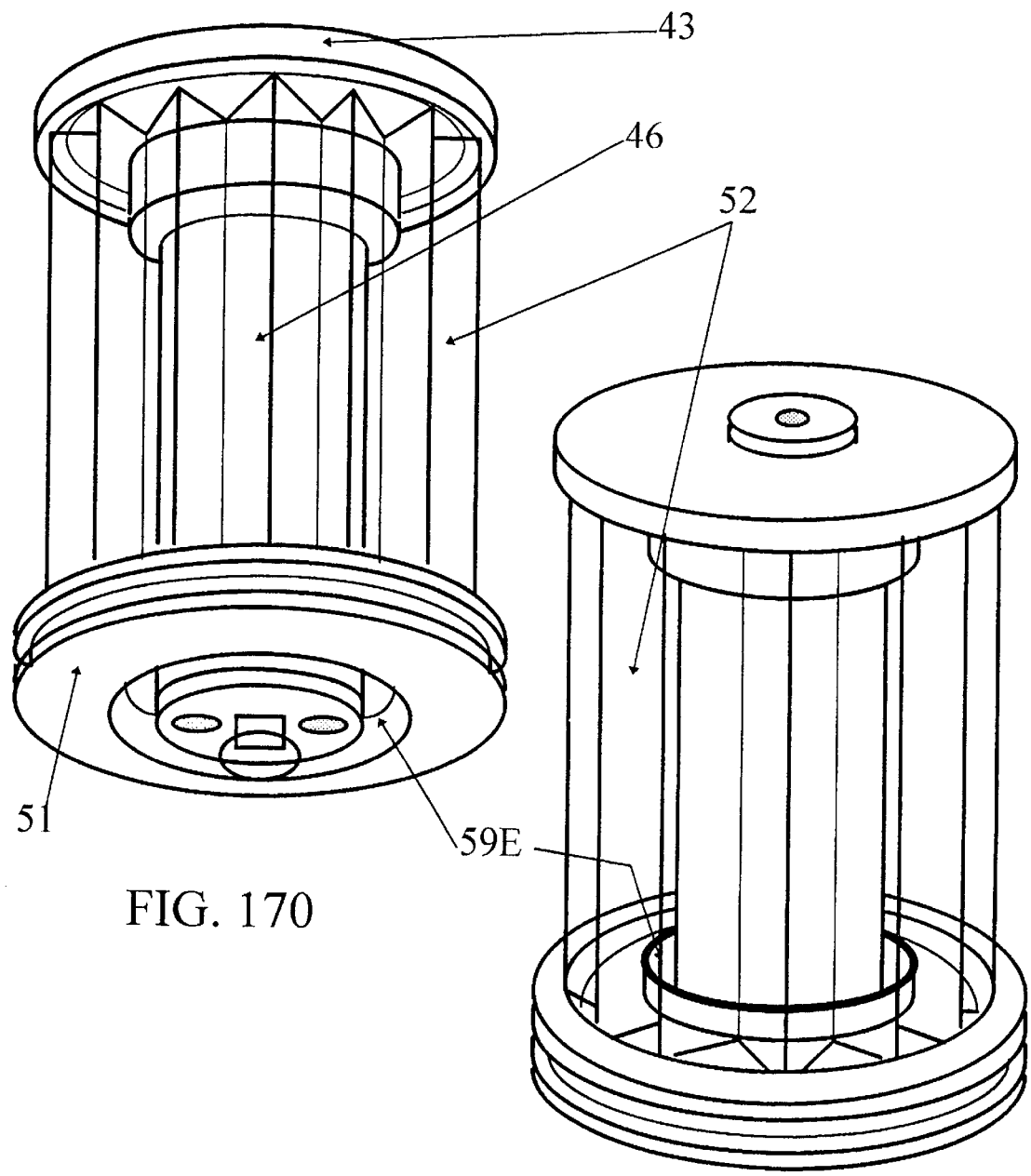
Figure 172:
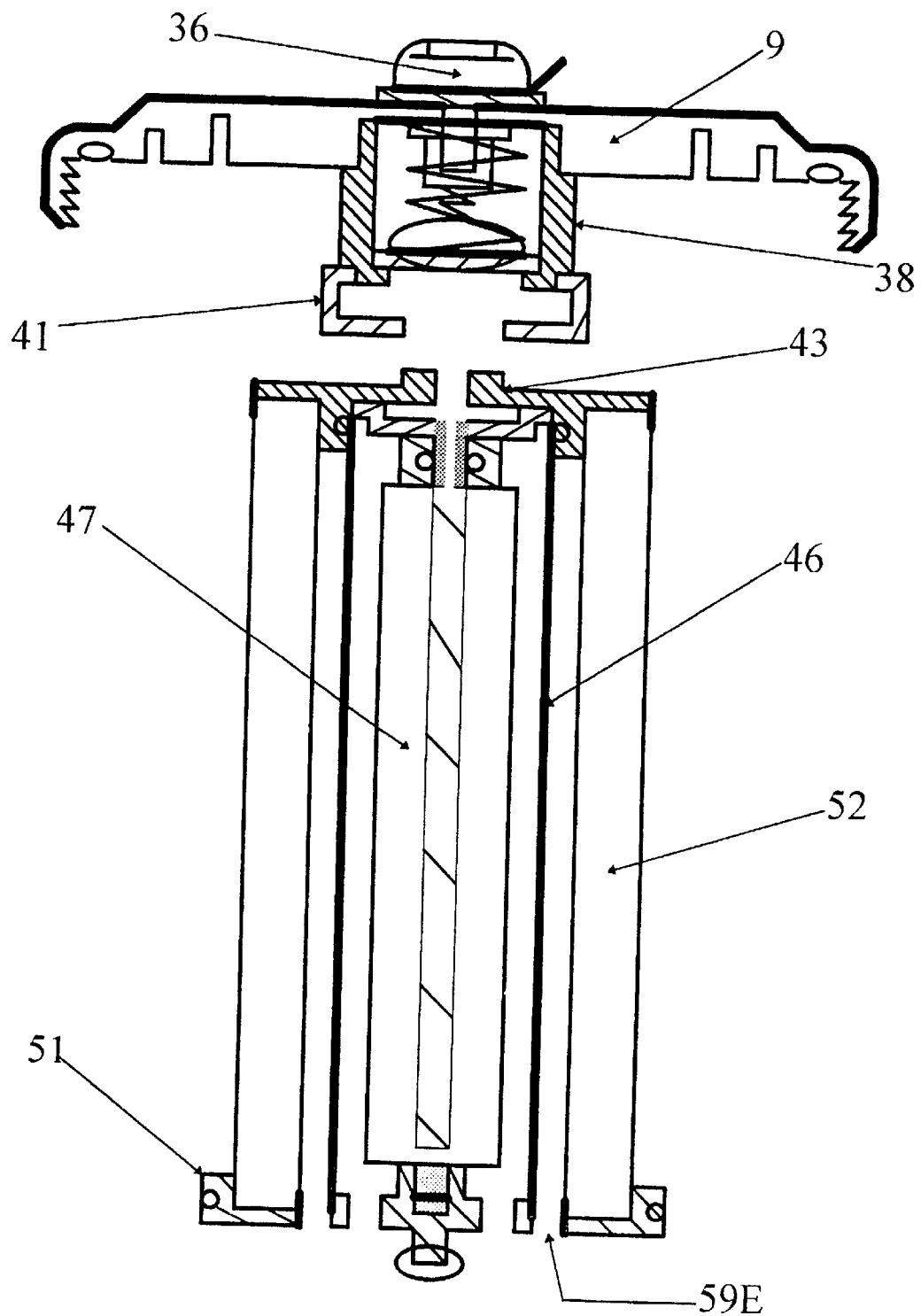
Figure 173:
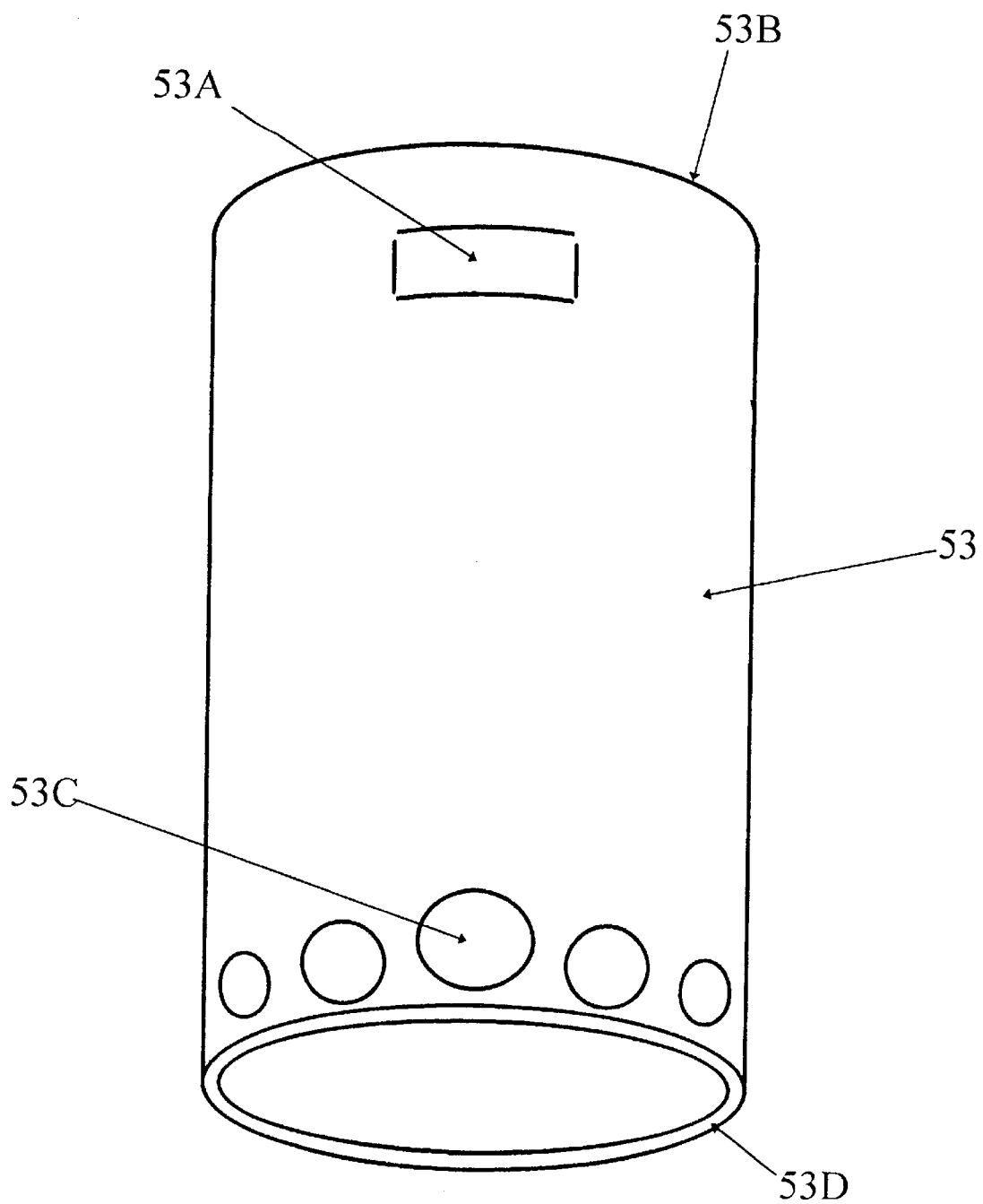
Figure 174:
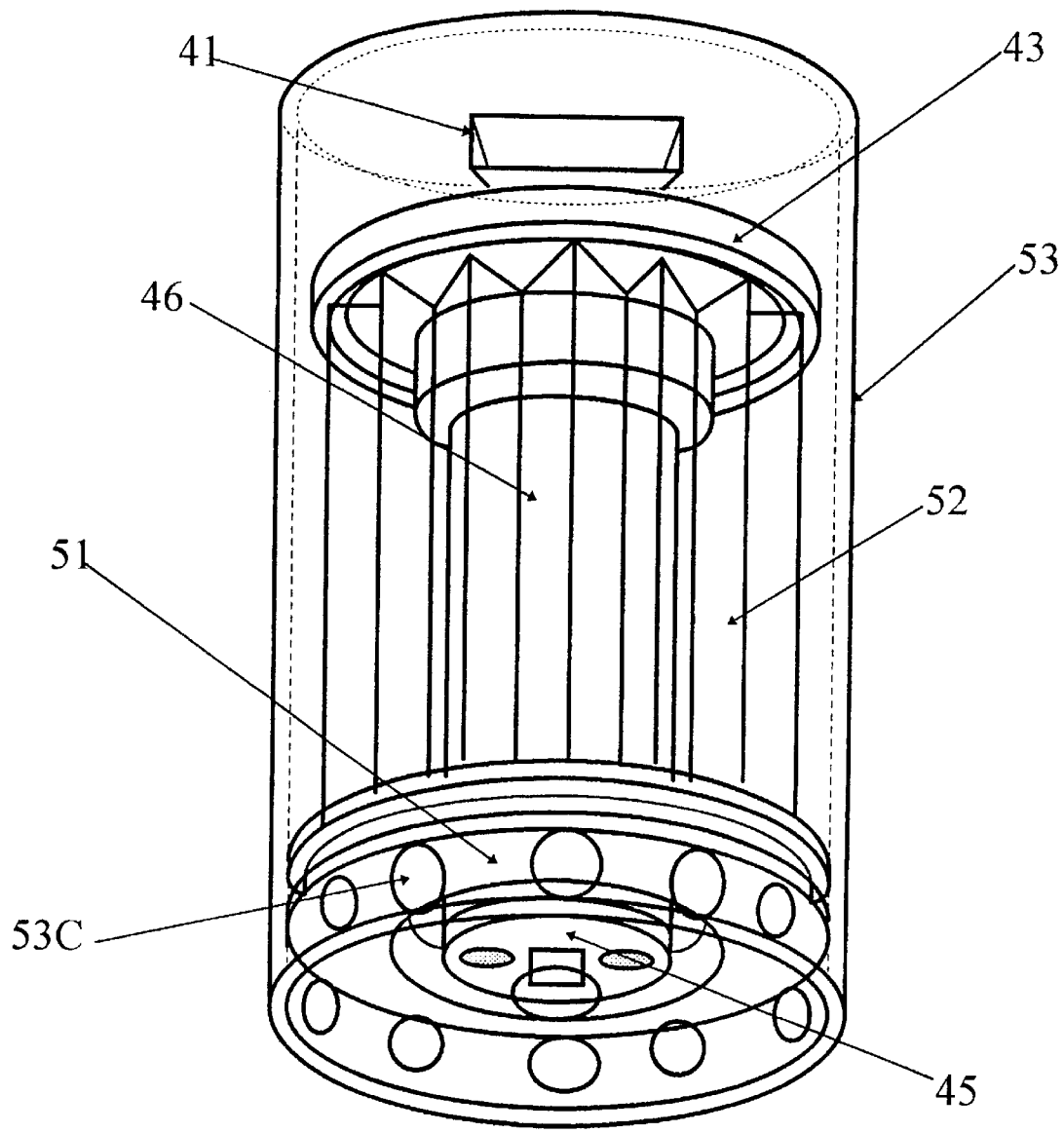
Figure 175:
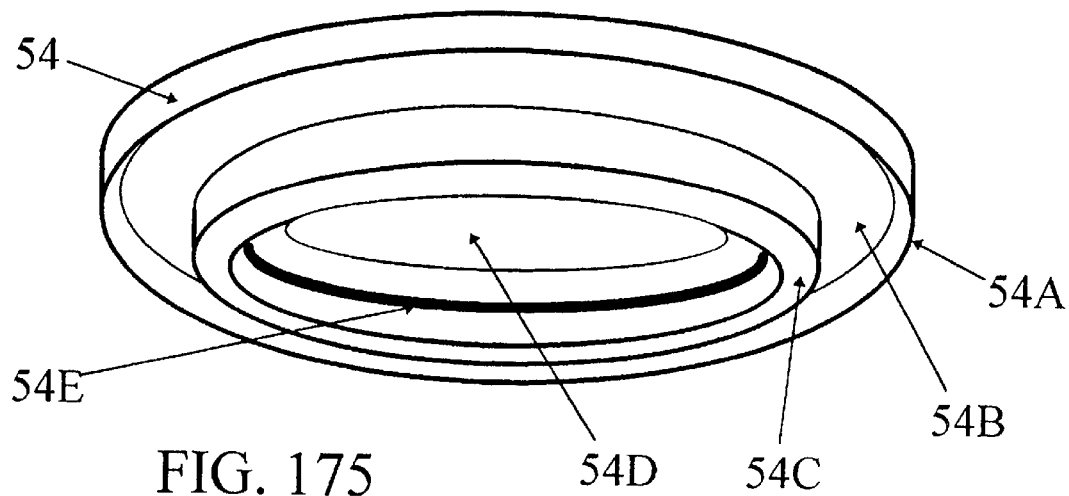
Figure 176:
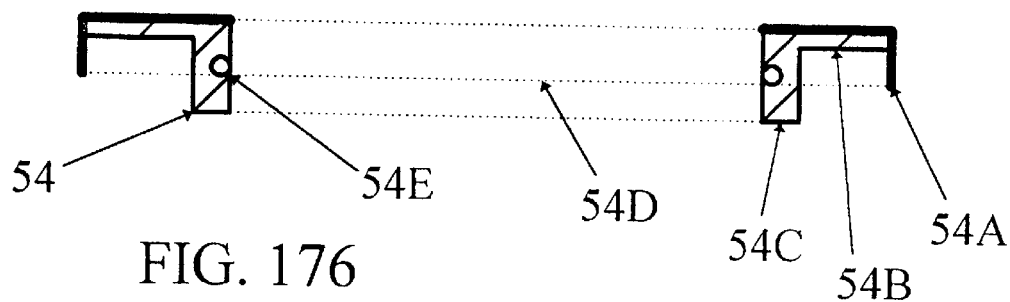
Figure 177:
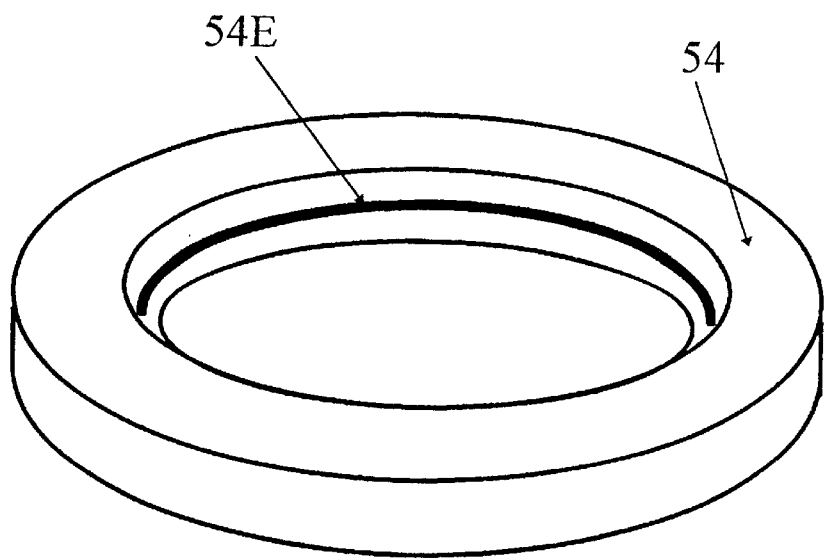
Figure 178:
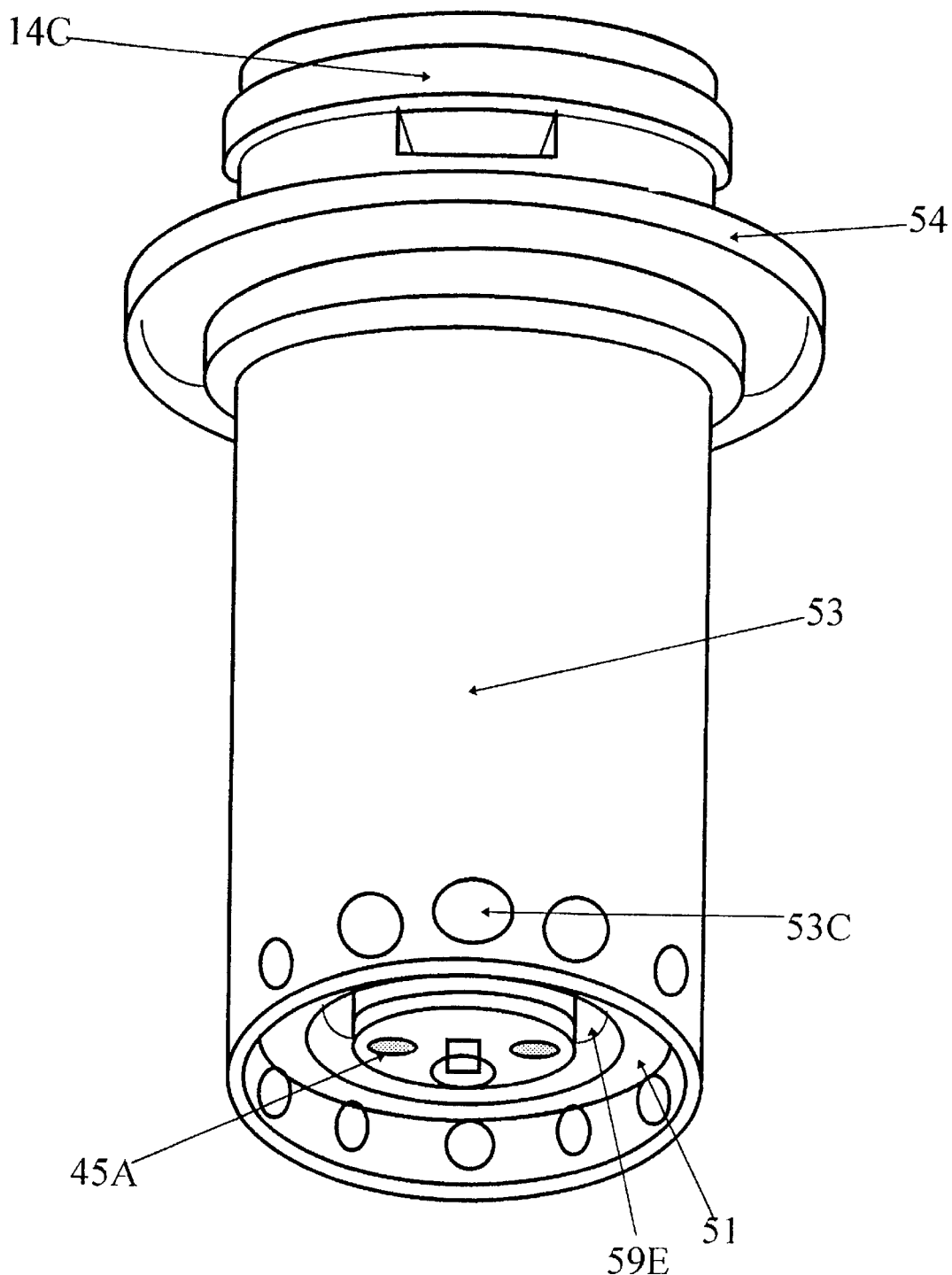
Figure 179:
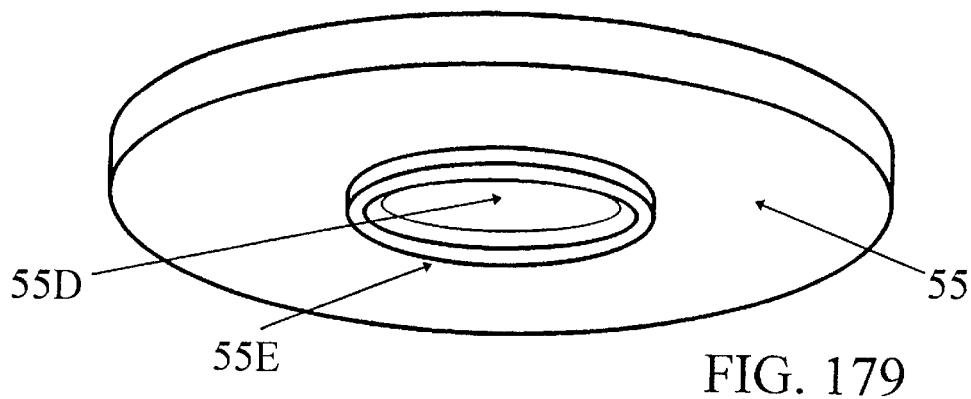
Figure 180:
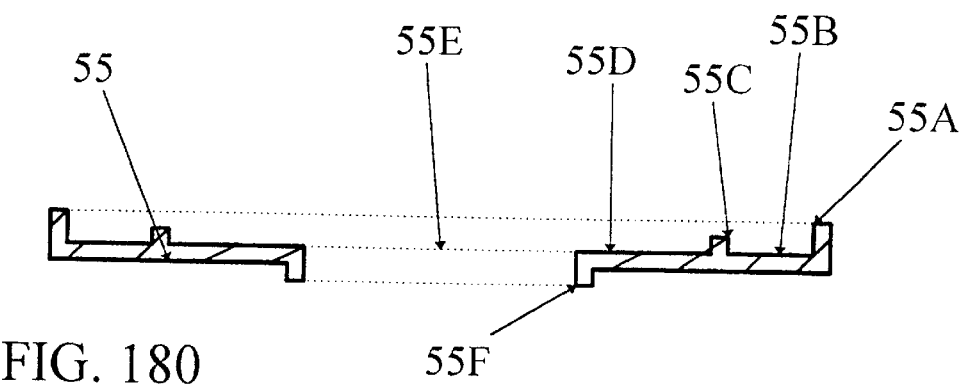
Figure 181:
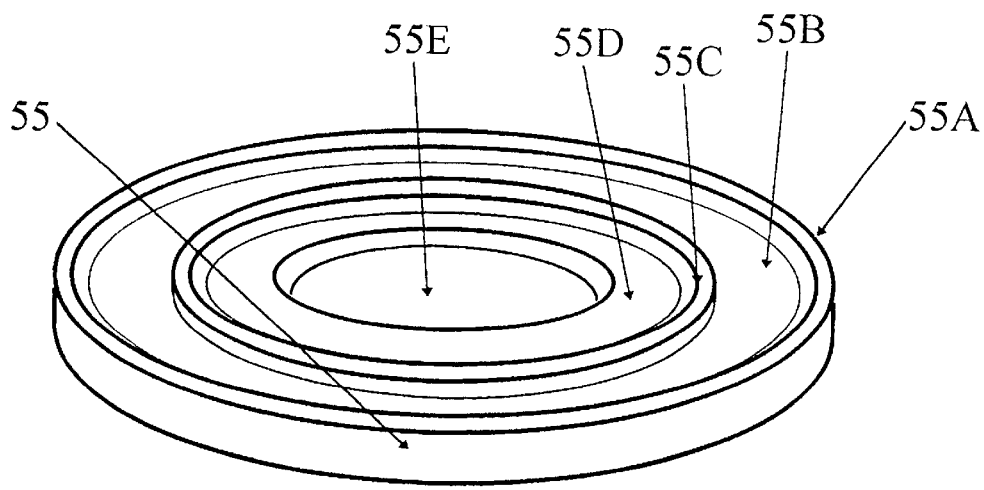
Figure 182:
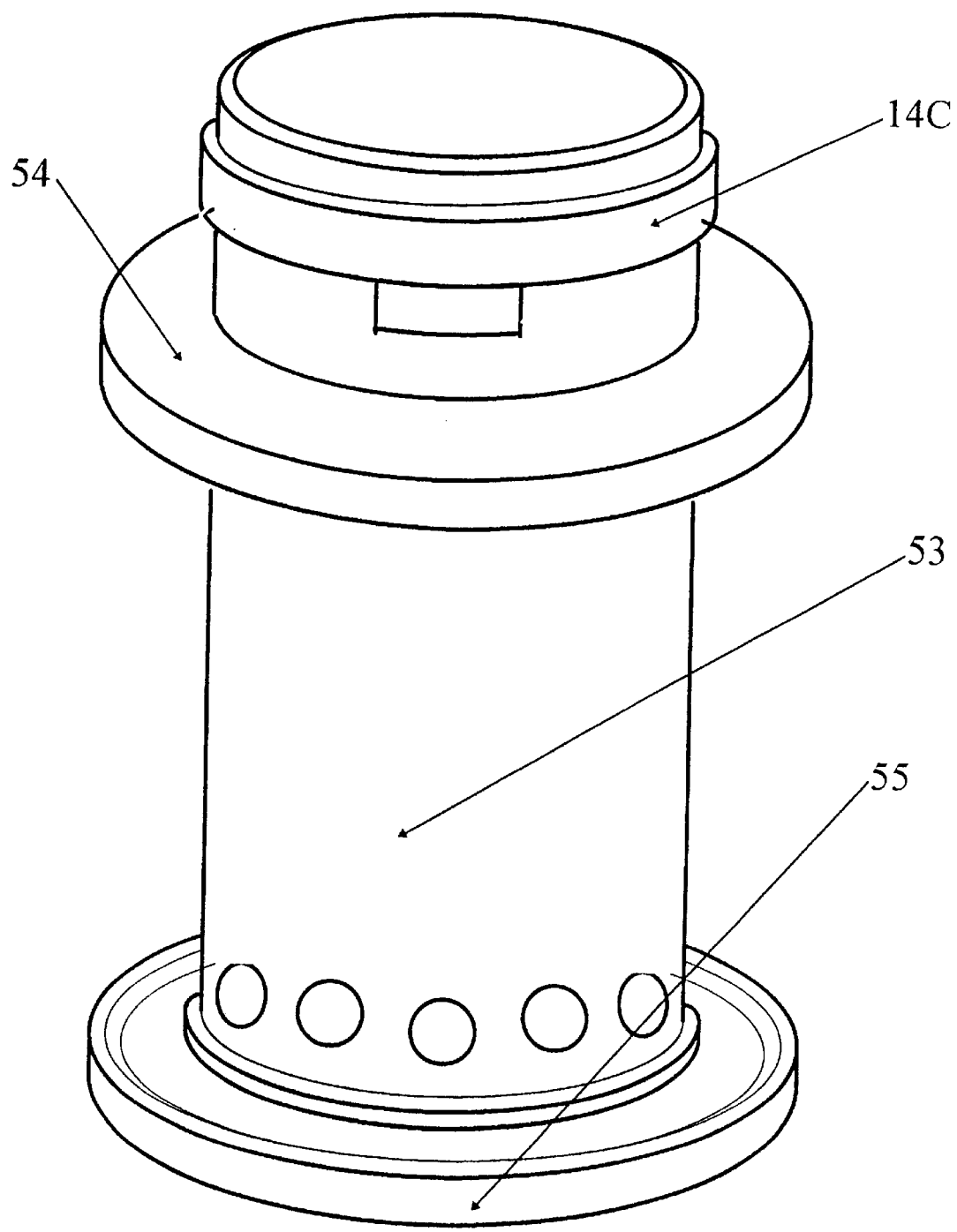
Figure 183:
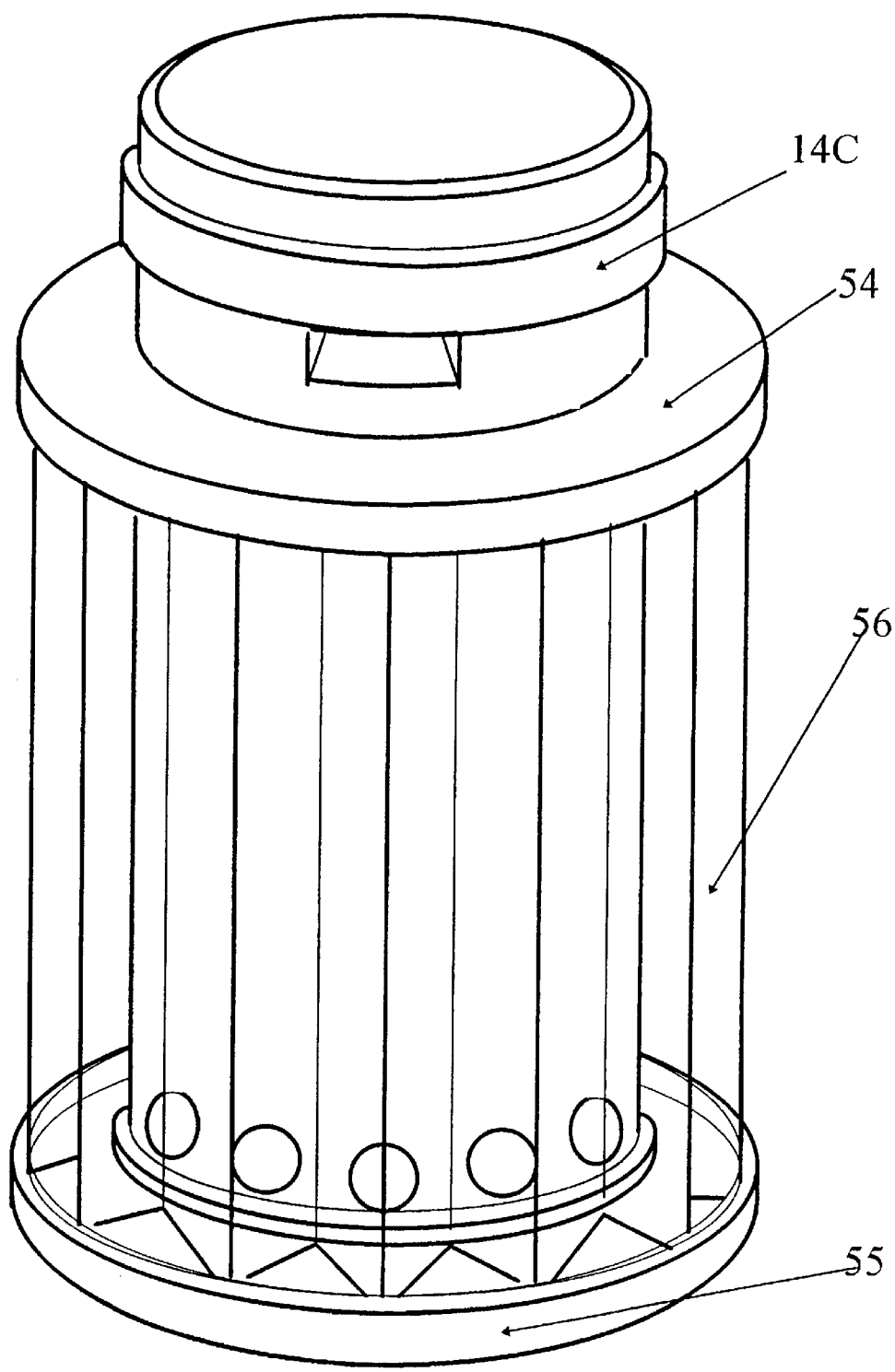
Figure 184:
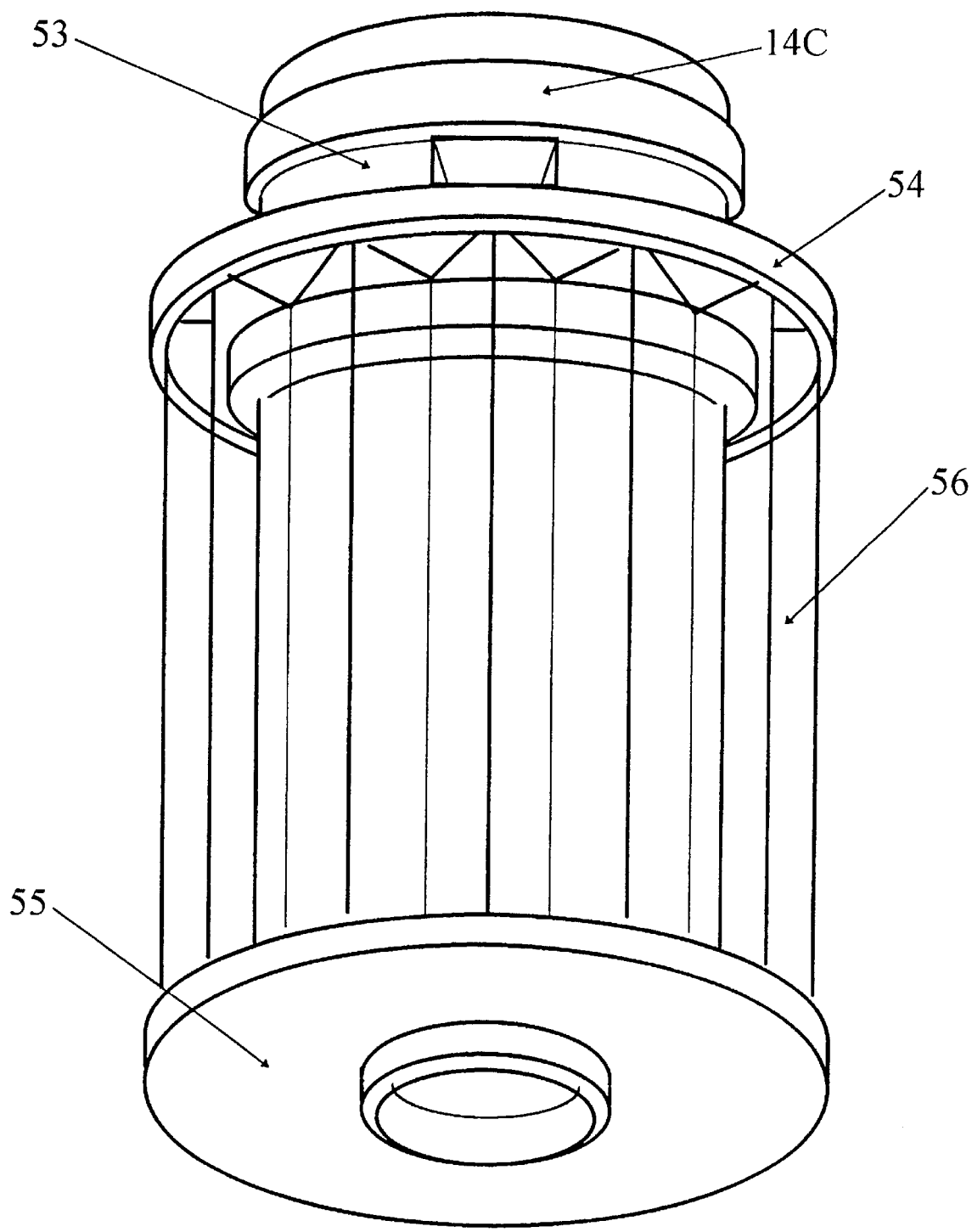
Figure 185:
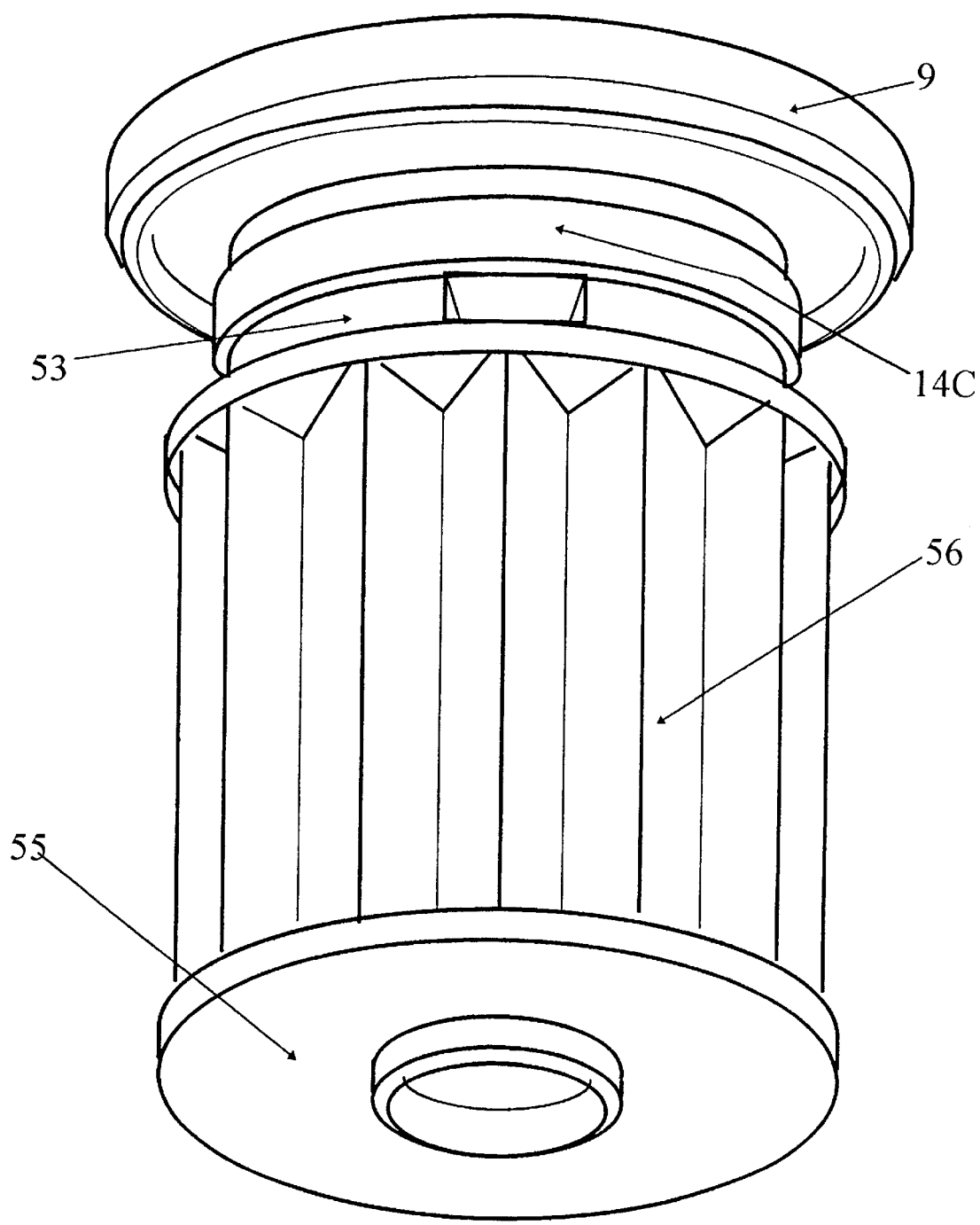
Figure 186:
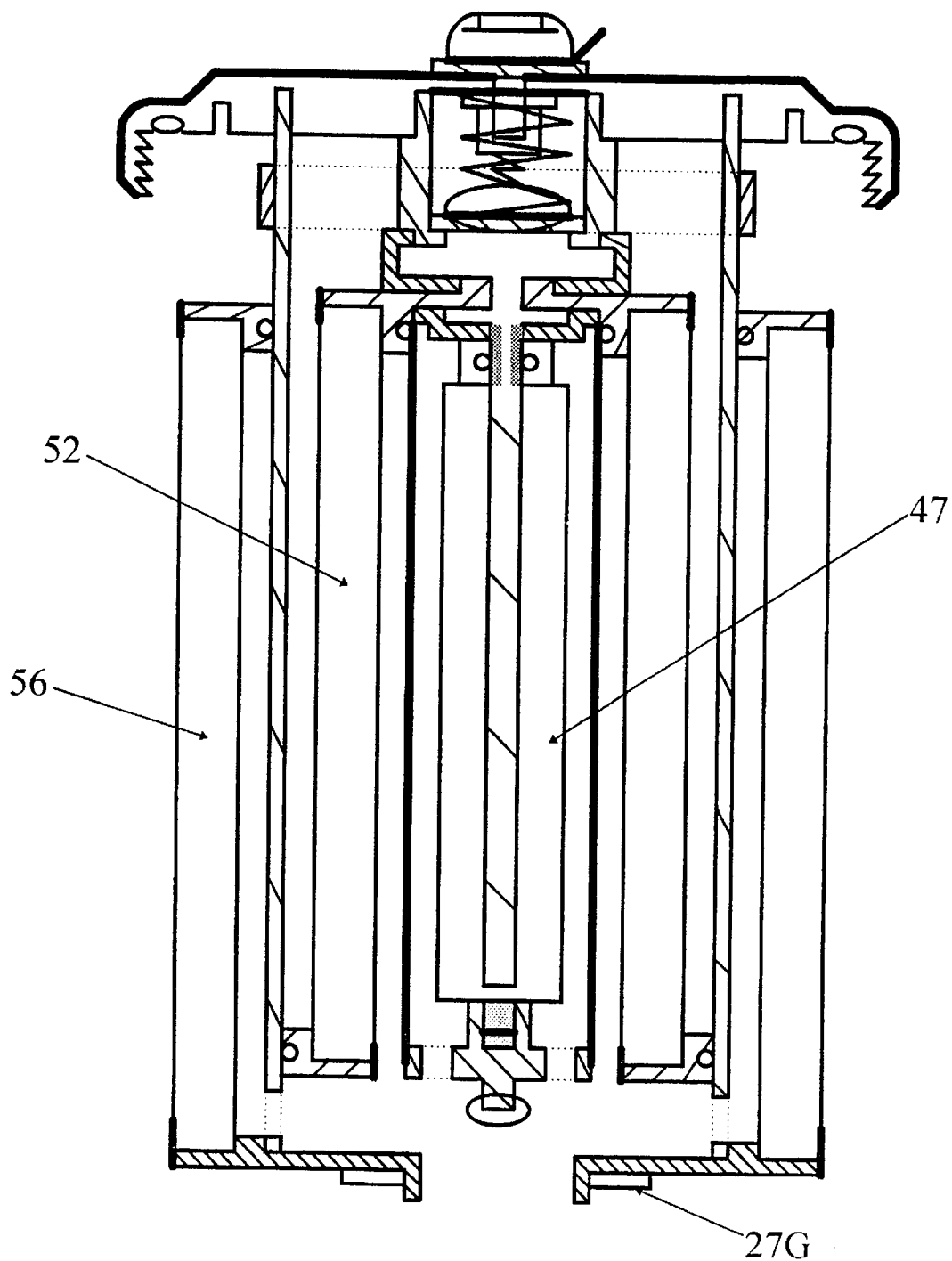
Figure 187:
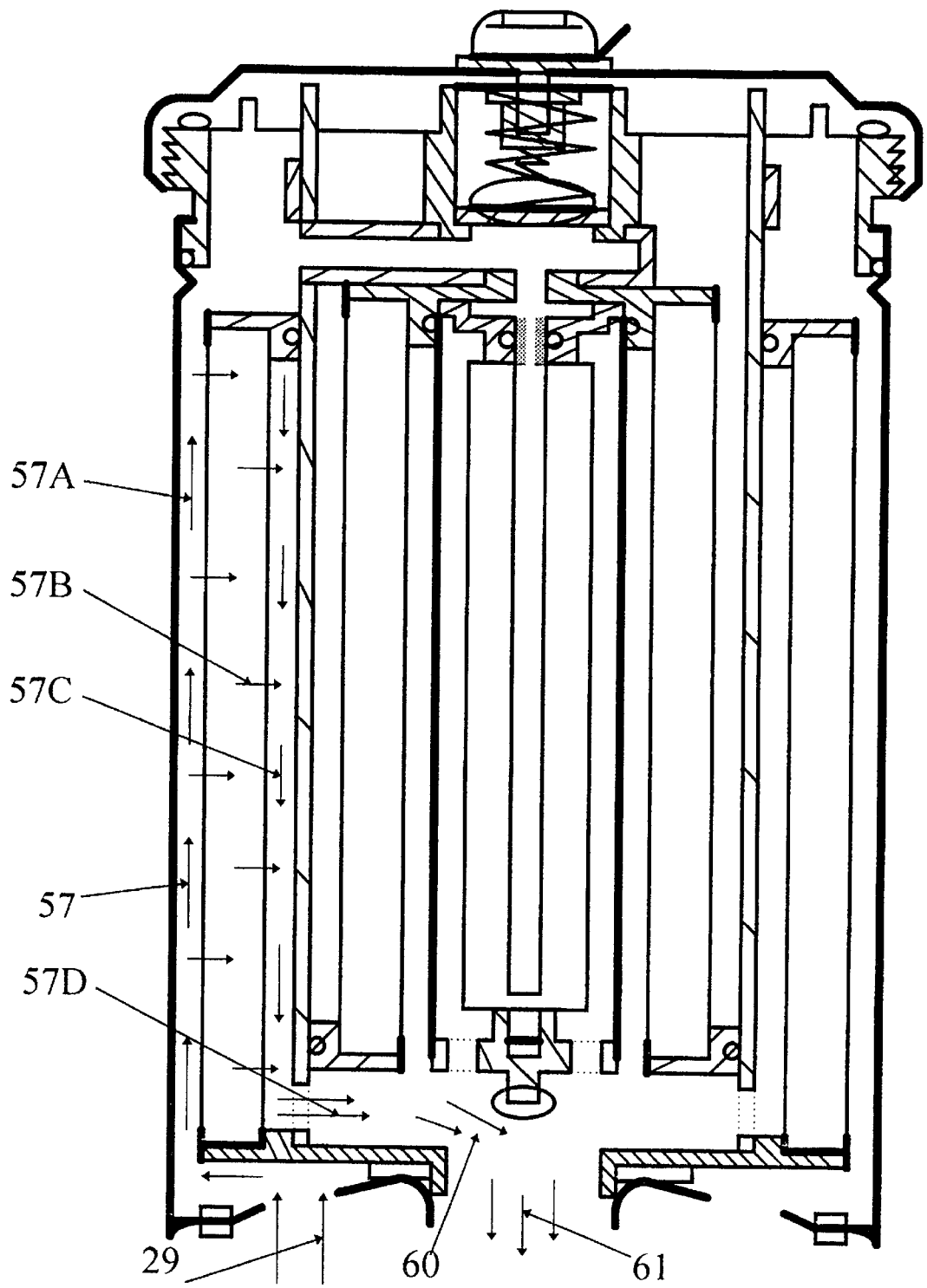
Figure 188:
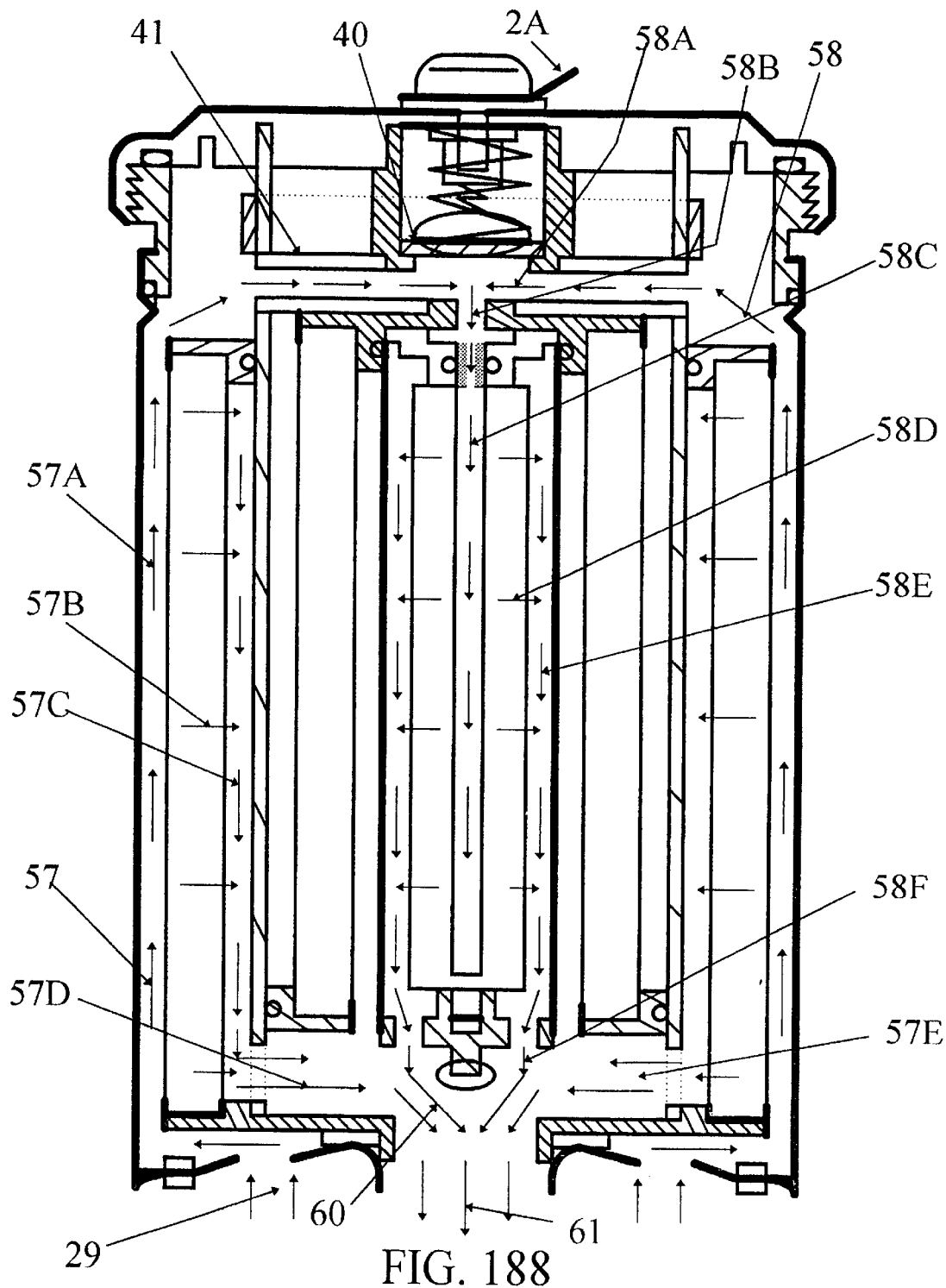
Figure 189:
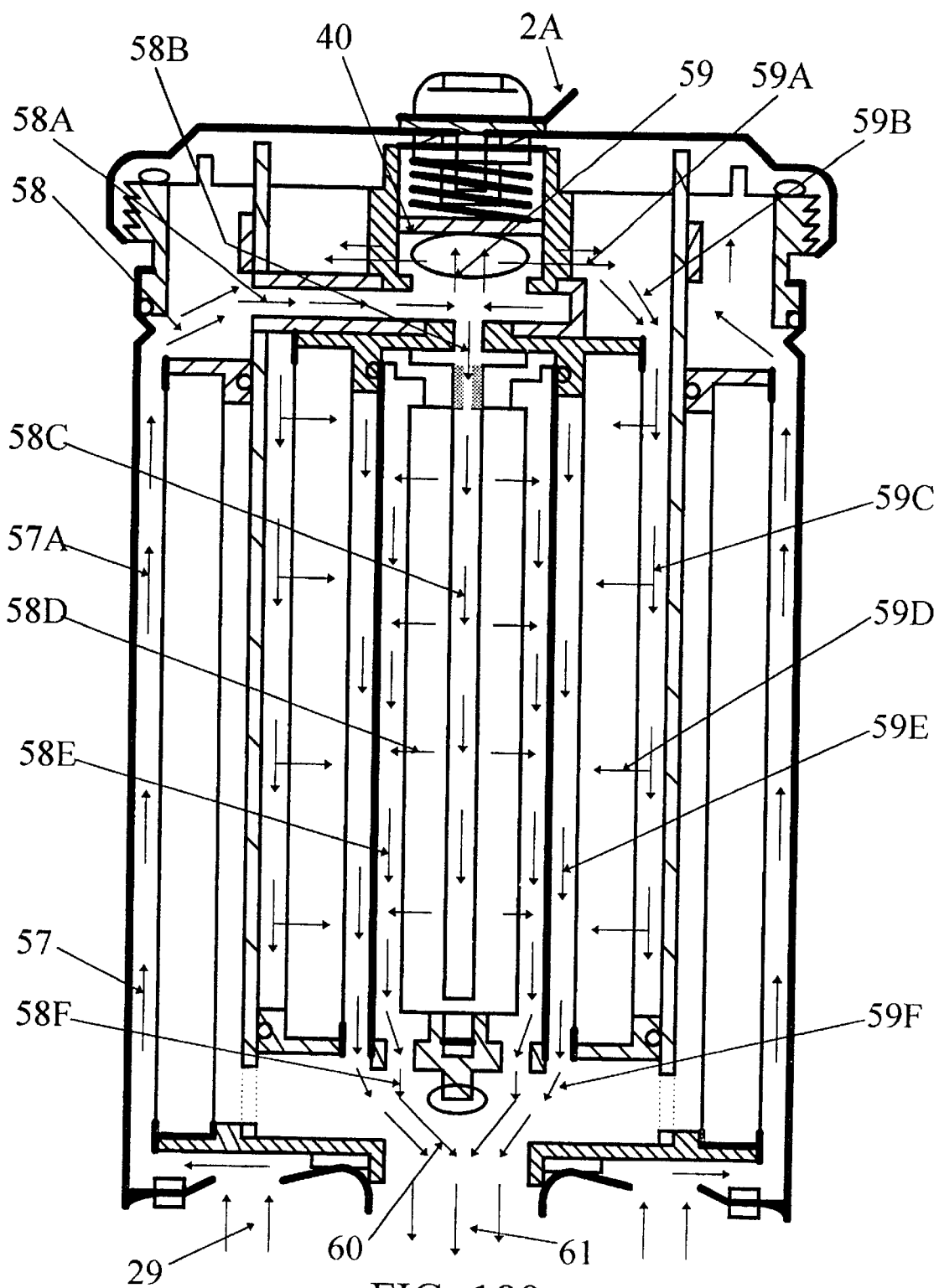

FIG. 165 is a perspective view of the circular disk;

FIG. 166 is a cross-sectional view of FIG. 165;

FIG. 167 is a perspective view of the underside of the member shown in FIG. 165;

FIG. 168 is a perspective view of the relationship of the auxiliary cartridge and the circular disk;

FIG. 169 is a cross-sectional view of FIG. 168;

FIG. 170 is a perspective view of the assembly of the circular disk and the auxiliary cartridge having the safety filter in position;

FIG. 171 is a similar view to FIG. 170 from a different attitude;

FIG. 172 is an exploded cross-sectional view illustrating the warning device, safety valve and rectangular flow tunnel;

FIG. 173 is a perspective view of the tubular member;

FIG. 174 is a similar view to FIG. 173 illustrating the assemblies of in FIG. 172;

FIG. 175 is a circular disk member shown in perspective view;

FIG. 176 is a cross-sectional view of FIG. 175;

FIG. 177 is a cross-sectional view of the elements shown in FIG. 175 from a different attitude;

FIG. 178 is a perspective view of the tubular member showing the disposition of the circular mounting disk;

FIG. 179 is a perspective view of a further disk for use in the present invention;

FIG. 180 is a cross-sectional view of FIG. 179;

FIG. 181 is a cross-sectional view of FIG. 180 from a different attitude;

FIG. 182 is a perspective view of the assembly of elements herein previously referred to;

FIG. 183 is a perspective view of the assembled elements;

FIG. 184 is a similar view to FIG. 183 in a different attitude;

FIG. 185 is a perspective view of the assembled filter core;

FIG. 186 is a cross-sectional view of FIG. 185;

FIG. 187 is a cross-sectional view showing the movement of the oil in a first position;

FIG. 188 is a similar view to FIG. 187 illustrating the flow pattern of the oil through the filter media; and FIG. 189 is a similar view to FIG. 188 showing the multiple stage filtration.

Similar numerals used in the Figures denote similar elements.

MODES FOR CARRYING OUT THE INVENTIONS

Figure 1:
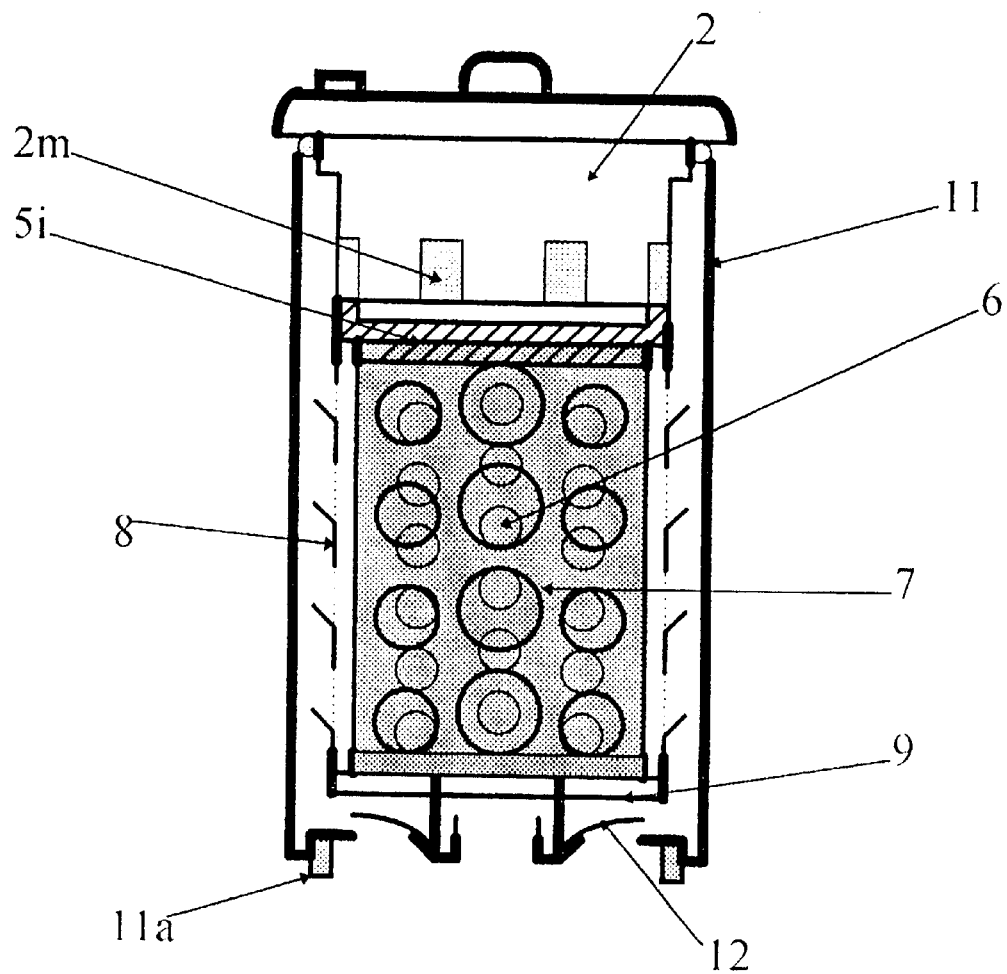
FIG. 1 is a schematic view of an assembled invention.

Referring now to FIG. 1, shown is the filter head 2 comprising a circular solid piece of metal with magnets 2 m imbedded radially in its outer circumferential surface. The safety full flow filter 5 is a series of threaded components forming the filter body. The internal parts in sequence are a cylindrical full flow medium supporting member 6; a cylindrical full flow medium; a cylindrical full flow oil guide 8; a retaining base member 9; and a cylindrical filter canister 11 which may be adapted from a used conventional oil filter. The member at the bottom is the circular sealing gasket 11a of the filter canister. The internal gasket member 12 with circular flap flared out axially also functions as a back flow cover to prevent dirty oil flowing back to the engine.

Figure 2:
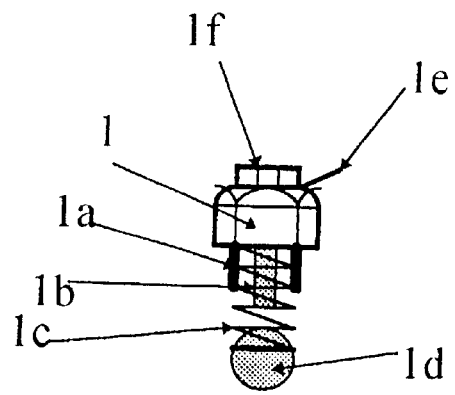
FIG. 2 is a schematic view of the safety valve device.

FIG. 2 illustrates a conventional device adapted to enhance the function of the invention, the spring 1c holds the ball 1d in closed position, when pressure pushes the ball 1d up and touches the hollow pin 1b triggering the ground contact of a DC circuit (not shown) connected by 1e which is held in place by a small nut 1f which completes the circuit and turns the warning light on. Thread 1a is provided adjacent and beneath the main nut 1 for fastening within the filter head.

Figure 3:
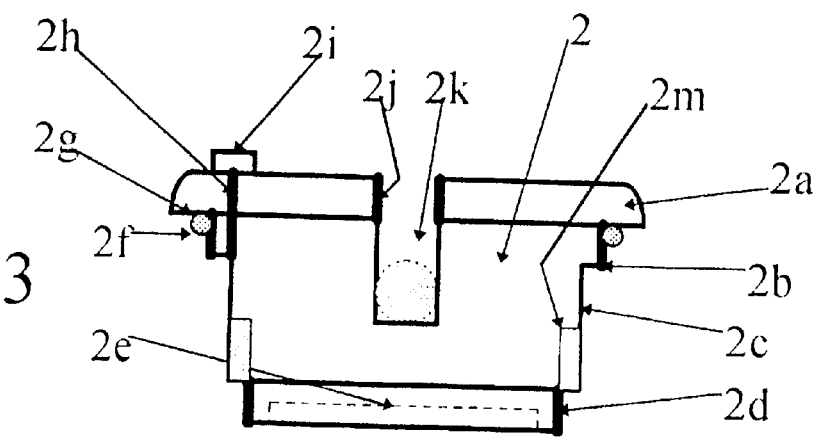
FIG. 3 is a cross-sectional view of the one solid piece filter head and the central chamber of the safety valve device and the position of the drain conduit.

FIG. 3 illustrates the filter head 2. It is configured of four circular portions which gradually decrease in circumferential sizes from the top to the bottom. The top portion 2a is configured as a cap having a radial flange beneath and adjacent to the portion 2b, the latter being a threaded outer circumference. On the threaded outer circumference a O-ring sealing gasket 2f rests in circular groove 2g beneath flange 2a. One level lower is the larger body portion 2c where imbedded magnets 2m are located. The adjacent bottom projected rim 2d is threaded on its outer surface which may be adaptable by either an inward threaded circular bushing disk 5 (FIG. 6) or with a cylindrical medium support member 6 (FIG. 7). A circular recessed indentation 2e is at the bottom face of the rim 2d wherein forms the upper filter chamber when connected with bushing disk 5, illustrated in FIG. 6. A threaded drain nut 2i plugs drain 2h which is shown in greater detail in FIG. 22. The centre chamber cavity 2k where the device 1, illustrated in FIG. 2, is positioned by a thread 2b which thread matches thread 1a on nut 1. Chamber 2k is also designed for alternate applications where a pressure sensing gauge may be utilized.

Figure 4:
FIG. 4 is a cross-sectional view of the safety full flow circular sheet medium.

FIG. 4 illustrates a cross-sectional view of a circular sheet filtering medium 3 having a U-ring sealing gasket 3a mounted around its perimeter. The medium 3 will be labelled as first circular sheet medium 3 in order to distinguish it from the other circular sheet medium with a central opening which will be labelled as the second circular sheet medium 32 hereinafter.

Figure 5:
FIG. 5 is a cross-sectional view of the corrugated and perforated underlay member of the safety full flow circular sheet medium.

FIG. 5 illustrates a cross-sectional view of a circular medium underlay member 4 which is corrugated and perforated. Sheet medium 3 is in use positioned on the top surface of member 4.

Figure 6:
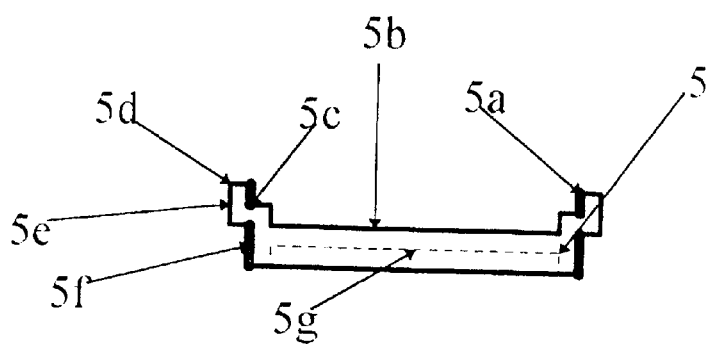
FIG. 6 is a cross-sectional view of the circular bushing disk which is the supporting retainer for the circular sheet medium and the circular medium underlay member forming the safety flow full filter.
Figure 7:
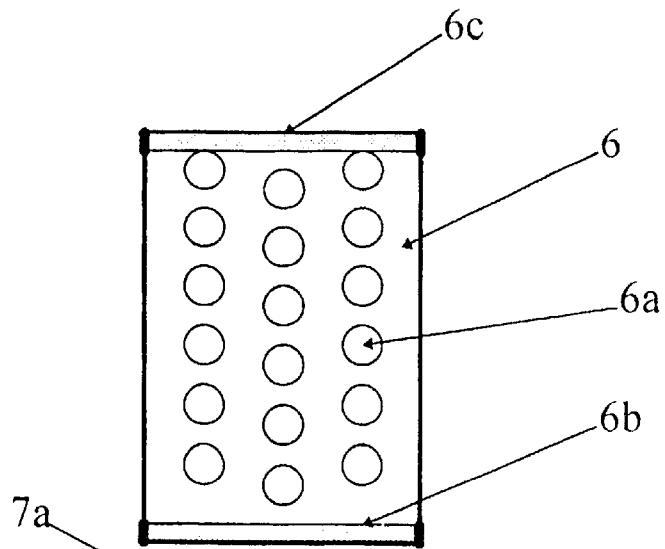
FIG. 7 is a side view of the cylindrical corrugated, perforated medium supporting member.

FIG. 6 depicts a cross-sectional view of a circular bushing member 5. A circular indentation forming a recessed surface 5b is configured to receive medium 3 and member 4. The circular recess surface 5b is bounded by an axially extending raised ledge 5c. The thickness of member 4 in FIG. 5, when positioned on 5b, does not exceed the height of ledge 5c. Ledge 5c holds the U-ring sealing gasket 3a of medium 3 when it rests on top of the member 4. An inner thread 5a is adaptable to receive other thread means 2d in FIG. 3 is implemented adjacent above the ledge 5c. A circular projected rim 5d is a result of the above indented configuration. The first medium 3, member 4 and bushing 5 are assembled together which constitutes a safety full flow filter assembly which may be attached to the threaded bottom portion 2d of the filter head 2 in FIG. 3. The smaller outer bottom portion 5f has a threaded circumferential area designed to receive a cylindrical medium support member 6 in FIG. 7. The circular adaptable bushing disk 5 will be described further in detail concerning its other functions hereinafter in FIGS. 18, 20 and 48. The circular bushing disk 5 will be labelled as first circular bushing disk 5 hereinafter in order to distinguish the other circular bushing disk with a central projected rim bordering a central opening which will be labelled as the second circular bushing disk 42 referred to hereinafter in FIG. 36.

FIG. 7 depicts a cross-sectional view of a circular, cylindrical, corrugated, perforated metal medium support member 6 having opposed ends 6b and 6c threaded. Member 6c connects with thread 5f of circular bushing disk 5 in FIG. 6. Apertures 6a are passages for oil that penetrate through to the core space from the cylindrical filtering medium.

Figure 8:
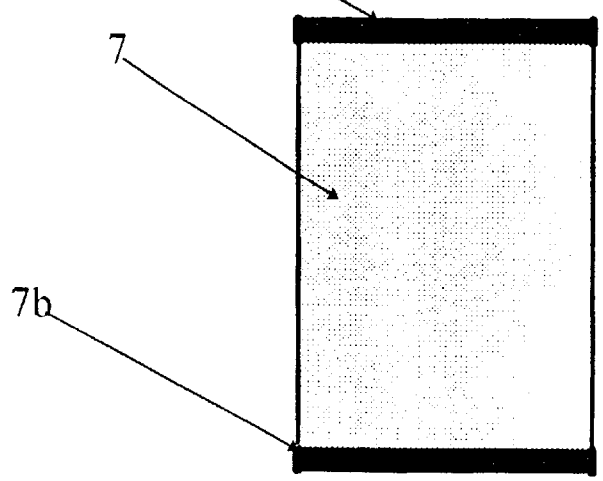
FIG. 8 is a side view of the cylindrical steel cloth full flow filtering medium.

FIG. 8 illustrates the circular cylindrical steel cloth filter medium 7 having both circular ends mounted with a circular "U" shape O-ring 7a and 7b. Cylindrical filtering medium 7 is sheathed over the cylindrical medium supporting member 6 in FIG. 7.

Figure 9:
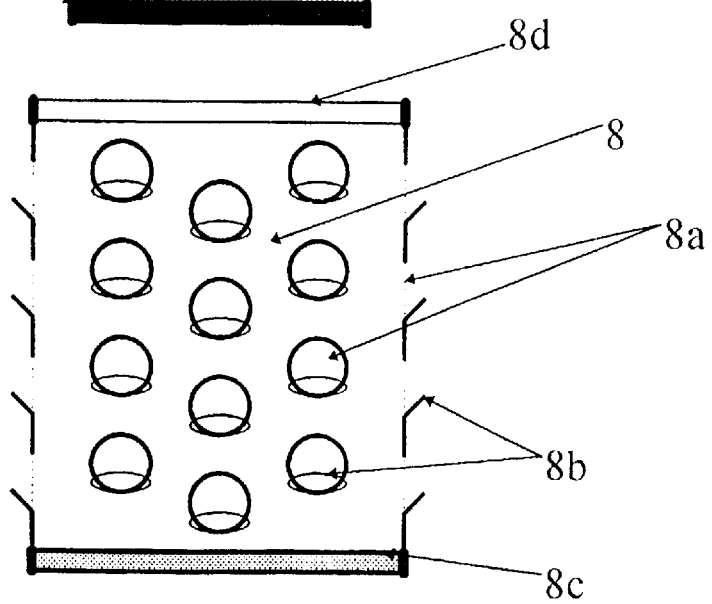
FIG. 9 is a side view of the cylindrical perforated, oil flow guide with deflected lips.

FIG. 9 illustrates that the circular cylindrical metal flow guide 8 has rows of large apertures and outwardly extending lips 8b on one side of each aperture. The lips 8b are designed to deflect the flow of oil along the filter wall towards the safety valve. The upper circular end 8d of the flow guide 8 slides over the cylindrical filtering medium 7. Circular end 8d fits frictionally around the non-threaded portion 5f of the first circular bushing member 5 in FIG. 6 and is ready to be fastened in position in a later sequence (discussed hereinafter). The lower circular end 8c is threaded together with the end member 9b of a retaining base member 9 in FIG. 10.

FIG. 10 illustrates a retaining base member 9 which is a two tier threaded adapter forming the base of the filter core body. The base member 9 has an outward thread on the smaller circular platform portion 9a to connect with threaded end member 6b of cylindrical medium supporting member 6 in FIG. 7. Its larger bottom portion has a radially extending flange where end member 7b of the cylindrical filtering medium 7 rests in FIG. 8. The other adjacent thread 9b on the circumferential surface of the bottom portion is to be connected with the lower threaded end 8c of flow guide 8 in FIG. 9. At the bottom face of the retaining base member 9, a smaller cylindrical collar-like supporting member 9c is welded, preferably threaded in its centre allowing the return oil to flow through the centre hole 9d. The filter assembly can now be connected to the retaining base member 9 in appropriate series. The oil flow guide 8 in FIG. 9 slides down and is joined together at thread 8c with matching thread 9b in FIG. 10. The above assembled parts form the completed lower-part of the filter body. This assembled filter head with filtering body is inserted into the open end of the canister 11 in FIG. 12.

FIG. 11 is the top view of the retaining base member 9 of FIG. 10 showing appropriate positions and features.

FIG. 12 illustrates a cross-sectional view of a conventional disposal steel canister having its top portion removed. A metal circular U-shaped O-ring 11g with the open end downward having its inner axial surface 11f threaded, is mounted on the top edge of rim 11h of the canister 11. The generally rounded top-side of the metal U-ring 11g is ideal to make a tight seal when securely threaded against the rubber O-ring sealing gasket 2g in FIG. 3. At the bottom of the canister 11, the rubber O-ring sealant 11a is the vital sealing gasket which is grooved in around the bottom part of the conventional filter canister to prevent leakage. A circular heavy gauge steel plate is the main structural base of the filter canister. The circular steel plate is configured with a radially concave area 11c on which a plurality of apertures are symmetrically located in a circular pattern. The function of the apertures is to act as inlet ports 11b for oil to enter the canister. The radial concave area is shown more clearly and is referenced hereinafter in FIG. 22. On the circular steel plate a larger centre aperture 11d is also provided and is threaded on its inner surface. The aperture 11d is the only main outlet port for return oil (shown on path 11e) flowing back to the engine block (not shown).

FIG. 13 illustrates a dual function circular plastic member which may be moulded in one piece comprising a cylindrical collar 12b and a circular flap 12d flared outward to form a circular groove 12c between collar 12b and flap 12d. The collar 12b includes an opening 12a designed to receive and sheath around 11d in FIG. 12. The assembled filter embodiment when inserted into the filter canister therein the cylindrical collar supporting member 9c of the retaining base member 9 in FIG. 10 rests and fits on the circular groove 12c thereto, when the collar-flap member 12 is held down firmly in place by the complete filter insertion and when threaded together becomes an internal sealant between the embodied filter assembly and the bottom assembly of the filter canister therein separating the incoming and outgoing oil flow. The circular flap 12d covers the radially positioned inlet ports 11b to prevent oil flow back to the engine block when the engine is not in operation.

The assembled filter bead and canister, when completed, forms the filter. The apparatus is mounted on the engine block (not shown) by the centre threaded female receiving member lid in FIG. 12 which is placed on top of the male threaded member 13e and threaded together by rotation on the oil filter mounting in FIG. 14. The rotation is continued until the O-ring seal gasket 11a is in intimate contact with the engine mounting base and has been tightened so that the apparatus is secured tightly in position.

Figure 22:
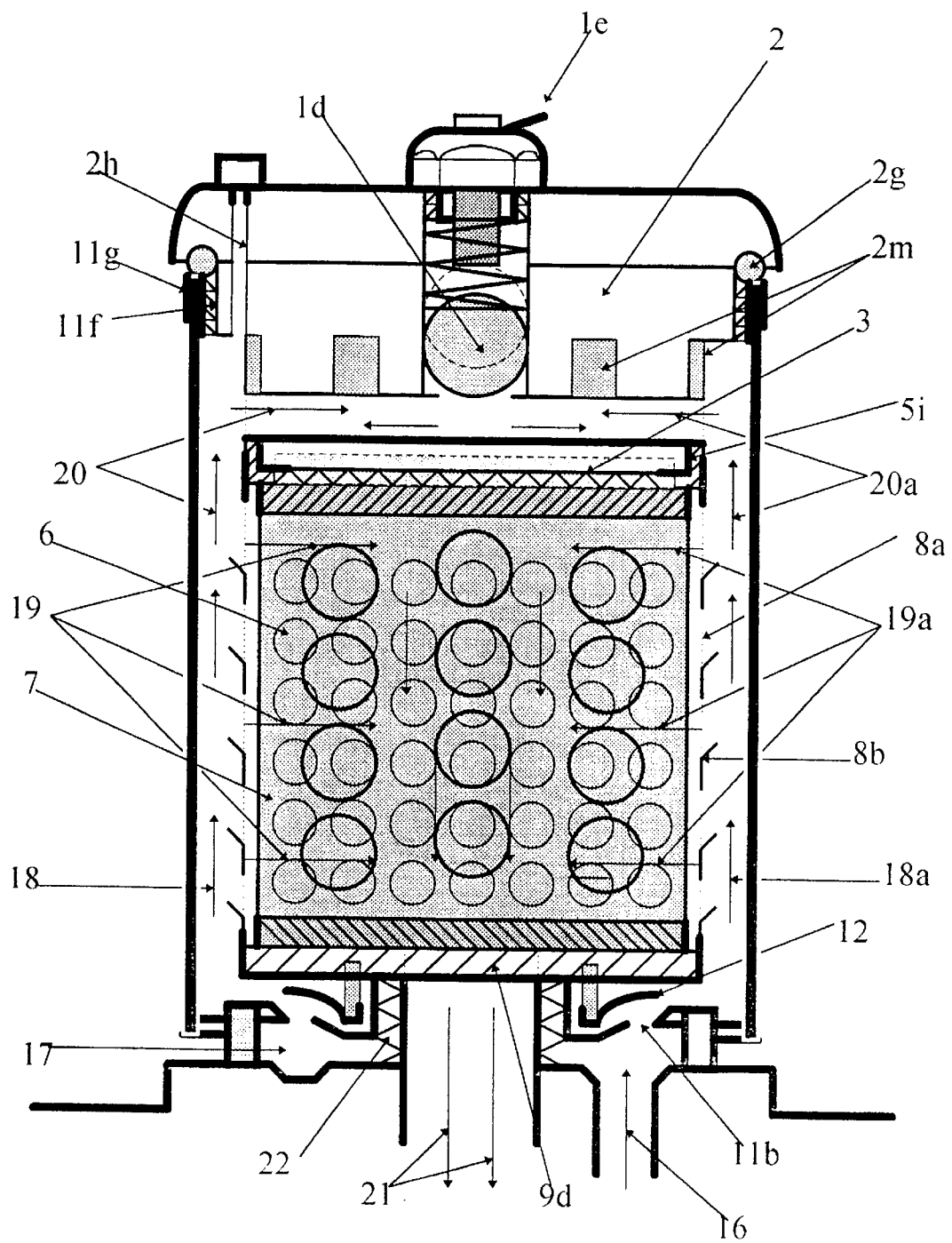
FIG. 22 is a cross-sectional view of the one piece assembled functioning invention in its normal full flow filtering mode, without the bypass system in the filter head, showing the oil path with safety valve closed and having a safety full flow filter.

FIG. 14 illustrates the conventional oil filter mounting base 13 illustrating the exact position of convergence with the filter canister. When the apparatus is firmly attached onto the mounting base 13 in FIG. 14, a circular oil tunnel 17 referred to hereinafter in FIG. 22 is formed by closing a recessed circular indented area 13a matching with the circular concave area 11c in FIG. 12. Oil on path 13d comes through outlet port 13c and is distributed evenly within the circular tunnel 17 before entering inlet ports 11b leading into the canister. Return oil flow at lie and 13b coincides with the return oil flow in FIG. 14.

FIG. 15 illustrates another cross-sectional view of a one piece filter bead referred to in FIG. 3 and illustrates the positions of the open flow tunnel exits 15 and 15a and the appropriate position of drain conduit 2h. When the cylindrical main full flow medium is functioning normally, oil flows freely in and out of the open oil flow tunnel without disturbing the safety valve 1d. The dashed lines illustrate the position of the safety valve tunnels referred to in FIG. 16.

FIG. 16 illustrates another cross-sectional view of the one piece filter head referred to in FIGS. 3 and 15 illustrating the coordinate positions of the safety valve tunnel exists 14 and 14a, open tunnel exits 15 and 15a, the central position of the safety valve 1d and the position of the drain conduit 2h.

FIG. 18 more clearly illustrates the first circular bushing disk 5 which is the same circular bushing disk 5 also referred to in FIGS. 6 and 18. The first circular bushing disk 5 has four additional functions the first of which is 5b, having an indentation recess to contain the first medium and the first underlay shown in FIGS. 20 and 21. The second of which is element, 5a, a female thread designed to receive the threaded bottom retainer rim 2d shown in FIGS. 15 and 16. The third is 5f which is the male threaded portion of the bottom retainer rim. The alternate function of element 5f is to receive the cylindrical medium supporting member 6 in FIG. 7. The fourth of which is element 5g, the bottom indentation designed to receive the first circular sheet medium 3 which becomes an upper chamber of the dual bypass system. FIG. 18 relative to FIG. 19 can be utilized as a bushing member to attach several filtering media in tandem making a series of filtering components.

Figure 48:
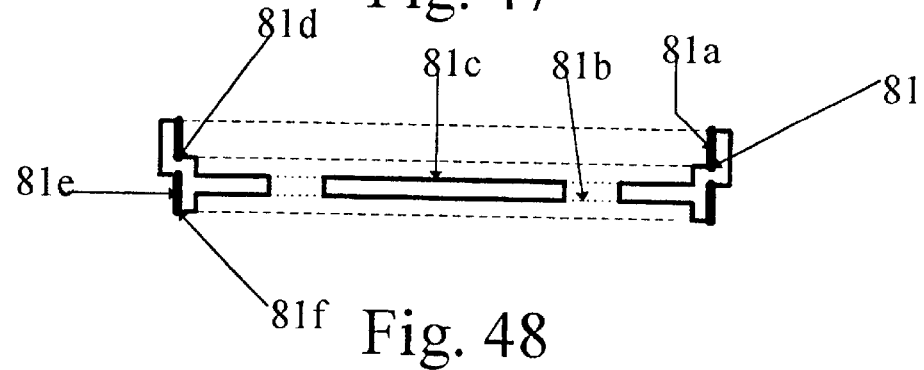
FIG. 48 is a dual medium and underlay retainer member, the first circular bushing disk which is the same circular bushing disk shown in FIGS. 6 and 18, for nesting the safety full flow medium and the medium underlay member.

FIG. 19 illustrates the bottom view of the first circular bushing disk 5 with apertures 5h and also shown in FIGS. 6 and 48.

FIG. 20 shows the cross-sectional view of the first circular sheet medium 3 which is mounted with a U-ring sealing gasket 3a, referred to in FIG. 4.

FIG. 21 illustrates the top view of the first circular sheet medium 3 and the U-ring 3a. The medium 3 is used in the safety full flow filter 5i as well as for media that are used for single and dual bypass filtering systems, as well as for alternate construction of the invention and for the purpose to be mentioned hereinafter with reference to FIG. 40.

FIG. 22 depicts a cross-sectional view and more clearly defines the invention. The one piece filter head 2 is the configuration without the built-in bypass system, but it is equipped with safety valve device 1d and 1e and safety full flow filter 5i which it comprises with first circular bushing disk 5 when added to medium and underlay (FIGS. 6, 18 and 48). This assembly is for the normal filtering mode. Oil path 16 shows the oil moving from the engine and rapidly flowing around the oil tunnel] 17. Oil then enters the inlet ports 11b, forces open the back flow flap 12 and travels paths 18 and 18a. Flow continues passing through perforated holes on flow guide 8 then permeates the cylindrical full flow medium 7 and its perforated cylindrical supporting member 6. The oil continues to flow through paths 19 and 19a within the hollow core space of the support 6, gathering momentum and passing through the centre opening 9d of the circular retaining base member 9, through path 21 then returning to the engine. Oil flow to paths 20 and 20a demonstrates that some oil moves around within the designated space of the invention and travels in and out of the open flow tunnel above the safety full flow filter 5i.

Magnets 2m attract any iron and steel metal particles and safety valve 1d is a standby in the normal filtering mode position. The invention has two important read means on the main filter body for descriptive purpose. The first is located on the filter cap and designated as 2b. Thus thread secures the filter cap with the filter canister at inward thread 11f on U ring 11g. To form a seal of the above two threaded components an "0" ring 2g is utilized. The drain conduit 2h has an extremity adjacent to thread 11f. The vertical inverted position results in draining of 95% of the residual oil in the filter canister during servicing. At the bottom portion point 22 is the thread that secures the filter canister in place with the oil filter mounting base of the engine (not shown).

Figure 23:
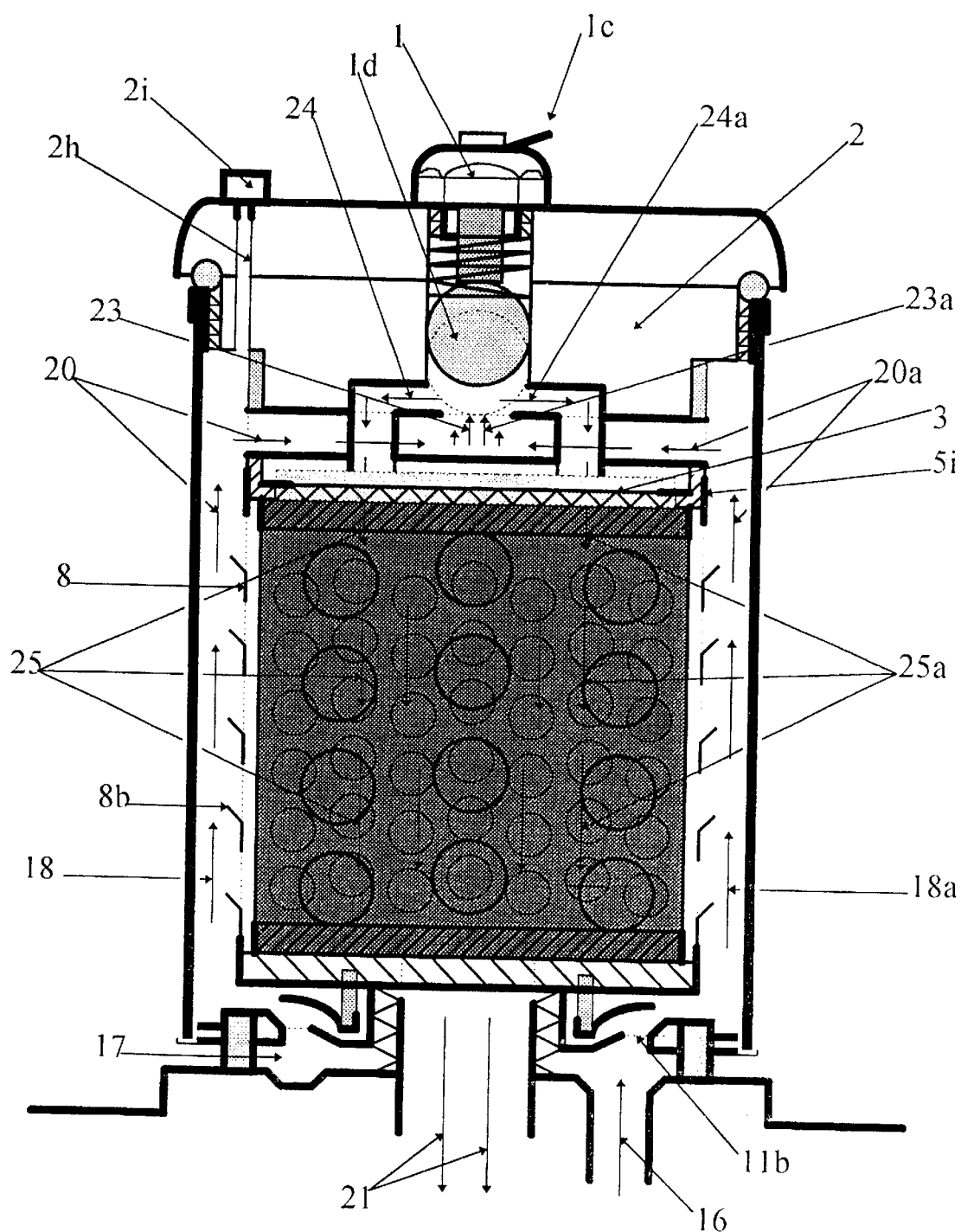
FIG. 23 is a cross-sectional view of the one piece assembled functioning invention in its restricted filtering mode, refereed to in FIG. 22, illustrates the oil path, travels with safety valve open through the safety valve tunnels and the safety full flow filter installed.

FIG. 23 illustrates another embodiment of the invention without the bypass system in accordance with FIG. 22. The system includes the safety full flow filtering system 5i and safety valve 1 in a restricted filtering mode. Both systems are housed within a reclaimed conventional filter canister. Oil flowing on path 16 travels around space 17 and forces open the circular flap 12, entering inlet ports 11b. Oil flows around the cylindrical full flow medium 7 and forward on paths 18 and 18a. When the cylindrical full flow medium 7 surface is fouled with particles, the space around medium 7 is maintained by having flow guide 8 in between separating the moving oil flow from the clogged filtering medium. There is little or no movement within the space thus the oil flow is relatively inconsequential compared to the oil flow on the outside of the flow guide 8. The oil current moves rapidly towards the safety tunnels deflected further by the protruding lips 8b. The oil flows along without disturbing the neutral space behind the flow guide 8 because of the baffling action of the protruding lips 8b. The function of the flow guides is to prevent the moving oil stream from washing off the particles which may be trapped on the surface of the medium from being carried back to the engine. Oil flowing along paths 20 and 20a inside the open flow tunnel proceeds on upwardly to paths 23 and 23a and pushes the safety valve 1d to open. The oil flow proceeds on paths 24 and 24a then downward to paths 25 and 25a entering the chamber of the safety full flow filter 5i and filtered by the first circular sheet medium 3. The oil then permeates into the core area within the main cylindrical full flow medium 7 gathering momentum for the return to the engine shown on path 21. The safety valve 1d is lifted to contact the sensor pin 1b activating the indicator light connected to 1c alerting the operator that safety valve is open and the main full flow medium is fouled. As the oil flows around the filter head the magnets 2m imbedded in the lower filter body trap and thus remove suspended iron and steel particles from the oil flow.

Figure 24:
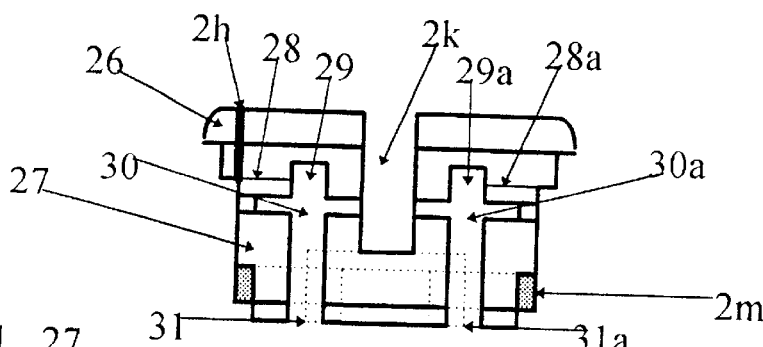
FIG. 24 is a cross-sectional view of a two piece filter head, illustrates other tunnel positions related to a single stage bypass system.

FIG. 24 depicts a cross-sectional view of the filter head illustrating other features of the invention. In this embodiment, the filter head 2 comprises two halves, referred to in FIGS. 1, 3, 15, 16, 22 and 23. This configuration of the filter head includes an upper filter body 26 and a lower filter body 27. A single stage bypass system is provided and retains all other functions as the one piece filter head 2 thereby showing coordinate of the safety valve's central chamber 2k. The latter houses the safety valve 1, magnets 2m, drain conduit 2h with the broken lines showing the safety and open tunnels. Ducts 28a and 28b lead into chambers 29 and 29a of the bypass chamber 20 and 30a. The two exit tunnels 31 and 31a are beneath the circular chamber spaces 30 and 30a. The chambers 29 and 29a inside the upper filter body 26 are not necessarily in alignment with the two exit tunnels 31 and 31a when threaded together with the lower filter body 27.

Figure 25:
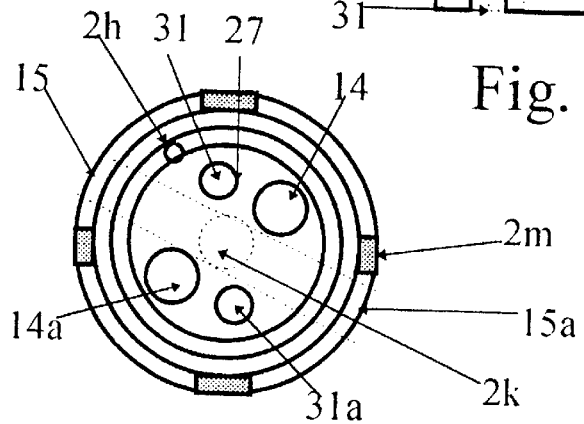
FIG. 25 is a bottom view of the two piece filter head illustrates coordinating positions of all tunnel exits and disposition of the magnets.

FIG. 25 illustrates more clearly the bottom view of the lower filter body 27 concerning the appropriate positions of all the features within the two piece filter head in FIG. 24.

Exits 31 and 31a are the tunnel exits of the bypass system, referred to in FIG. 21. Exits 14 and 14a are the safety tunnels illustrated in FIGS. 15, 17 and 23. Horizontal tunnel exits 15 and 15a are the open flow tunnels illustrated in FIGS. 16, 22 and 23. The drain conduit 2h is located adjacent to the top rim of the upper body member 26 of the filter head while magnets 2m are aligned around the circular surface in positions to avoid blocking the exits 15 and 15 and orifice ducts 28a and 28b shown in FIG. 24.

Figure 26:
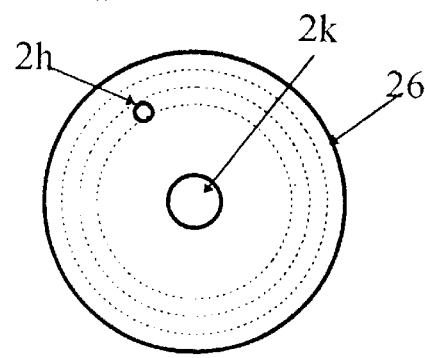
FIG. 26 is a top view of the two piece filter head illustrates the position of the centre chamber of the safety valve and the drain conduit.

FIG. 26 illustrates the top view of the upper filter body 26 of the filter head referring to FIGS. 24 and 25. Central chamber 2k is the housing chamber for appropriate sensing instruments, such as safety valve or pressure gauge. Location 2h is the position of the top drain conduit.

Figure 27:
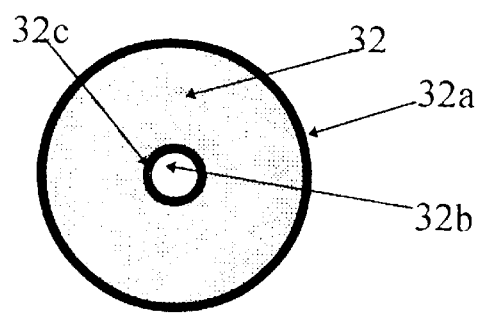
FIG. 27 is a top view of a second circular steel cloth sheet filtering medium with a centre opening having a outer and inner U-ring sealing gasket.
Figure 31:
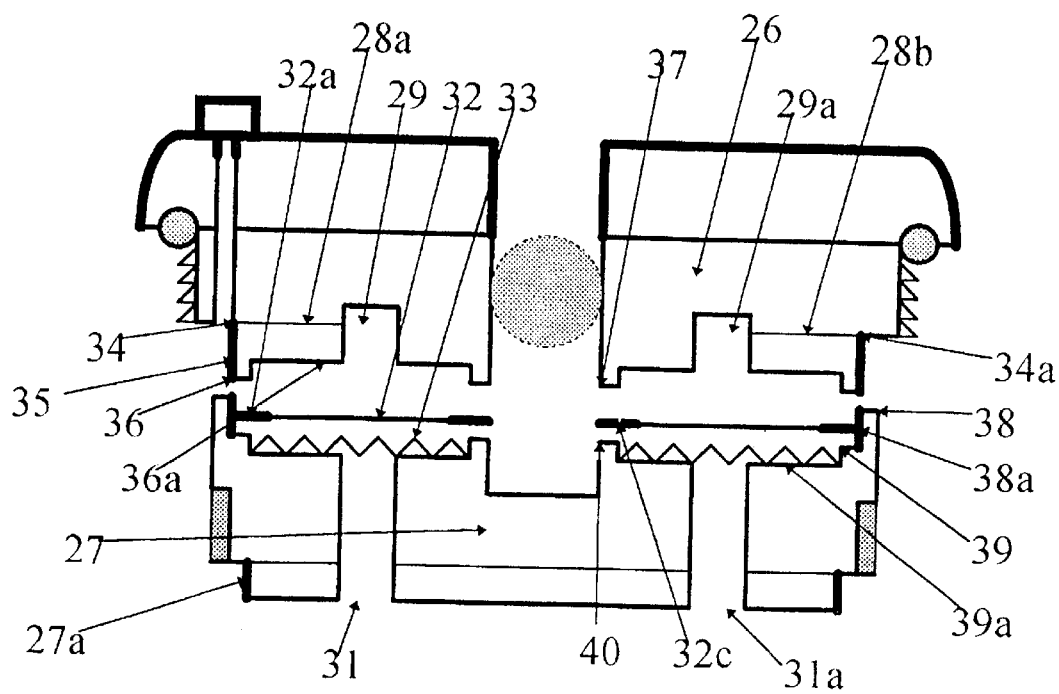
FIG. 31 is a clearer cross-sectional view of the two piece filter head illustrates the single bypass system with the second medium and the second underlay member, positions of the two orifices, and tunnels.

FIG. 27 illustrates the top view of the second circular steel cloth sheet medium 32 with an opening 32b to which accommodates the safety valve 1 referred to in FIGS. 24 and 31 within centre chamber 2k. The second circular sheet medium 32 has the U-ring sealing gasket 32a on the outer rim and a centre sealing gasket 32c defining the centre opening 32b. The second sheet medium 32 is made for the filtering system within the filter head which is equipped with a centre cavity chamber 2k described in FIGS. 24 and 25.

Figure 28:
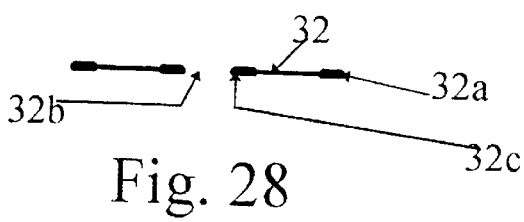
FIG. 28 is a cross-sectional view of the second circular steel cloth sheet medium referred to in FIG. 27.

FIG. 28 depicts more clearly the cross-sectional view of the second circular sheet medium 32, with U-ring 32a, centre U-ring 32c and centre opening 32b.

Figure 29:
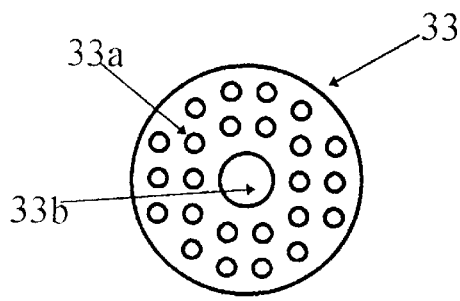
FIG. 29 is a top view of a second circular, perforated and corrugated underlay member with a centre opening, which is the underlay member of the circular sheet medium referred to in FIG. 27.
Figure 30:
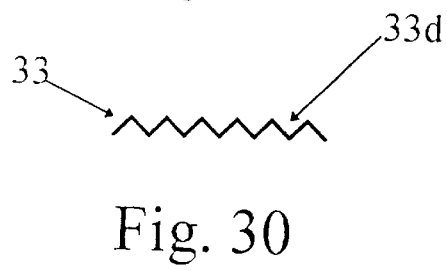
FIG. 30 is a cross-sectional view of the second circular medium underlay member in FIG. 29.

FIG. 29 and FIG. 30 illustrate the top view and cross-sectional view of the corrugated and perforated sheet metal second circular underlay member 33 with a centre opening 33b which is aligned concentrically with the centre opening 32b of the second medium 32 in FIG. 27 and the centre instrument chamber 2k in FIG. 24.

FIG. 31 depicts a cross-sectional view according to the aforementioned single stage bypass system within the two piece filter head referred to in FIG. 24. At the bottom of the upper filter body 26, there is included a projected outer rim member 36 threaded on its outer circumferential area 35. The projected outer rim member 36 encompasses a recess area 36a forming the upper bypass chamber extending radially inwardly surrounding an inner circular projected member 37 bordering the safety valve chamber 2k. On the surface of the recess 36a there are two symmetrically positioned shallow holes 29 and 29a, referred to in FIG. 24 which are the chambers designed to receive small oil streams from the orifice ducts 28a and 28b, positioned at points 334 and 34a. As on the top circular surface of the lower filter body 27 the same arrangement is provided to form the lower bypass chamber. A projected outer rim member 38 having inner circumferential thread 38a, adjacent to but beneath the thread 38a is a raised circular ledge 39 which encompasses a recess area 39a. The latter extend radially and inwardly surrounding an inner circular projected member 40 which matches the inner circular projected member 37 and also borders the safety valve chamber 2k. On the surface of the recess area 39a, two matching size apertures 31 and 31a extend to the bottom of the lower filter body 27 comprising the oil exit tunnels. The second circular underlay member 33 is placed under the second circular sheet medium 32 against the recess surface 39a of the lower bypass chamber of the lower filter body 27. The outer U-ring sealing gasket 32a of the second circular medium 32 rests on top the circular ledge 39 so that its small centre U-ring sealing gasket 32 is seated on top of the circular projected member 40. During the threading action that brings together the upper filter body 26 and lower filter body 27, the projected outer rim member 36 matches circular ledge 39 and closes intimately so that contact on outer U-ring seal gasket 32 is made. The inner circular projected member 37 of the upper filter body 26 simultaneously comes in intimate contact on inner U-ring 32a and inner U-ring 32c and thus the second circular sheet medium 32 is secured within the single bypass chamber forming a sandwiched filter construction.

Figure 32:
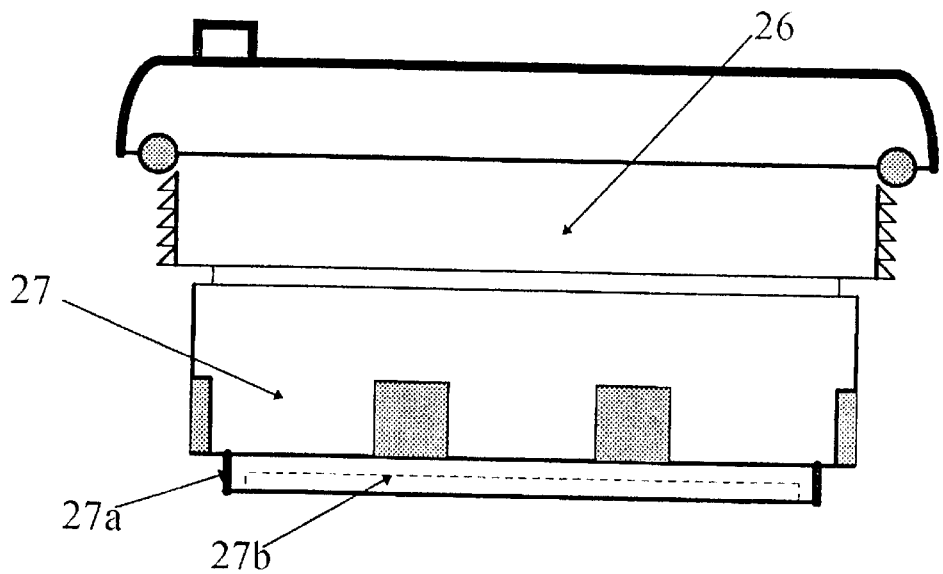
FIG. 32 is a side view of the two piece filter head enclosed with a single bypass system in FIG. 31.

FIG. 32 illustrates a full side view of the enclosed two piece filter head with upper filter body 26 and lower filter body 27 having a bottom rim 27a threaded on its outer circumference, referred to in FIG. 31. The threaded circumference 27a is for receiving the cylindrical medium supporting member 6 referred to in FIG. 7 or the adaptable first circular bushing disk 5 which forms the safety full flow filter 5i, referred to in FIGS. 18, 22, and 23. The bottom recessed indentation 27b is the upper chamber of the safety full flow filter 5i, referred to in FIGS. 18 and 22 which in the case that such application can be utilized by adapting the first circular bushing disk 5, referred to in FIGS. 6 and 18.

Figure 33:
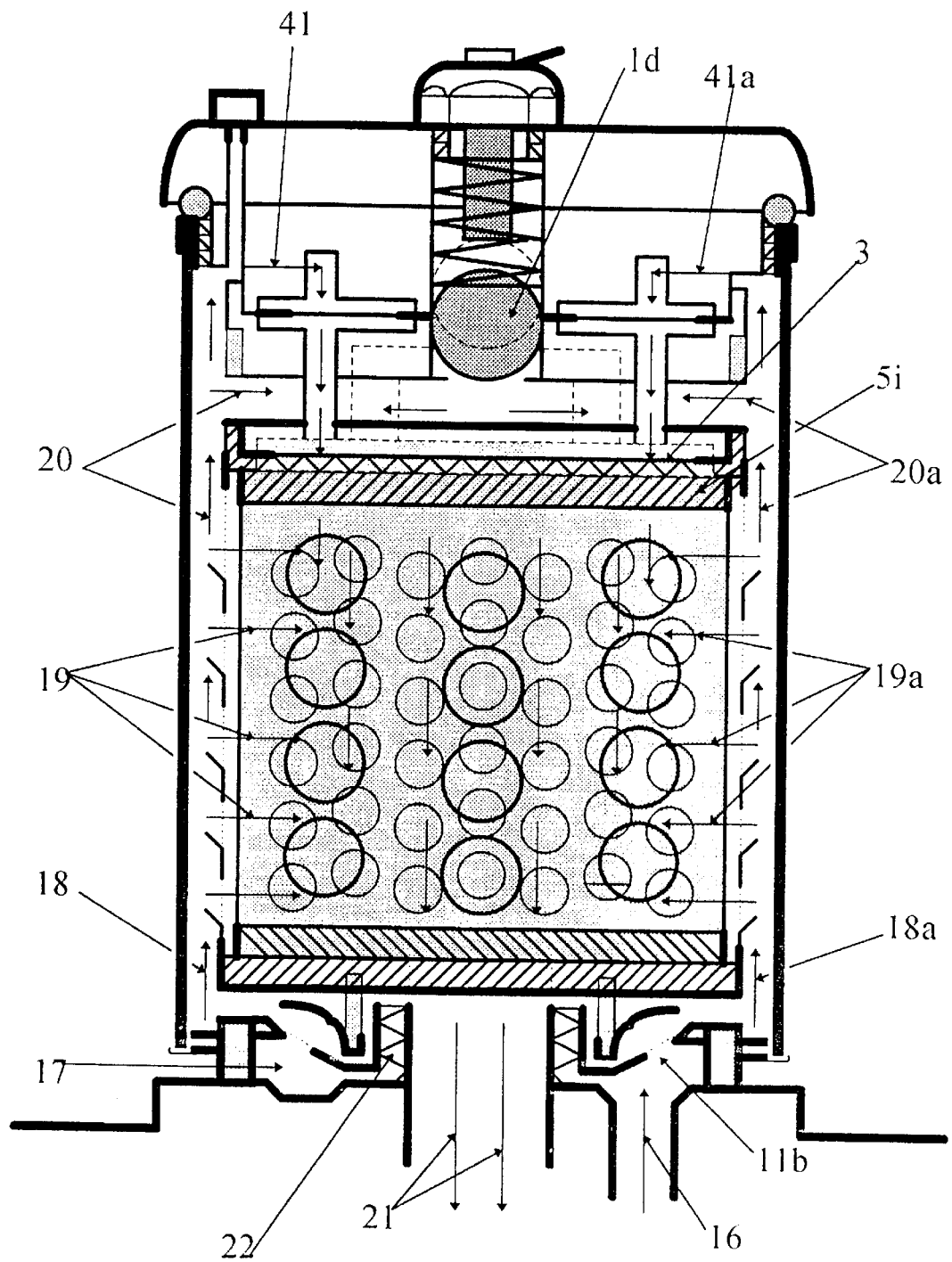
FIG. 33 is a cross-sectional view of a assembled functioning invention with two piece filter head in its normal filtering mode comprised with a single stage bypass system, and a safety full flow filter.

FIG. 33 illustrates the various oil paths that flow within the filter canister. The normal filtering mode is comprised of a single stage bypass system, the magnets 2m are in the position along the safety valve id and the safety full flow filter 5i, referred to in FIGS. 18 and 22. Oil from engine flows on oil path 16 moves around space 17 and then enters inlet ports 11b then flows into the cylindrical canister shown by oil paths 18 and 18a. The main flow of oil moves rapidly on paths 19 and 19a into the perforated holes of flow guide 8, then permeates through the flow guide 8 and is filtered by the cylindrical main full flow medium 7 thereupon passing through the cylindrical medium supporting member 6. Other oil paths denoted by arrows 20 and 20a show that oil travels freely in and out the open flow tunnel 15 referred to in FIG. 16. In this normal filtering mode, the safety valve 1d is in the closed position; some oil is forced into the single stage bypass filtering chamber via the orifice ducts shown by oil paths 41 and 41a. Oil filtered by a finer second circular sheet medium 32 in FIG. 31 passes the first courser safety full flow sheet medium 3 in FIG. 4 within safety full flow filter 5i referred to in FIGS. 6 and 18. The filtered bypass oil stream merges with the filtered main oil flow stream within the core space of the cylindrical medium support 6 and returns to the engine shown on oil path 21.

Figure 34:
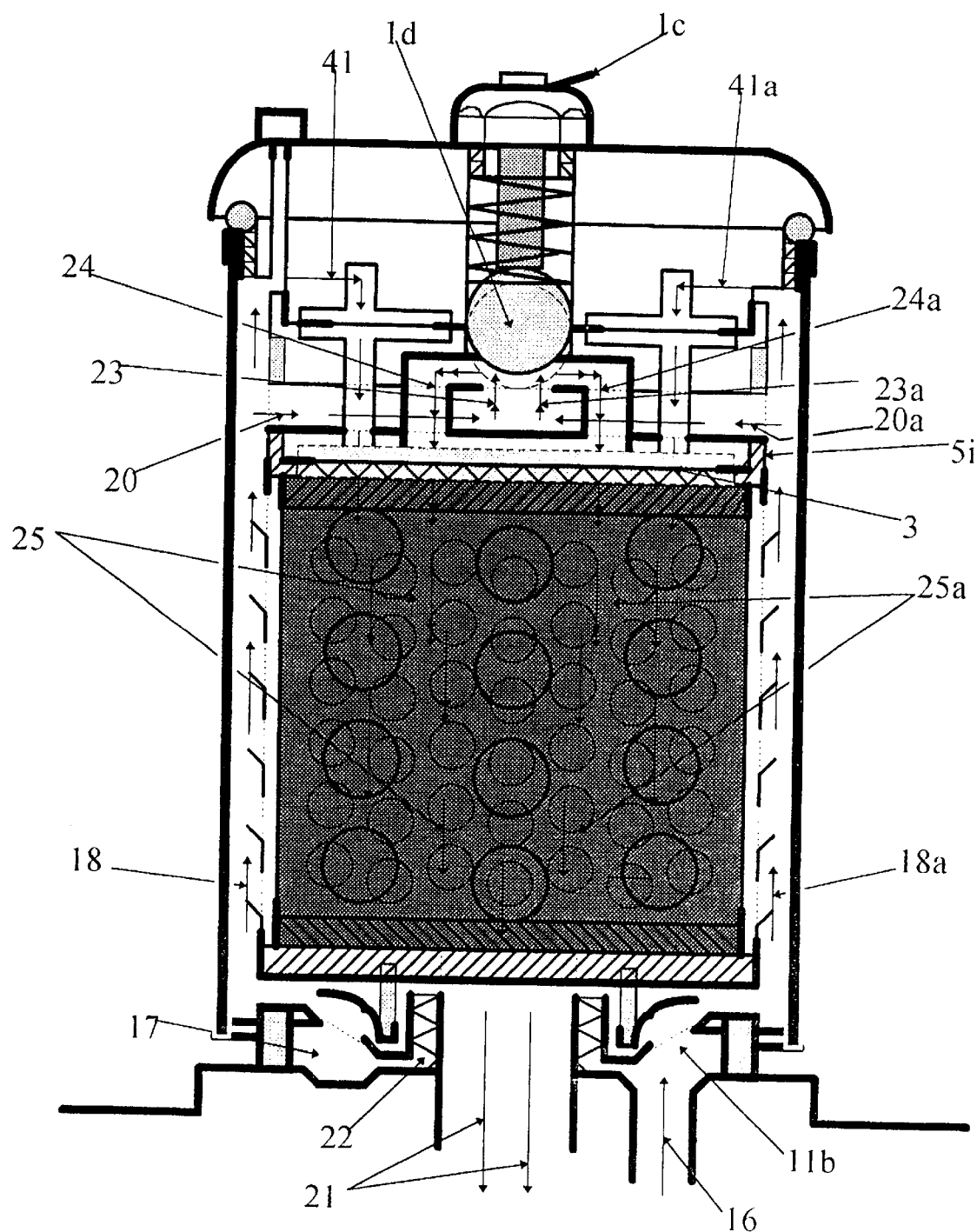
FIG. 34 is a cross-sectional view of the invention comprised with a two piece filter head in its restricted filtering mode comprised with a single stage bypass system and a safety full flow filter.

FIG. 34 illustrates a cross-sectional view of the invention in accordance with FIG. 33 and shows various oil paths in the restricted filtering mode. In this embodiment, the arrangement provides the magnets 2m, single stage bypass system and the safety full flow filter 5i. Oil from engine flows on oil path 16, going around space 17, entering inlet ports 11b, oil paths 18 and 18a which show oil moving within the filter canister 11. The oil is moving rapidly in this mode flowing forward, passing by the guide 8 without disturbing the contaminated cylindrical full flow medium 7 referred to in FIG. 8 and flowing on to paths 20 and 20a. Oil entering the full flow tunnel 15 on paths 23 and 23a illustrates that oil forces open the safety valve 1d and advancing on path 24 and 24a within the two safety valve tunnels referred to in FIGS. 15 and 23. The oil continues to flow rapidly toward the safety full flow filter 5h and is filtered by a course first circular sheet filter medium 3 referred to (FIGS. 21 and 23). Simultaneously, oil flows through open-flow tunnel 15 and around the magnets 2m. The flow on paths 41 and 41a shows oil entering the bypass filtering chamber via the orifice ducts 28a and 28b referred to in FIG. 31 and being filtered by the finer second circular sheet medium 32. The small oil stream then flows into the bypass exit tunnels approaching the safety full flow filter 5i thereto, penetrates the course first circular sheet medium 3 and merges with the filtered main oil flow shown on oil paths 25 and 25a within the core space of the cylindrical medium support member 6. Gathering momentum the oil then flows back into the engine on oil path 21. If the cylindrical main full flow filtering medium is fouled the safety valve 1d is lifted to contact the sensor pin 1b thereby activating the indicator light via 1c to alert that the safety valve is functioning and the main oil flow is restricted. The magnets 2m continue to trap iron and steel particles that flow near the field.

FIG. 34 illustrates a cross-sectional view of the invention in relation to FIG. 31 which comprises a single stage bypass system within the same two piece filter head, therebetween. By inserting the second circular bushing disk 42 which is connected with the top portion of lower filter body 27 ensuring the circular medium underlay 33 and second circular sheet medium 32 remains in place on top of the lower filtering member 27. Another second circular medium underlay 44 and another second circular sheet medium 43 are then placed on the top surface of the second circular bushing disk 42. The above assembly when connected with upper filter body 26, results in the conversion of a single stage bypass into a dual stage bypass system within the same two piece filter head.

Figure 35:
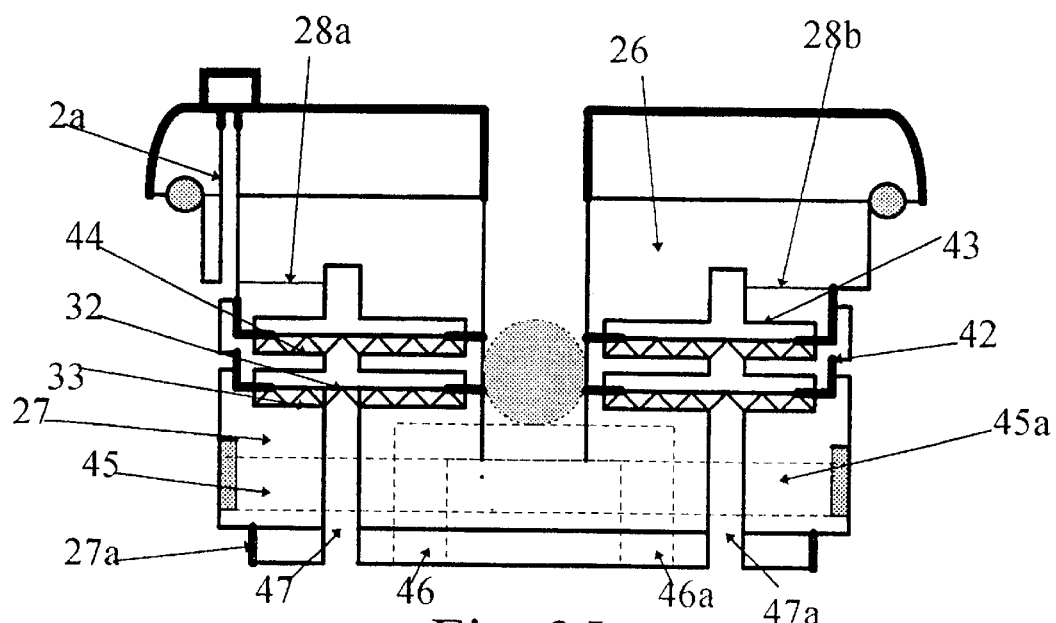
FIG. 35 is a cross-sectional view of the invention of the same two piece filter head referred to in FIG. 34 comprises with a multiple stage bypass system.

FIG. 35 illustrates the coordinate positions of the oil orifice ducts 25 and 28a, drain conduit 2h, with dashed lines showing open flow exit tunnel 47 and 17a, as well as safety flow tunnel exits 48 and 48a, dual bypass tunnel exits 49 and 19a, and threads on the outer surface of the rim 27a.

As a further example of the versatility of the invention by enlarging the oil duct 28a and 28b into full flow oil tunnels and replacing them with circular sheet filtering media, the system may be converted into a single stage or a dual stage full flow system as broadly shown in FIG. 50 discussed in greater detail hereinafter.

Figure 36:
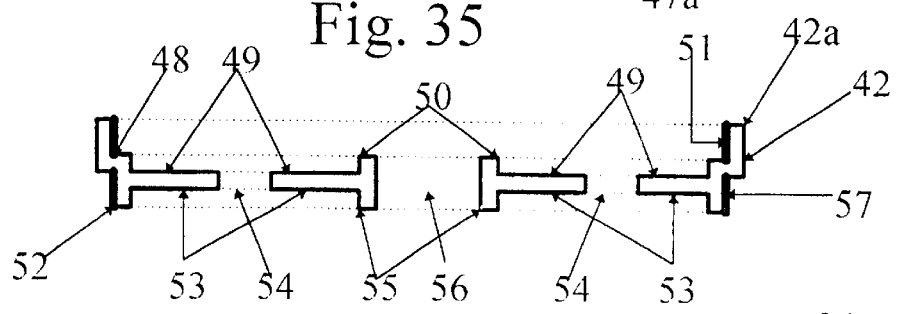
FIG. 36 is a cross-sectional view of the second circular bushing disk for multiple stage bypass system.

FIG. 36 illustrates a cross-sectional view of the second circular bushing disk 42, which has a circular projected rim 42a. The adjacent thread 51 is on the inner rim area of the member 41a. A radially extended raised ledge 48 is adjacent to and beneath the thread 51 and encompasses circular recess surface 49. Surface 49 has a central axis aperture with a raised circular lip shown as projected member 50. A second circular medium underlay member 33 is then placed beneath a second circular sheet medium 32 against the recess surface 49 referred to in FIG. 35. When upper filter body 26 is assembled together with the second circular bushing disk 42, the result of the threading action is that two circular pressure areas are created on the upper side of the second circular bushing disk 42, which is the circular ledge 48 and centre circular projected member 50. The second outer U-ring sealing gasket 31a rests on ledge 48 and the second central U-ring gasket 32c rests on the central projected member 50, reference to FIG. 35. Openings 54 are passages for filtered oil. The bottom portion of the second circular bushing disk 42 is made to receive the lower filter body 27. The second circular bushing disk 42 has on its outer circumference 57, a 90° indent, which is threaded to receive the lower filter body 27. Surface 53 which is the bottom recess forming an outer projected rim-member 55 encompasses a radially, inwardly extending recess 53 which becomes the upper chamber of the second stage filter. Recess 53 having the central axis with circular raised rim, shown as projected member 55 bordering safety valve chamber 2k, referred to in FIG. 35. There are two circular pressure areas on this lower part of the circular bushing disk 42, the projected rim 52 for pressing the (2nd) outer U-ring sealing gasket 32a and the centre circular projected member 55 for pressing the (2nd) centre U-ring sealing gasket 32c.

Figure 37:
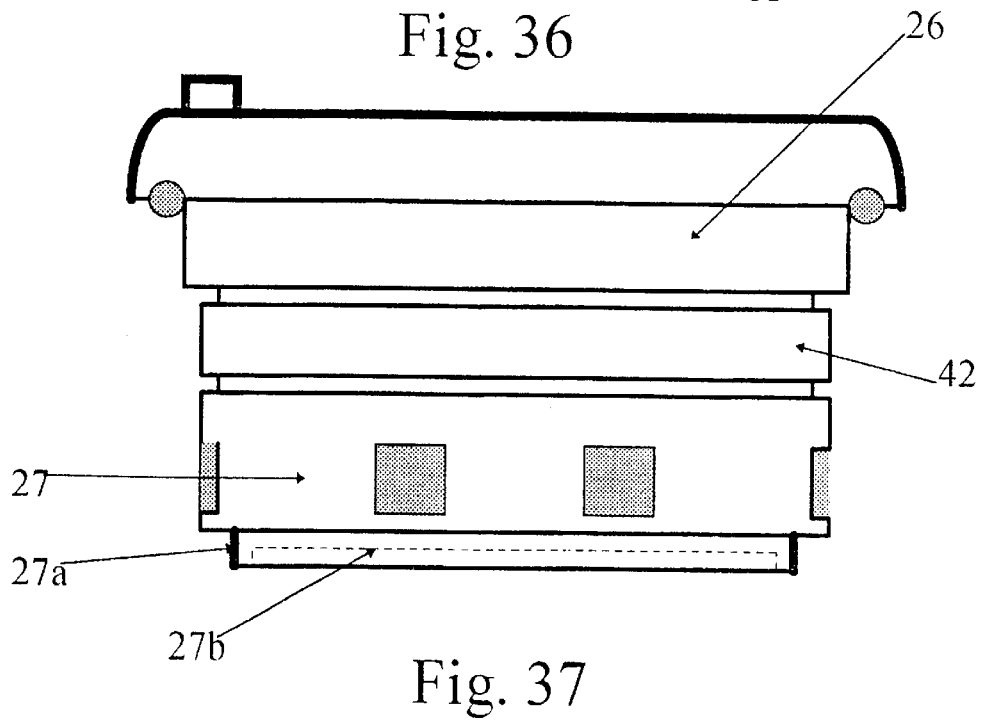
FIG. 37 is a full side view of the filter head enclosed with a multiple stage bypass system.

FIG. 37 illustrates a side view of an enclosed filter head in accordance with FIG. 36 depicting of a dual bypass system. This alternate form of the invention is complete when the upper filter body 26 and the lower filter body 27 are sandwiched together with the second circular bushing disk 42 referred to in FIG. 36. The bottom portion of the lower filter body 27 having a threaded outer circular surface 27a forms a projected rim which forms a recess. The recess 27b becomes the upper chamber of the safety full flow filter 5i when adapted to the first circular bushing disk 5, referred to in FIG. 18.

Figure 38:
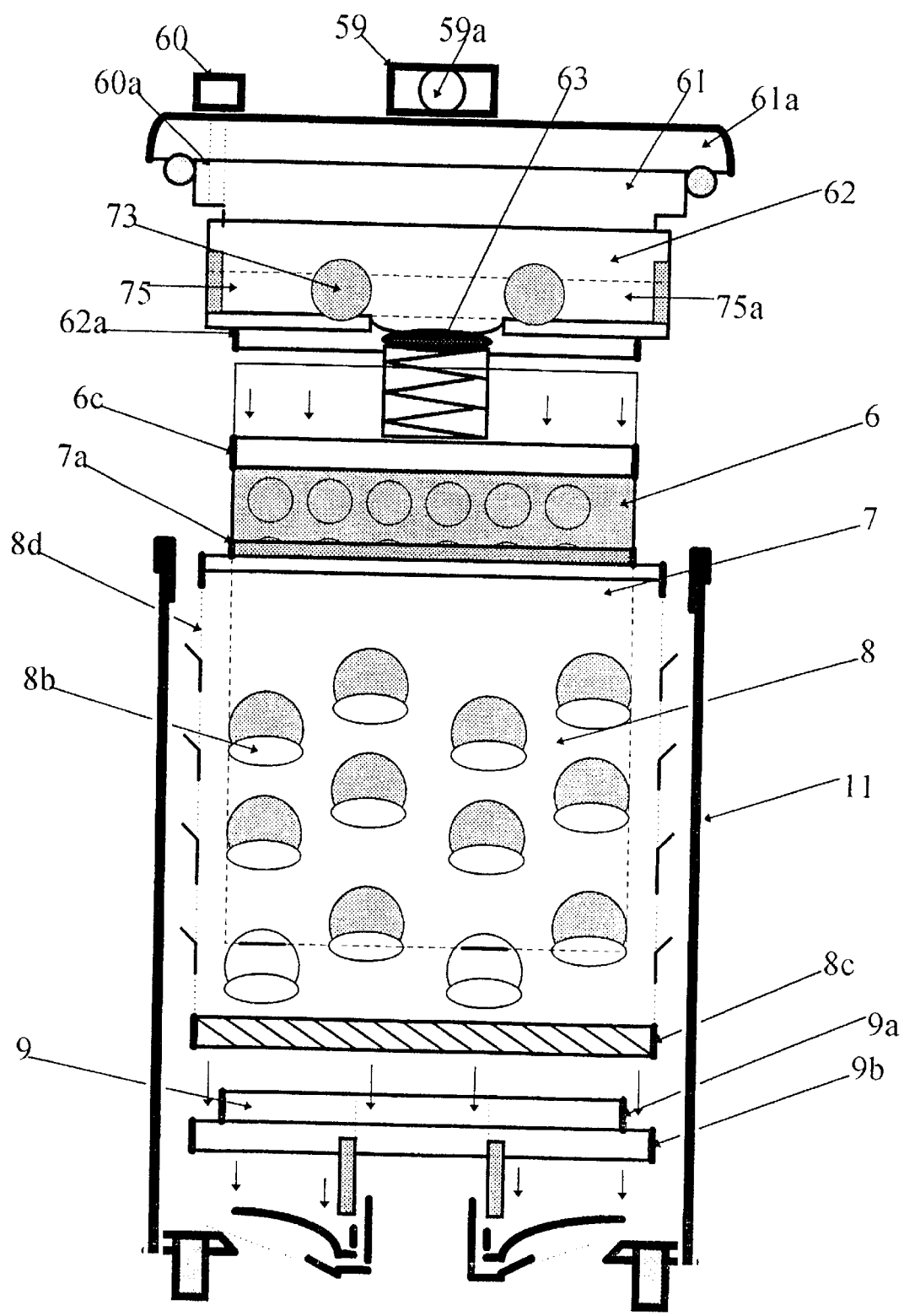
FIG. 38 is a cross-sectional view of a transformed two piece filter head comprised with an alternate type of safety valve and the components to be installed in sequence.

FIG. 38 illustrates another transformation and alternate configuration of the invention having a two piece filter head. The embodiment shown resembles the configurations in FIGS. 32 and 33. The centre nut 59 on the top of the upper filter body 61 has a four-way hole 59a interconnected for easy removal from the filter canister by inserting a metal rod and turning to loosen the nut. A screwdriver or other instrument may be used to loosen the nut. Adjacent to the edge of the cap 61a is a drain nut 60. When drain nut 60 is screwed to drain conduit 60a it closes the drain. Lower filter body 62 of the filter bead has magnets 73 imbedded in the surrounding surface. The alternate safety valve 62 installed at the bottom centre is centrally connected to the open flow tunnel 75.

This alternate design provides a flatter filter head for situations where installation space is limited. FIG. 38 also exhibits more clearly the sequence of assembling the invention made up of cylindrical medium support 6, cylindrical full flow medium 7, cylindrical flow guide 8, retaining base member 9 and the open end filter canister 11. In particular, FIG. 38 illustrates the relationship between the cylindrical medium support 6, the cylindrical full flow medium 7 and the cylindrical flow guide 8.

FIG. 39 depicts the cross-sectional view of the invention according to FIG. 38 and exhibits more clearly the alternate configuration of the shorter two piece filter head of the invention also related to in FIG. 31 and 38. The two piece filter head, consisting of an upper filter body 61 and a lower filter body 62, contains a single stage bypass system. The filter head equipped without the cylindrical safety valve chamber 2a is referred to in FIG. 24 and 3. In this alternate configuration, an alternate safety valve 63 is implemented and is located at a different position. The circular sheet medium 69 resembles sheet medium 3 in FIG. 21 and the circular medium underlay member 70 requires no centre opening as shown in FIG. 40 and FIG. 41. The drain nut 60 is threaded in place shutting the drain conduit 60a. The O-ring 64 is fitted into a groove and is positioned adjacent to and above the threaded circular surface 65. The other outer threaded circular surface 66 of the upper filter body 61 is designed to receive the inner threaded rim 71 of the lower filter body 62. The circular ledge 71a is made so the outer U-ring seal gasket 69a of medium 69 can rest on it. During the threading action, pressure is applied equally on circular projection 66a and the circular ledge 71a creating intimate contact on the filtering medium perimeter seal 69a. The filtering medium being secured by the above action beneath the circular underlay member 70 and are both sandwiched between the upper body 61 and lower body 62. Orifices 67 and 67a lead to chambers 68 and 68a of the upper filter head. Two openings 72 and 7a having both extremities through the bottom of lower body 61 are the two bypass tunnels. Magnets 73 are installed on the circular surface of lower part 62. The thread 62a on the outer surface of the bottom rim of lower part 62 is for connecting the cylindrical full flow element 7 in FIG. 38 or with the safety full flow filter 5i in FIG. 18.

FIG. 40 depicts the top view of the circular sheet medium 69 which can be used as the medium for the single stage and the dual stage bypass systems for the filter head shown in FIG. 39 without the centre safety valve chamber 2k. The circular sheet medium 69 is the same as the circular medium 3 referred to in FIG. 4 and can also be used as the filtering medium for the safety full flow medium 3 in FIG. 21 provided appropriate porosity is used. The circular U-ring seal gasket 69a is the same cis the 3a shown in FIG. 21.

FIG. 41 exhibits the top view of the circular medium underlay member 70 of the circular sheet medium 69 which also can be used in the single stage and the dual stage bypass system as well as in the safety full flow filter 5i referred to in FIG. 5.

FIG. 42 illustrates a side view of the two piece filter head with upper filter body 62 and lower filter body 62, forming the single stage bypass system of the invention, having magnets 73 on the circumferential surface of lower filter body 62. The dashed line shows the positions of the open flow tunnel exits 75 and 75a.

Figure 43:
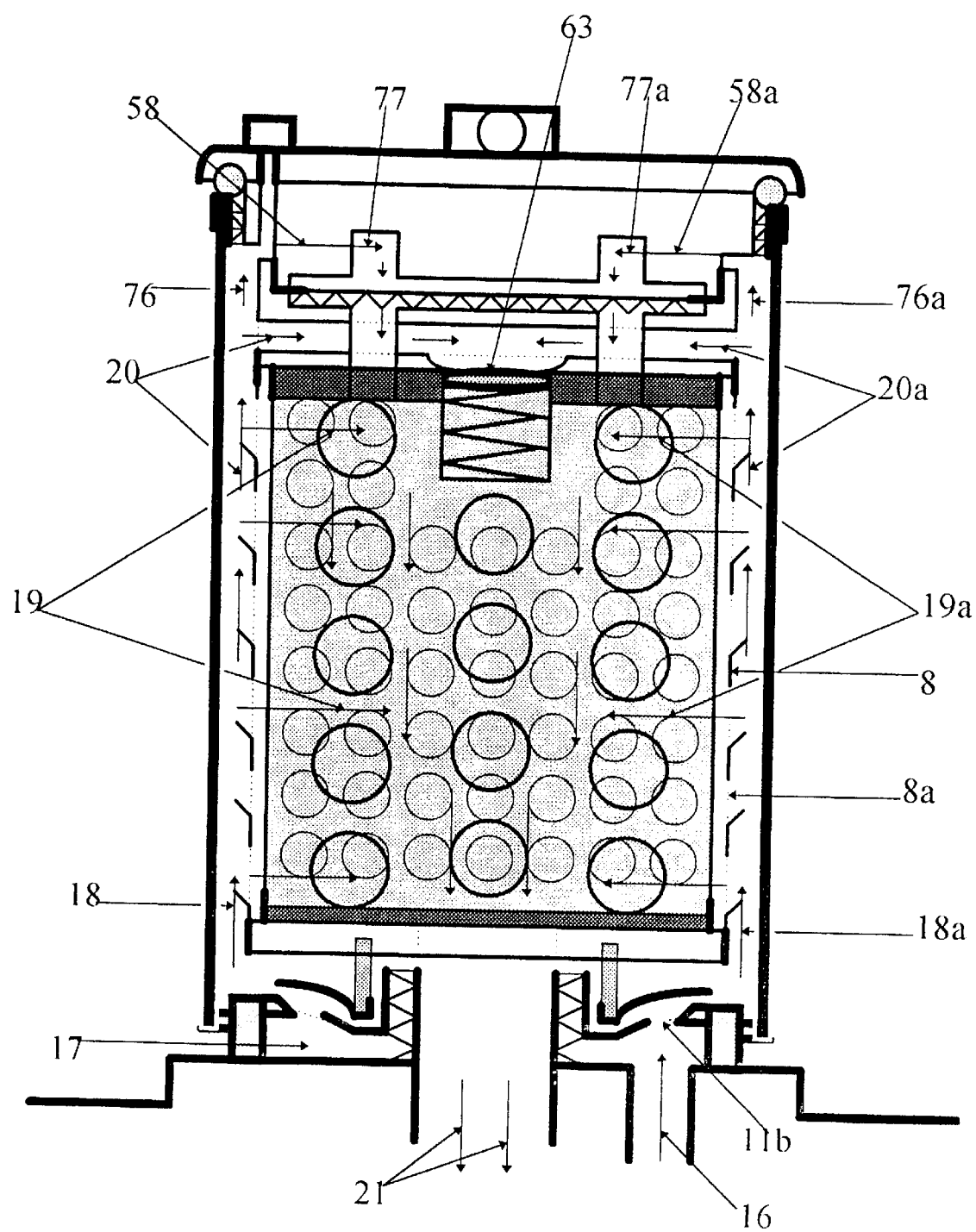
FIG. 43 is a cross-sectional view of the invention is in the normal full flow and single stage bypass filtering mode in a transformed, alternate construction, equipped with an alternate safety valve, a shorter two piece filter head and without the safety full flow filter.

FIG. 43 illustrates the assembled alternate construction of the invention in the normal filtering mode. The embodiment also contains the alternate safety valve 63 and a single stage bypass system within the filter bead. Oil flows out from the engine on the oil path denoted by arrow 16 flowing in space 17, enters inlet ports 11b, flows rapidly on the path denoted by arrows 18 and 18a. The oil then flows in apertures 19 and 19a into the main full flow element from around the flow guide 8 via all perforated holes 8a. Some oil flows freely on paths 20 and 20a in and out of the open flow tunnels 75 and 75a. At this stage the safety valve 63 remains in a closed mode. Small amounts of oil travel further on path 76 and 76a and are forced into orifices 58 and 58a shown on path 77 and 77a. The oil permeates through the bypass medium down to the bypass tunnels and into the core space within the cylindrical full flow medium. This oil merges with the main filtered oil flow gathering momentum while flowing back into the engine on path 21 (not shown).

Figure 44:
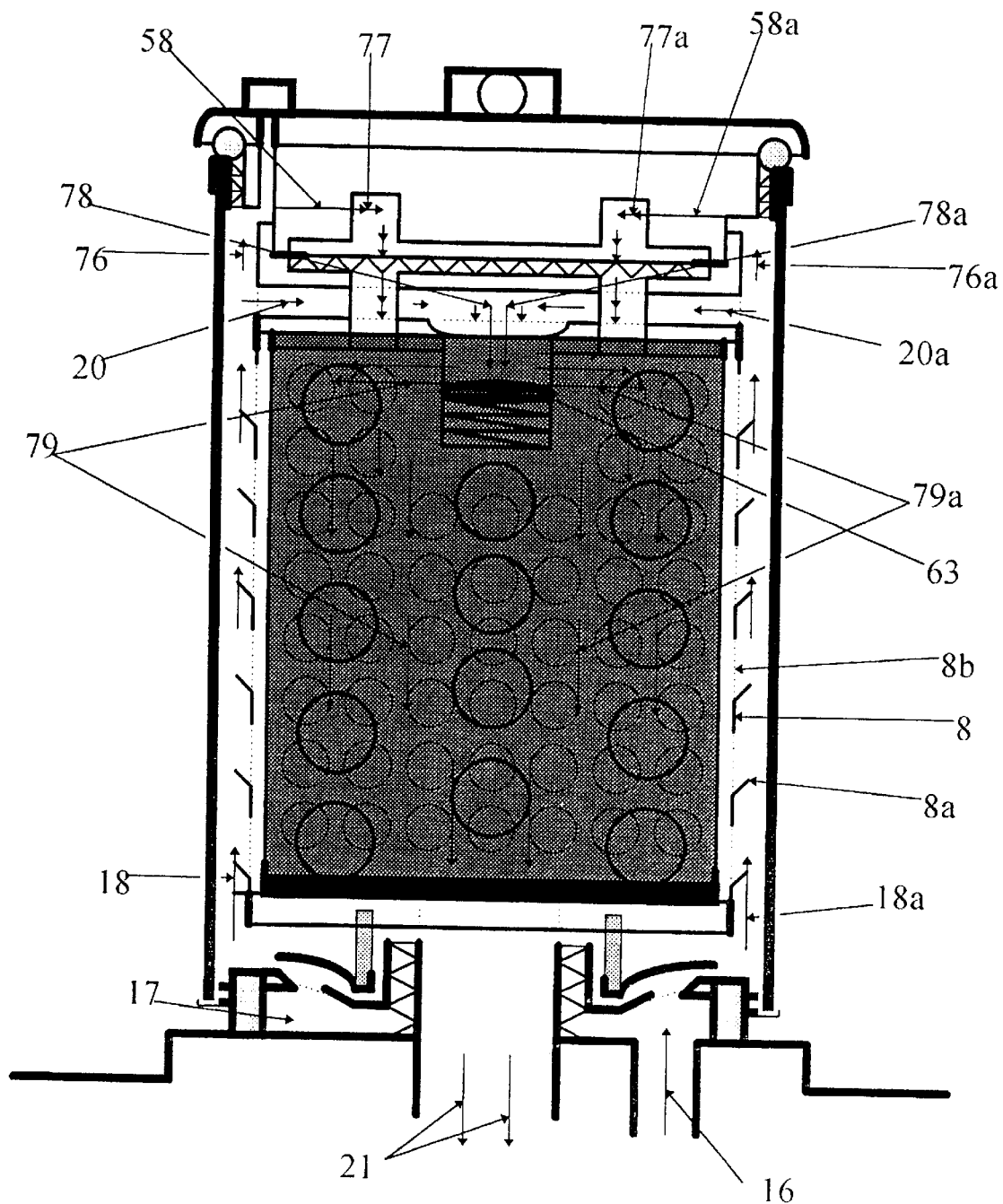
FIG. 44 is a cross-sectional view of the shorter two-piece filter head of the invention is in the restricted full flow and the single stage bypass filtering mode in an alternate construction, equipped with an alternate safety valve, and without the safety full flow filter.

FIG. 44 exhibits the functioning invention in the restricted filtering mode. The embodiment comprises a single stage bypass system within the filter head. Oil flowing out of the engine on the oil path denoted by arrow 16 goes around space 17 entering inlet ports and moving rapidly forward on the paths denoted by arrows 18 and 18a, passing through the flow guide 8 without disturbing the fouled medium which lies behind the baffled oil flow. Oil paths denoted by arrows 20 and 20a show the oil flowing towards the open flow tunnel on path 79 and 79a to open the safety valve 63 which allows the main flow of oil to disperse into the core space of the cylindrical medium support member. Some of the oil travelling on flow paths 76 and 76a is forced into orifices 58 and 58a shown on paths 70 and 70a entering the upper bypass chamber thereupon permeating through the bypass medium down the bypass tunnels into the core space within the cylindrical element support. The oil flow proceeds and merges with the main unfiltered oil flow gathering momentum and returning to the engine on path 21. At this stage the bypass filter may be clogged by particles and may not function at a desirable capacity.

Figure 45:
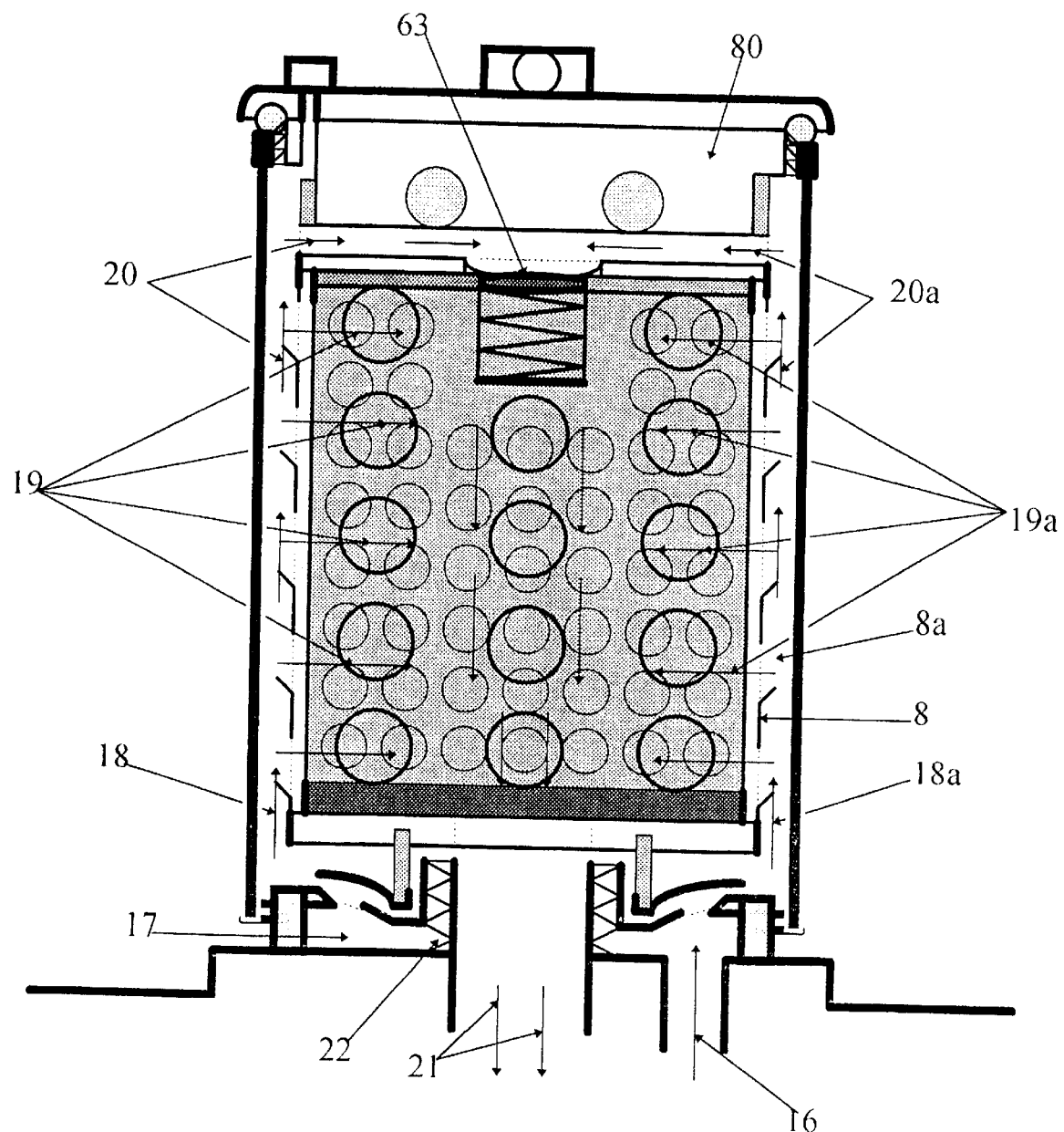
FIG. 45 is a cross-sectional view of the shorter one-piece filter head of the invention functioning in its normal full flow mode without the bypass system and without the safety full flow filter.

FIG. 45 is a schematic version of the invention which shows the filter head 80 with no bypass system and no safety full flow filter. This schematic shows an alternate assembly of the invention in a normal filtering mode. Oil from the engine block (not shown) flowing on path 16 spreads around the concave recess space 17 and is forced through inlet ports. The oil flow then forcibly opens the circular flap into the filter canister. Oil flows rapidly upward on the paths denoted by arrows 18 and 18a entering the flow guide 8. The oil flowing on paths 19 and 19a shows oil penetrating the main full flow element. The filtered main oil flow picks up momentum and returns to the engine on path 21. Oil paths 20 and 20a show oil travelling freely within the open flow tunnel flowing around the imbedded magnets 73, all the while the safety valve 63 remains in the closed position.

Figure 46:
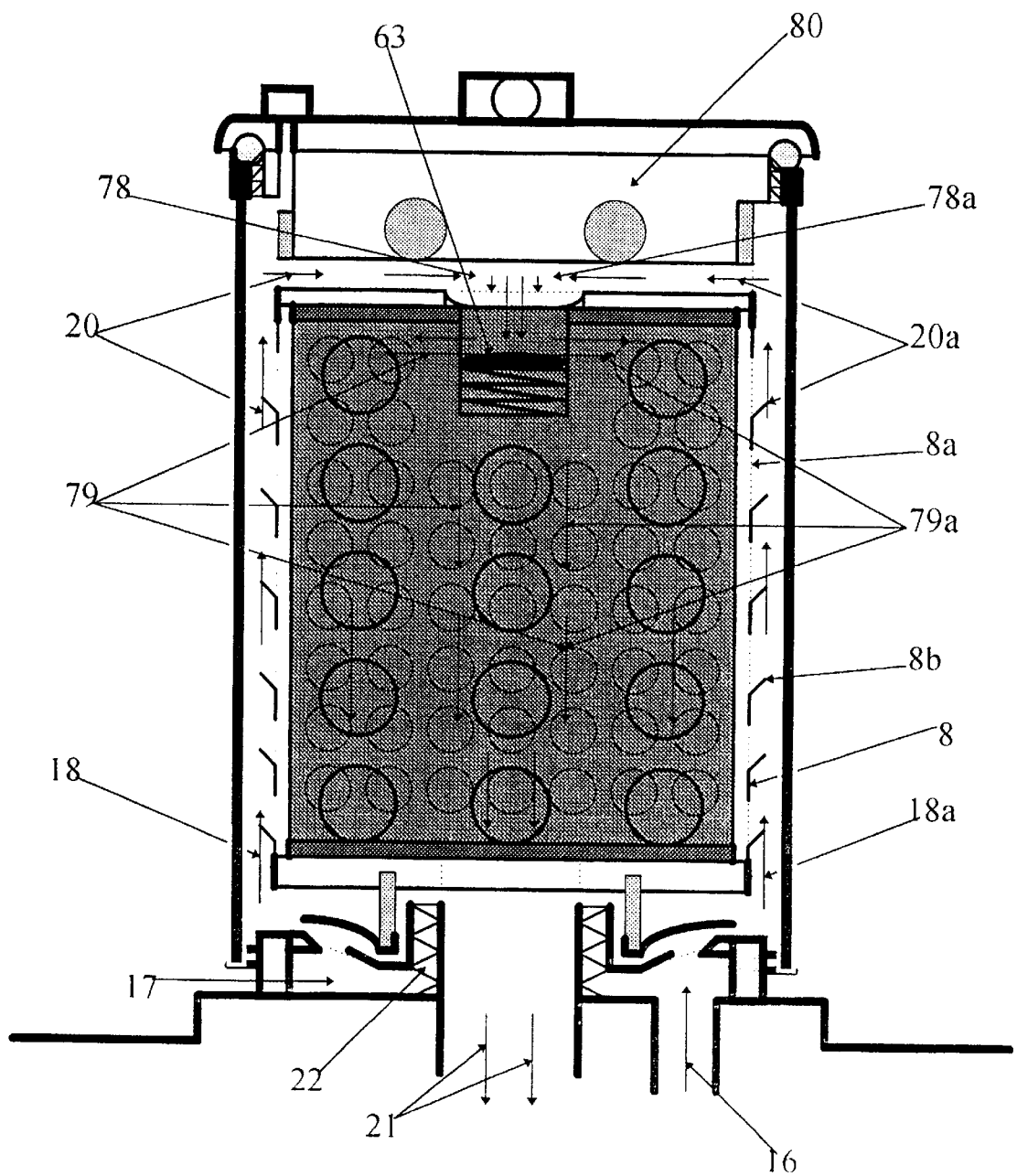
FIG. 46 is a cross-sectional view of the shorter one-piece filter head of the invention function in its restricted full flow mode without the bypass system and without the safety full flow filter.

FIG. 46 is a same assembly to FIG. 45 depicting the filter head 80. The filter head has no bypass system, nor does it have a safety full flow filter. This alternate assembly of the invention is restricted filtering mode. Oil forced out from the engine (not shown) flows oh the oil path denoted by arrow 16 flowing around space 17, entering the inlet ports and forcing open the circular flap. The oil flowing into the filter casing moves rapidly forward on the paths represented by arrows 18 and 18a, passing by the flow guide 8 without disturbing the fouled cylindrical full flow medium 78 behind it because of the baffled ports and the protective body of the flow guide 8. Oil paths 20 and 20a show the oil flowing in the open flow tunnel and proceeding on oil flow paths 79 and 79a, the oil flow pushes open the safety valve 63 and allows the main flow of oil from the oil body to disperse into the core space of the cylindrical full flow medium as shown on the oil path shown by arrows 79 and 79a. The oil flow in growing filtered volume flows back to the engine (not shown) on the path represented by arrow 21.

Figure 47:
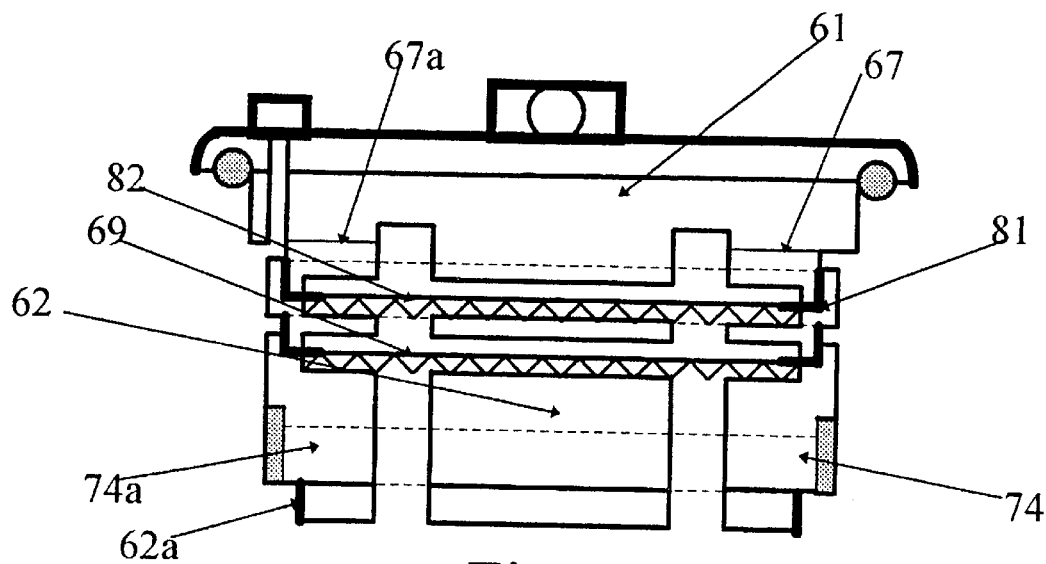
FIG. 47 is a cross-sectional view of an alternate configuration of the invention, the same two-piece shorter filter head shown in FIG. 44 can be easily converted into a dual stage bypass system by incorporating a first circular bushing disk between the two piece shorter filter head.

FIG. 47 depicts another alternate configuration of the invention which comprises a dual bypass system. With accompanying reference to FIG. 39, the same filter head of the upper filter body 61 and the lower filter body 62 is used to show additional filtering capacity. A dual bypass system can be demonstrated by separating the upper and lower filter body of the filter head and ensuring the first circular sheet medium 69 and the first circular medium underlay 70 remain in position on top of lower filter body 62. The dual bypass system is then created by simply adding the first circular bushing disk 5 (FIG. 6,) which is housed with a second circular sheet filtering medium 82 and a second circular medium underlay member 83. The above assembly, when threaded together with the lower filter body 62, forms the lower part of the first stage of the dual bypass filter assembly.

The second stage of the dual bypass filter assembly is made by adding upper filter body 61 in a stacked configuration. When the upper filter body 61 is stacked and threaded in place above the first circular bushing disk 5 which contains the second circular filtering medium 82 and the second circular medium underlay member 83, a multiple sandwiched filtering assembly is formed, which is the dual bypass system of the invention. The dashed line shows the position of the open flow channel exits 74 and 74a, and 62a is the threaded outer circumference to receive the cylindrical medium supporting member 6.

FIG. 48 depicts a cross-sectional view of the circular bushing disk member 81 which is the same first circular bushing disk 5 that was shown in FIGS. 6 and 47. The inner threaded rim surface 81a is adjacent to a raised circular ledge 81d whereon rests the U-ring 81 and medium 82. Ledge 18d encompasses upper recessed circular surface 81c having perforations 81b that provide openings for the passage of filtered oil. The recessed circular surface 81c when attached to an upper filter head body becomes a lower filtering chamber. The lower outer threaded rim surface 81e is designed to connect with the lower filter body referred to in FIG. 47. The projected circular member 81f forms a circular rim to hold down the U-ring of a second filtering medium when used in a dual bypass system. The bottom recessed surface 18g when attached to a lower filter body becomes the upper filter chamber referred to in FIG. 47. The circular bushing disk member 81 also can be used as the safety full flow filter 5i referred to in FIGS. 6 and 18.

Figure 49:
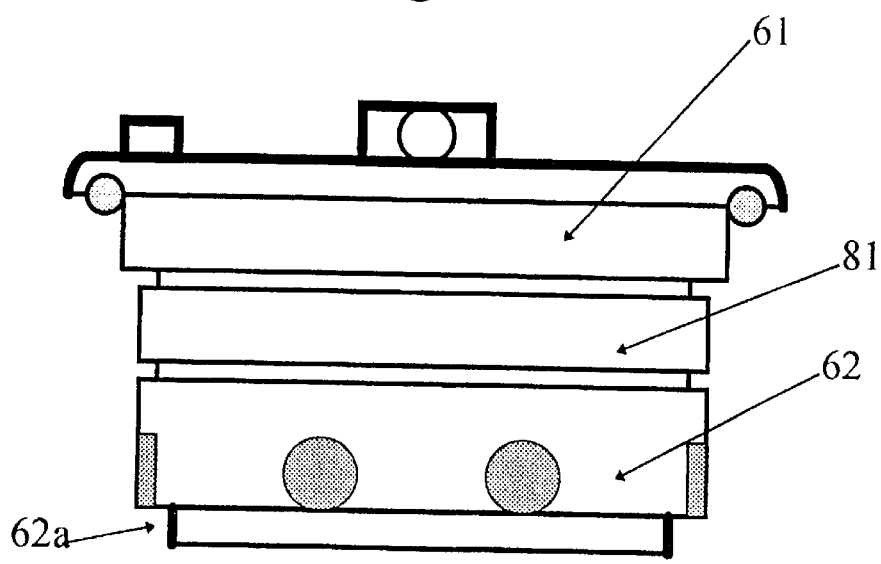
FIG. 49 is a side view of the two piece shorter filter head of the invention enclosed with the dual stage bypass system.

FIG. 49 illustrates a side view of the alternate filter head with upper filter body 61 and lower filter body 62 enclosed with a dual bypass system facilitated by adaptable circular bushing disk member 81. The outward threaded rim surface 62a is for adapting a safety full flow filter 5i or with the cylindrical full flow medium 7.

Figure 50:
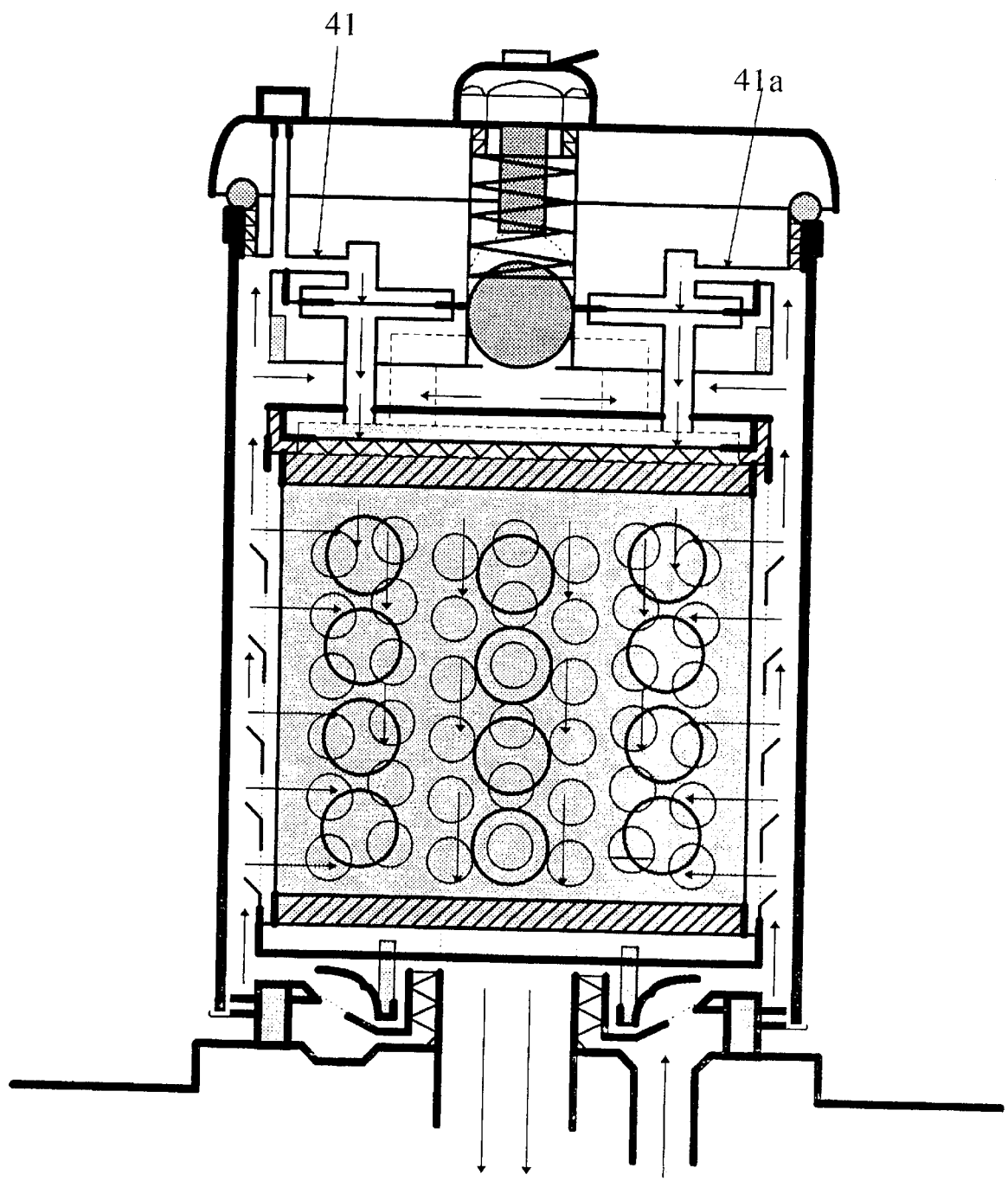
FIG. 50 is a cross-sectional view of the invention having the orifice ducts 41 and 41a enlarged and is easily transformed from a bypass system to an additional full flow filter system of the invention.

FIG. 50 illustrates the upper filter body referring to the same upper filter body in FIG. 33 with the tiny orifice ducts enlarged and the finer circular medium replaced with a courser circular sheet medium.

Figure 51:
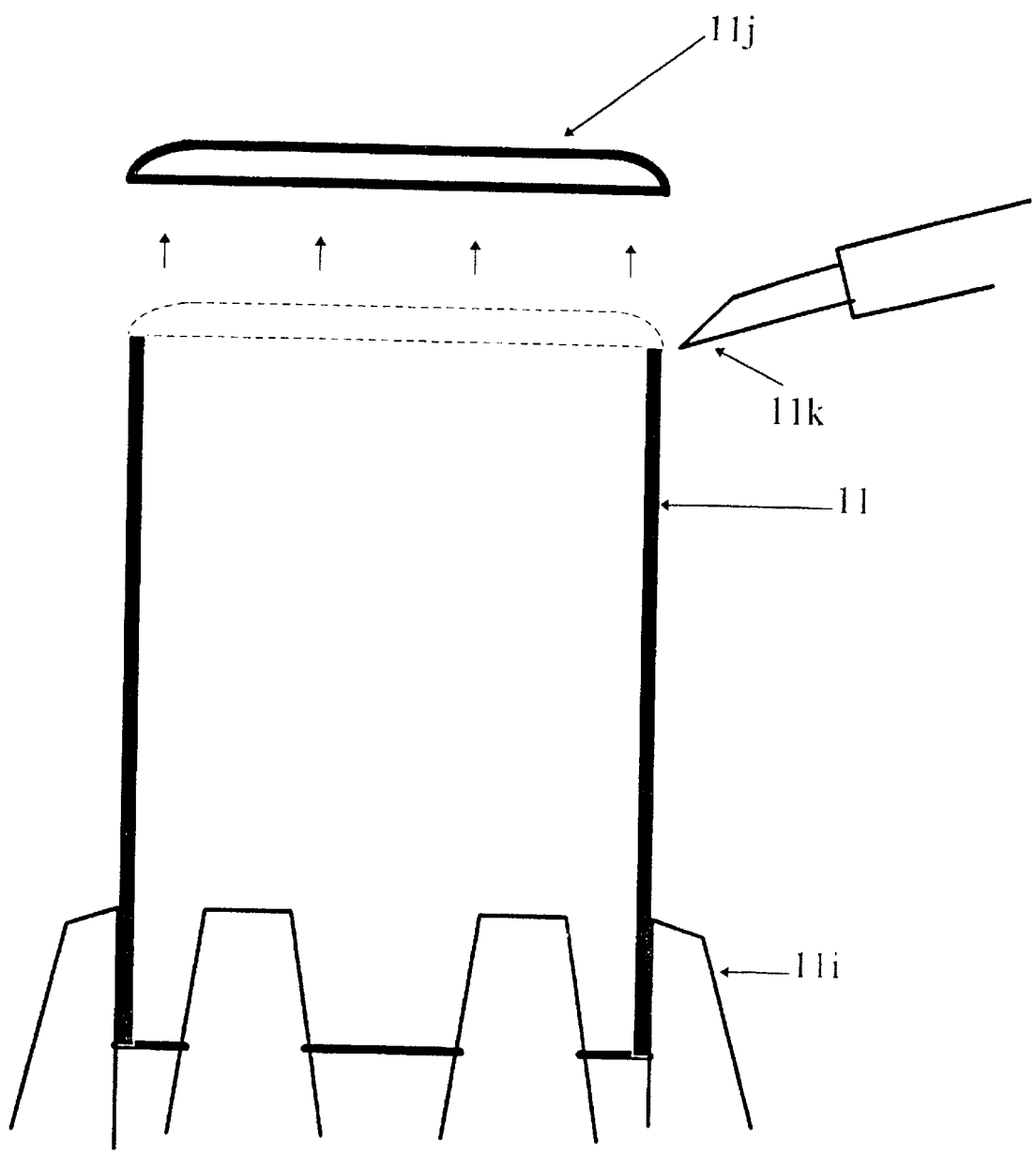
FIG. 51 is a cross-sectional view of a conventional filter canister is placed within a lathe ready to be machined off the top.

FIG. 51 depicts additional components of the invention. Part of the invention when utilizing conventional or existing filter canisters that are on the market and adapting them to receive the internal filtering media of the invention creates a reusable filtering canister. When a typical oil filter is removed from an internal combustion engine in the conventional way, the filter is then placed on a metal lathe adapted to receive the used filter canister 11. By rotating the filter canister 11 and pressing against its side with a fixed cutting tool ilk, the top of the typical filter body 11j is cut off at a predetermined point. The contaminated internal paper filtering material and other materials are removed from the filter canister 11. The filter canister 11 is then cleaned.

Figure 52:
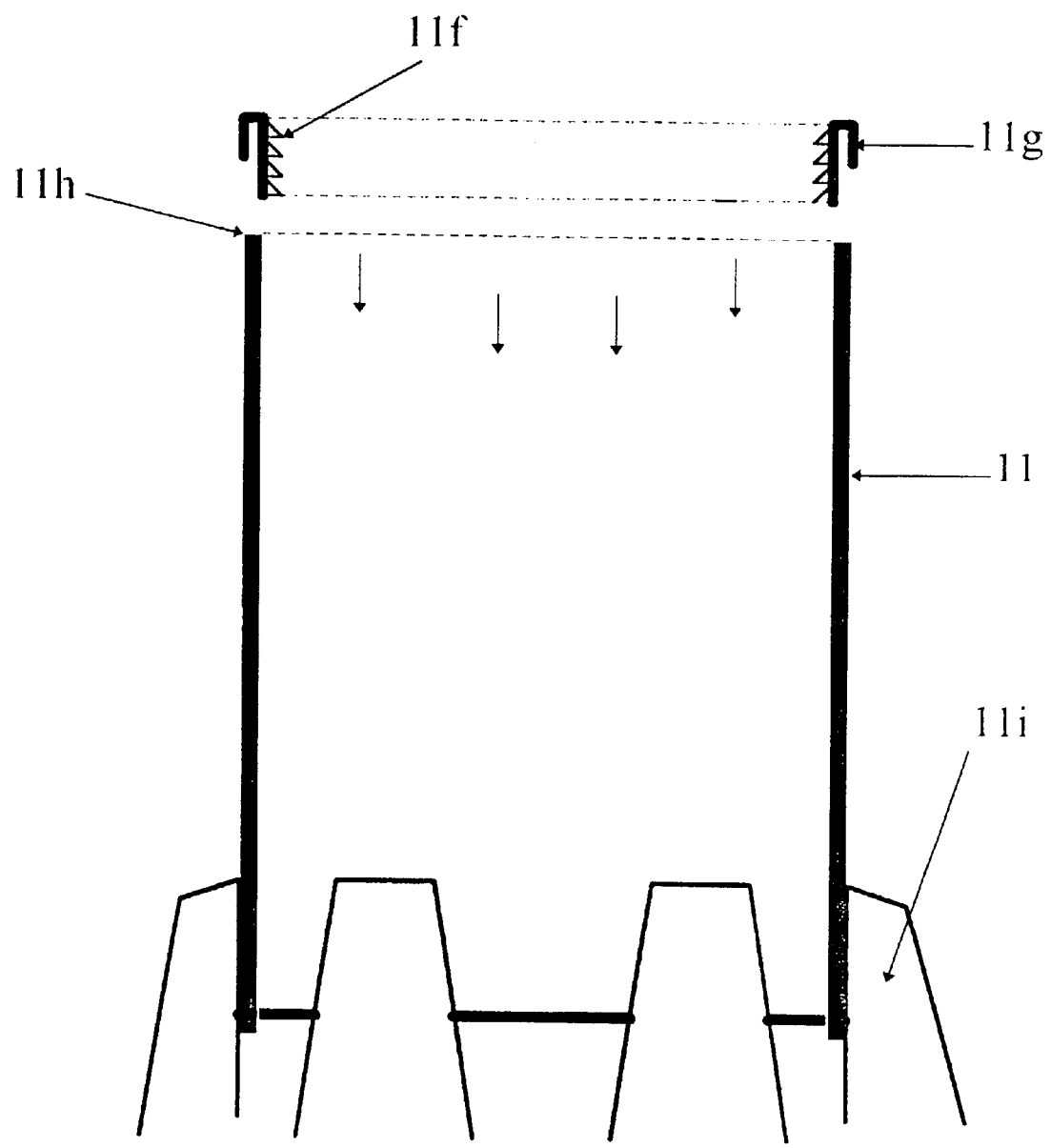
FIG. 52 is a cross-sectional view of the conventional canister which is ready to receive the metal U-ring and to be mounted on top and around the rim.

FIG. 52 depicts the cleaned-open-ended filter canister 11. This reclaimed filter canister 11 is now ready to receive a metal O-ring 11g which is cross-sectionally shaped in a "U" fashion. The U-ring is fitted to the cleaned filter canister with various conventional fasteners such as, welding or crimping etc. U-ring 11g is mounted inversely and secured radially on the top of the rim and the internal radial surface 11g is threaded by an appropriate instrument. The U-ring 11g fits tightly against the rubber O-ring sealing gasket 2g of the filter head when fastened together and is designed to secure an internal filtering apparatus. The refitted filtering canister receives the core of the invention, and the filtering devices and mechanism can be used and reused over and over again. The core part of the invention when assembled in the refurbished canister creates ai complete multiple-system filter which is reusable for the entire life of the internal combustion engine.

Figure 53:
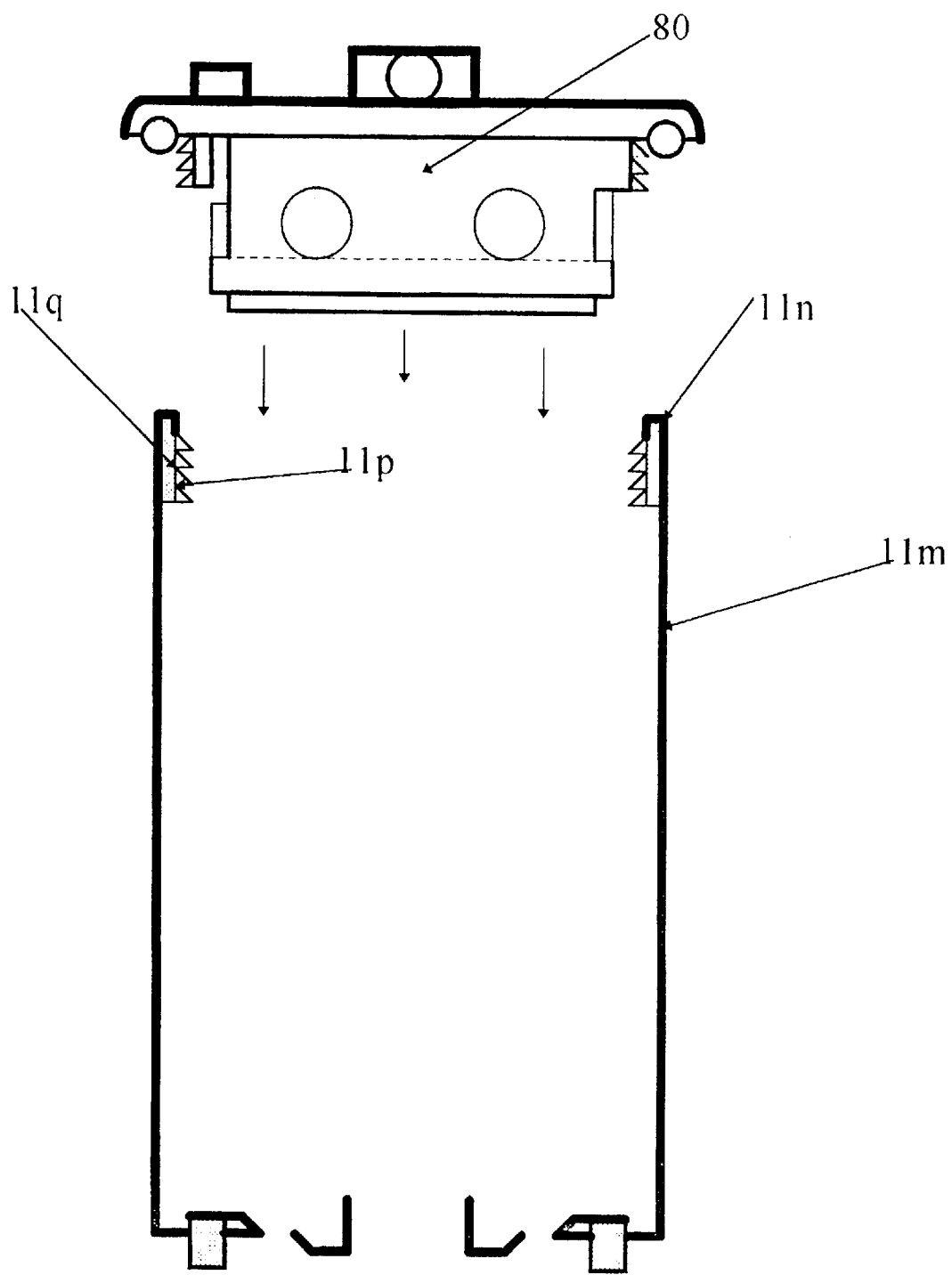
FIG. 53 is a relationship of attachment between the new filter canister and the one piece filter head of the invention.

FIG. 53 illustrates the configuration of a new filter canister 11m comprising an open-end 11n and a metal O-ring 11q which has an inner thread lip, the O-ring is placed within the canister 11m therein before the open-end 11n is curled inwardly forming a radially extending groove thereby the metal ring 11q is fitted in the grove and is secured by crimping means. The one piece filter head 80 related to FIG. 45 shows the relationship of attachment between the filter head 80 and the canister 11m.

Figure 54:
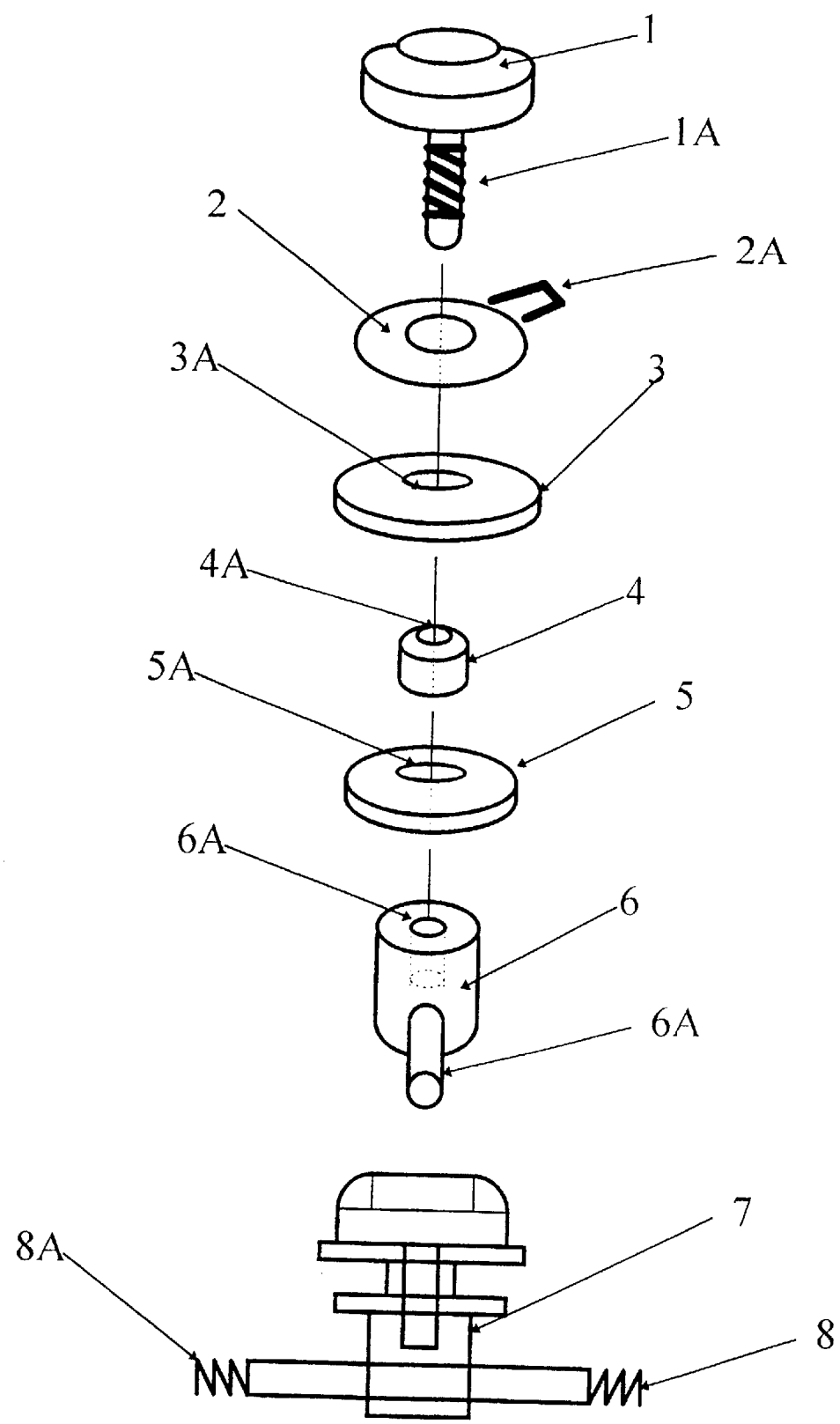
FIG. 54 is an exploded view of the warning device for use with the present invention.

FIG. 54 is an exploded view showing the assembling order of the warning device used in conjunction with the present invention. The device includes a head bolt 1' with a threaded shaft 1a' and has two functions;
  i) to secure the warning light assembly to the filter cap; and
  ii) when it is secured it acts as part of a conductor to activate the warning light.

A metal washer 2' with wiring connector 2a' is provided for ground circuit connection. Numeral 3' represents the head bolt nylon top washer functioning as a sealing washer as well as an insulating washer to isolate the head bolt from contacting the metal filter cap and the metal filter canister and ground for the electrical current which activates the warning light. Numeral 4' denotes the head bolt nylon insulating nut which seats in the central cavity of the filter cap isolate the head bolt shaft from contacting the metal filter cap. Numeral 5' denotes a head bolt nylon bottom washer with a center hole 5a' which is also a sealing washer and acts as an insulator preventing the grounding of the head bolt which is the conductor of the electrical current that activates the warning light or indicating device. Head bolt receiving nut 6' has a threaded centre cavity 6a' with metal pin 6b' inserted across.

Numeral 7' denotes the assembled warning/securing device which is fastened to the center of the filter head cap. Small tip springs 8' and 8a' are affixed to each end of the pin 6b'. (Numeral 7' is the complete warning/safety assembly, the attached pins are the shafts that when pressure springs and circuit springs with valves are attached drive the piston like circular safety valves in a open position. At both ends of the pin, the small tip springs are affixed which are the circuit activating contact point when oil flow forces the metal valves against the small springs.)

Figure 55:
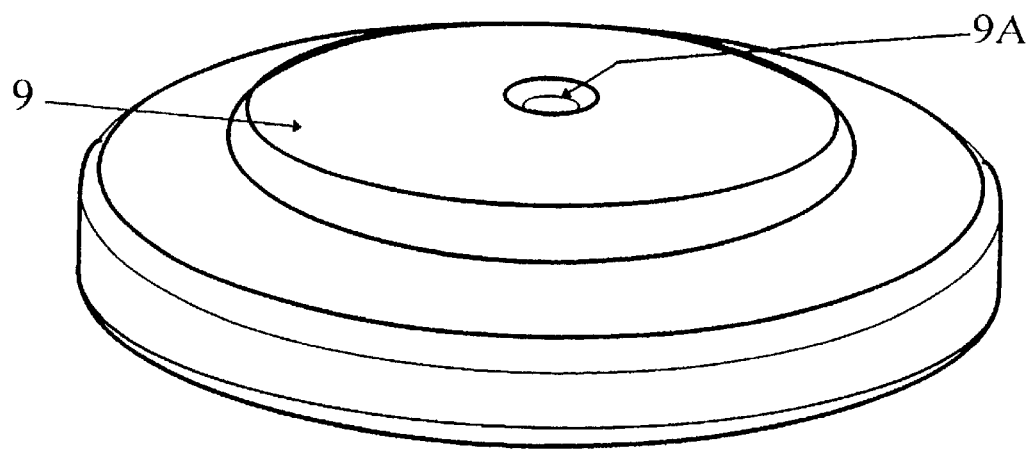
FIG. 55 is a perspective view of the filter cap.

FIG. 55 illustrates the top side view of a filter cap having a center cavity 9' to accommodate the securing device 7' in FIG. 54. Filter cap 9' is the major component which secures all other components of the filtering mechanism to the canister.

Figure 56:
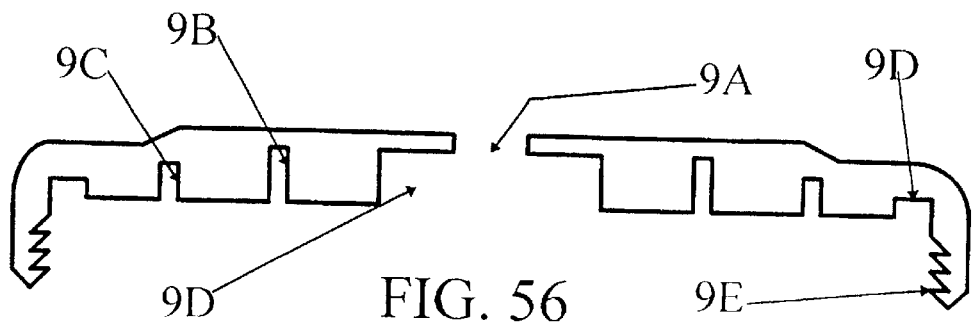
FIG. 56 is a cross-sectional view of FIG. 55.

FIG. 56 is the cross-sectional view of the filter cap 9'. The inside thread 9e' is the fastener for mounting the head to the canister body, adjacent to the threads is an outer annular groove which fits a tubular section which functions as a partition, support member and positioning member. Towards the center, 9b', is a second annular groove that fits a tubular section which also functions as a partition, supporting member and securing device for other components of the filter core. Numeral 9d' is the circular indentation to receive the center safety valve assembly hereinafter described, as well as the warning/safety device 7' in FIG. 54. Numeral 9a' is the center cavity which receives the complete top bolt assembly.

Figure 57:
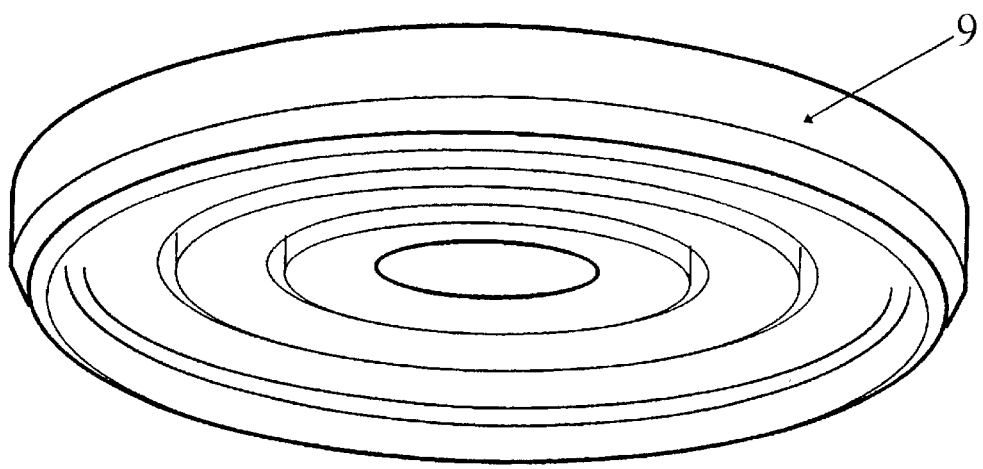
FIG. 57 is a perspective view of the underside of the filter cap.

FIG. 57 illustrates an underside view of the filter cap 9' depicting a clearer view of its configuration.

Figure 58:
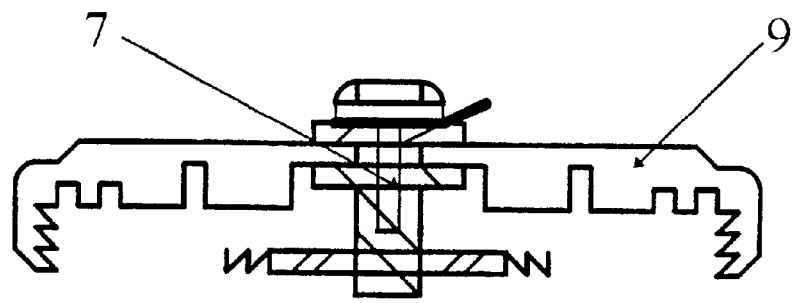
FIG. 58 is a cross-sectional view of the filter cap and warning device in situ.

FIG. 58 illustrates the warning/device 7' and the filter cap 9' which are assembled together.

Figure 59:
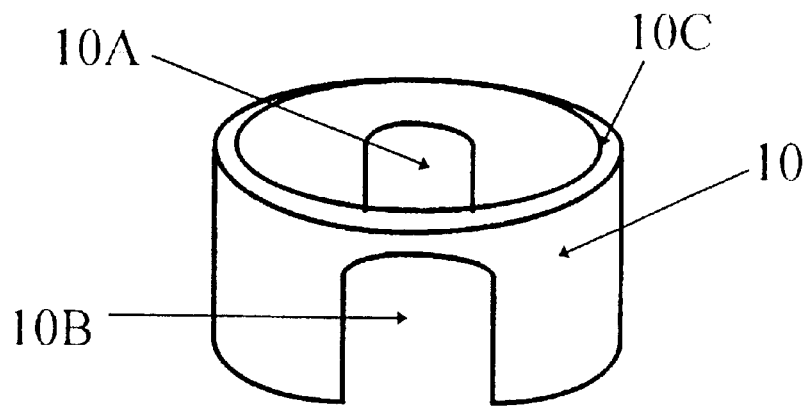
FIG. 59 is a perspective view tubular section of the apparatus.

FIG. 59 illustrates the configuration of a tubular section 10' functioning as a partition and a securing and supporting member having two corresponding arch-like openings 10a' and 10b' for accommodating a small tubular shape like safety valve assembly (not shown). The top side 10c' is inserted into groove 9b', of the filter cap 9'.

Figure 60:
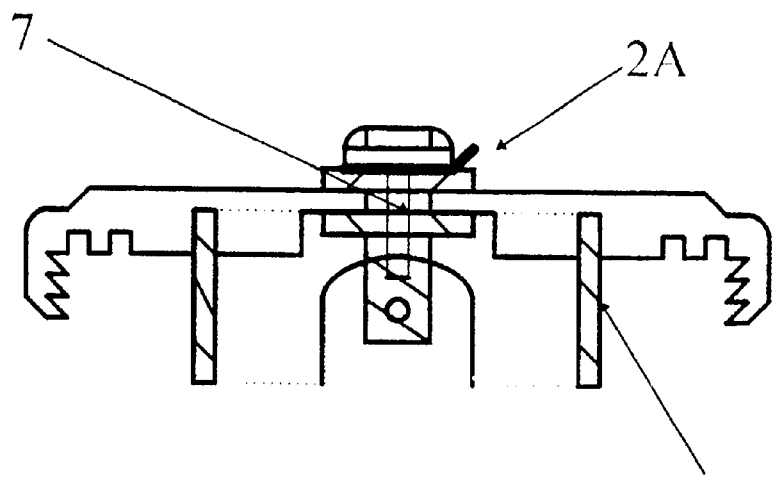
FIG. 60 is a view similar to FIG. 58 with the tubular member in position.

FIG. 60 illustrates the assembled filter cap 9', warning/device 7' at a 90° angle as shown in FIG. 54 and the tubular section 10'.

Figure 61:
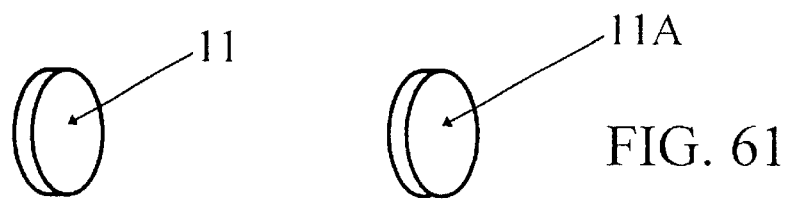
FIG. 61 is a perspective view of the metal valves.

FIG. 61 illustrates two pieces of flat annular light metal valve 11' and 11a' which functions as valves as well as conducting ground circuit to the warning/safety device 7' in FIG. 54 once the valves contact the contacting springs 8' and 8a' in FIG. 54.

Figure 62:
FIG. 62 is a side view of the valve springs.

FIG. 62 illustrates two sets of springs 12' and 12a' forming part of the safety valve assembly. The pressure of the springs is specified to be lower than the bypass valve spring pressure that is built into the engine block (not shown).

Figure 63:
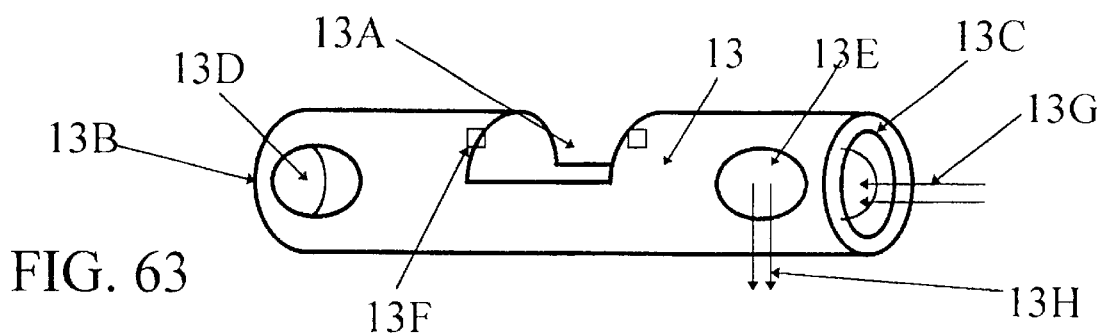
FIG. 63 is a cross-sectional view of the tubular safety valves.

FIG. 63 is a cross-sectional view illustrating the tubular safety valve assembly having a tubular body 13' with two open ends 13b' and 13c' with both capped. Apertures 13d' and 13e' function as oil passages. Retainer springs 13f' are provided. 13a' is the opening to receive the warning/safety device 7' in FIG. 54.

Figure 64:
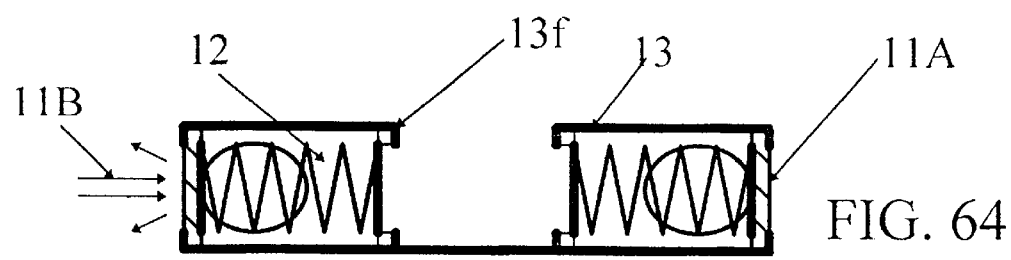
FIG. 64 is a cross-sectional view of the tubular member shown in FIG. 63.

FIG. 64 illustrates a cross-section of the assembly of elements 11', 12', and 13'. Springs 12' and 12a' are retained in opposite section of the tubular body 13' by retainers 13f' forcing flat valves 11' and 11a' against the edge closing both ends 13b' and 13c'. At this stage, the safety valves assembly is in its closed mode and 11b' showing the oil bounds off from the closed flat valve 11'.

Figure 65:
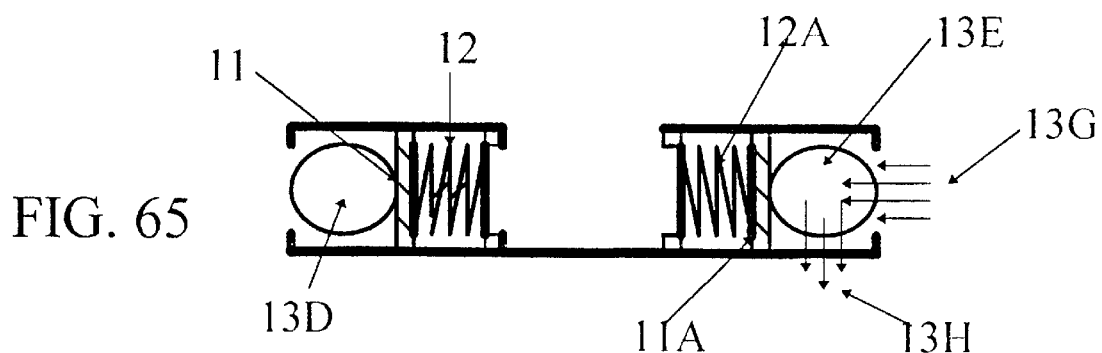
FIG. 65 is a cross-sectional view of the valve assembly with the valves displaced.

FIG. 65 illustrates valves 11' and 11a' pushed inwardly. They open with the oil path shown by numerals 13g' and 13h'.

Figure 66:
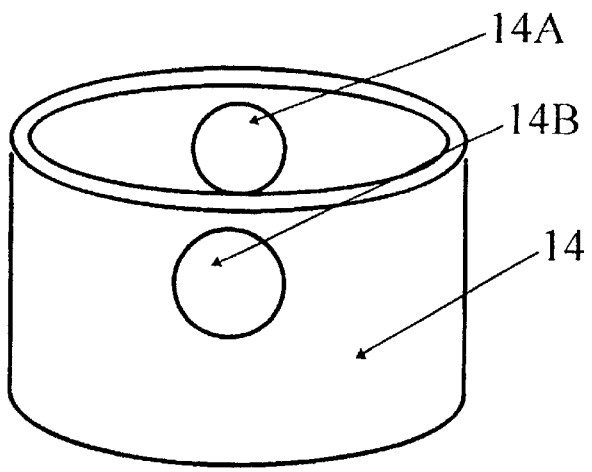
FIG. 66 is a perspective view of the tubular member illustrating the position of the apertures.

FIG. 66 is a perspective view of tubular member 14' having two corresponding holes 14a' and 14b, its top end 14c' inserted into the outer groove 9c' of filter cap 9' in FIG. 56. Tubular member 14' houses the complete safety valve assembly and the safety filter medium.

Figure 67:
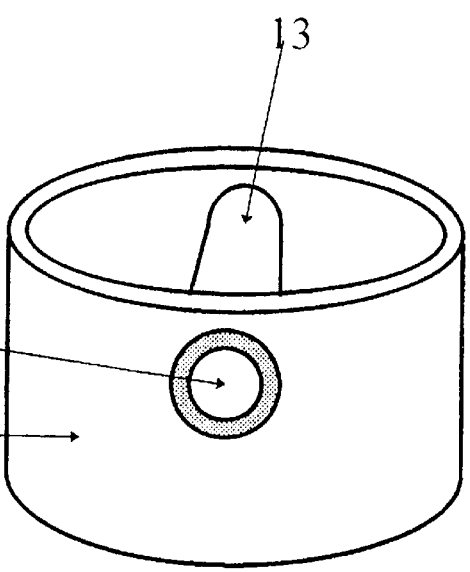
FIG. 67 is a perspective view of the tubular member and the valve body in position.

FIG. 67 illustrates the safety valve tubular body 13' inserted in position in the upper portion of tubular member 14' and secured in apertures 14a' and 14b'.

Figure 68:
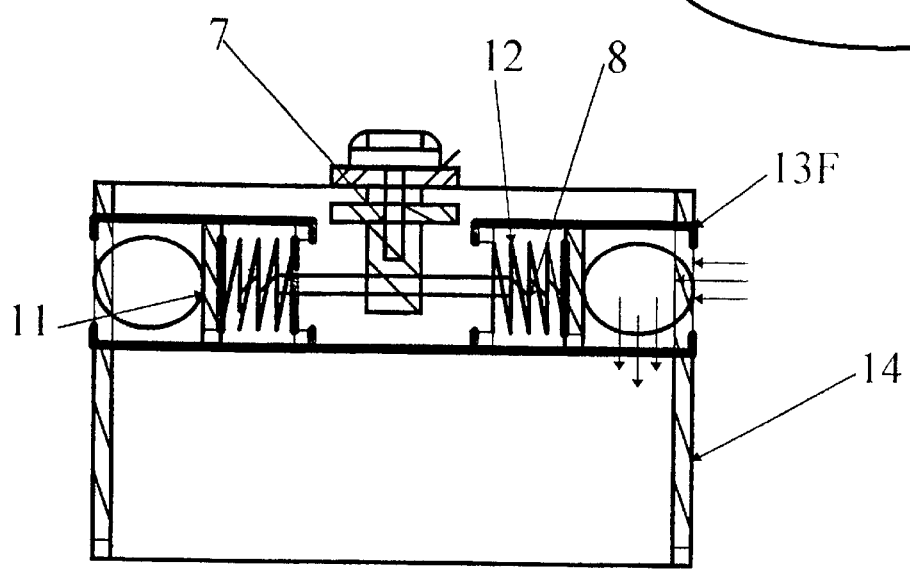
FIG. 68 is a cross-sectional view of FIG. 67.

FIG. 68 illustrates the relationship of warning/safety device 7', safety valves assembly 13' and the tubular member 14'.

Figure 69:
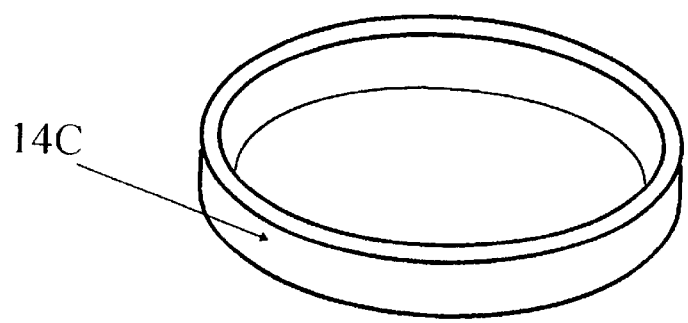
FIG. 69 is a perspective view of the circular magnetic ring.

FIG. 69 illustrates an isometric view circular magnetic ring 14c' which can be slide on the outside of tubular member 14'.

Figure 70:
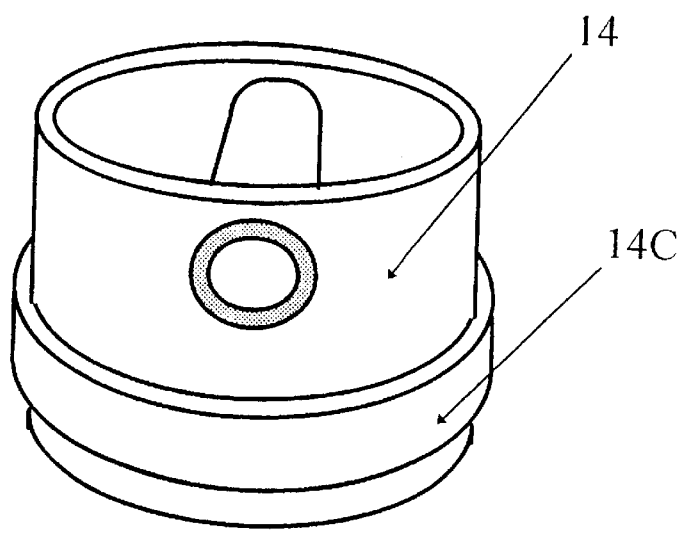
FIG. 70 is a perspective view of the circular ring as positioned on the assembly of FIG. 67.

FIG. 70 illustrates the relationship of safety valve assembly 13', tubular member 14' and magnetic ring 14c'.

Figure 71:
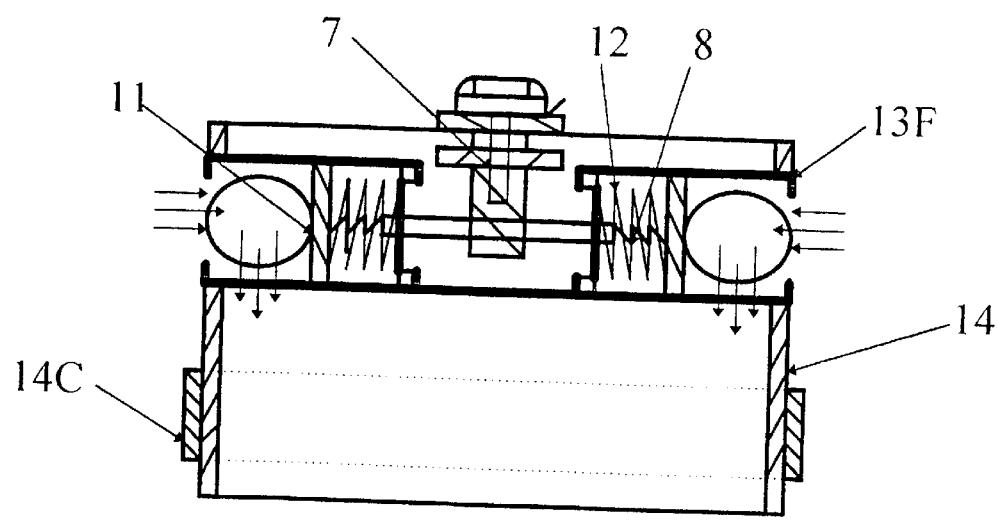
FIG. 71 is a cross-sectional view of FIG. 70.

FIG. 71 illustrates the relationship of the safety valve assembly 13', the safety warning device and the tubular 14' to which the magnetic ring 14c' is attached. The safety valves flap 11' and 11a' are shown open.

Figure 72:
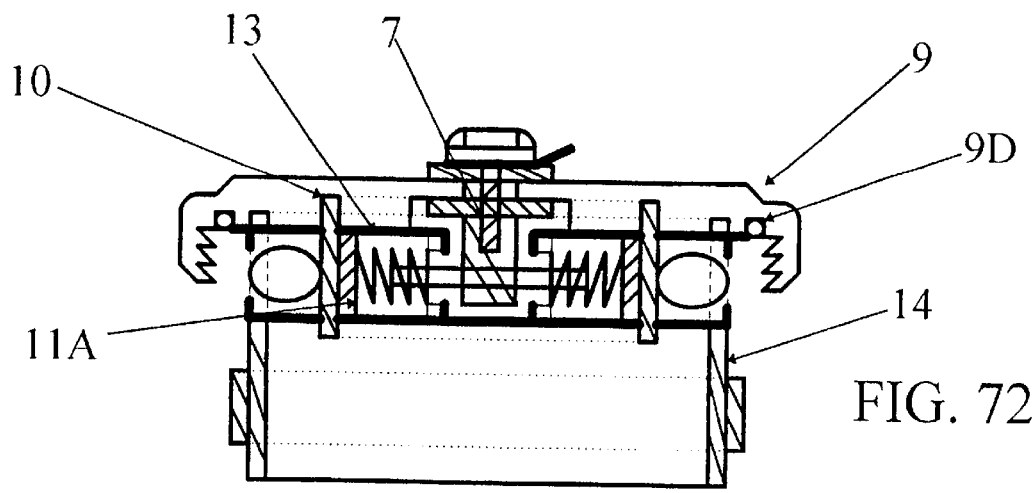
FIG. 72 is a cross-sectional view of the relationship between warning device, filter cap, valve assembly, magnetic ring and tubular member shown with the valve assembly open.

FIG. 72 illustrates the relationship of warning device 7', filter cap 9', safety valve assembly 13', magnetic ring 14c', tubular member 14' and the tubular member 10'. The safety valve assembly is shown open.

Figure 73:
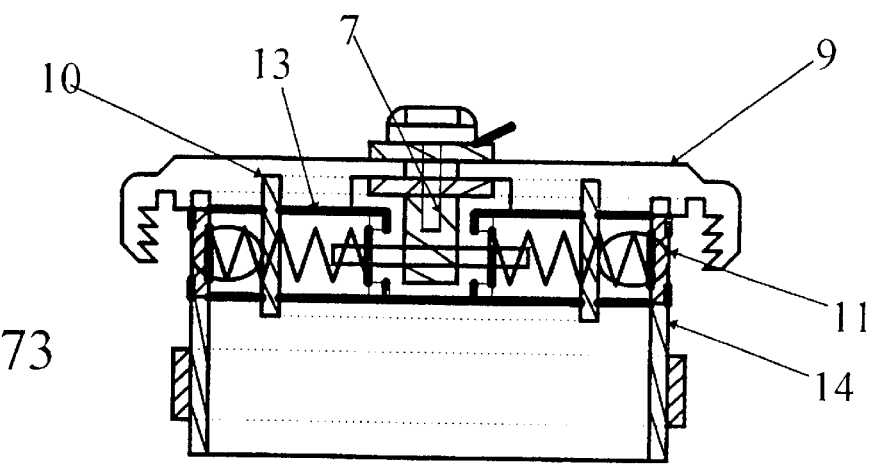
FIG. 73 is a cross-sectional view of FIG. 72 with the valve assembly closed.

FIG. 73 illustrates the same perspective view of FIG. 72, but with safety valve assembly 13' closed.

Figure 74:
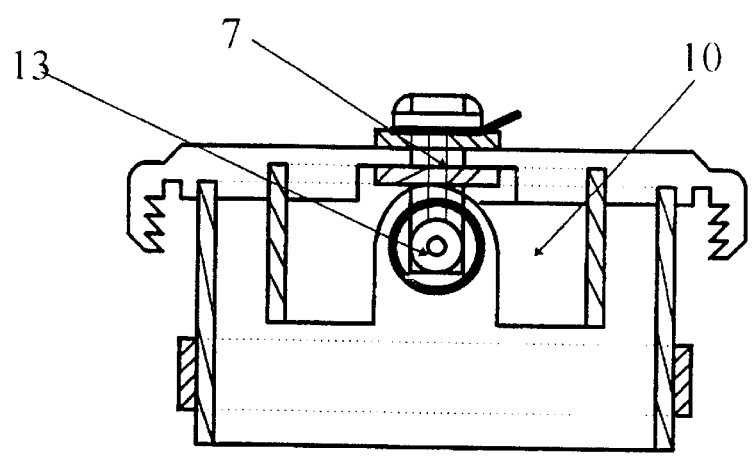
FIG. 74 is a cross-sectional view similar to FIG. 73 rotated 90°.

FIG. 74 also demonstrates the same perceptive view of FIG. 72 except that it is from a 90° angle of FIGS. 72 and 73 and the safety valves are closed.

Figure 75:
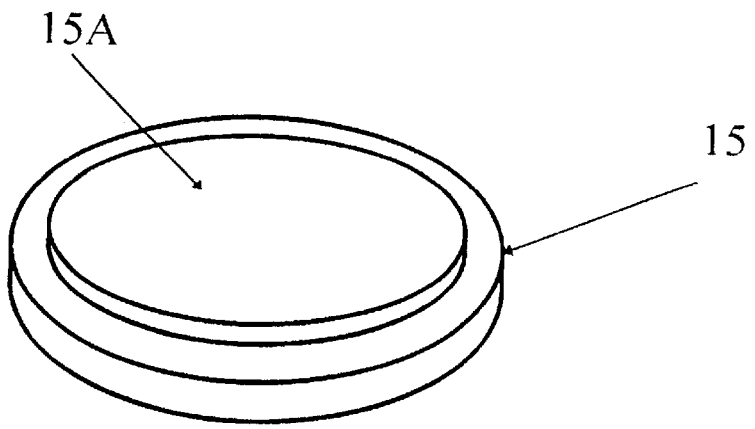
FIG. 75 is a perspective view of the circular disk for use in the present invention.

FIG. 75 illustrates the side top dimensional view of a circular disk member 15'.

Figure 76:
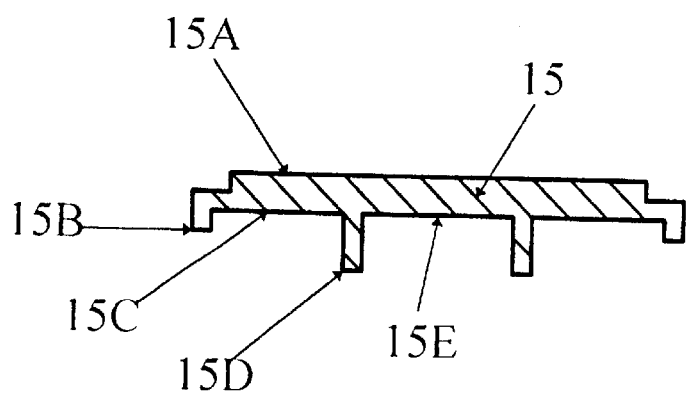
FIG. 76 is a cross-sectional view of FIG. 75.

FIG. 76 illustrates a cross-sectional view of the circular disk member 15'. Element 15a' represents a raised top which is an important positioning feature for fitting the bottom part of the tubular member 10' referenced in FIG. 6. At the bottom, 15b' is the raised rim, 15c' is the indentation for accommodating the safety filter cartridge, 15d' is a raised circular wall that once the top part of the circular safety filter cartridge is placed in area 15c' thereby positioning it between 15d' and 15b'. Area 15e' is also created for housing an auxiliary filter body (not shown).

Figure 77:
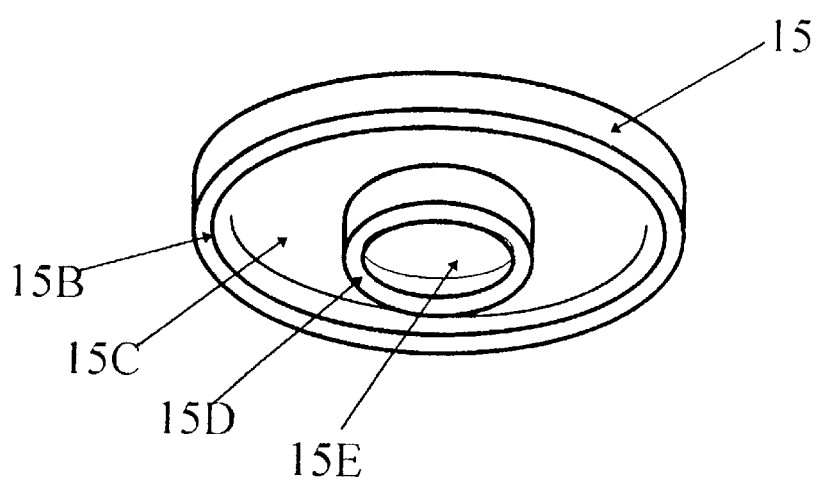
FIG. 77 is a perspective view of the underside of FIG. 75.

FIG. 77 illustrates an underside view of the circular disk member 15'.

Figure 78:
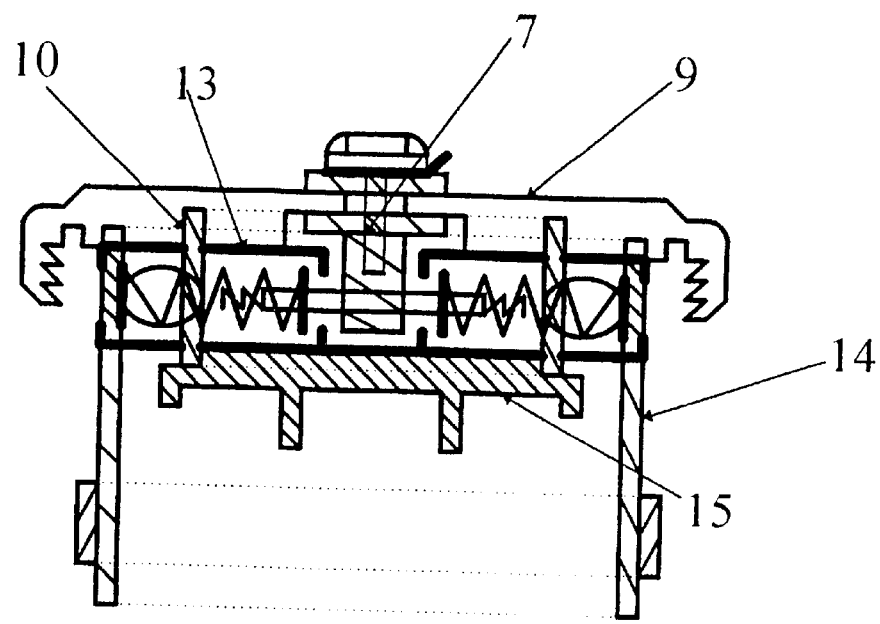
FIG. 78 is a cross-sectional view with the circular disk mounted on the assembly.

FIG. 78 illustrates a cross-sectional view with the circular disk 15' installed in position directly beneath tubular member 10' having 15a' positioned with the bottom of the tubular member 10'. The assembling order and relationship of the warning device 7', filter cap 9', the tubular member 10', the safety valves assembly 13' and the tubular member 14' is shown.

Figure 79:
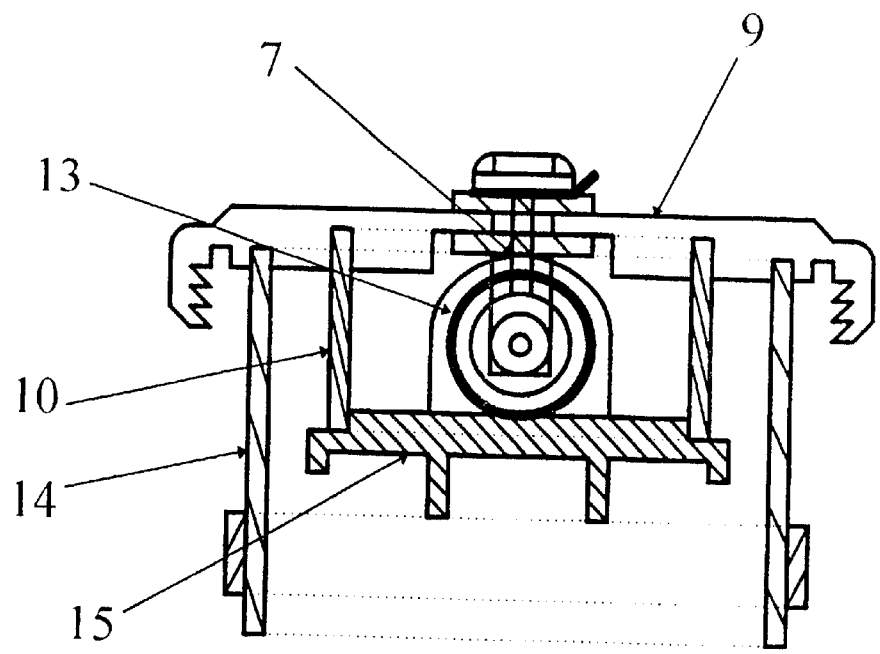
FIG. 79 is a similar view to FIG. 78 rotated 90°.

FIG. 79 illustrates a 90' cross-sectional view of FIG. 76.

FIG. 80 illustrates a bottom view of the top mounting plate 16' of the safety filtering medium having a raised outer edge 16a' and a raised rim 16b' adjacent center opening 16c' which is the core space for return oil passage. The annular indented space 16d' between 16a' and 16b' is created wherein one end of the safety filter medium is mounted.

FIG. 81 illustrates a perspective view of the bottom mounting plate 17', which is identical in size and configuration with the top mounting plate 16' referenced with respect to FIG. 80.

FIGS. 82 and 83 illustrate the assembled safety filter medium cartridge 18' having the filtering medium sandwiched by both top mounting plate 16' and bottom mounting plate 17'.

Figure 84:
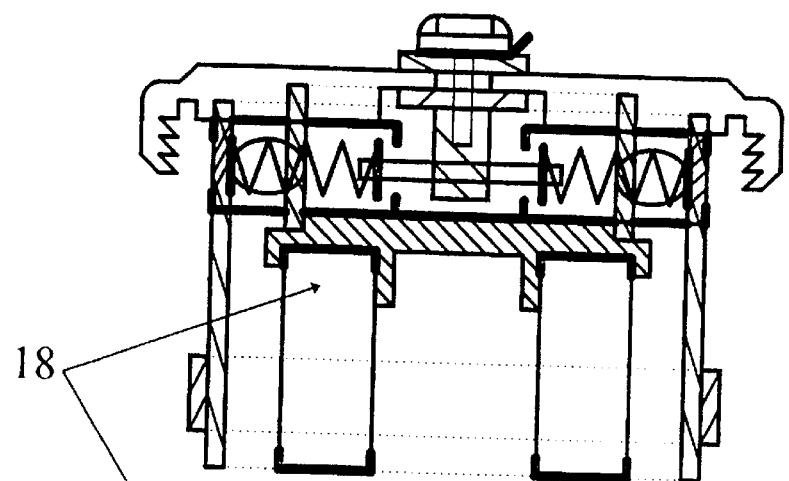
FIG. 84 is a cross-sectional view illustrating the disposition of the filter cartridge and the elements of FIG. 78.

FIG. 84 illustrates a cross-sectional view showing the relationship of the safety filter medium cartridge and the assembled parts referenced in FIG. 78.

Figure 85:
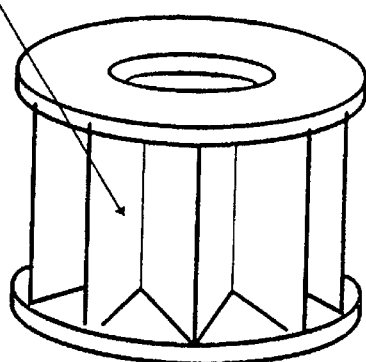
FIG. 85 is a perspective view of the cartridge shown in position in FIG. 84.

FIG. 85 illustrates a dimensional view of the safety filter medium cartridge to be affixed in position to the assembly shown in FIG. 84.

Figure 86:
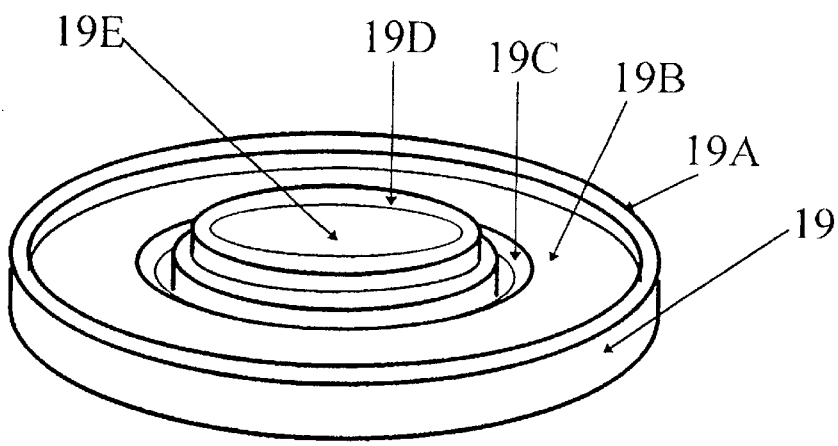
FIG. 86 is a perspective view of the top mounting plate of the main filter medium.

FIG. 86 illustrates a perspective view of a circular member 19' which is the top mounting plate of the main filter medium. Mounting plate 19' includes a raised perimeter edge 19a' and a raised center ring 19c', thus creating annular area 19b', and a center hole 19e', which is the core passage for the returned oil. The indented annular area 19b', is for accommodating the bottom part of the safety filter cartridge referenced in FIG. 82 and 19b', comprises an annular groove 19d' in which an O-ring is inserted for sealing purposes.

Figure 87:
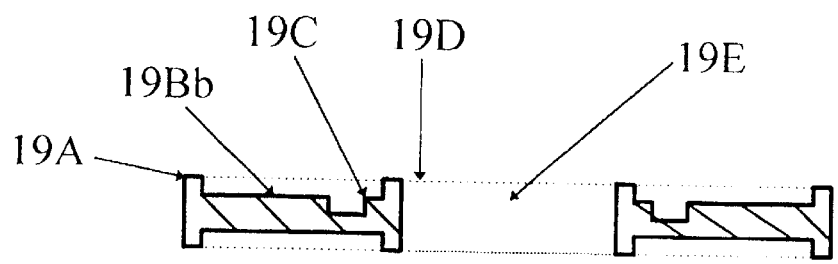
FIG. 87 is a cross-sectional view of FIG. 86.

FIG. 87 illustrates a cross-sectional view of the top main filter medium mounting plate 19'.

Figure 88:
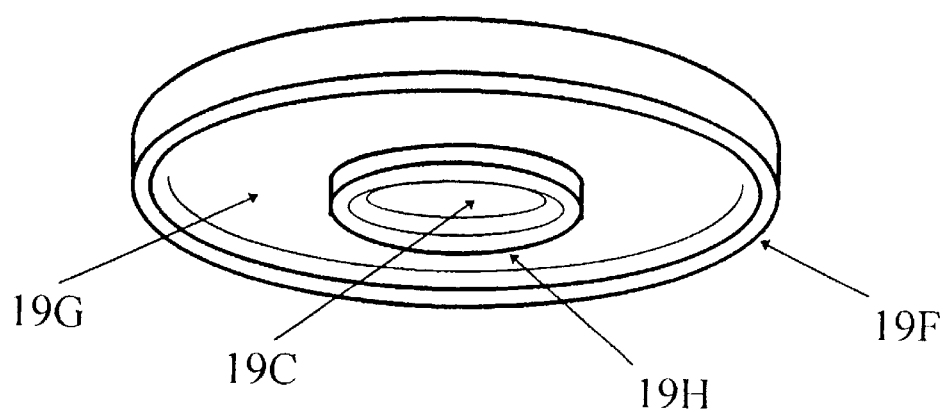
FIG. 88 is a perspective view of the underside of the member shown in FIG. 86.

FIG. 88 illustrates the underside of the top main filter medium mounting plate 19'. Plate 19' also includes a raised perimeter edge 19g' and a raised center ring 19i' adjacent the center opening 19c', the circular indented area wherein the one end of the main filter medium is mounted.

Figure 90:
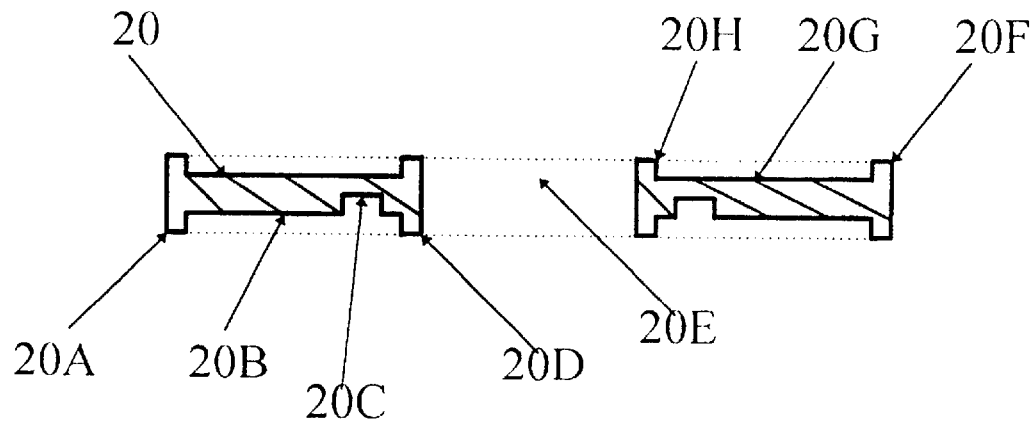
FIG. 90 is a cross-sectional view of FIG. 89.
Figure 91:
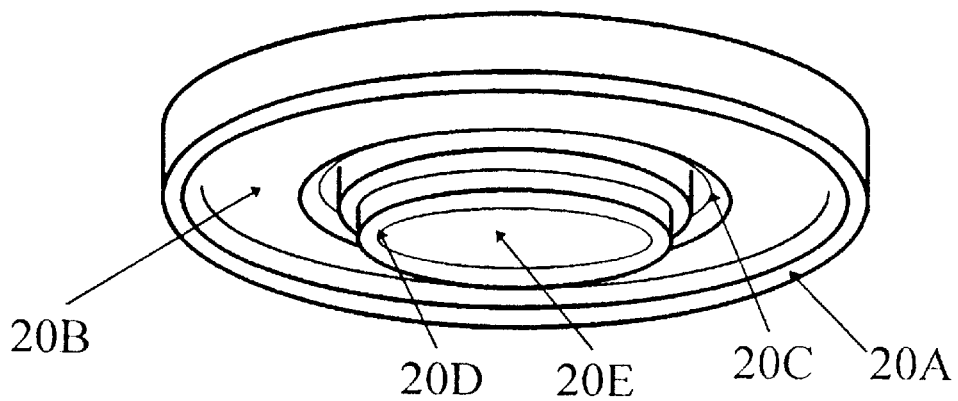
FIG. 91 is a perspective view of the underside of FIG. 89.

FIGS. 89, 90 and 91 illustrate various views of the bottom main filter medium mounting plate 20' which is identical in size and configuration with the top mounting plate 19' referenced in FIGS. 86, 87 and 88. FIG. 91 shows the bottom side view of the bottom mounting plate wherein the top part of the fine micronics medium cartridge is to be affixed.

Figures 92, 93:
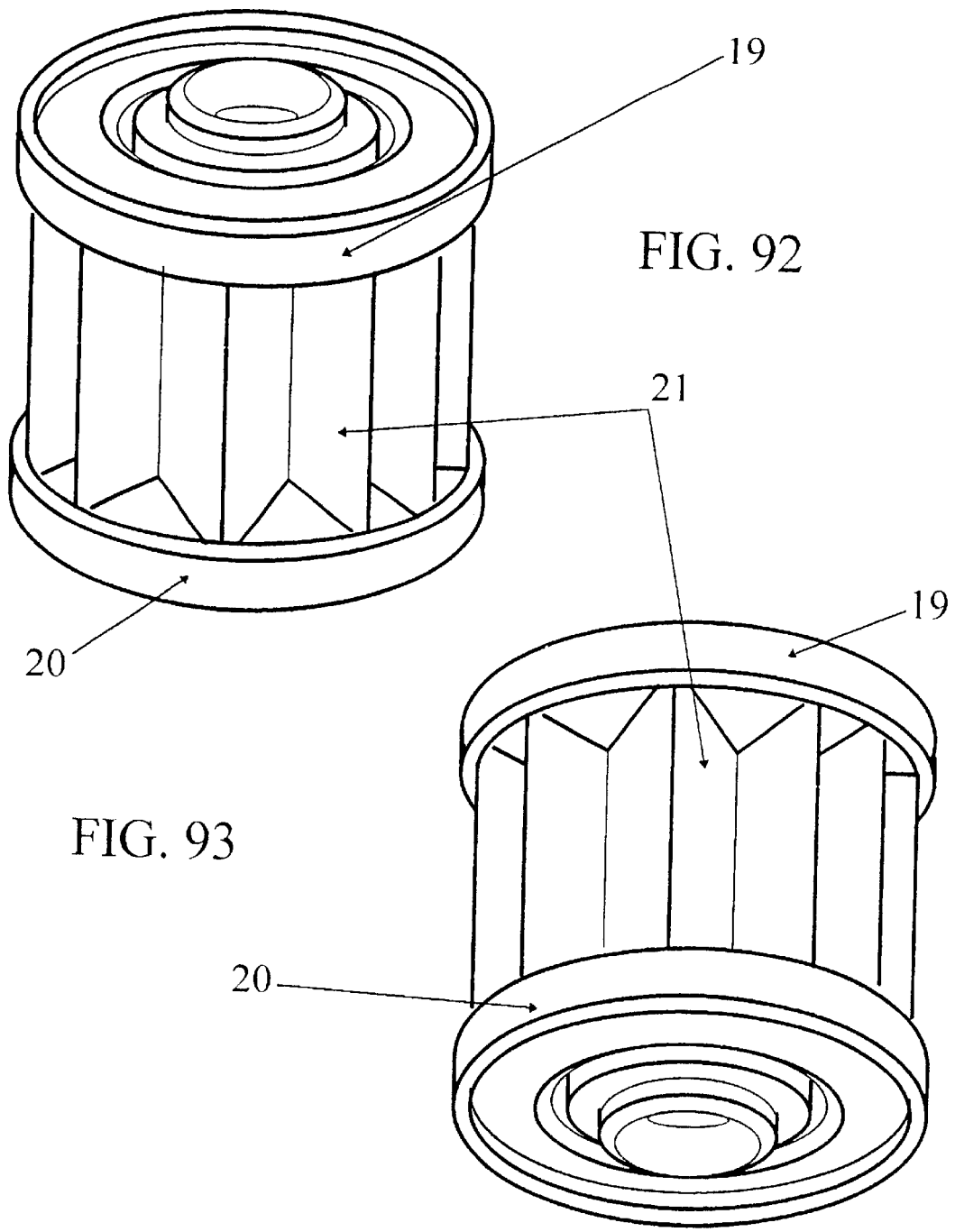
FIG. 92 is a perspective view of the assembled main flow filter cartridge.
FIG. 93 is a perspective view of FIG. 92 in a different attitude illustrating the underside of the filter.

FIGS. 92 and 93 illustrate the assembled main full flow filter cartridge 21' with filter medium 21a' in place.

Figures 94, 95:
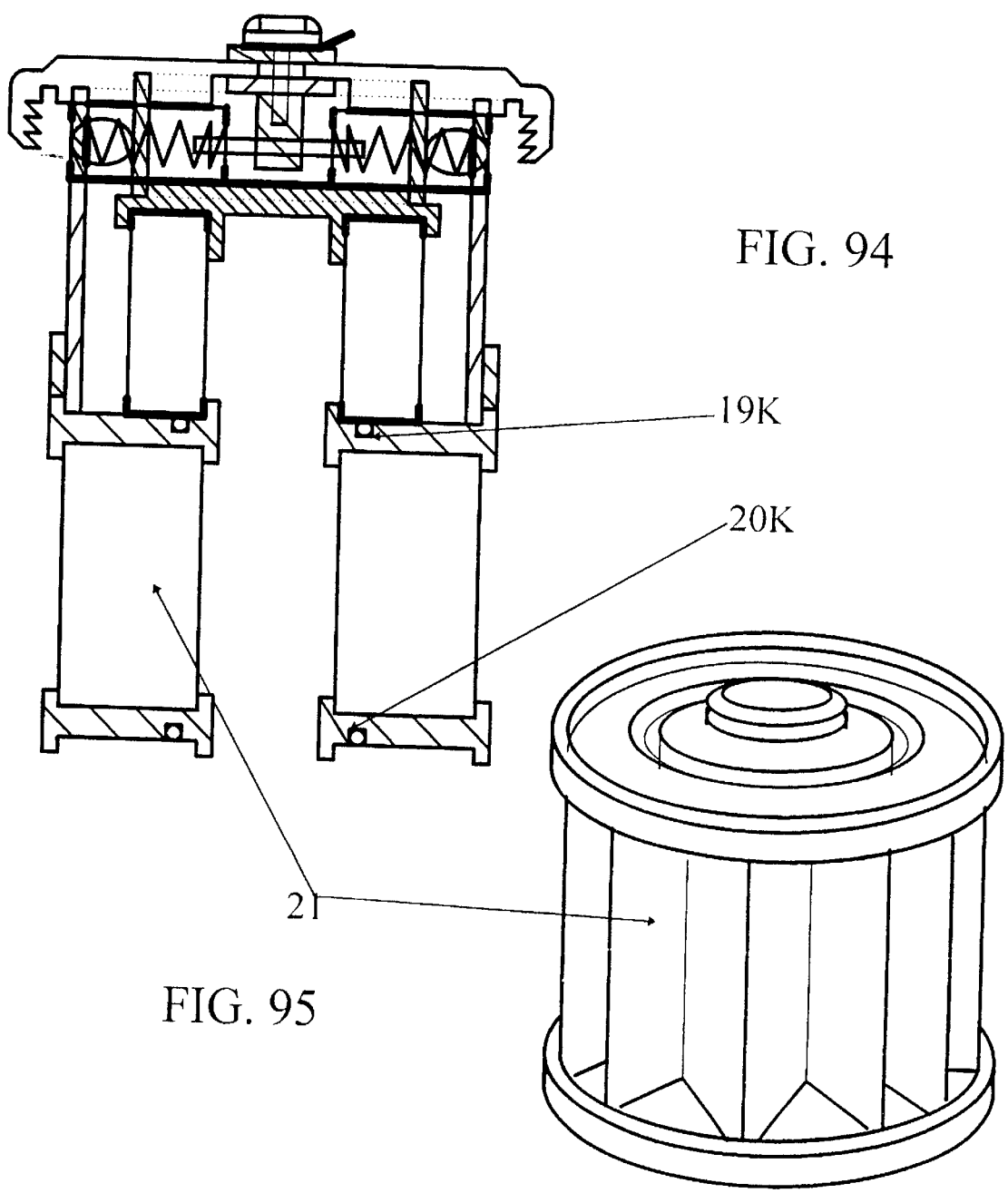
FIG. 94 is a cross-sectional view of the main filter cartridge in position with the ancilliary components shown in FIG. 84.
FIG. 95 is a perspective view of the main filter cartridge employed in the assembly of FIG. 94.

FIG. 94 illustrates the main filter cartridge 21' connected in proper position with other assembled components referenced in FIG. 84. Rubber O-rings 19k and 20k are both in place.

FIG. 95 illustrates a perspective view of the safety filter medium cartridge to be affixed in proper position.

Figures 96, 97:
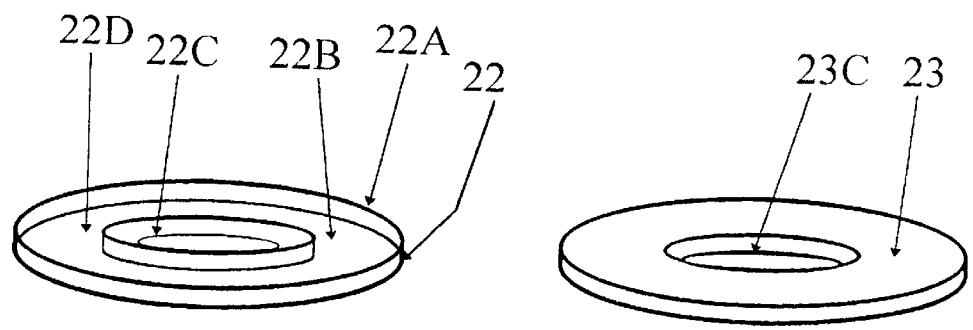
FIG. 96 is a perspective view of the top mounting plate.
FIG. 97 is a perspective view of the top mounting plate in a different attitude.

FIG. 96 illustrates a perspective view of the top mounting plate 22' of the safety filtering medium having a raised outer edge 22a' and a raised rim 22b' adjacent the center opening 22c' which is the core space for returning oil passage. The annular indented space 22d' between 22a' and 22b' is created wherein one end of the safety filter medium is mounted.

FIG. 97 illustrates a perspective view of the mounting plate 23' and its center opening 23a'. The mounting plate 22' and 23' are identical in size and configuration both have a center opening.

Figures 98, 99:
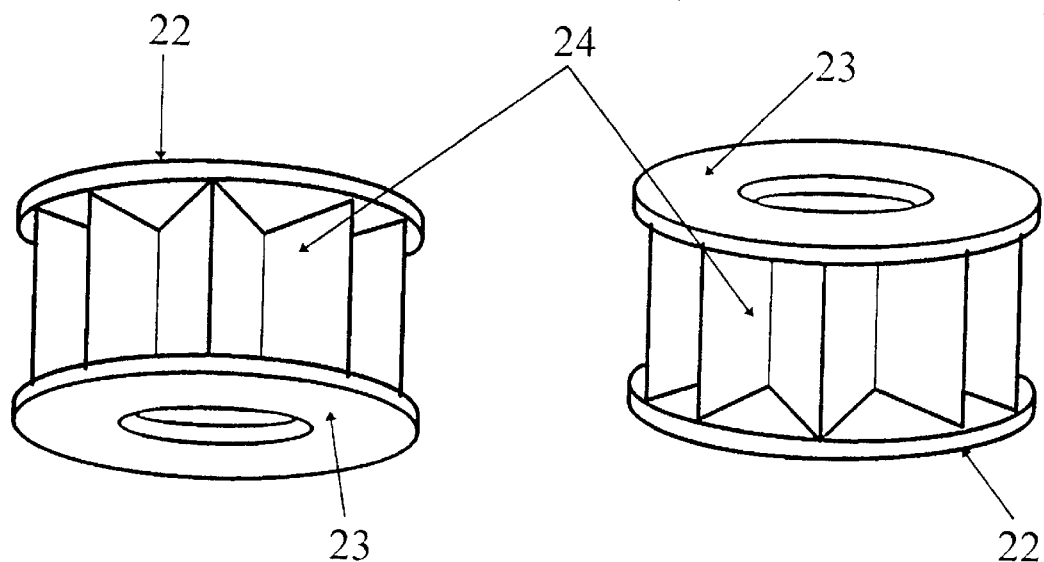
FIG. 98 is a perspective view of the fine filter cartridge.
FIG. 99 is a similar view to FIG. 98 in a different attitude.

FIGS. 98 and 99 illustrate different views of the assembled fine micronic filter medium cartridge 24' having the filtering medium sandwiched by both top mounting plate 22' and bottom mounting plates 23'.

Figure 100:
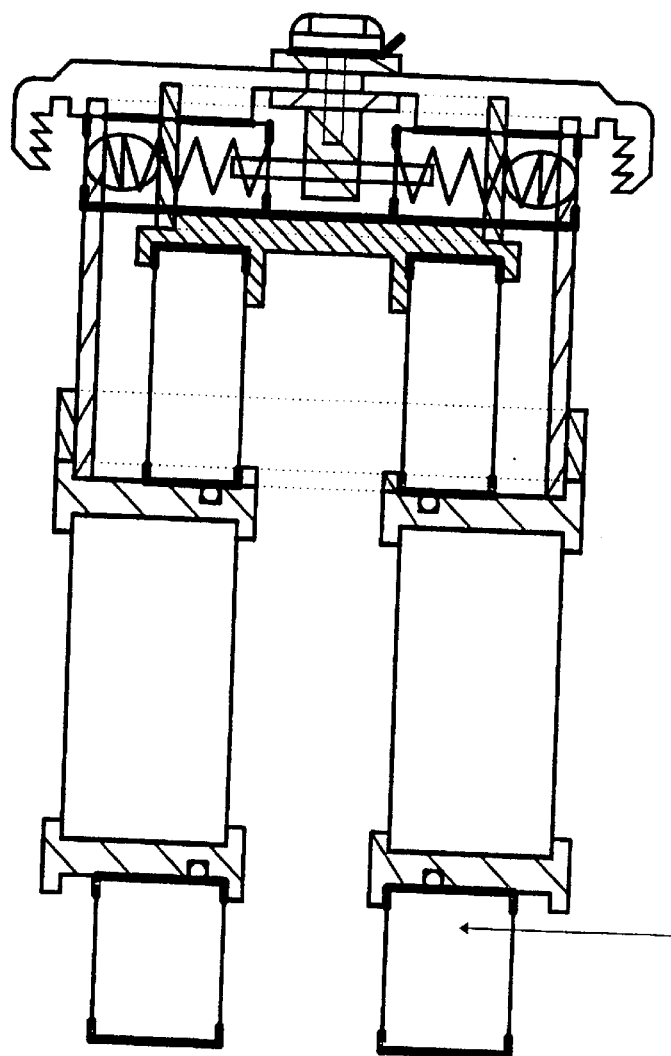
FIG. 100 is a cross-sectional view of the assembly with the fine filter cartridge in situ.

FIG. 100 illustrates is a cross-sectional view showing the fine micronic filter cartridge properly installed in place with the assembled components referenced in FIG. 41. The assembled filter core having all three different filtering cartridges is also depicted.

Figure 101:
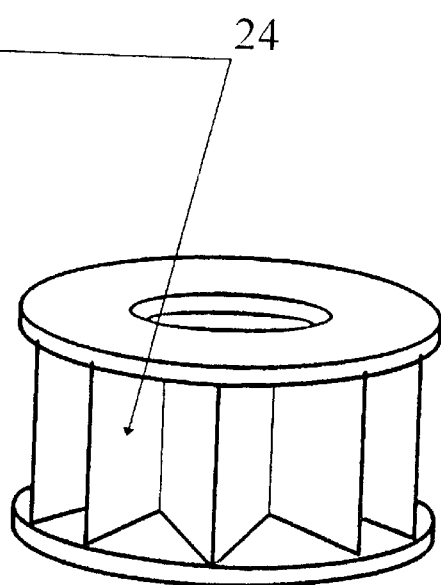
FIG. 101 is a perspective view of the fine filter cartridge.

FIG. 101 is a perspective view of the assembled fine micronics filter cartridge 24'. FIG. 100 shows the device in position.

Figure 102:
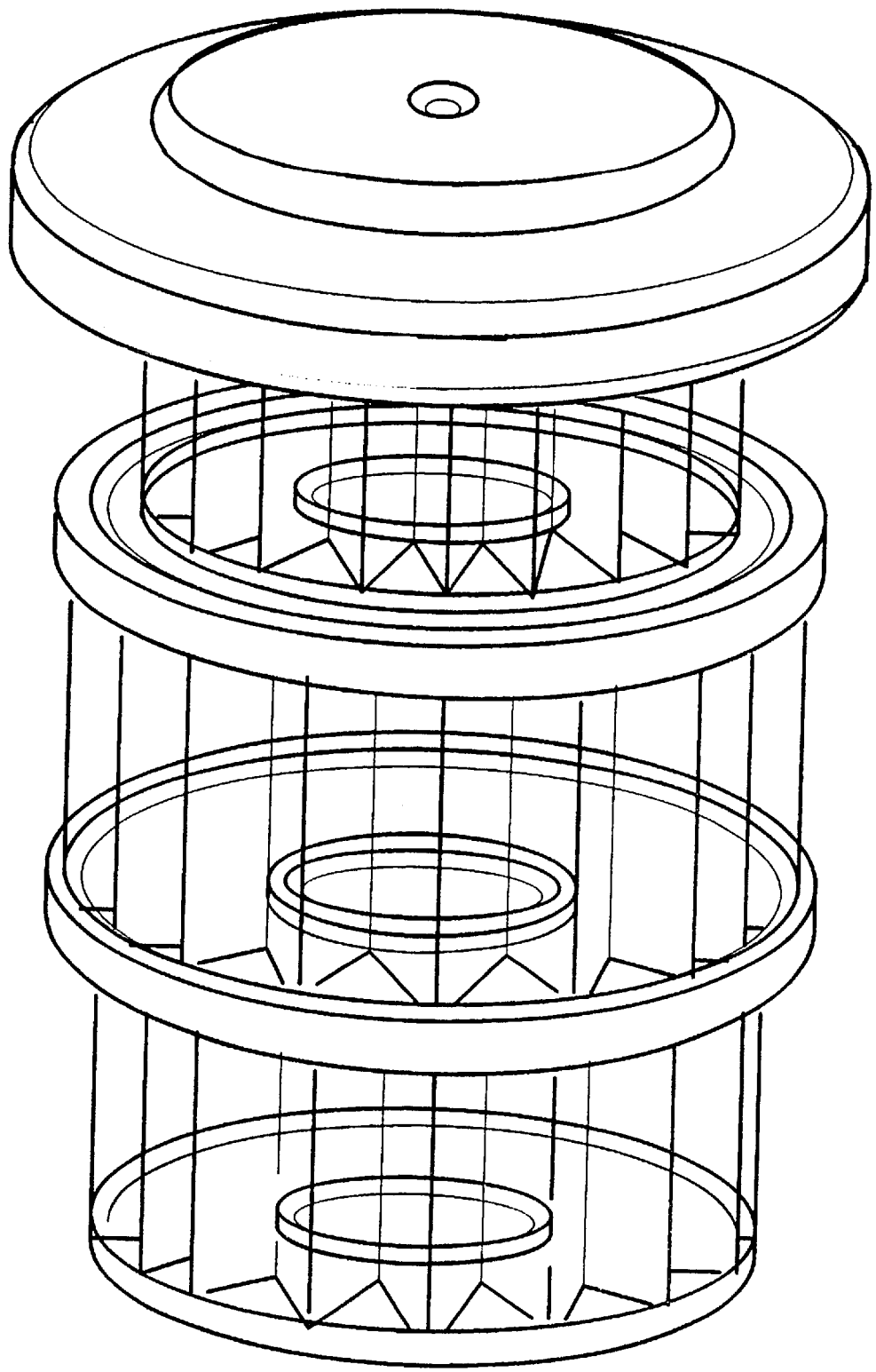
FIG. 102 is a perspective view of the assembled filter core having a triplet of stages.

FIG. 102 illustrates a perspective view of the assembled filter core having three different filtering cartridges.

Figure 103:
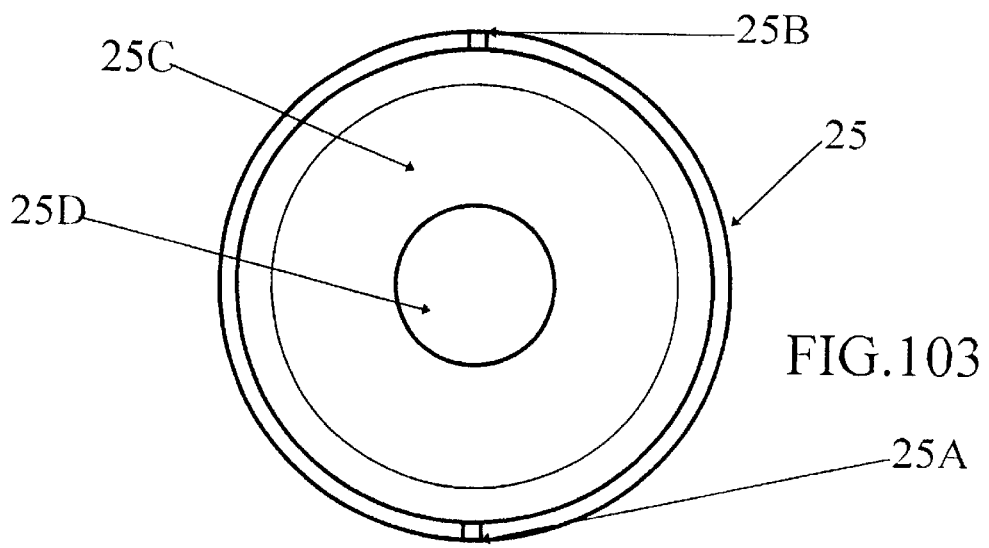
FIG. 103 is a top plan view of the casing for the fine filter cartridge.

FIG. 103 illustrates a top plan view of the casing which houses the fine micronics filter cartridge. This component includes two small openings which are located on the annular wall, the latter being orifice 25a' and orifice 25b'. 25c' is the bottom base with a center hole 25d', the latter being the core passage for returning oil. 25e' is a raised circular flange for accommodating the flat seal 27g' when connecting with the outpost of the canister for positioning and sealing.

Figure 104:
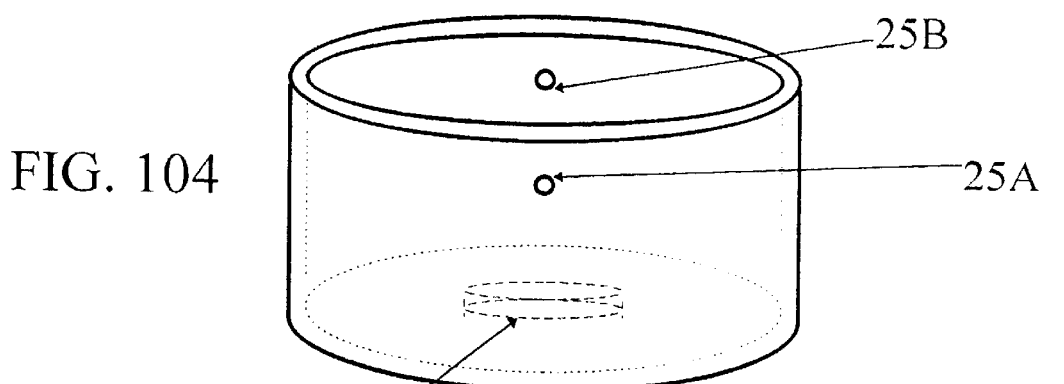
FIG. 104 is a side view of the casing of FIG. 103.

FIG. 104 illustrates a side view of the fine micronics filter casing 25' and the locations of orifices 25a' and 25b'.

Figure 105:
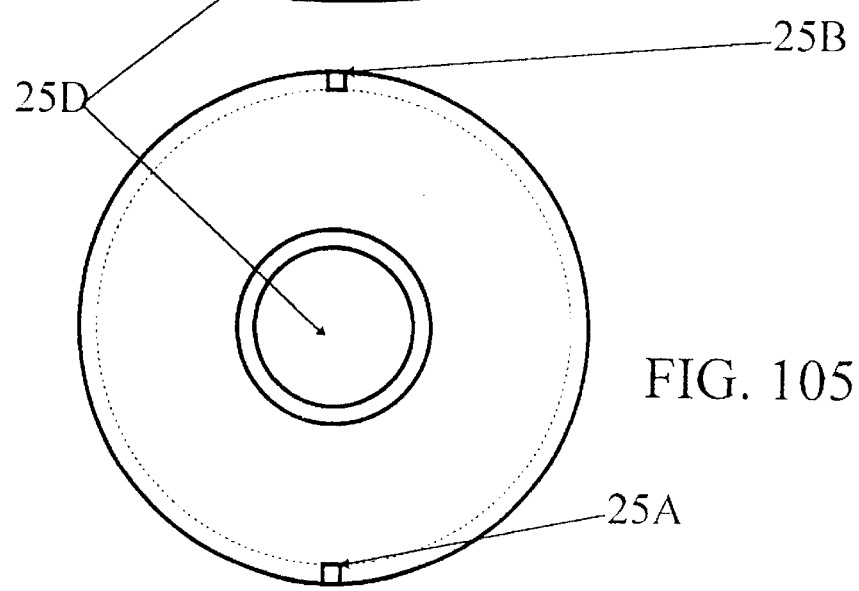
FIG. 105 is a bottom plan view of the casing.

FIG. 105 illustrates a bottom view of the fine micronics filter casing 25' with center hole 25d'.

Figure 106:
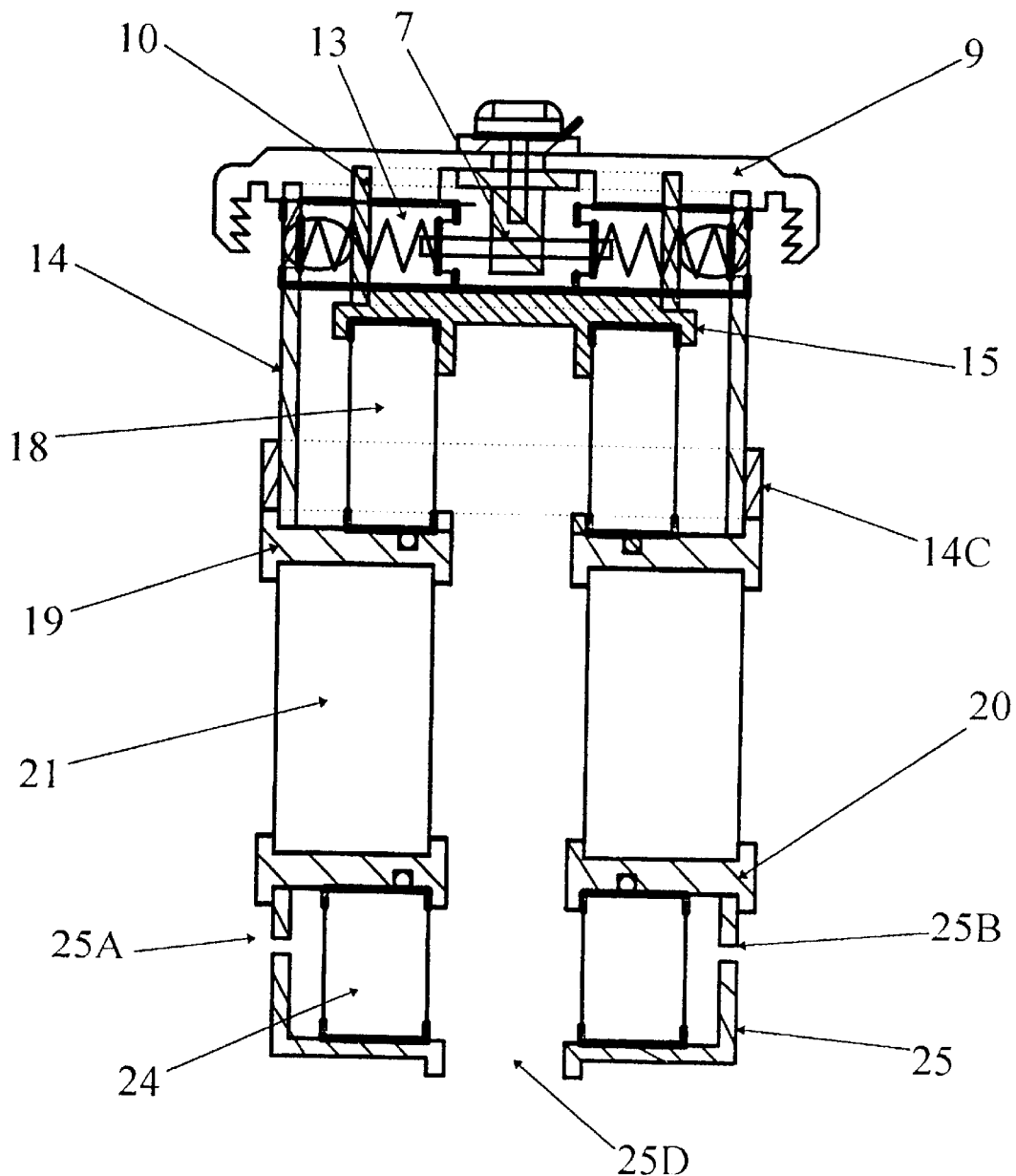
FIG. 106 is a cross-sectional view of the fine filter casing in position at the bottom of the main filter cartridge.

FIG. 106 is a cross-sectional view illustrating the fine micronic filter casing 25' affixed to the bottom part of bottom side of the lower mounting disk 20' of the main filter cartridge referenced in FIGS. 93 and 100'. The fine micronic filter casing 25' is installed to the bottom side of the main full flow filter 20' referenced in FIG. 88.

Figure 107:
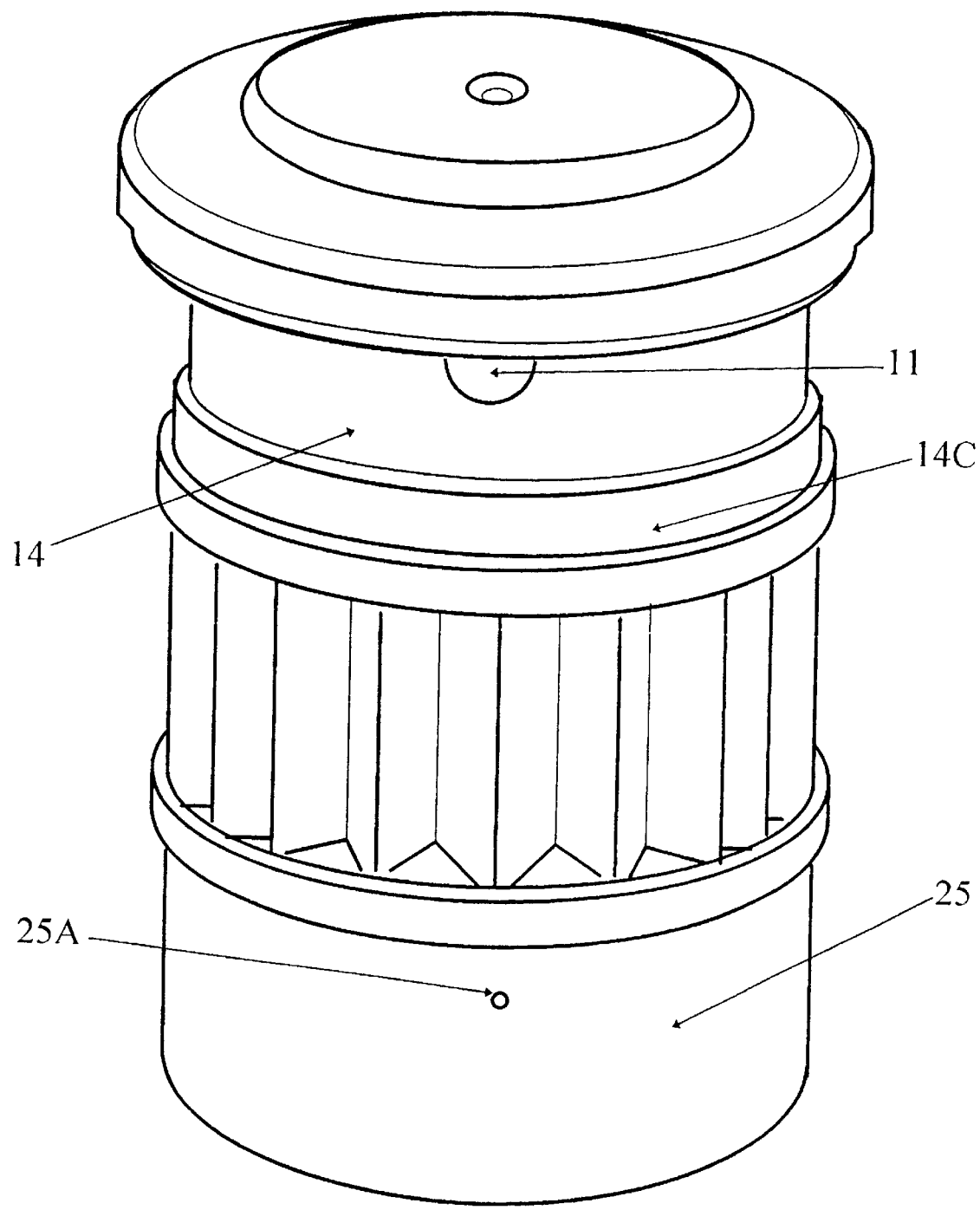
FIG. 107 is a perspective view of the assembled filter core body more clearly illustrating the position of the orifice.

FIG. 107 is a perspective view of the fully assembled filter core body also showing a clearer perspective and the position of the orifice 25a'.

Figure 108:
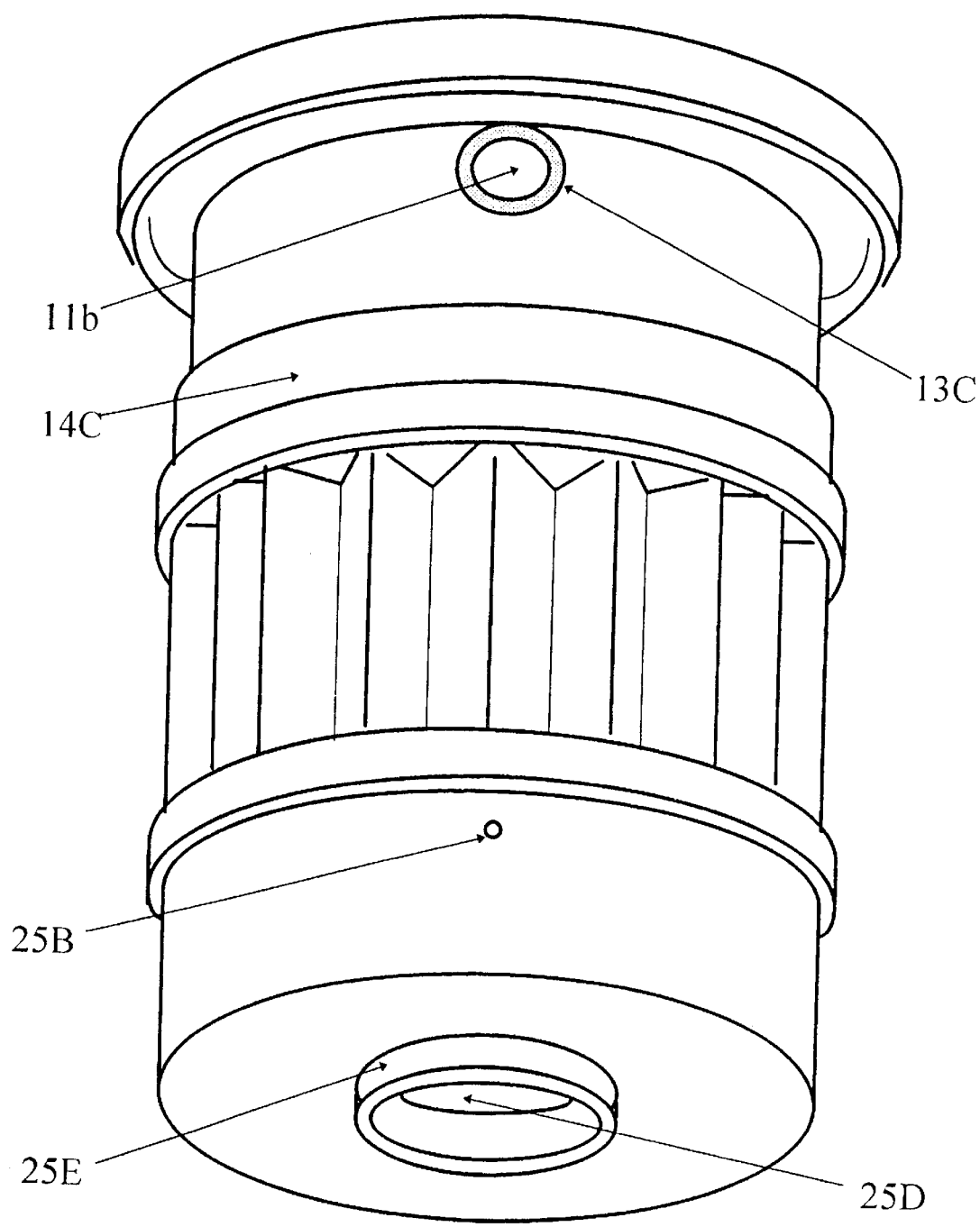
FIG. 108 is a similar view to FIG. 107 is a different attitude.

FIG. 108 is a perspective view of the fully assembled filter core body showing the positions of orifice 25b', the safety valve 13b', the magnetic ring and the center hole 25d' (the core passage for all the returning oil).

Figure 109:
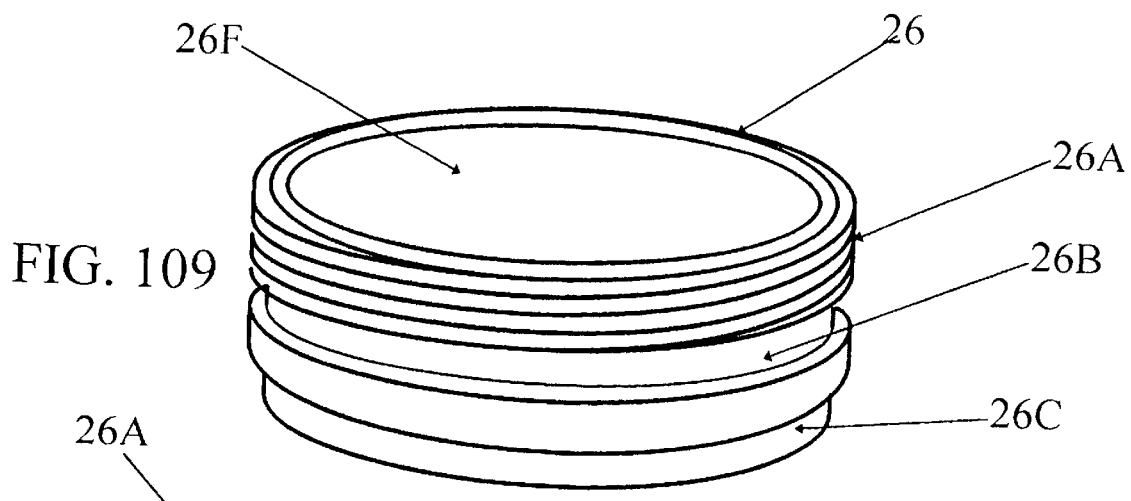
FIG. 109 is a perspective view of the canister ring.

FIG. 109 is a perspective view of the canister ring 26' which functions as a reinforcement ring for the open top canister as well as the major fastening component for the whole filter core. Numeral 26a' is the outside threads, a circular groove 26b' is beneath the threads 26a', adjacent to is annular recess 26c' which receives O-ring seal 26d'.

Figure 110:
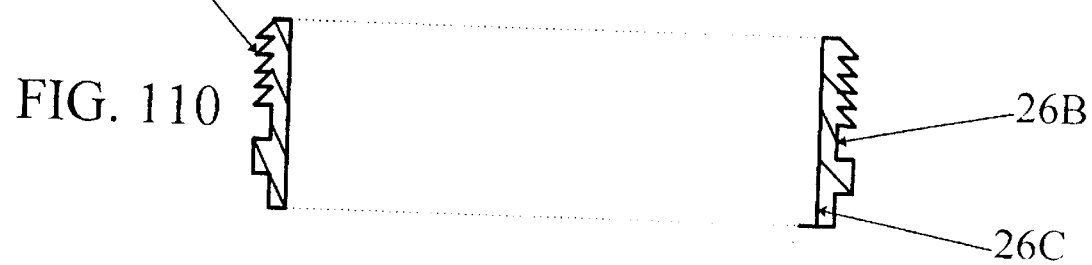
FIG. 110 is a cross-section of FIG. 109.
Figure 111:
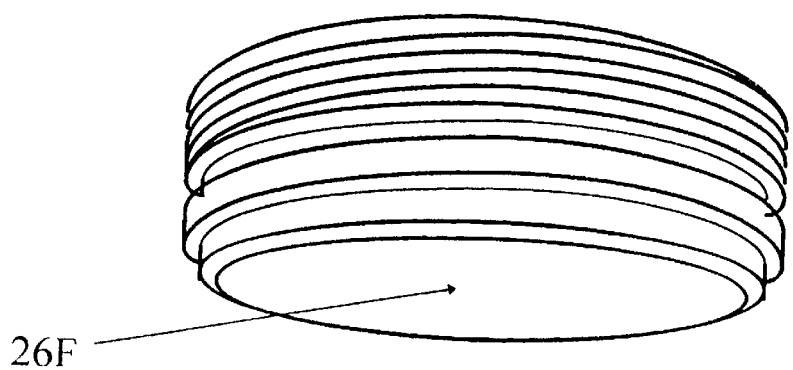
FIG. 111 is a similar view of FIG. 110 in a different attitude.
Figure 112:
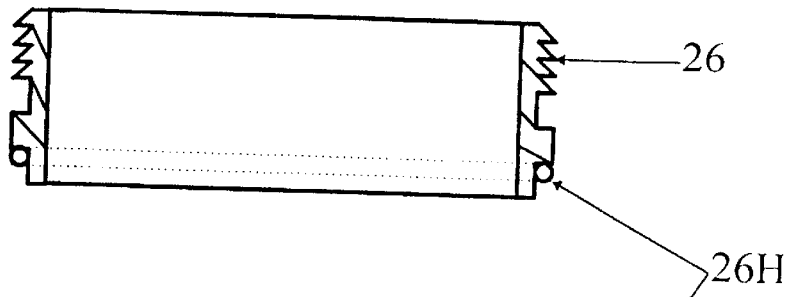
FIG. 112 is a cross-sectional view of the ring illustrating the gasket in situ.
Figure 113:
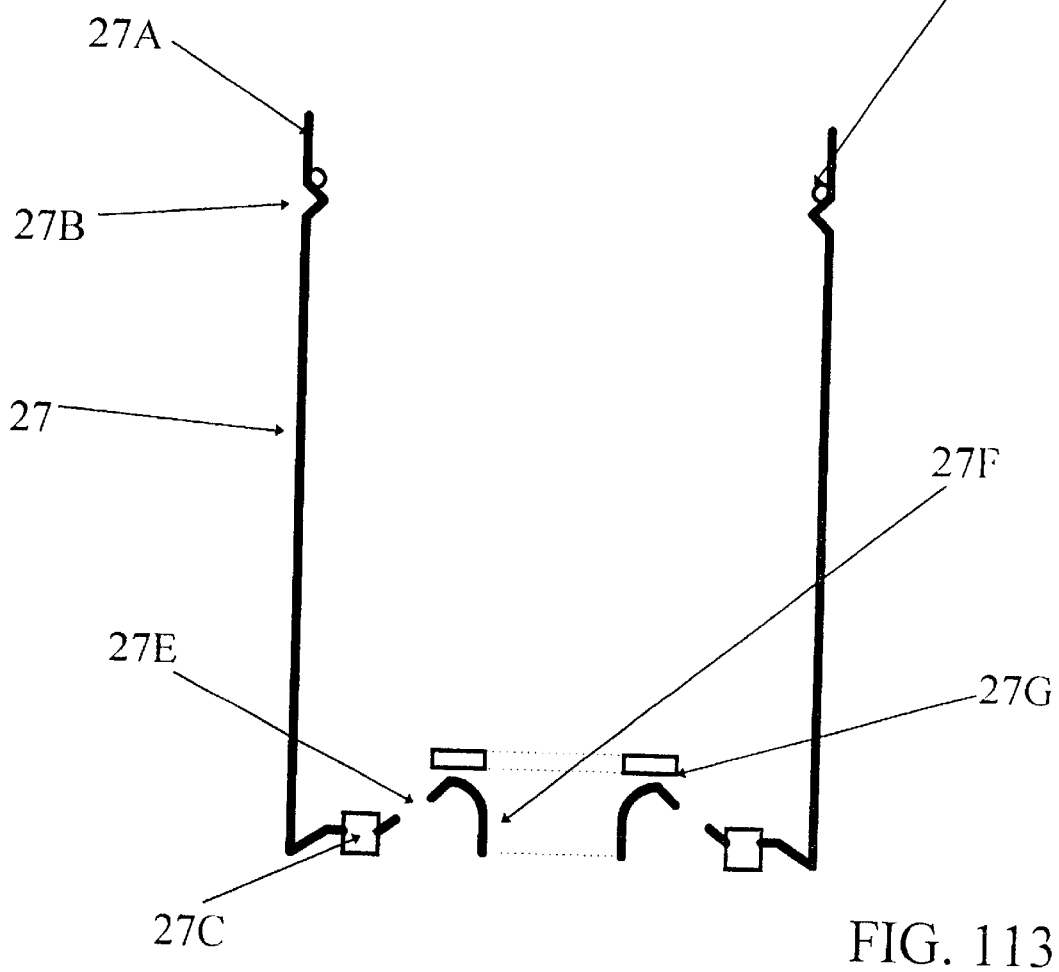
FIG. 113 is a cross-sectional view of the canister for use with the present invention.

FIG. 110 illustrates a cross-sectional view of canister ring 26'; FIG. 111 illustrates a perspective view of canister ring 26'; and FIG. 112 illustrates the O-ring gasket 26h' installed in position 26c' of metal ring 26.

FIG. 111 illustrates a cross-sectional view of used oil filter canister 27' with the top removed. 27a' is the open rim adjacent to which a bead 27b' is ran inwardly around the upper body of canister body 27'. Bead 27b' reinforces the rigidity of the thin metal structure of the open end canister body 27'; this forms a ledge 27c', which is inside the canister body 27'. When canister ring 26' is inserted into the open end of canister body 27', O-ring 26h' is urged downwardly as a seal to prevent oil leakage, therefore canister ring 26' is secured in position by engaging with ledge 27b'. At the bottom of canister body 27', where rubber ring 27d' is grooved in place circling an array of multiple oil entry ports 27e'. The threaded center outpost 27f', which is the only passage for the filtered oil returns to the engine and is rotated into position. A flat rubber washer 27g' is for positioning and acts as a seal when the filter core is inserted into the filter canister.

Figure 114:
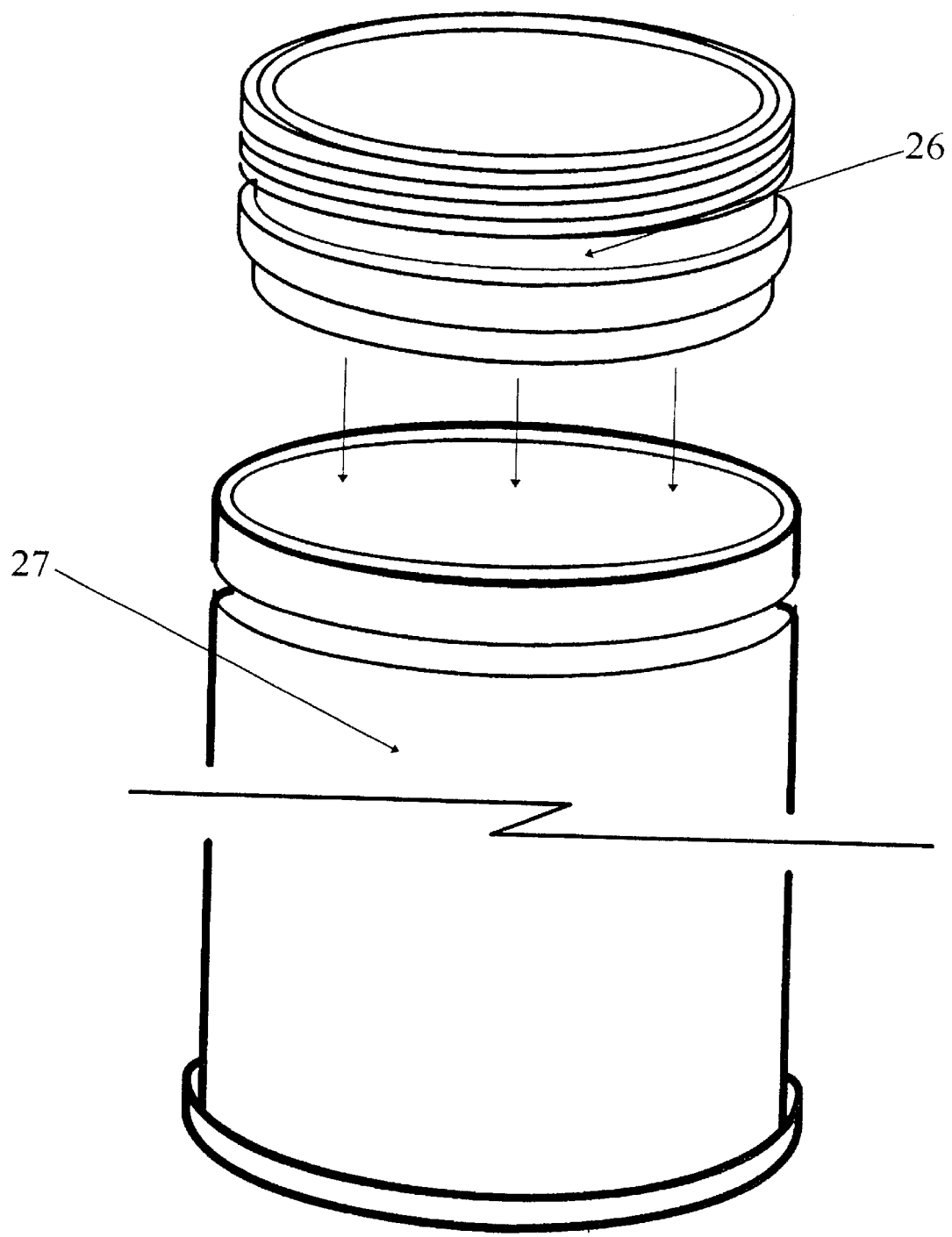
FIG. 114 is an exploded view of the canister and the canister ring.

FIG. 114 is a perspective exploded view of showing the canister ring 26' to be inserted into the canister body 27'.

Figure 115:
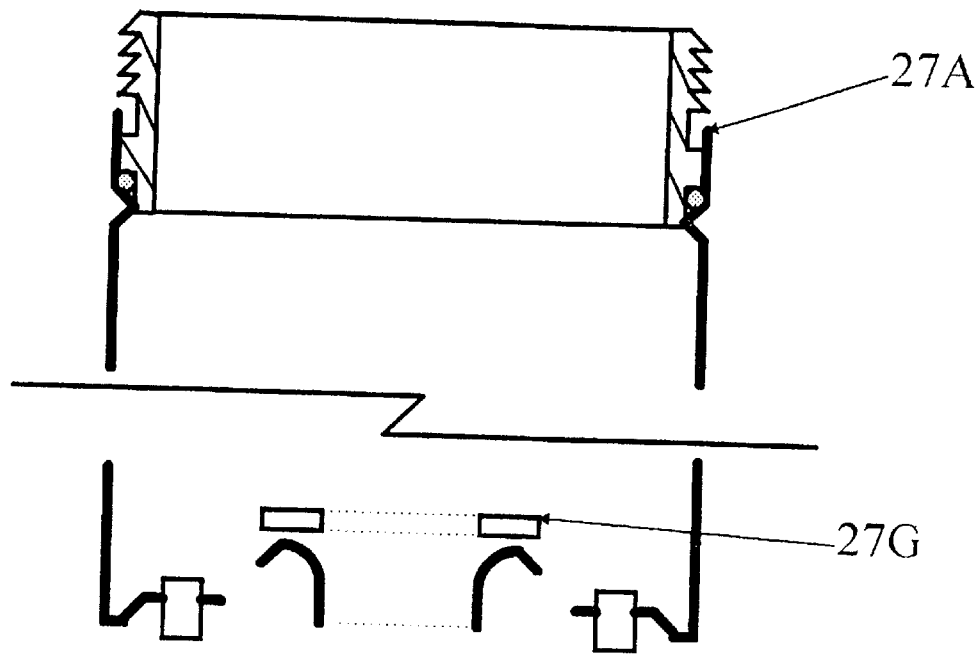
FIG. 115 is a cross-sectional view of the canister ring in position within the canister.
Figure 116:
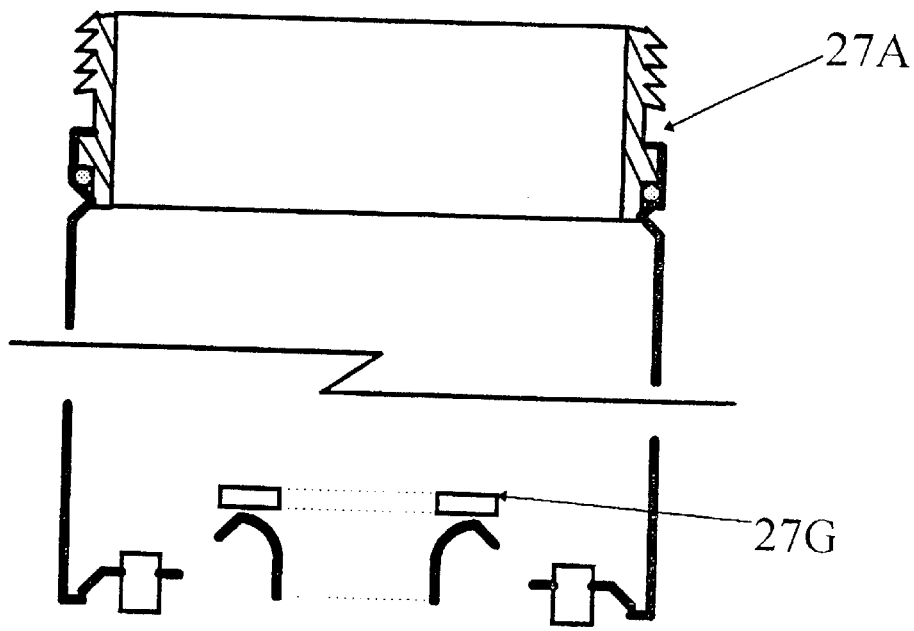
FIG. 116 is a view similar to FIG. 115 illustrating the locking system for the canister and canister ring interface.
Figure 117:
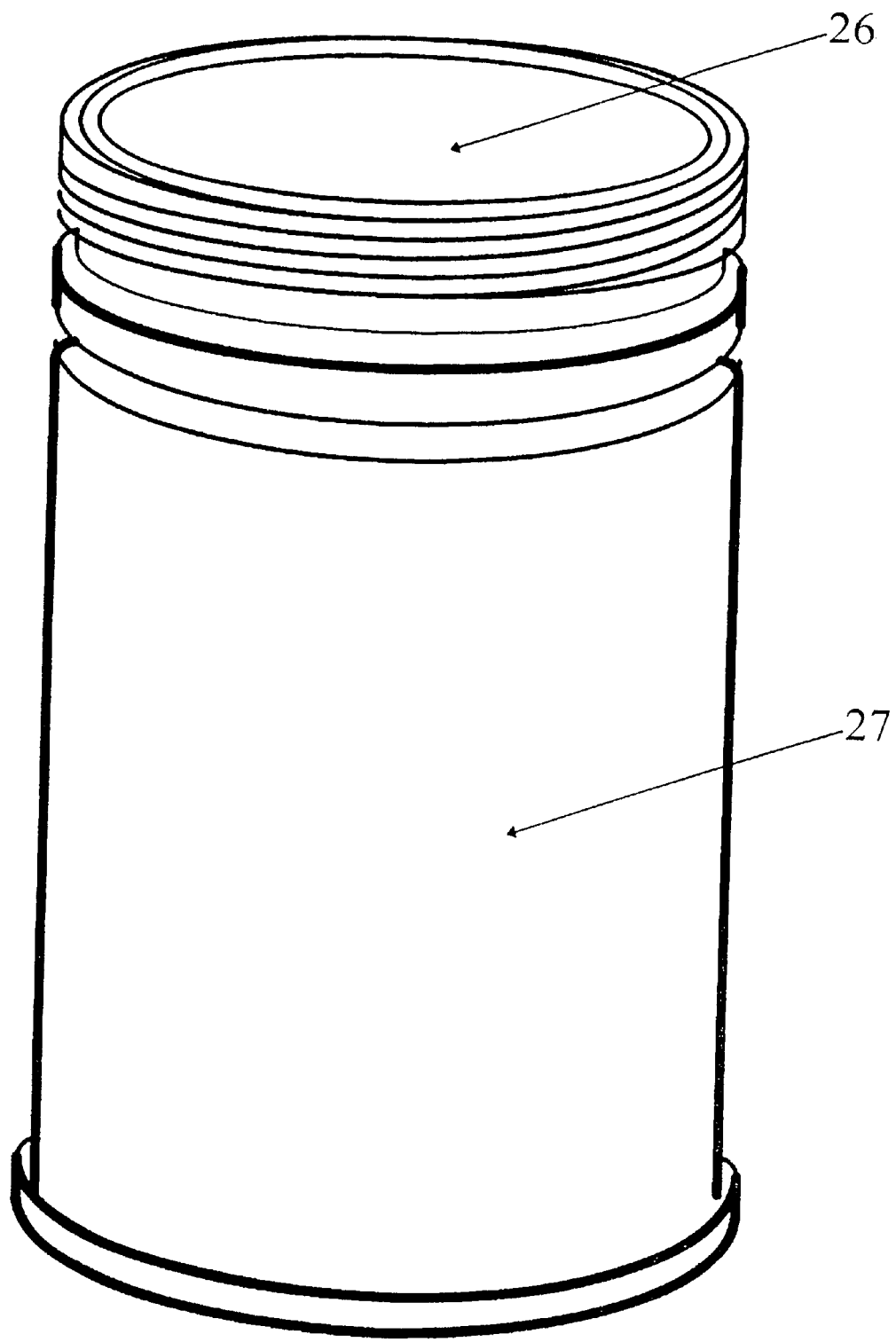
FIG. 117 is a perspective view of the assembled unit of FIG. 116.

FIGS. 115 and 116 illustrate the open rim 27a' crimped down to the nearest wall of the groove 26b' to hold and the canister ring 26' secured in position. FIG. 117 is a perspective view of the assembled canister ring 26' and the open ended canister body 27'.

Figure 118:
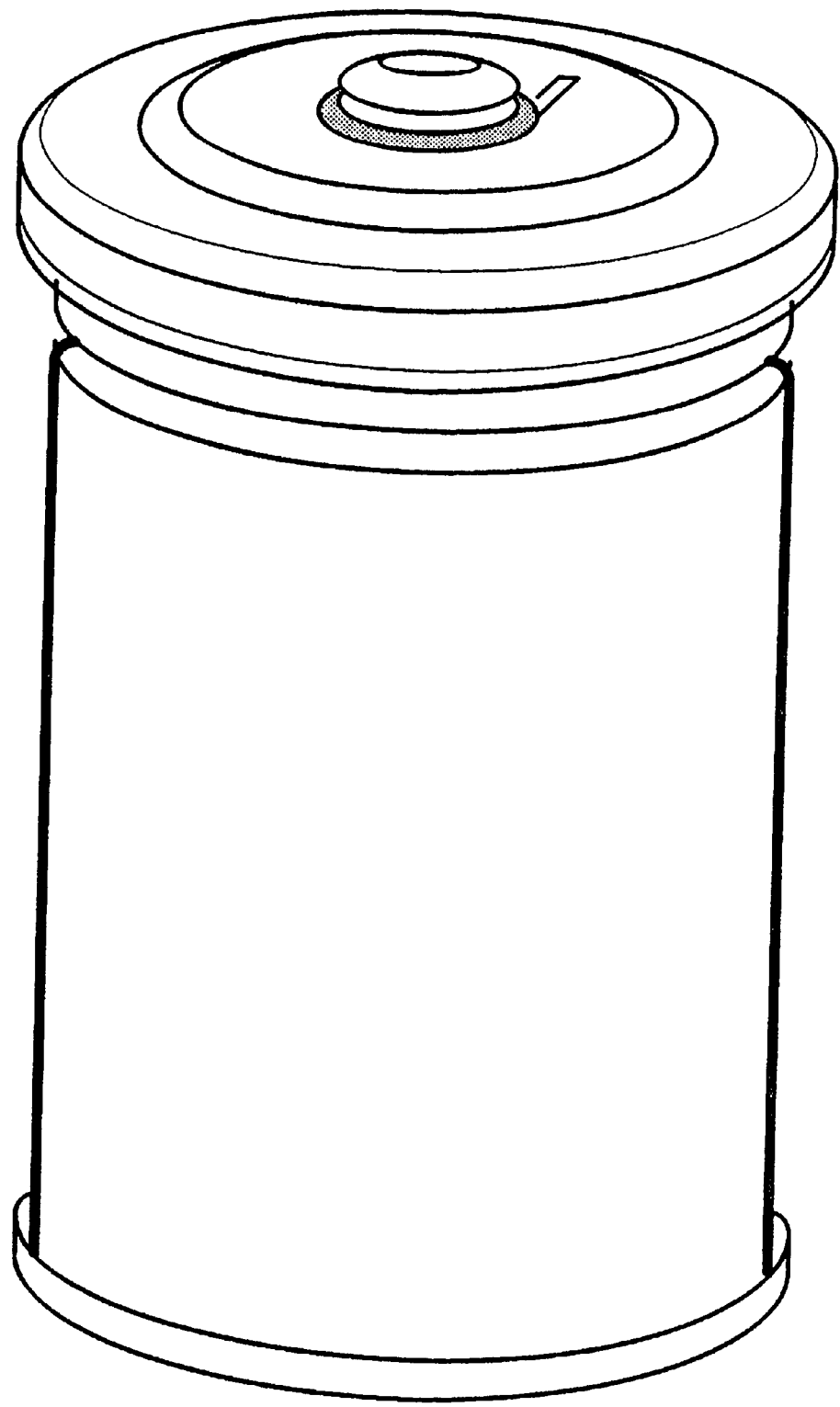
FIG. 118 is a perspective view of the complete filter core.

FIG. 118 illustrates a perspective view of a complete filter core as referenced in FIG. 108 and is inserted into the assembled canister ring 26' and the canister body 27', referenced in FIGS. 114 and 117.

Figure 119:
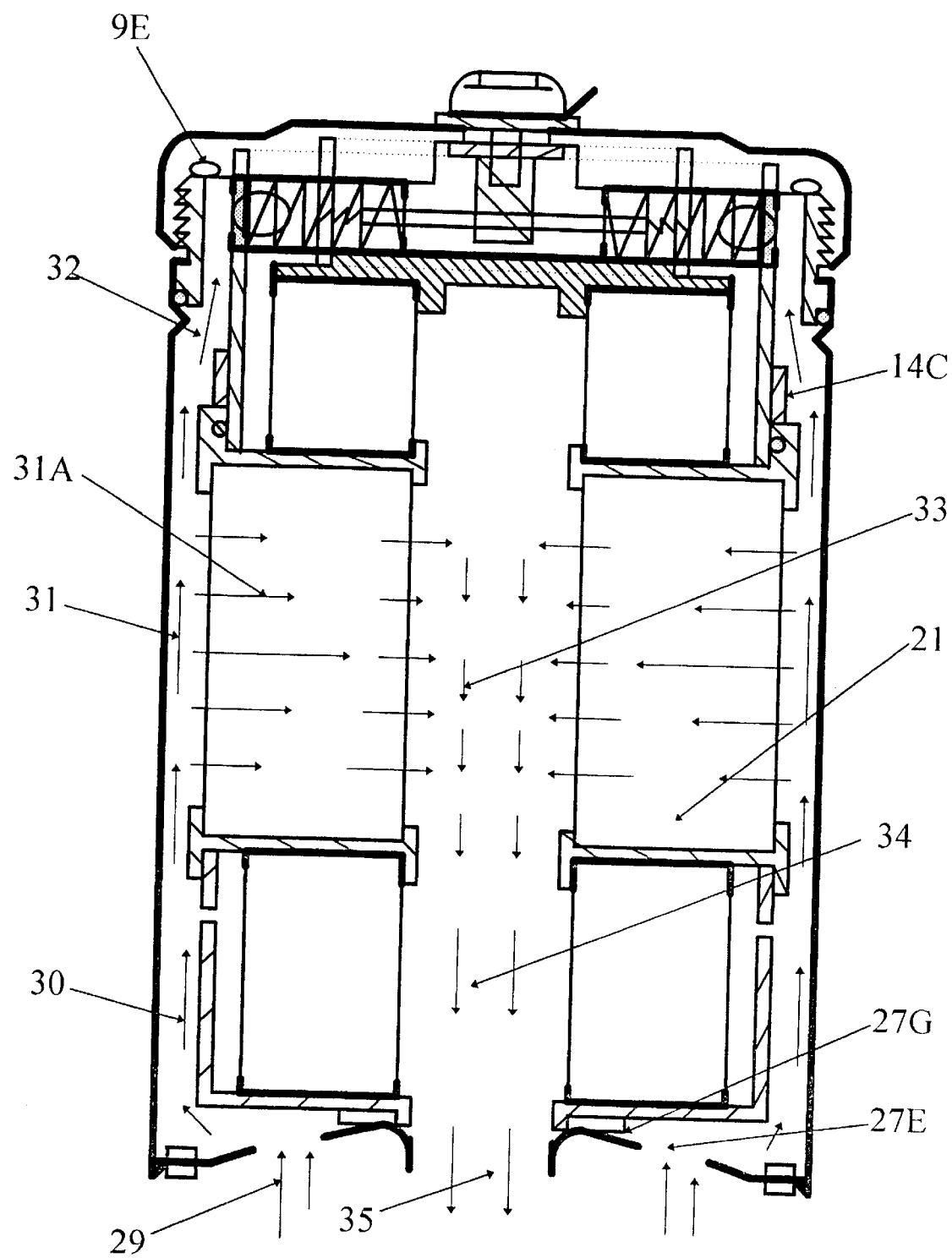
FIG. 119 is a cross-sectional view of a three-stage filter core in situ within the canister.
Figure 120:
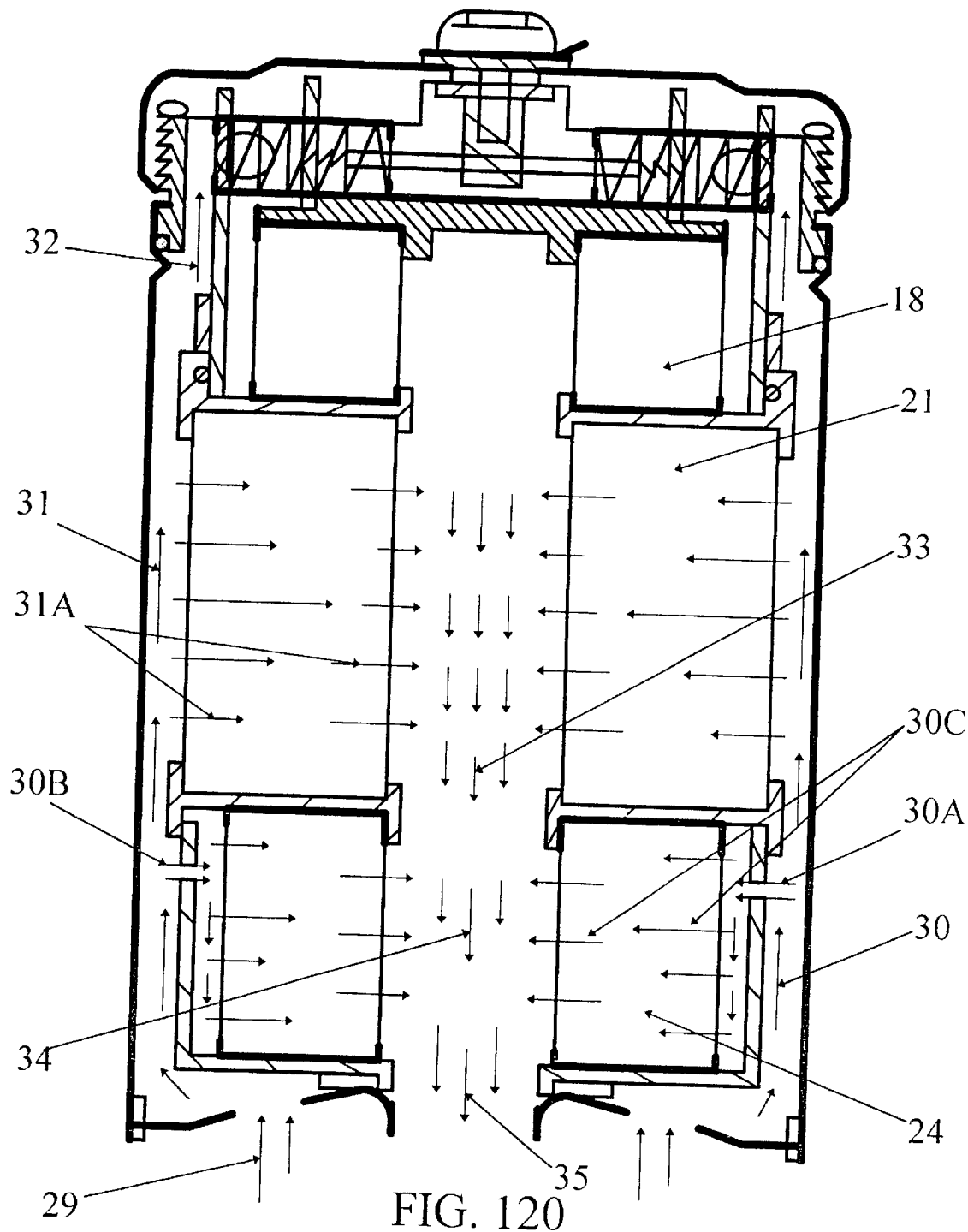
Figure 121:
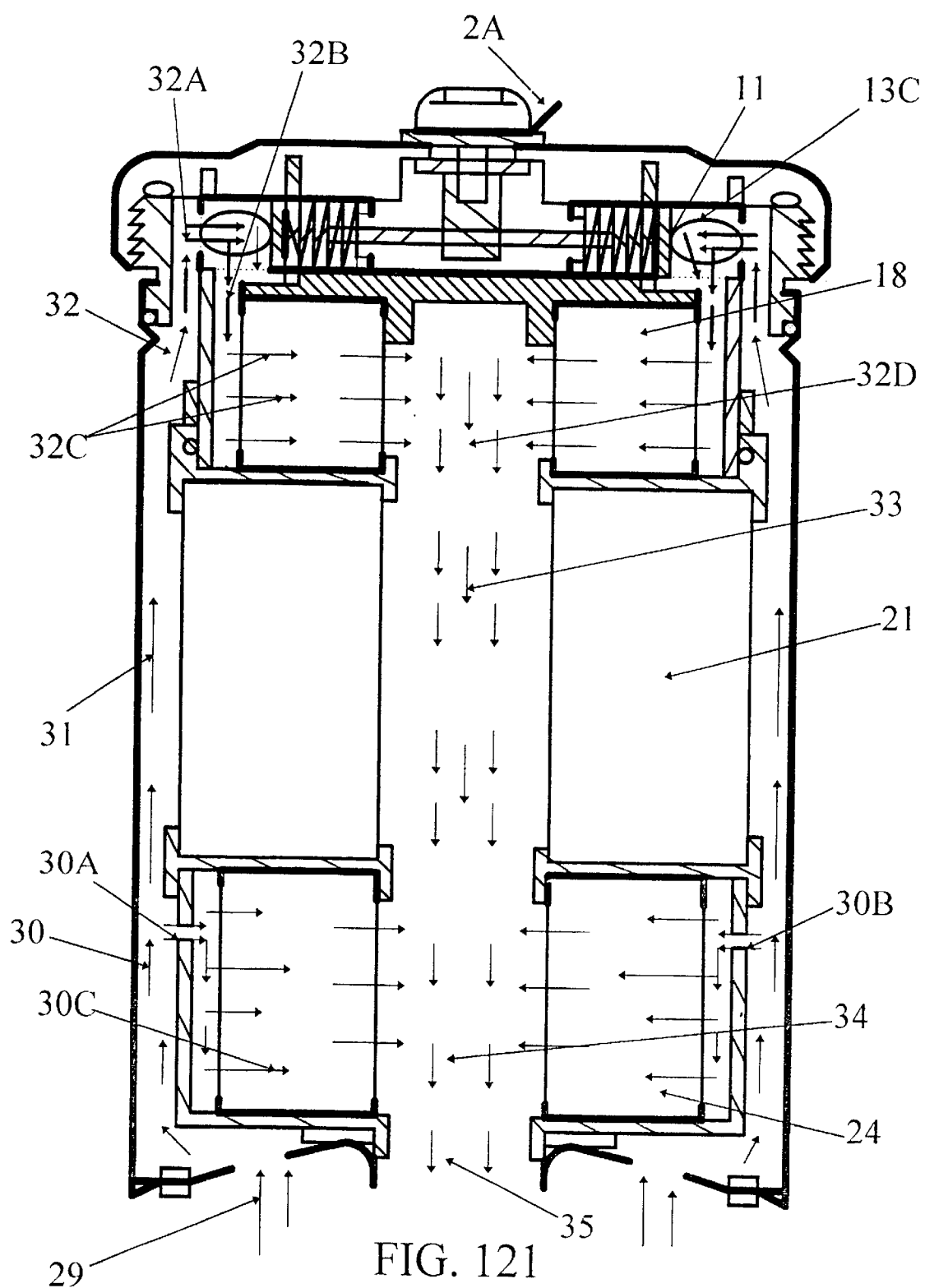

FIG. 119 illustrates a cross-sectional view of a fully assembled three stage filter core which is inserted into the filter canister. The rubber washer 27g' is placed between the bottom of the filter core and is positioned and sealed properly against the outpost of the filter canister. FIG. 119 depicts one embodiment of three models of the invention with arrows indicating the flow of the oil from the engine (not shown) through three filtering stages, (FIGS. 119 to 121). FIG. 119 illustrates the oil activity of the main filter only. Numeral 29' illustrates the flow of the oil entering the filter through a series of entry ports 27e', which are positioned at the base of the filter canister 27'. 30' shows the flow of oil moving along the perimeter of the filter casing. Arrow 31' shows the oil travelling closer to the main filter medium and 31a' shows the oil moving through the main filtering medium 21a'. Arrow 32' shows the oil movement outside of the safety filter housing 14' while the safety filter is in its closing mode. Arrows 33' show the filtered oil flowing through the filter's central chamber moving down the core passage 34' and returning to the engine.

FIG. 120 illustrates a cross-sectional view showing the main filter 21' and the fine micronics filter 24' functioning simultaneously. Oil movement from the main filter 21' from oil path 31', 31a' and 33' have been referenced with respect to FIG. 86. Arrow 29' shows the oil entering the oil entry ports 27e'; 30' shows the oil flowing forward along the perimeter canister of the invention and 30a' and 30b' shows a small amount of oil entering offices 25a' and 25b'. Numeral 30c' shows the oil permeate through fine micronic filter medium. Numerals 24' and 34' show the filtered oil from the micronics filter chamber joining the oil flow from the main filtering chamber and flowing back to the engine via oil passage 35'.

FIG. 121 illustrates a cross-sectional view showing the main filter medium 21' in a plugged condition. Arrows 29' show the oil flow into the canister via entry ports 27e', while arrows 30' show the oil continuous on its path 30a' and some small amount of oil flow through orifice 25a' and 25b'. Continuous oil movement of the fine micronics filter 24' has been discussed relative to FIG. 120'. Arrow 32' shows the oil flowing along the perimeter canister outside the upper safety filter. In the figure, oil flow is shown restricted due to the plugged main filter medium 21a'. In this situation, oil pressure increased, therefore forcing both safety valves 13b' and 13c' open allowing the oil to flow through. As the safety valves have been forced open, the oil reaches the upper safety filter 18'. Arrows 32a', 32b' and 32c' show the movement of the oil passing through the safety filter medium 18' and entering the core oil passage 32d'. Flow continues to arrow 33' passing the main filter core passage, joining the filtered oil flow from the micronics filter 24' merged in oil path 34' and previously then flows back to the engine (not shown) via oil path 35'.

Figure 122:
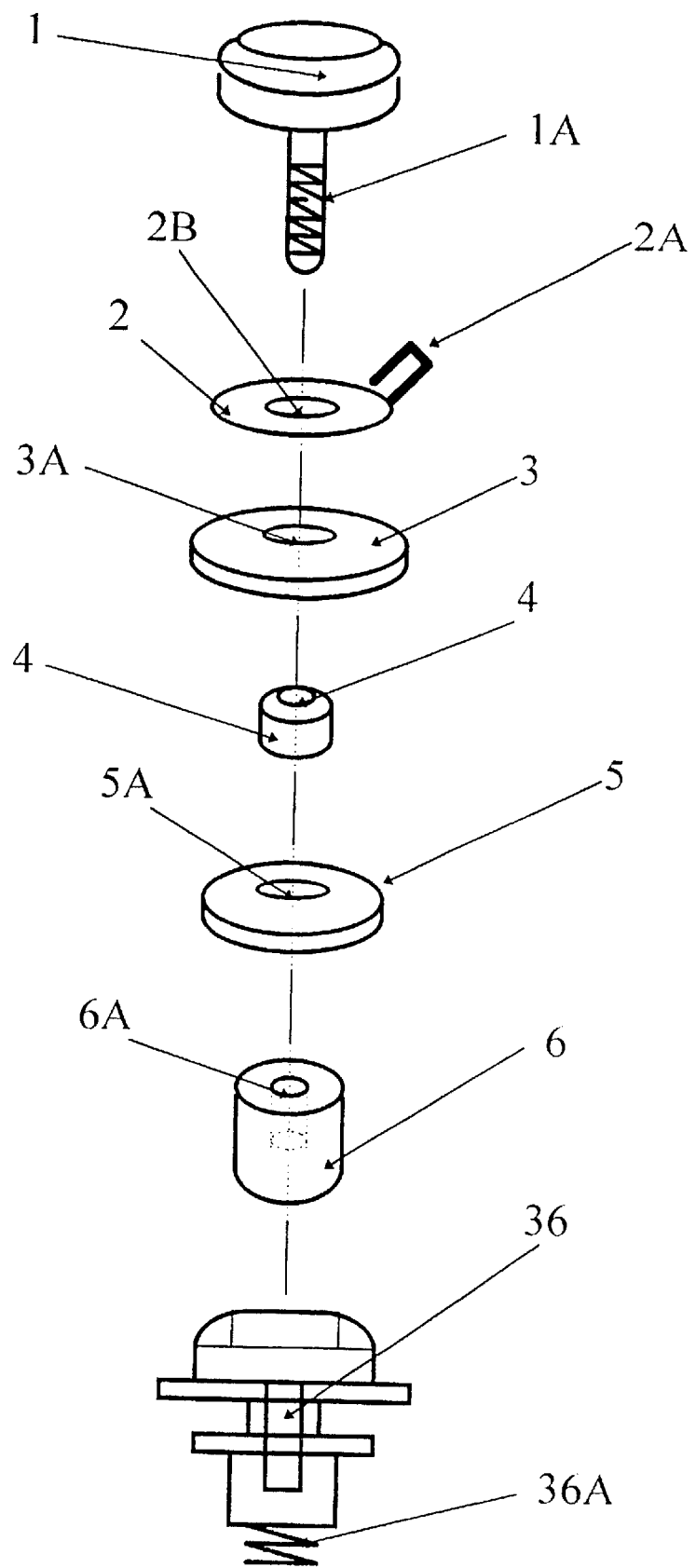

FIG. 122 illustrates the warning device assembly 36' referred to the warning device 1' in FIG. 54. The receiving nut 6' in FIG. 54 is the same as the receiving nut 6' in FIG. 122 but without the contacting pin 6b' that affixed to the the nut body 6, referenced in FIG. 54. The contact spring 36a' is attached to the bottom of receiving nut 6.

Figure 123:
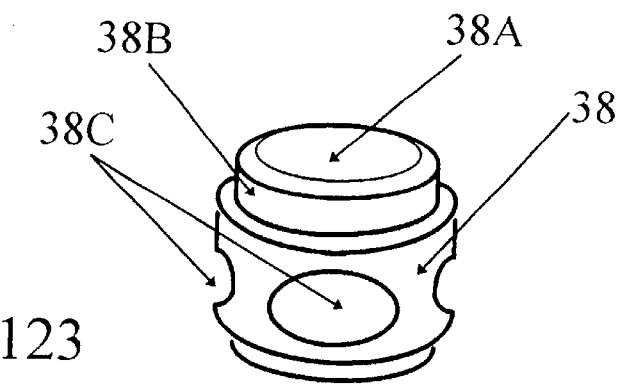

FIG. 123 illustrates a perspective view of the central safety valve casing 38', having a raised ring wall 38b' circles an opening 38a', along the casing body 38' are four outposts 38' for oil that enters into the safety filter chamber.

Figure 124:
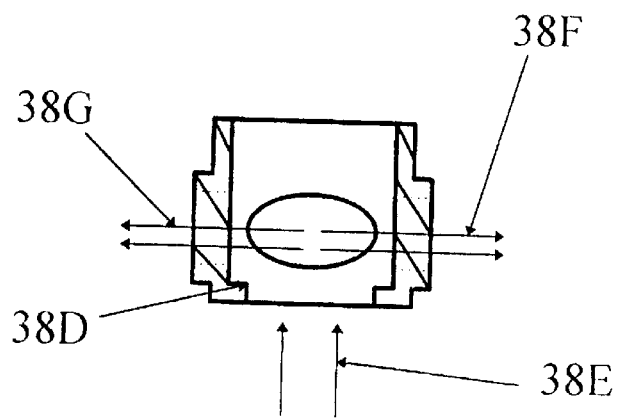
Figure 126:
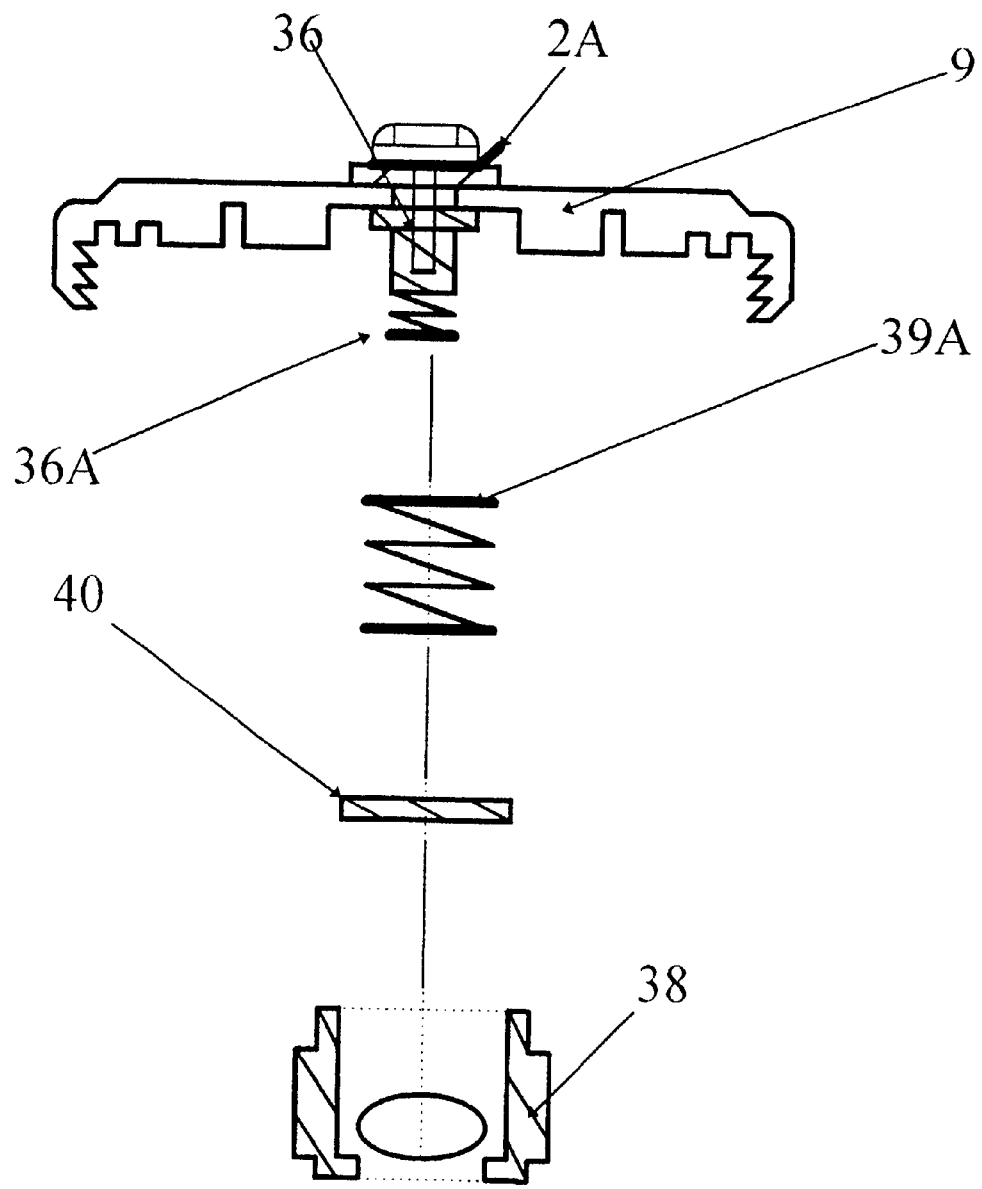

FIG. 124 illustrates a sectional view of the center safety valve casing 38', a circular flange 38d' is located at the bottom part functioning as the recess for a flat round valve 40' in FIG. 126. Numerals 38e', 38f' and 38g' show represent arrows showing the oil path that oil enters through the bottom opening and corme out of the outports 38c'.

Figure 125:
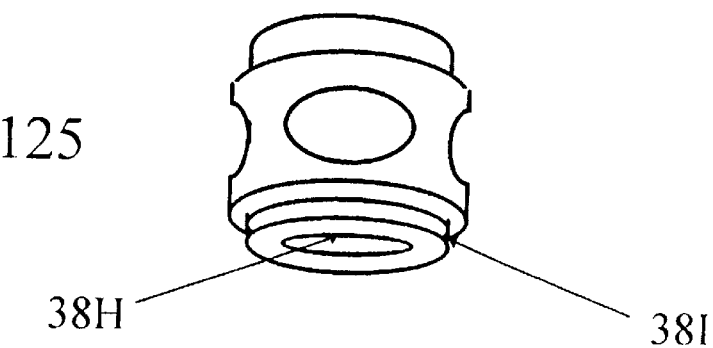

FIG. 125 illustrates a perspective view of the center safety valve casing 38'. Indent base 38g' has a bottom opening 38h' which is the entry port for oil when a safety valve is open.

FIG. 126 illustrates an exploded view with insulated warning/safety device 36', the filter cap 9', the safety valve spring 39', flat safety valve 40' and the center safety valve casing 38'. When these above components are assembled and contact each other, the ground circuit is connected and terminates at the flat metal safety valve 40'. The contact spring 36a' attached to the ground current insulated warning/safety device 36', of which its metal wire connector 2a' is wired to an outside warning indicator which will be activated when ground current (circuit) is connected. Connection is made by close contact of the flat metal safety valve 40' and the insulated safety warning device 36'.

Figure 127:
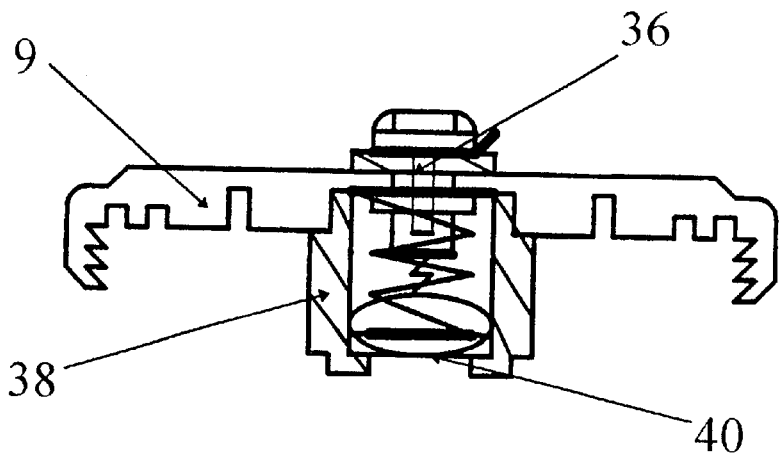

FIG. 127 illustrates a cross-sectional view of a fully assembled safety valve 11' and warning device, affixed with filter cap 9', the latter referenced in FIG. 126.

Figure 128:
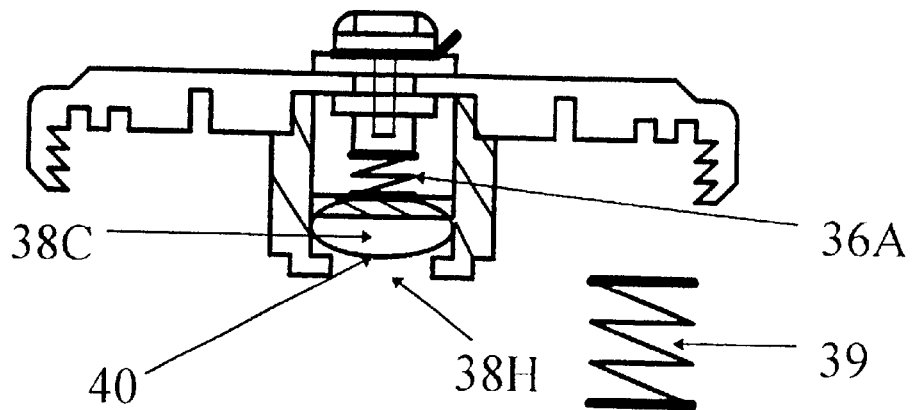

FIG. 128 illustrates a cross-sectional view of the assembled device referred to FIG. 127 except that the safety valve spring is removed for clearer illustration purpose for the interaction of the opening of the flat metal safety valve 40' and the warning/safety device 36'. Whilst the flat safety valve 40' is pushed upward by oil pressure and opens up the safety oil passage then makes contact with the contact spring 36a' which its other end is attached to the insulated warning/safety device, thereby the ground circuit is connected by such an action.

Figure 129:
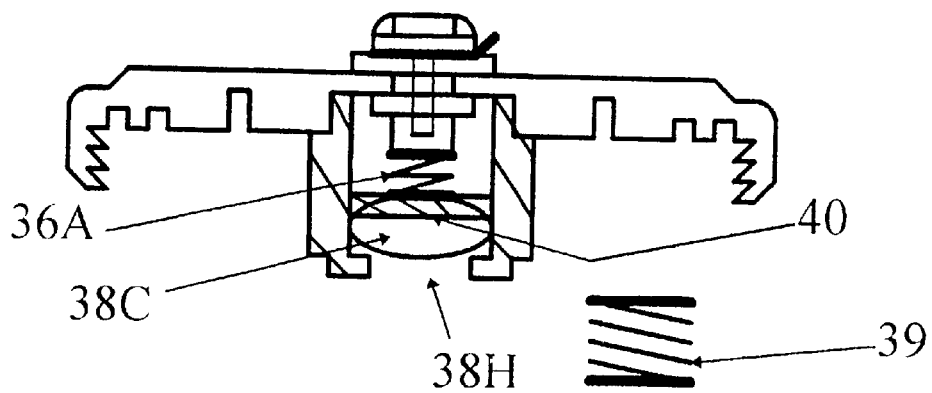

FIG. 129 illustrates a cross-sectional view of the assembled device referenced in FIG. 128. The safety valve spring 39' is also removed for clarity showing the flat metal valve 40' is in close position without contacting the contact spring 36a'.

FIG. 130 illustrates an underside view of the filter cap 9' assembled with the safety valve assembly 38'.

FIG. 131 and 132 illustrates a perspective view of the rectangular free flow tunnel 41', which is the component that its top opening 41a' can be tightly fitted into the circular base 38g' of the safety valve casing 38'. Numerals 41b' and 41c' are oil entry ports which allow oil to flow freely into the safety filter chamber and other auxiliary filter chamber. Positioned at the bottom of the rectangular free flow tunnel 41, there is a smaller opening 41d' which receives circular member 43' to be discussed hereinafter with respect to FIG. 83.

FIG. 133 illustrates a perspective view of a tubular section which functions as the housing of the safety filter, securing the filter cap 9', positioning the main filter assembly 21', partition between the main oil flow and the oil flow that flows into the safety filter chamber, housing the warning/safety device and the rectangular free flow tunnel 41'. This tubular section is designated as safety filter housing 42' which has two corresponding openings 42a' and 42b' at its upper body in which the rectangular free flow tunnel 41' is fitted.

FIG. 134 illustrates a perspective view of the rectangular free flow tunnel 41' positioned in openings 42a' and 42b' of the safety filter housing 42'.

FIG. 135 illustrates a perspective view of the assembled filter cap 9', safety valve assembly 38', rectangular free flow tunnel 41' and safety filter housing 42'.

FIG. 136 illustrates a side top dimensional view of circular member 43' which functions as the securing member of the safety filter cartridge, and the tubular auxiliary filter cartridge referred herein previously. Numeral 43b' is the orifice for oil entry into the auxiliary filter chamber, while 43a' is a raised member that snugly fits into the bottom opening 41d' under the rectangular free flow tunnel 41'.

FIG. 137 illustrates a cross-sectional view of circular member 43'. Numeral 43c' is a raised flange along the perimeter rim and 43e' is a raised center ring. 43c' and 43e' create two indented areas. Inside the center ring 43e' is the indented area 43f' which is accommodates the top part of the auxiliary filter housing in FIG. 154. 43g' is an O-ring positioned in a groove. The indented area 43d' is for securing the top part of the safety filter cartridge 18', referred to in FIGS. 71 and 72.

FIG. 138 illustrates a perspective view of the circular member 43'.

FIG. 139 illustrates an exploded view of the position of circular member 43' and the relationship with other components referred to in FIG. 135.

FIG. 140 illustrates FIG. 139 rotated 90' having the circular member 43' installed in position as well as illustrating one of the entry ports of the rectangular flow tunnel 41, referred to in FIG. 79.

FIG. 141 illustrates a perspective view of the assembled components described in FIG. 139.

FIG. 142 illustrates a perspective view of a circular cap which is the top cover 44' of the auxiliary filter body.

FIG. 143 illustrates a cross-sectional view of the top cover 44' having a circular rim surrounding the indented area 44b' and a small center oil entry port which is the orifice for oil passing through into the auxiliary filter chamber. Numeral 44d' is the indented body which fits into the auxiliary filter body; 44e' is the top connecting end with the auxiliary filter cartridge.

FIG. 144 illustrates a perspective view of the top cover 44' of FIG. 89.

FIG. 145 illustrates a perspective view of a circular cap which is the bottom cover 45' of the auxiliary filter body.

FIG. 146 illustrates a cross-sectional view of the bottom cover, where numerals 45', 45a' and 45b' represent the outward ports for the filtered oil comes out the auxiliary filter cartridge. The center indentation 45c' is the recess for securing and positioning the auxiliary filter cartridge. Element 45e' is the raised bolt having a small hole going through its body to receive a small metal ring 45f' which is a convenience device for pulling out the auxiliary filter body for servicing.

FIG. 147 illustrates a perspective view of the bottom cover 45'.

FIG. 148 illustrates an exploded view showing the proper assembling order of the circular cover 43' referred to in FIG. 136, the auxiliary filter top cover 44' and bottom cover 45' referred to in FIGS. 142 to 147. The elongated auxiliary filter body 46, which is an elongated tubular body, having both ends 46a' and 46b' fitted with top cover 44' and its top cover 45'.

FIGS. 149 and 150 illustrate a perspective view and a cross-sectional view, respectively of the assembled components 43', 44', 46', and 45' referred to in FIG. 148.

FIG. 151 illustrates a cross-sectional view of the elongated auxiliary filter cartridge 47'. Element 47a' is the top connecting member having a center opening 47b' to receive the connecting end 44e' of the top cover 44'. Element 47d' is the rubber O-ring seal which is installed on the inside wall of 47b' for securing and sealing purposes. Element 47c' is the hollow chamber for oil passing through into the auxiliary filter medium 47e'. At the bottom of the auxiliary cartridge, an extension member 47h' is fitted with a small O-ring 47g' to be inserted into the recess, which is the center indentation 45c' of the bottom cover 45' referred to FIGS. 146 and 150.

FIG. 152 illustrates a perspective view of the auxiliary filter cartridge 47'.

FIG. 153 illustrates a perspective view of proper assembling order of the components referred to FIGS. 148, 149 and 150.

FIG. 154 illustrates an exploded view of proper assembling order of the circular cover 43', top cover 44', auxiliary filter cartridge 47', bottom cover 45' and the elongated filter casing 46'.

FIG. 155 illustrates a cross-sectional view of the fully assembled components referred to in FIG. 154. The FIG. illustrates the relationship of the components.

FIG. 156 is a cross-sectional view showing the travel route of the oil into the rectangular free flow tunnel 41' and flow through two filtering systems at the same time. For clarity, the rectangular free flow tunnel 41' of which two entry ports 41a' and 41b' are placed in a 90° position in the drawing. The assembly in this drawing is in the safety filtering mode as the safety valve is pushed open by oil pressure. Arrow 48' shows oil entering entry port 41a', 48a' shows oil midway of the rectangular free flow tunnel and splitting into two, the main flow of oil moving upwardly pushing the safety valve open, oil flows to all directions through these four outports on the safety valve casing then flows toward the safety filter chamber passing through the safety filter medium continuous its path flow down the core passage along the exterior wall of the auxiliary filter chamber. The other flow of oil indicated by its path 50', 50a', 50b', 50c', 50d', flows into the auxiliary filter core, passing through the auxiliary filter medium moving along the interior wall of the auxiliary filter casing towards and through the outports 45a' and 45b'.

FIG. 157 illustrates a cross-sectional of the partially assembled filter core, referred to in FIG. 119, comprising filter cap 9', safety filter cartridge 18', the main full flow filter cartridge 21', the fine micronic filter cartridge 24', and the elongate auxiliary filter cartridge.

FIG. 158 shows a perspective view of the assembled components referred to in FIG. 157.

FIG. 159 illustrates a perspective view of the partial assembly comprising the filter cap 9', the safety filter housing 42' and the four filtering cartridges, referred to in FIGS. 157 and 158; also shown is the position of the rectangular free flow tunnel entry 41b'.

FIG. 160 illustrates a perspective view of the completely assembled filter core having the safety filter casing 42', the magnetic ring 14c', and the fine micronic filter casing in place. The position of the elongate auxiliary filter cartridge is illustrated by dotted lines.

FIG. 161 is a cross-sectional view of the completely assembled four stages filter core that is inserted into the filter canister 27'. The assembly comprises the main full flow filter 21', the full flow safety filter 18, the fine micronics filter 24', the magnetic ring 14c' and the auxiliary filter 47'. It is demonstrated that the filter is in the main full flow filtering mode, referred to in FIG. 119.

FIG. 162 illustrates a cross-sectional view of the four stages filter model when in the normal filtering mode; the main full flow filter 21', the fine micronics filter 24', the magnetic ring 14c' and the auxiliary filter 47', are all simultaneously in operation while the safety filter is in the closed mode. At the bottom of the FIG., numeral 29' denotes the oil entry into the filter via entry ports to travel along the interior wall of the canister. Arrows 30', 30a', 30b' and 30c' show the oil flow through the orifice of the fine micronics filter chamber passing through the medium and merging with the filtered main oil flow in the center core passage. Arrows 31', 31a', 31b', and 31c' show the oil flow through the main full flow filter medium into the center core passage.

It moves rapidly toward the exit, merging with the filtered oil from the fine micronics filter. Arrows 32', 48', 50', 50a', 50b' and 50c' show the oil travel passing the outside wall of the safety filter housing and entering the rectangular free flow tunnel flow. The oil flows through the orifice of the auxiliary filter into its filter core and passes through the auxiliary filter medium to move along the interior wall of the elongated auxiliary filter casing. The oil then flows out via the two outports at the bottom of the auxiliary filter. All three separate streams of oil merge together and flow back to the engine via outpost 35'.

FIG. 163 illustrates a cross-sectional view of the four stage filter inserted into the canister. In this stage of the filter, the main full flow filter is restricted and the safety filter is in the open mode. Numeral 40' shows the safety valve in an open condition and the oil path 48', 49', 49a', 49b', 49c', 49d' and 49e' show the oil path into the rectangular free flow tunnel. Oil pressure forces the safety valve to open and the oil then passes through the four openings on the safety valve casing dispersing to all directions. The oil flow around and toward the circular safety filter cartridge passes through the safety filter medium and filtered oil then moves into the center core passage and travels rapidly along the exterior wall of the auxiliary filter housing merging with the filtered oil flows from the fine micronics filter and the auxiliary filter. The merged oil flow returns to the engine via the outpost of the filter canister.

FIG. 164 illustrates a cross-sectional view of the components. The warning/safety device 36', the filter cap 9', the safety valve casing 38' and the auxiliary filter assembly 46, which can be transformed into another multiple filtering model by adding filter cartridges of different configurations.

FIG. 165 illustrates a perspective view of a circular disk 51' which functions as the bottom mounting plate for the safety filter; numeral 51a' is the indented area for seating the safety filter medium; numeral 51b' is a raised center rim creating a center opening 51c' for accommodating the circular member 43' and the elongate auxiliary filter cartridge 46'. The outer annular groove 51d' where a O-ring is placed for sealing purposes when fitted inside a larger elongate tubular member 53' referred to in FIG. 173 to be discussed hereinafter.

FIG. 166 is a cross-sectional view of the circular disk 51' and, FIG. 167 illustrates a perspective view of the circular disk 51'.

FIG. 168 illustrates a perspective view of the relationship of the circular disk 43', the elongate auxiliary cartridge 46' and the circular disk 51', particulary showing the annular open space 59e' created for the oil passage of the filtered oil that passes through the safety filter.

FIG. 169 is a cross-sectional view of the assemblies of circular disk 43', elongated auxiliary filter cartridge 46' and the circular disk 51'. O-ring 59e' is in place at position 59c'.

FIGS. 170 and 171 illustrate perspective views of the assemblies of circular disk 43', elongated auxiliary filter cartridge 46' and the circular disk 51' having the safety filter medium 52' installed in position.

FIG. 172 illustrates a cross-sectional view of the assembled filter cap 9', warning device 36', safety valve assembly 38', rectangular free flow tunnel 41', all previously referred to in FIG. 135.

FIG. 173 illustrates in perspective, a tubular member having a rectangular opening 53a' and a series of openings adjacent to the bottom rim 53d'.

FIG. 174 illustrates a perspective view of a tubular member 53' which houses the whole assemblies referred to in FIG. 173. Member 53' functions as the partition between the main full flow filter cartridge and the safety filter cartridge. Element 53a' is one of the corresponding openings in which the rectangular free flow tunnel 41' is fitted. Upper rim 53b' connects with groove 9c' of the filter cap 9', referred to in FIG. 56. The lower rim 53d' connects with another circular disk member 54' referred to in FIG. 127 forming the main full flow filter cartridge. An array of openings 53c', located at the bottom part of the tubular body 53' adjacent to rim 53c' are passages for filtered oil that passes through the main full flow filter medium. FIG. 173 illustrates a perspective view of the assembled components referred to in FIGS. 169, 170 and 171, all of which are housed in proper position within the tubular member 53'.

Referring now to FIG. 175, shown is a circular disk member which is the top mounting disk for the main full flow filter medium. Raised rim 54a' and raised inner rim 54c' create an indented annular area in which houses one end of the main filter medium. An O-ring is fitted into the groove on the inner wall of rim 54c' whereby the opening 54d' is to receive the assembled tubular member 53' referred to in FIG. 173.

FIG. 176 illustrates the member 54' in a cross-section view; and, FIG. 177 illustrates a top side dimensional view of disk 54'.

FIG. 178 illustrates the circular mounting disk mounted around the top part of the tubular member 53' adjacent to the rectangular free flow tunnel, above which the magnetic ring 14c' is also affixed.

FIG. 179 illustrates another circular disk member which is the bottom mounting disk 55' for seating the bottom end of the main full flow filter medium. Raised rim 55a' and inner raised rim 55c' creates a annular indented area 55b' wherein the bottom end of the main full flow filter medium is mounted. Element 55c' is raised to position the bottom rim 53d' of the tubular member 53. Element 55d' is the open area within the tubular member 53' where the returning oil flows into the center opening 55e'. Element 55f is another raised rim for positioning with the oil flow outport when engaging with the filter canister. FIG. 180 illustrates the mounting disk 55' in cross-section and FIG. 181 illustrates the underside of the circular mounting disk 55'.

FIG. 182 illustrates a perspective view of the assembly where the circular mounting disk is mounted around the lower body of tubular member 53', referred to in FIG. 178.

FIG. 183 illustrates the main full flow filter medium 56' installed in position between the circular top mounting disk 54' and the circular bottom mounting disk 55'; and, FIG. 184 illustrates the assembled components.

FIG. 185 illustrates the fully assembled filter core, including the filter cap 9', referred to FIGS. 183 and 184.

FIG. 186 illustrates the cross-sectional view of the fully assembled filter core referred to in FIG. 185 with the flat seal 27g' in place.

FIG. 187 illustrates a cross-sectional view of the fully assembled filter core installed into the filter canister showing the oil movement through the main full flow filter. Oil enters into the canister via multiple inports 27e' on oil path 29' along the inner wall of the canister; arrows 57', 57a', 57b', 57c', 57d' and 60' show the movement of the main flow of oil being filtered by the main full flow filter medium and returned to the engine via outport 61'.

FIG. 188 illustrates a cross-sectional view of the fully assembled filter core within the canister showing the oil movements of both the main full flow filter as well as the elongate auxiliary filter. At this stage, the filter is in the normal filtering mode. The main full flow filter oil movement illustrated is the same as referred to in FIG. 186.

Arrows 29', 57', 57a', 58', 58a', 58b', 58c', 58d', 58e', 58f', 60', and 61' show a small stream of oil detoured from the main oil stream being filtered and merged with the main oil stream at point of oil path, denoted by numeral 60', then return back to the engine.

FIG. 189 illustrates a cross-sectional view of the multiple stage filter referred to in FIG. 188. The filter is in the safety filtering mode wherein the main full flow filter medium is restricted and clogged by particles thus activates the safety filter by forcing open up the safety valve 40'. Oil flows through the rectangular free flow tunnel illustrated on oil path denoted by path 59', 59a'; oil exits the safety valve assembly on path 59b', then flows along the safety filter chamber on path 59c'. Path 59d' shows the oil entering the safety filter medium, the filtered oil subsequently flows along path 59e' to 59f and merges with the small stream of filtered oil from the auxiliary filter at points of path 58f', 60' and 61' then returns back to the engine.

Although the invention has been discussed with respect to oil filtration, it will be appreciated by those sidlled in the art that the filter can be employed in any form of fluid filtration. Furthermore, regarding the choice of materials of which the filter media may be composed, any suitable synthetic, i.e. metal mesh, organic polymer mesh or natural materials such as cotton fibers or any other suitable natural filtration medium.

The size and number of the openings in the filtration head may vary substantially depending upon the intended volume of oil and other requirements.

Although embodiments of the invention have been described above, it is not limited thereto and it will be apparent to those skilled in the art that numerous modifications form part of the present invention insofar as they do not depart from the spirit, nature and scope of the claimed and described invention.

What is claimed is:

1. A reusable oil filter comprising:

a hollow container having opposed ends;

a plurality spased apart concentric filtration body members removably mounted within said container, each filtration body member having a different porosity from the other filtration body members for providing a plurality of successive filtering steps;

filter base means removably mounted on first end of said container;

removable filter head means releasably mounted to a second opposed end of said container for sealing said container;

said filter base means having an inlet to receive oil to be filtered and an outlet to discharge filter oil;

said filter head including upper and lower filter body members, and an annular space between said container and said filtration body members for the flow of oil.

2. The filter as set forth in claim 1, wherein each of said filtration body members is releasably connected to an adjacent filter body member.

3. The filter as set forth in claim 2 wherein connection between said filtration body members comprises friction connection.

4. The filter as set forth in claim 2, characterized in that each of said plurality of filter body members includes a filter medium having a different porosity for progressive filtration of said oil.

5. The filter as set forth in claim 4 wherein said filter body members are differently dimensioned relative to one another.

6. The filter as set forth in claim 1, wherein the said porosity of each of said filtration body member is from about 1 Um to 300 Mm.

7. The filter as set forth in claim 2 wherein said filter includes a central core filter positioned centrally of said hollow container and a plurality of discrete independent filter body members in stacked releasable interconnection surrounded and coaxially disposed with said central core.

8. The filter as set forth in claim 1 wherein said removable filter head includes valve means for selectively passing oil therethrough when oil pressure exceeds a predetermined value.

9. The filter as set forth in claim 8 wherein said valve means includes indicator means for indicating said valve means is actuated.

10. The filter as set forth in claim 1, wherein said filter includes magnetic means for removing metallic material from oil flowing through said filter.

11. The reusable oil filter as set forth in claim 1, further comprising flow guide means disposed within said annular space for directing oil flow through said annular space.

12. The filter as set forth in claim 11 wherein said flow guide means prevents dislodging of material contained in said filtration body members.

13. The filter according to claim 11, wherein said flow guide means comprises a cylindrical perforated body with a protruding lip on each perforation for deflecting oil flow.

14. The filter as set forth in claim 11 wherein said flow guide means includes a plurality of apertures and outwardly extending lips.

15. The filter as set forth in claim 11 wherein at least one of said filter body members comprises woven steel.

16. The filter as set forth in claim 11, characterized in that at least one of said filter body members comprises natural material.

17. The filter as set forth in claim 11, further comprising magnetic means for removing metallic material from oil flowing through said filter.

18. The filter as set forth in claim 1, wherein at least one of said filter body members is at least partly enclosed within an enclosure having an aperture opening to said annular space.

19. The filter as set forth in claim 18, wherein at least one of said filter body members has a finer porosity than at least one of said lifter body members.

20. The filter as set forth in claim 1, further comprising a third filtration body member having valve means for selectively passing oil therethrough when oil pressure within said filter exceeds a predetermined value.

* * * * *